(12) United States Patent
Prasad et al.

(10) Patent No.: US 12,008,522 B1
(45) Date of Patent: Jun. 11, 2024

(54) APPARATUSES, METHODS AND SYSTEMS FOR A PUBLISHING AND SUBSCRIBING PLATFORM OF DEPOSITING NEGOTIABLE INSTRUMENTS

(71) Applicant: United Services Automobile Association (USAA), San Antonio, TX (US)

(72) Inventors: Bharat Prasad, San Antonio, TX (US); Rickey Dale Burks, San Antonio, TX (US); Minya Liang, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/206,407

(22) Filed: Jun. 6, 2023

Related U.S. Application Data

(63) Continuation of application No. 17/539,513, filed on Dec. 1, 2021, now Pat. No. 11,756,009, which is a
(Continued)

(51) Int. Cl.
*G06Q 20/04* (2012.01)
*G06Q 20/10* (2012.01)
*G06Q 40/02* (2023.01)

(52) U.S. Cl.
CPC ....... *G06Q 20/042* (2013.01); *G06Q 20/0425* (2013.01); *G06Q 20/10* (2013.01); *G06Q 40/02* (2013.01)

(58) Field of Classification Search
CPC .. G06Q 20/042; G06Q 20/0425; G06Q 20/10; G06Q 40/02
See application file for complete search history.

(56) References Cited

U.S. PATENT DOCUMENTS 5,664,027 A  9/1997 Ittner
5,890,141 A  3/1999 Carney et al.
(Continued)

FOREIGN PATENT DOCUMENTS

CA  2619884  3/2007
CN  1967565 A  5/2007
(Continued)

OTHER PUBLICATIONS

Henkel, Joseph et al., "Remote Deposit Capture in the Consumer's Hands", Downloaded on Jun. 19, 2010 at 18:46: UTC from IEEE Xplore.
(Continued)

*Primary Examiner* — Scott C Anderson
(74) *Attorney, Agent, or Firm* — Crowell & Moring LLP

(57) ABSTRACT

The APPARATUSES, METHODS AND SYSTEMS FOR A PUBLISHING AND SUBSCRIBING PLATFORM OF DEPOSITING NEGOTIABLE INSTRUMENTS (hereinafter "PS-PLATFORM") provides a negotiable instrument data publish and subscribe framework, whereby financial institutions may exchange negotiable instrument deposit data and/or validation information within the publish and subscribe framework. In one embodiment, the PS-PLATFORM may register a financial institution as a subscriber and provide financial transaction information to the financial institution based on the subscription.

17 Claims, 70 Drawing Sheets

Related U.S. Application Data continuation of application No. 16/708,686, filed on Dec. 10, 2019, now Pat. No. 11,222,315, which is a continuation of application No. 15/722,836, filed on Oct. 2, 2017, now Pat. No. 10,896,408, which is a continuation of application No. 12/859,741, filed on Aug. 19, 2010, now Pat. No. 9,779,392.

(60) Provisional application No. 61/235,216, filed on Aug. 19, 2009.

(56) References Cited

U.S. PATENT DOCUMENTS

| | | | |
|---|---|---|---|
| 5,903,904 A | 5/1999 | Peairs | |
| 6,315,195 B1 | 11/2001 | Ramachandran | |
| 6,564,380 B1 | 5/2003 | Murphy | |
| 6,668,372 B1 | 12/2003 | Wu | |
| 6,704,039 B2 | 3/2004 | Pena | |
| 6,738,087 B2 | 5/2004 | Belkin et al. | |
| 6,930,718 B2 | 8/2005 | Parulski et al. | |
| 7,296,734 B2 | 11/2007 | Pliha | |
| 7,568,615 B2 | 8/2009 | Corona et al. | |
| 7,647,897 B2 | 1/2010 | Jones | |
| 7,766,223 B1 | 8/2010 | Mello | |
| 7,865,425 B2 | 1/2011 | Waelbroeck | |
| 7,873,556 B1 | 1/2011 | Dolan | |
| 7,974,869 B1 | 7/2011 | Sharma | |
| 8,009,931 B2 | 8/2011 | Li | |
| 8,051,453 B2 | 11/2011 | Arseneau et al. | |
| 8,064,729 B2 | 11/2011 | Li | |
| 8,118,654 B1 | 2/2012 | Nicolas | |
| 8,131,636 B1 | 3/2012 | Viera et al. | |
| 8,275,715 B2 | 9/2012 | Caruso | |
| 8,396,623 B2 | 3/2013 | Maeda et al. | |
| RE44,274 E | 6/2013 | Popadic et al. | |
| 8,483,473 B2 | 7/2013 | Roach | |
| 8,531,518 B1 | 9/2013 | Zomet | |
| 8,582,862 B2 | 11/2013 | Nepomniachtchi et al. | |
| 8,725,607 B2 | 5/2014 | Dunn | |
| 8,768,836 B1 | 7/2014 | Acharya | |
| 8,824,772 B2 | 9/2014 | Viera | |
| 8,929,640 B1 | 1/2015 | Mennie et al. | |
| 9,195,986 B2 | 11/2015 | Christy et al. | |
| 9,235,860 B1 | 1/2016 | Boucher et al. | |
| 9,270,804 B2 | 2/2016 | Dees et al. | |
| 9,384,409 B1 | 7/2016 | Ming | |
| 9,387,813 B1 | 7/2016 | Moeller et al. | |
| 9,524,269 B1 | 12/2016 | Brinkmann et al. | |
| 9,613,467 B2 | 4/2017 | Roberts et al. | |
| 9,613,469 B2 | 4/2017 | Fish et al. | |
| 9,674,396 B1 | 6/2017 | Pashintsev | |
| 9,818,090 B1 | 11/2017 | Bueche, Jr | |
| 9,824,453 B1 | 11/2017 | Collins et al. | |
| 10,157,326 B2 | 12/2018 | Long et al. | |
| 10,210,767 B2 | 2/2019 | Johansen | |
| 10,217,375 B2 | 2/2019 | Waldron | |
| 10,402,944 B1 | 9/2019 | Pribble et al. | |
| 10,460,295 B1 | 10/2019 | Oakes, III et al. | |
| 10,482,432 B1 | 11/2019 | Oakes, III et al. | |
| 10,818,282 B1 | 10/2020 | Clauer Salyers | |
| 10,846,667 B1 | 11/2020 | Hecht | |
| 11,121,989 B1 | 9/2021 | Castinado | |
| 11,182,753 B1 | 11/2021 | Oakes, III et al. | |
| 11,222,315 B1 | 1/2022 | Prasad et al. | |
| 11,232,517 B1 | 1/2022 | Medina et al. | |
| 11,250,398 B1 | 2/2022 | Prasad et al. | |
| 11,288,898 B1 | 3/2022 | Moon | |
| 11,328,267 B1 | 5/2022 | Medina, III | |
| 11,398,215 B1 | 7/2022 | Clauer Salyers | |
| 2001/0020949 A1 | 9/2001 | Gong et al. | |
| 2002/0075380 A1 | 6/2002 | Seeger et al. | |
| 2002/0120846 A1 | 8/2002 | Stewart | |
| 2002/0152169 A1 | 10/2002 | Dutta | |
| 2003/0046223 A1 | 3/2003 | Crawford | |
| 2003/0051138 A1 | 3/2003 | Maeda et al. | |
| 2003/0056104 A1 | 3/2003 | Carr | |
| 2003/0081121 A1 | 5/2003 | Swan | |
| 2003/0097592 A1 | 5/2003 | Adusumilli | |
| 2003/0119478 A1 | 6/2003 | Nagy et al. | |
| 2003/0158811 A1 | 8/2003 | Sanders | |
| 2003/0200107 A1 | 10/2003 | Allen et al. | |
| 2003/0213841 A1 | 11/2003 | Josephson et al. | |
| 2004/0136586 A1 | 7/2004 | Okamura | |
| 2004/0193878 A1 | 9/2004 | Dillinger et al. | |
| 2004/0202349 A1 | 10/2004 | Erol et al. | |
| 2005/0001924 A1 | 1/2005 | Honda | |
| 2005/0015341 A1 | 1/2005 | Jackson | |
| 2005/0078192 A1 | 4/2005 | Sakurai | |
| 2005/0087594 A1 | 4/2005 | Phillips | |
| 2005/0091117 A1 | 4/2005 | Phillips | |
| 2005/0091132 A1 | 4/2005 | Phillips | |
| 2005/0102208 A1 | 5/2005 | Gudgeon | |
| 2005/0125337 A1 | 6/2005 | Tidwell | |
| 2005/0128333 A1 | 6/2005 | Park | |
| 2005/0133586 A1 | 6/2005 | Rekeweg et al. | |
| 2005/0165641 A1 | 7/2005 | Chu | |
| 2005/0172118 A1* | 8/2005 | Nasu | G03G 21/04 399/24 |
| 2005/0190269 A1 | 9/2005 | Grignani | |
| 2005/0198364 A1 | 9/2005 | Val et al. | |
| 2005/0216409 A1 | 9/2005 | McMonagle et al. | |
| 2005/0273430 A1 | 12/2005 | Pliha | |
| 2005/0281450 A1 | 12/2005 | Richardson | |
| 2006/0010071 A1 | 1/2006 | Jones | |
| 2006/0023930 A1 | 2/2006 | Patel | |
| 2006/0026140 A1 | 2/2006 | King | |
| 2006/0171697 A1 | 2/2006 | Nijima | |
| 2006/0045321 A1 | 3/2006 | Yu | |
| 2006/0071950 A1 | 4/2006 | Kurzweil et al. | |
| 2006/0091216 A1* | 5/2006 | Page | G06V 30/244 235/462.07 |
| 2006/0112013 A1 | 5/2006 | Maloney | |
| 2006/0124728 A1 | 6/2006 | Kotovich et al. | |
| 2006/0152576 A1 | 7/2006 | Kiessling et al. | |
| 2006/0186194 A1 | 8/2006 | Richardson | |
| 2006/0202468 A1 | 9/2006 | Phillips | |
| 2006/0270421 A1 | 11/2006 | Phillips | |
| 2006/0280360 A1 | 12/2006 | Holub | |
| 2007/0030363 A1 | 2/2007 | Cheatle et al. | |
| 2007/0058874 A1 | 3/2007 | Tabata et al. | |
| 2007/0095909 A1 | 5/2007 | Chaum | |
| 2007/0116364 A1 | 5/2007 | Kleihorts et al. | |
| 2007/0118747 A1 | 5/2007 | Pintsov et al. | |
| 2007/0136078 A1 | 6/2007 | Plante | |
| 2007/0244811 A1 | 10/2007 | Tumminaro | |
| 2008/0013831 A1 | 1/2008 | Aoki | |
| 2008/0040280 A1 | 2/2008 | Davis | |
| 2008/0141117 A1 | 6/2008 | King | |
| 2008/0192129 A1 | 8/2008 | Walker | |
| 2008/0250196 A1 | 10/2008 | Mori | |
| 2008/0270295 A1 | 10/2008 | Lent | |
| 2008/0298635 A1* | 12/2008 | West | G06V 30/147 382/101 |
| 2009/0092287 A1 | 4/2009 | Moraleda | |
| 2009/0141962 A1 | 6/2009 | Borgia | |
| 2009/0171723 A1 | 7/2009 | Jenkins | |
| 2009/0176511 A1 | 7/2009 | Morrison | |
| 2009/0222347 A1 | 9/2009 | Whitten | |
| 2009/0236201 A1 | 9/2009 | Blake | |
| 2009/0240574 A1 | 9/2009 | Carpenter | |
| 2009/0242626 A1 | 10/2009 | Jones | |
| 2010/0016016 A1 | 1/2010 | Brundage et al. | |
| 2010/0038839 A1 | 2/2010 | DeWitt et al. | |
| 2010/0069093 A1 | 3/2010 | Morrison | |
| 2010/0069155 A1 | 3/2010 | Schwartz | |
| 2010/0076890 A1 | 3/2010 | Low | |
| 2010/0112975 A1 | 5/2010 | Sennett | |
| 2010/0142749 A1 | 6/2010 | Rhoads | |
| 2010/0150424 A1 | 6/2010 | Nepomniachtchi et al. | |
| 2010/0161408 A1 | 6/2010 | Karson | |
| 2010/0201711 A1 | 8/2010 | Fillion et al. | |
| 2010/0262607 A1 | 10/2010 | Vassilvitskii | |
| 2010/0287250 A1 | 11/2010 | Carlson | |
| 2011/0015963 A1 | 1/2011 | Chafle | |

(56) References Cited

U.S. PATENT DOCUMENTS

| | | |
|---|---|---|
| 2011/0016109 A1 | 1/2011 | Vassilvitskii |
| 2011/0054780 A1 | 3/2011 | Dhanani |
| 2011/0082747 A1 | 4/2011 | Khan |
| 2011/0083101 A1 | 4/2011 | Sharon |
| 2011/0105092 A1 | 5/2011 | Felt |
| 2011/0112985 A1 | 5/2011 | Kocmond |
| 2011/0166976 A1 | 7/2011 | Krein |
| 2012/0036014 A1 | 2/2012 | Sunkada |
| 2012/0052874 A1 | 3/2012 | Kumar |
| 2012/0098705 A1 | 4/2012 | Yost |
| 2012/0109793 A1 | 5/2012 | Abeles |
| 2012/0113489 A1 | 5/2012 | Heit et al. |
| 2012/0150767 A1 | 6/2012 | Chacko |
| 2012/0230577 A1 | 9/2012 | Calman et al. |
| 2012/0296768 A1 | 11/2012 | Fremont-Smith |
| 2013/0021651 A9 | 1/2013 | Popadic et al. |
| 2013/0097076 A1 | 4/2013 | Love |
| 2013/0191261 A1 | 7/2013 | Chandler |
| 2013/0324160 A1 | 12/2013 | Sabatellil |
| 2013/0332004 A1 | 12/2013 | Gompert et al. |
| 2013/0332219 A1 | 12/2013 | Clark |
| 2013/0346306 A1 | 12/2013 | Kopp |
| 2013/0346307 A1 | 12/2013 | Kopp |
| 2014/0010467 A1 | 1/2014 | Mochizuki et al. |
| 2014/0032406 A1 | 1/2014 | Roach et al. |
| 2014/0037183 A1 | 2/2014 | Gorski et al. |
| 2014/0156501 A1 | 6/2014 | Howe |
| 2014/0197922 A1 | 7/2014 | Stanwood et al. |
| 2014/0203508 A1 | 7/2014 | Pedde |
| 2014/0207673 A1 | 7/2014 | Jeffries |
| 2014/0207674 A1 | 7/2014 | Schroeder |
| 2014/0244476 A1 | 8/2014 | Shvarts |
| 2014/0313335 A1 | 10/2014 | Koravadi |
| 2014/0351137 A1 | 11/2014 | Chisholm |
| 2014/0372295 A1 | 12/2014 | Tatham |
| 2014/0374486 A1 | 12/2014 | Collins, Jr. |
| 2015/0134517 A1 | 5/2015 | Cosgray |
| 2015/0235484 A1 | 8/2015 | Kraeling et al. |
| 2015/0244994 A1 | 8/2015 | Jang et al. |
| 2015/0294523 A1 | 10/2015 | Smith |
| 2015/0348591 A1 | 12/2015 | Kaps et al. |
| 2016/0026866 A1 | 1/2016 | Sundaresan |
| 2016/0034590 A1 | 2/2016 | Endras et al. |
| 2016/0014625 A1 | 5/2016 | Weksler et al. |
| 2016/0189500 A1 | 6/2016 | Kim et al. |
| 2016/0335816 A1 | 11/2016 | Thoppae et al. |
| 2017/0039637 A1 | 2/2017 | Wandelmer |
| 2017/0068421 A1 | 3/2017 | Carlson |
| 2017/0132583 A1 | 5/2017 | Nair |
| 2017/0146602 A1 | 5/2017 | Samp et al. |
| 2017/0229149 A1 | 8/2017 | Rothschild et al. |
| 2017/0263120 A1 | 9/2017 | Durie, Jr. et al. |
| 2017/0337610 A1 | 11/2017 | Beguesse |
| 2018/0025251 A1 | 1/2018 | Welinder et al. |
| 2018/0108252 A1 | 4/2018 | Pividori |
| 2018/0197118 A1 | 7/2018 | McLaughlin |
| 2019/0026577 A1 | 1/2019 | Hall et al. |
| 2019/0122222 A1 | 4/2019 | Uechi |
| 2019/0311227 A1 | 10/2019 | Kriegman et al. |
| 2020/0311844 A1 | 10/2020 | Luo et al. |
| 2021/0097615 A1 | 4/2021 | Gunn, Jr. |

FOREIGN PATENT DOCUMENTS

| | | |
|---|---|---|
| IN | 202141007247 A | 3/2021 |
| JP | 2004-23158 | 1/2004 |
| JP | 3708807 | 10/2005 |
| JP | 2005326902 A | 11/2005 |
| WO | WO 96/14707 A1 | 5/1996 |
| WO | WO 2007/024889 | 3/2007 |

OTHER PUBLICATIONS

"Image Scanner having Image Quality diagnostics capability with No operator intervention", an IP.com Prior Art Database Technical Disclosure, Mar. 26, 2003.

Fletcher, Lloyd A., and Rangachar Kasturi, "A robust algorithm for text string separation from mixed text/graphics images", IEEE transactions on pattern analysis and machine intelligence 10.6 (1988), 910-918 (1988).

IPR 2022-00076 filed Nov. 17, 2021 on behalf of PNC Bank N.A., 98 pages.

IPR 2022-00075 filed Nov. 5, 2021 on behalf of PNC Bank N.A., 90 pages.

IPR 2022-00050 filed Oct. 22, 2021 on behalf of PNC Bank N.A., 126 pages.

IPR 2022-00049 filed Oct. 22, 2021 on behalf of PNC Bank N.A., 70 pages.

About Network Servers, GlobalSpec (retrieved from https://web.archive.org/web/20051019130842/http://globalspec.com80/LearnMore/Networking_Communication_Equipment/Networking_Equipment/Network_Servers ("GlobalSpec").

FDIC: Check Clearing for the $21^{st}$ Century act (Check21), FED. Deposit Ins. Corp., Apr. 25, 2016 (retrieved from https://web.archive.org/web/20161005124304/http://www.fdic.gov/consumers/assistance/protection/check21.html ("FDIC").

Bruno-Britz, Maria "Mitek Launches Mobile Phone Check Capture Solution," Bank Systems and Technologies Information Week (Jan. 24, 2008).

V User Guide, https://www.lg.com/US/support/manualsdocuments?customerModelCode=%20LGVX9800&csSalesCode=LGVX9800, select"VERISON(USA) en"; The V_UG_051125.pdf.

MING Phone User Manual, 2006.

Patel, Kunur, "How Mobile Technology is Changing Banking's Future" AdAge, Sep. 21, 2009, 4 pages.

Spencer, Harvey, "Controlling Image Quality at the Point of Capture" Check 21, Digital Check Corporation & HSA 2004.

Moseik, Celeste K., "Customer Adoption of Online Restaurant Services: A Multi-Channel Approach", Order No. 1444649 University of Delaware, 2007, Ann Arbor: ProQuest., Web. Jan. 10, 2022 (Year: 2007).

Bieniecki, Wojciech et al. "Image Preprocessing for Improving OCR Accuracy", Computer Engineering Department, Technical University of Lodz, al. Politechniki 11, Lodz Poland, May 23, 2007.

Shaikh, Aijaz Ahmed et al., "Auto Teller Machine (ATM) Fraud—Case Study of Commercial Bank in Pakistan", Department of Business Administration, Sukkur Institute of Business Administration, Sukkur, Pakistan, Aug. 5, 2012.

Tiwari, Rajnish et al., "Mobile Banking as Business Strategy", IEEE Xplore, Jul. 2006.

Lyn C. Thomas, "A survey of credit and behavioural scoring: forecasting financial risk of lending to consumers", International Journal of Forecasting, (Risk) (2000).

Non-Final Office Action issued on U.S. Appl. No. 14/293,159 dated Aug. 11, 2022.

Non-Final Office Action issued on U.S. Appl. No. 16/455,024 dated Sep. 7, 2022.

Non-Final Office Action issued on U.S. Appl. No. 17/071,678 dated Sep. 14, 2022.

Non-Final Office Action issued on U.S. Appl. No. 17/180,075 dated Oct. 4, 2022.

Non-Final Office Action issue on U.S. Appl. No. 17/511,822 dated Sep. 16, 2022.

Non-Final Office Action issued on U.S. Appl. No. 17/568,849 dated Oct. 4, 2022.

Yong Gu Ji et al., "A Usability Checklist for the Usability Evaluation of Mobile Phone User Interface", International Journal of Human-Computer Interaction, 20(3), 207-231 (2006).

Printout of news article dated Feb. 13, 2008, announcing a Nokia phone providing audio cues for capturing a document image.

IPR Petition 2022-01593, *Truist Bank* v. *United Services Automobile Association* filed Oct. 11, 2022.

ANS X9.100-160-Jan. 2004, Part 1: Placement and Location of Magnetic Ink Printing (MICR), American National Standard for Financial Services, approved Oct. 15, 2004.

(56) References Cited

OTHER PUBLICATIONS

Clancy, Heather, "Turning cellphones into scanners", The New York Times, Feb. 12, 2005; https://www.nytimes.com/2005/02/12/busienss/worldbusiness/turning-cellphones-into-scanners.html.

Consumer Guide to Check 21 and Substitute Checks, The Federal Reserve Board, The Wayback Machine—Oct. 28, 2004 https://web.archive.org/web/20041102233724/http://www.federalreserve.gov.

Curtin, Denis P., A Short Course in Digital Photography Chapter 7 Graphic File Formats.

Dance, Christopher, "Mobile Document Imaging", Xerox, Research Centre Europe, XRCE Image Processing Area, Nov. 2004.

Digital Photography Now, Nokia N73 Review, Oct. 28, 2006.

Federal Reserve System, 12 CFR Part 229, Regulation CC: Docket No. R-1176, Availability of Funds and Collection of Checks, Board of Governors of the Federal Reserve System Final rule.

Financial Services Policy Committee, Federal Reserve Banks Plan Black-and- White Image Standard and Quality Checks, May 18, 2004.

MICR-Line Issues Associated With The Check 21 Act and the Board's Proposed Rule, Prepared by Federal Reserve Board Staff, Apr. 27, 2004.

Microsoft Computer Dictionary Fifth Edition—Copyright 2002.

HTTP Over TLS, Network Working Group, May 2000, Memo.

Nokia N73—Full phone specifications.

Ranjan, Amit, "Using a Camera with Windows Mobile 5", Jul. 21, 2006.

Reed, John, "FT.com site: Mobile users branch out", ProQuest, Trade Journal, Oct. 6, 2005.

Weiqui Luo et al., "Robust Detection of Region-Duplication Forgery in Digital Image" Guoping Qui, School of Computer Science, University of Nottingham, NG8 1BB, UK—Jan. 2006.

Final Written Decision relating to U.S. Pat. No. 8,699,779, IPR2021-01070, Jan. 19, 2023.

Final Written Decision relating to U.S. Pat. No. 8,877,571, IPR2021-01073, Jan. 19, 2023.

Final Written Decision relating to U.S. Pat. No. 10,621,559, IPR2021-01077, Jan. 20, 2023.

IPR2023-00829 filed Apr. 13, 2023, *Truist Bank* vs. *United Services Automobile Association*, 97 pages.

"Reserve Banks to Adopt DSTU X9.37-2003 Format for Check 21 Image Services," Fed. Reserve Bank of Minneapolis Fin. Serv. Policy Comm., May 18, 2004.

"Camera Phone Shoot-Out", Phone Scoop, Dec. 18, 2002.

Shirai, K et al., "Removal of Background Patterns and Signatures for Magnetic Ink Character Recognition of Checks," 2012 10$^{th}$ IAPR International Workshop on Document Analysis Systems, Gold Coast, QLD. Australia, 2012, pp. 190-194.

Ding, Y. et al., "Background removal for check processing using morphology in Two- and Three-Dimensional Vision Systems for Inspection, Control, and Metrology". vol. 5606, pp. 19-26, SPIE 2004.

Haskell, B.G. et al, "Image and video coding-emerging standards and beyond," in IEEE Transactions on Circuits and Systems for Video Technology, vol. 8, No. 7, pp. 814-837, Nov. 1998.

\* cited by examiner

FIGURE 3D

Remote Deposit

Time: 10/03/2009 13:45:23
AMOUNT $15,000
Maximum Deposit Amount: $10,000

*Alert: Maximum Deposit Amount exceeded!*

Remote Deposit Message Box

*To proceed, please select one of the following and click "continue":*

☐ Request to raise deposit limit (link to payee's bank) 371

☐ Cancel the Deposit and Exit 372

☑ Deposit $ 10,000 for next business day availability and send the deposit information to XXX bank for walk-in deposit service 373

FIGURE 3F

| FINANCIAL INSTITUTION | | |
|---|---|---|
| | | AMOUNT |
| CHECKING ACCOUNT | ☑ | ............... |
| SAVINGS ACCOUNT | ☐ | ............... |
| INVESTMENT ACCOUNT | ☑ | ............... |

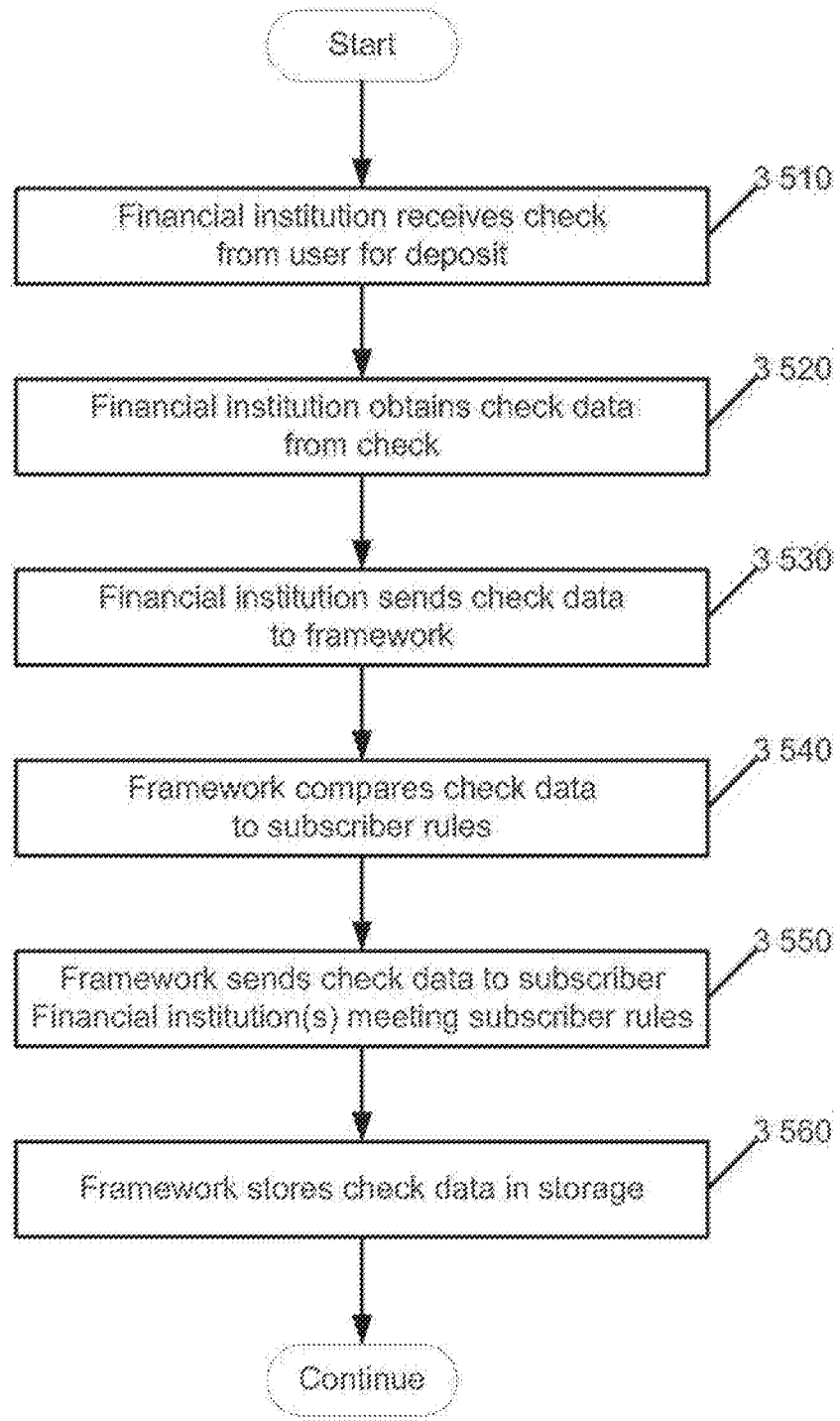

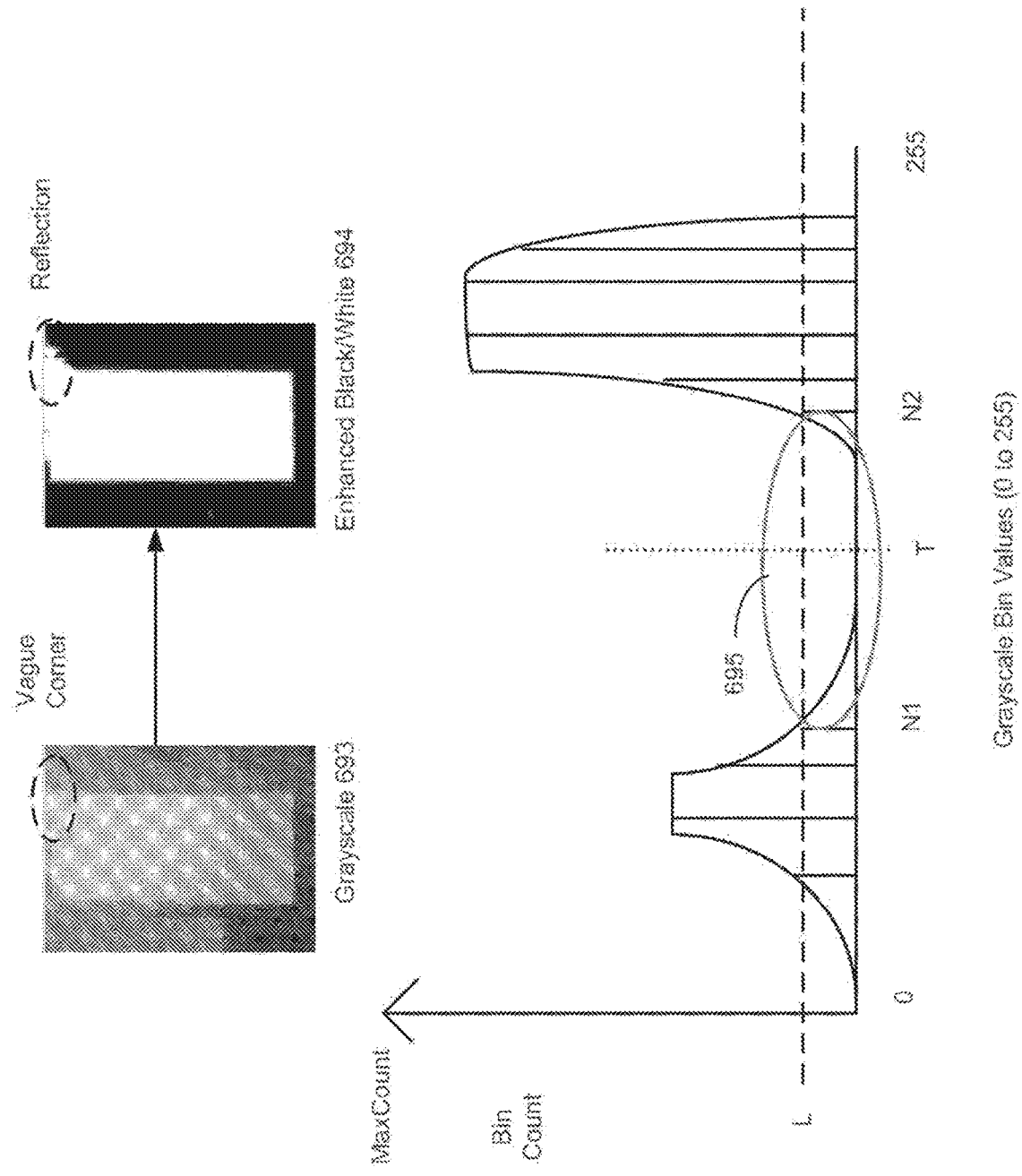

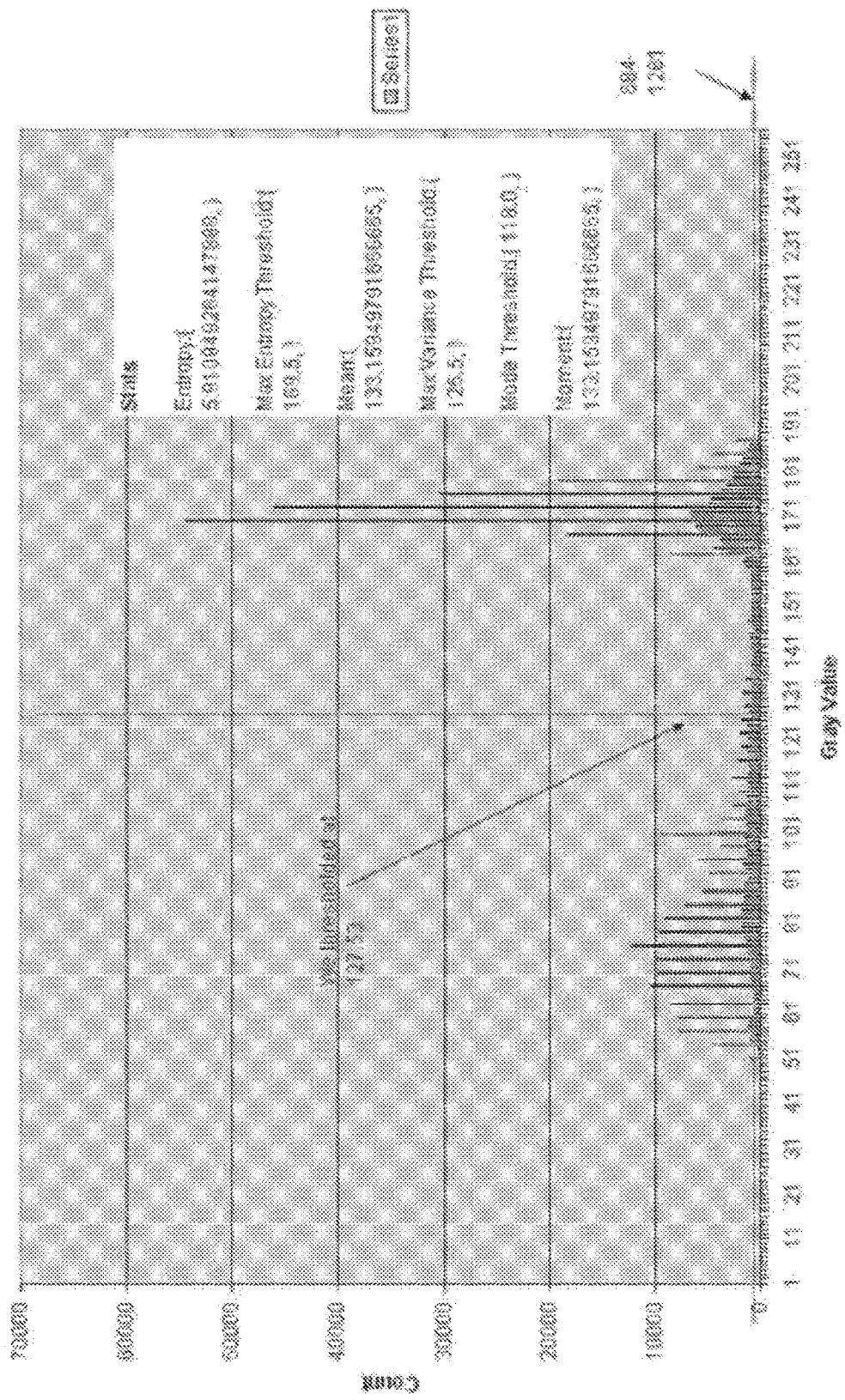

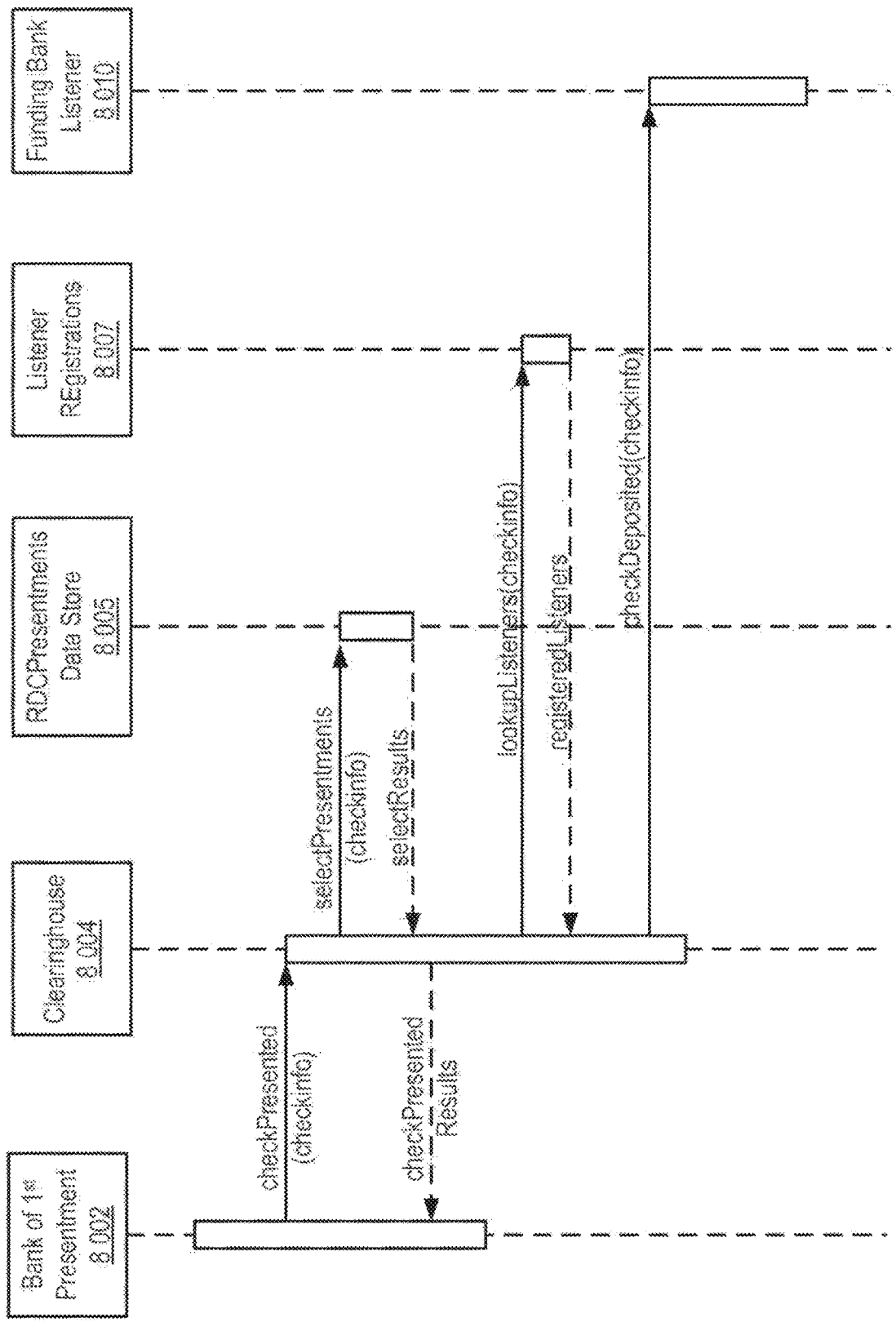

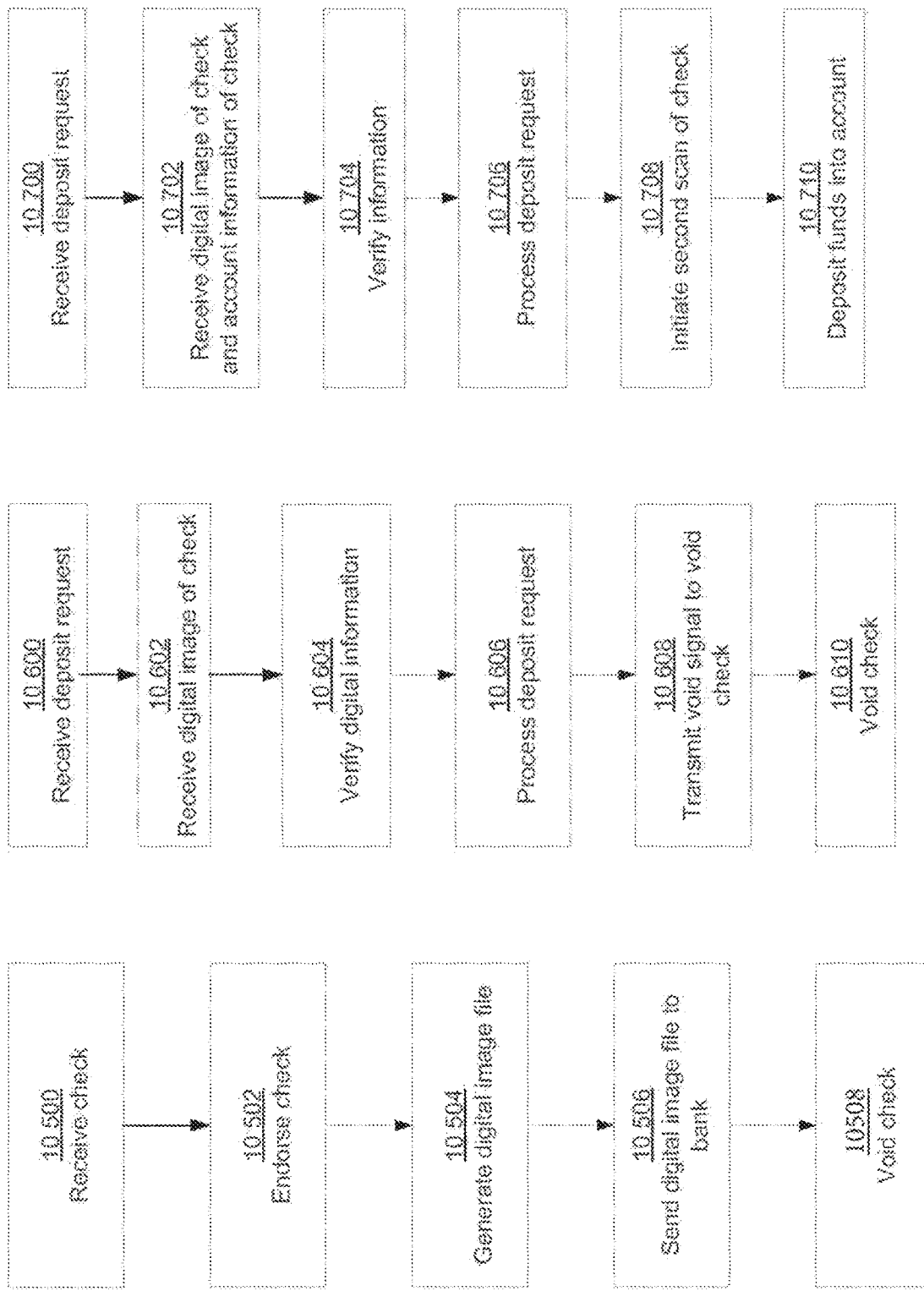

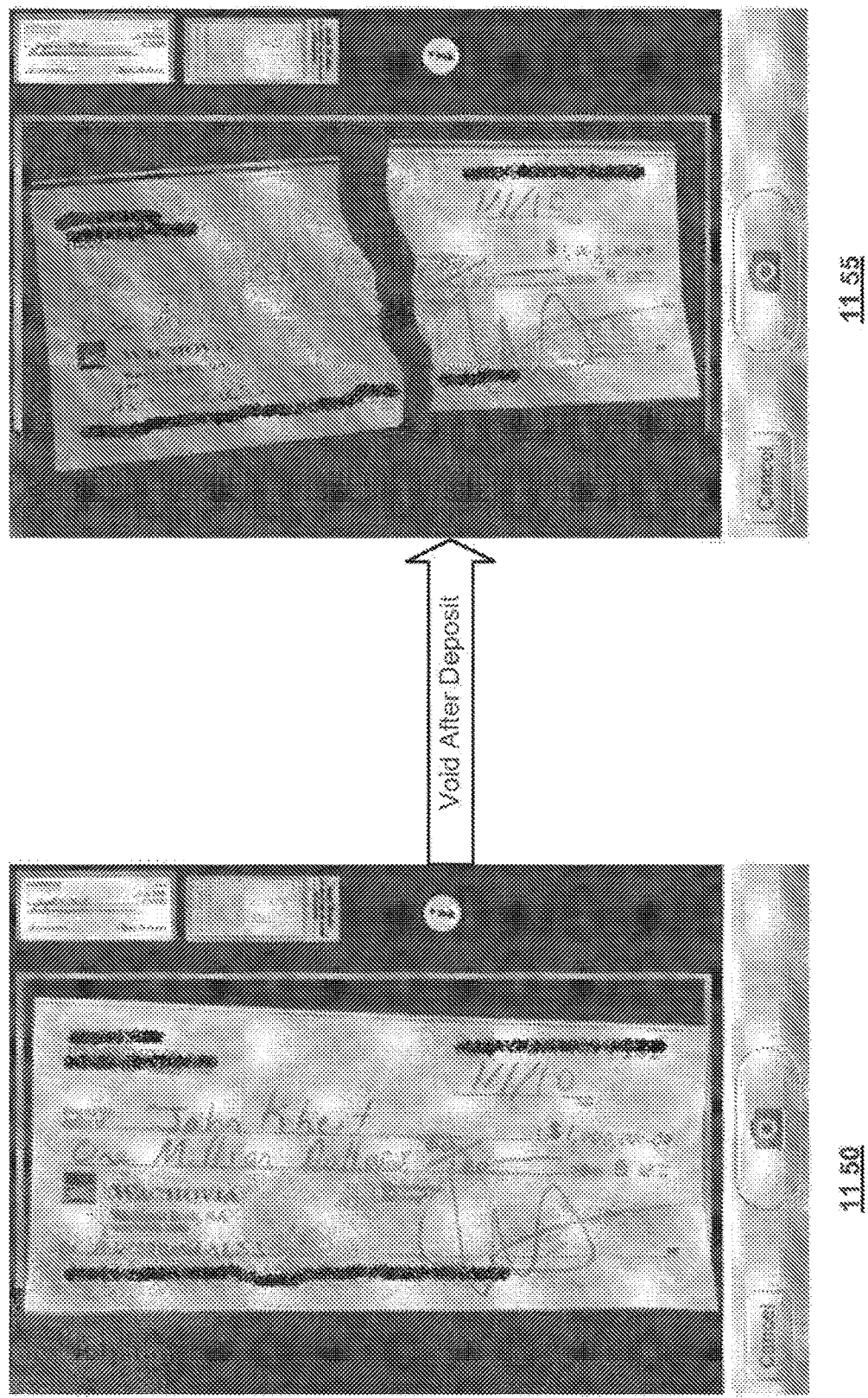

1201

1202

1204

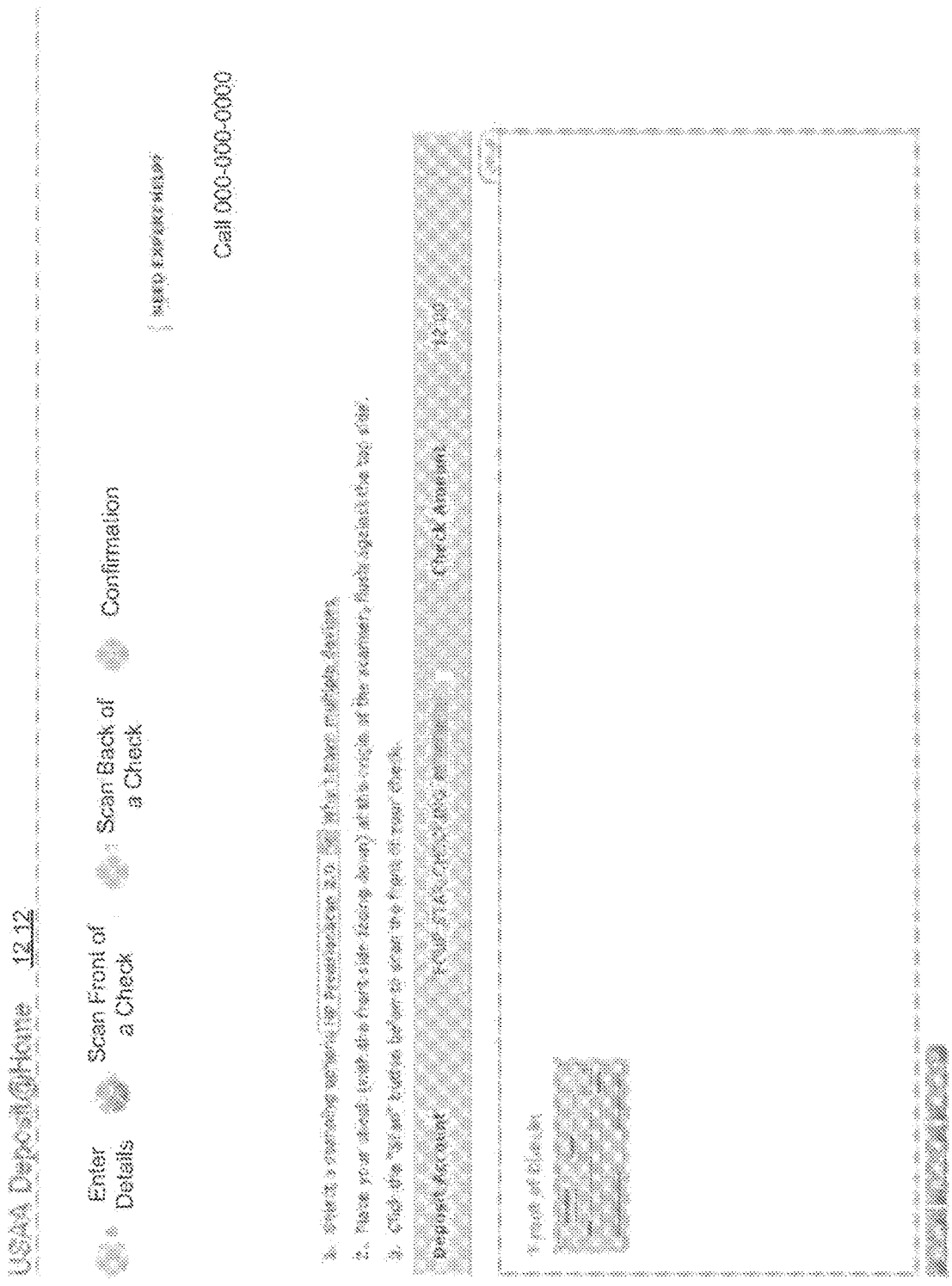

APPARATUSES, METHODS AND SYSTEMS FOR A PUBLISHING AND SUBSCRIBING PLATFORM OF DEPOSITING NEGOTIABLE INSTRUMENTS

RELATED APPLICATIONS

The present application is a continuation of U.S. patent application Ser. No. 17/539,513, filed Dec. 1, 2021, which is a continuation of U.S. patent application Ser. No. 16/708,686 (now U.S. Pat. No. 11,222,315), filed Dec. 10, 2019, which is a continuation of U.S. patent application Ser. No. 15/722,836 (now U.S. Pat. No. 10,896,408), filed Oct. 2, 2017, which is a continuation of U.S. patent application Ser. No. 12/859,741 (now U.S. Pat. No. 9,779,392), filed Aug. 19, 2010, which claims priority to U.S. Provisional Patent Application No. 61/235,216, filed Aug. 19, 2009.

BACKGROUND

1. Technical Field

The present invention is directed generally to apparatuses, methods, and systems of processing and exchanging financial deposit information, and more particularly, to APPARATUSES, METHODS AND SYSTEMS FOR A PUBLISHING AND SUBSCRIBING PLATFORM OF DEPOSITING NEGOTIABLE INSTRUMENTS.

2. Background Information

Negotiable instruments such as checks, money orders, banknotes, etc., have been widely used to make payments and purchases. For instance, a payor may tender a negotiable instrument to a payee to satisfy the payor's obligation to the payee. For example, an employer may provide salary paychecks to an employee (e.g., payee) in satisfaction of obligations owed for the employee's work. In order to obtain the payment amount, the payee may need to deposit the check in an account at the payee's bank, and have the bank process the check. In some cases, the payee may take the paper check to a branch of the payee's bank, and cash the check at the bank counter. Once the check is approved and all appropriate accounts involved have been credited, the check may be stamped with a cancellation mark by a bank clerk, such as a "paid" stamp. The payor's bank and payee's bank may then keep a record of the deposit information associated with the deposited negotiable instrument.

BRIEF SUMMARY

The APPARATUSES, METHODS AND SYSTEMS FOR A PUBLISHING AND SUBSCRIBING PLATFORM OF DEPOSITING NEGOTIABLE INSTRUMENTS (hereinafter "PS-PLATFORM") provides a negotiable instrument data publish and subscribe framework, whereby financial institutions may exchange negotiable instrument deposit data and/or validation information within the publish and subscribe framework. In one embodiment, the PS-PLATFORM may register a financial institution as a subscriber and provide financial transaction information to the financial institution based on the subscription.

In one implementation, a method is disclosed, comprising: receiving a negotiable instrument deposit information subscription request and a subscription rule from a financial institution; registering the financial institution as a negotiable instrument deposit information subscriber based on the received subscription rule; and in response to receiving information with regard to a proposed deposit of a negotiable instrument, sending a status notification of the negotiable instrument to the registered financial institution.

BRIEF DESCRIPTION OF THE SEVERAL VIEWS OF THE DRAWINGS

The accompanying appendices and/or drawings illustrate various non-limiting, example, inventive aspects in accordance with the present disclosure:

FIG. 3D provides a diagram illustrating aspects of remote deposit of checks in one embodiment of the PS-PLATFORM;

FIG. 3F provides a diagram illustrating aspects of remote deposit of checks in one embodiment of the PS-PLATFORM;

FIG. 3H provides a logic flow of another implementation of the PS-PLATFORM;

FIG. 6G provides an example illustrating aspects of an enhanced corner/edge detection using image quantumization in one embodiment of the PS-PLATFORM;

FIG. 6I provides an example illustrating aspects of an enhanced corner/edge detection using image quantumization in one embodiment of the PS-PLATFORM;

FIG. 8D provides a diagram illustrating aspects of check representment detection and check clearance in one embodiment of the PS-PLATFORM;

FIG. 10C provides a diagram illustrating aspects of alternative embodiments of voiding a check of the PS-PLATFORM;

FIG. 11H provides a flow diagram of example screen shots of user interfaces illustrating aspects of remote deposit via a mobile device within one embodiment of the PS-PLATFORM;

FIG. 12G provides another example screen shot of user interfaces illustrating aspects of remote deposit via a personal computer within one embodiment of the PS-PLATFORM;

Figure 1A:
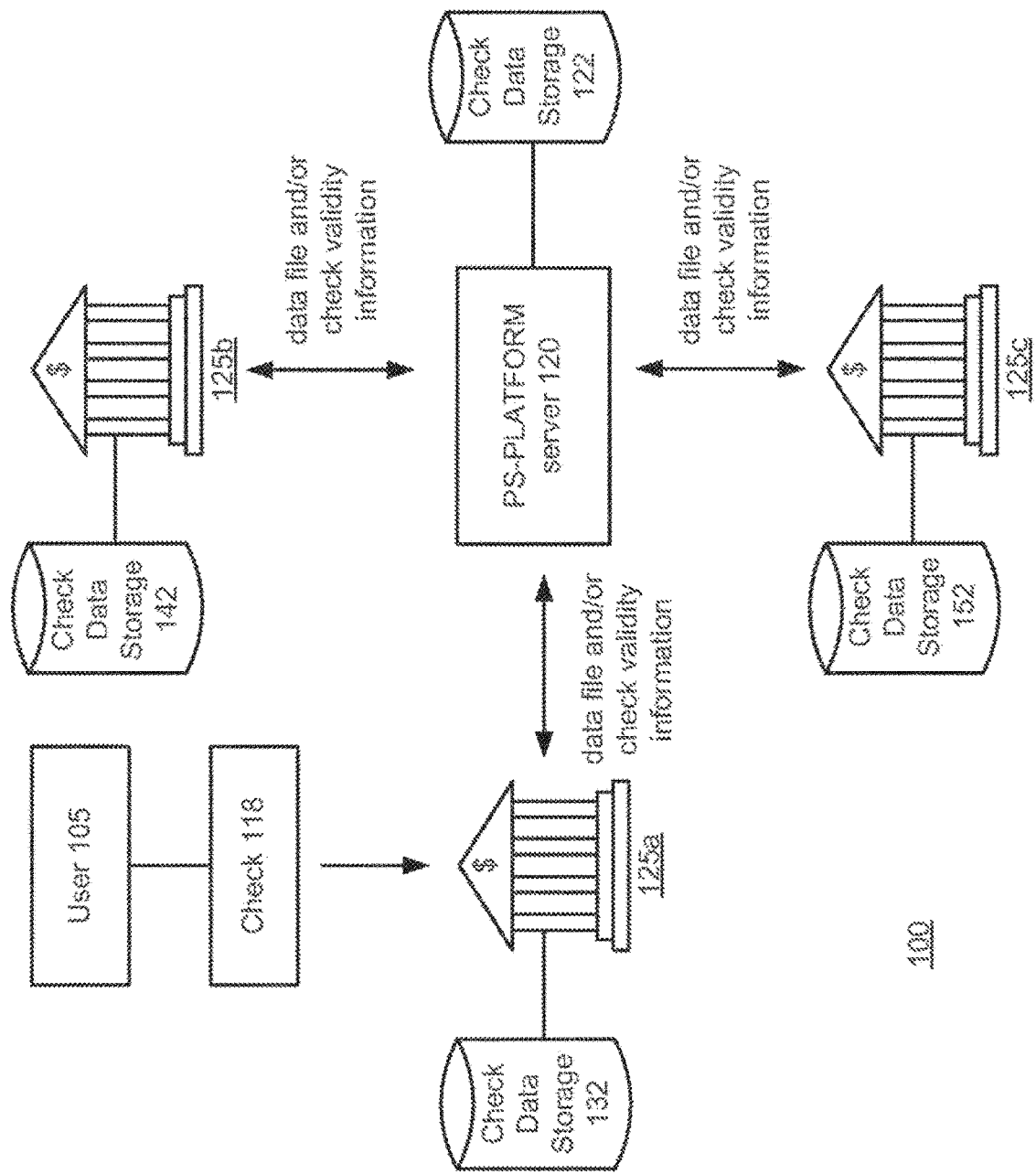
FIG. 1A is are of a block diagram illustrating an overview of an implementation of data flows between a PS-PLATFORM system and affiliated entities in embodiments of the PS-PLATFORM.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

PS-PLATFORM Overview

This disclosure details a negotiable instrument data publish and subscribe framework, whereby financial institutions may exchange negotiable instrument deposit data and/or validation information within the publish and subscribe framework. PS-PLATFORMs may, in one embodiment, implement a remote deposit application on a secured network system, whereby the remote deposit application may obtain, process and store images of a negotiable instrument, and generate virtualized negotiable instruments for deposit. In one embodiment, the PS-PLATFORM may register a financial institution as a subscriber and provide deposit information of a negotiable instrument to the financial institution based on the subscription characteristics.

For example, in one embodiment, a user (e.g., the payee) who wants to deposit a check, may capture an image of the check by a user image capture device, e.g., a scanner connected to a computer, a mobile device having a built-in camera, a digital camera, and/or the like. In another implementation, the user may take a video clip of the check and submit the video file. In one embodiment, the user may send the captured check image to a financial institution, e.g., a payee's bank with PS-PLATFORM service. The PS-PLATFORM server receiving the check image may then process the check image and extract deposit data from the digital check image. For example, in one implementation, the PS-PLATFORM may perform a series of image analysis procedures to enhance the received check image and extract deposit information such as payee's name, payee's bank, account number, bank routing number, deposit amount, and/or the like. In one implementation, after initial verification of the extracted deposit data, the PS-PLATFORM may post the deposit through direct banking and save the check image and the associated check deposit information in a transaction depository. In one implementation, the PS-PLATFORM may generate a substitute check (e.g., an X9.37 cash letter file) based on the received check image and send it to a clearinghouse bank (e.g., a regional branch of the Federal Reserve) for check clearance. In one implementation, the PS-PLATFORM may confirm, or cancel the soft posting of deposit funds based on the result of check clearance.

It is to be understood that, depending on the particular needs and/or characteristics of a PS-PLATFORM application, associated IDE, associated operating system, user interface, object, administrator, server, hardware configuration, network framework, and/or the like, various embodiments of the PS-PLATFORM may be implemented that enable a great deal of flexibility and customization. The instant disclosure discusses embodiments of the PS-PLATFORM primarily within the context of remote deposit of "checks" from a payee to a bank hereinafter. However, it is to be understood that the system described herein may be readily adopted for deposits of other types of negotiable instruments, such as a money order, a bank note, and/or the like, and configured/customized for a wide range of other applications or implementations. It is to be understood that the PS-PLATFORM may be further adapted to other implementations or communications and/or data transmission applications, such as but not limited to a general entity-to-entity payment system.

For example, In some embodiments, the PS-PLATFORM may allow a payee to apply the deposit, or a portion thereof, to the payment of one or more bills, such as a credit card payment, insurance bill payment, car payment, etc.

For another example, in some embodiments, the PS-PLATFORM may allow users to apply the deposit (or portion thereof) to a non-US Dollar denominated account. For example, in one implementation, a user may wish to apply a deposit of a $100 (USD) check into a Euro-denominated account. In one implementation, if the user selects an "USD to Euro" deposit option, the PS-PLATFORM may determine and notify the user of the exchange rate that will be used for the transaction (i.e., how much, in Euros, will be deposited into the user's account). In some embodiments, the PS-PLATFORM may prompt the user to approve the conversion, while in other embodiments, the conversion and deposit will occur automatically.

PS-PLATFORM Block Overview

FIG. 1A provides a block diagram illustrating an overview of data flow between the PS-PLATFORM and affiliated entities within an alternative embodiment of the PS-PLATFORM. In one embodiment, financial institutions 125a-c may be any type of entity capable of processing a transaction involving a negotiable instrument, such as processing checks (e.g., for deposit or cashing) and/or providing funds associated with checks. For example, each of the financial institutions 125a-c may be a financial service institution such as a, but not limited to a retail bank, an investment bank, an investment company, a regional branch of the Federal Reserve, a clearinghouse bank, a correspondent bank, and/or the like.

In one embodiment, a negotiable instrument may include a type of contract that obligates one party to pay a specified sum of money to another party. Negotiable instrument as used herein is an unconditioned writing that promises or orders payment of a fixed amount of money. For example, negotiable instruments may be money orders, cashier's checks, drafts, bills of exchange, promissory notes, and/or the like.

In one implementation, the check may be presented from a first person to a second person to affect the transfer of money from the first person to the second person. It may also include a check that is presented from a company or business to a person. In either case, the check may be taken by the receiving party and deposited into an account at a financial institution of the receiving party. The receiving party may endorse the check and then present it for deposit. For example, in one implementation, a payee may carry the paper check to a local bank branch and deposit the check with a bank representative at the counter. In another implementation, the payee may carry the paper check to an automated teller machine (ATM) and deposit the check via ATM automatic deposit service. In another implementation, the payee may employ a remote deposit capture scheme for deposit, e.g., by capturing an image of the check and send the image to a remote deposit server for deposit. While "banks" and "checks" are referred to as examples, the scope of the invention encompasses financial institutions and financial instruments involved in a payment system.

In one embodiment, the financial institutions 125a-c may obtain deposit data related to the negotiable instrument, e.g., a check 118. For example, in one implementation, a financial institution may receive a deposit request from a user (also referred to as "payee" or "depositor" hereinafter) 102, such as an individual or entity who owns an account held at that financial institution. In one implementation, the financial institution may receive deposit data from the user by collecting deposit information over the counter at a local bank branch, at an ATM, and/or the like. In an alternative implementation, the user 105 may send an image of the check 118 together with user specified deposit data to the financial institution server.

In one implementation, the obtained data (may be referred to herein as "check data") may be stored in storage maintained by or affiliated with the financial institution. For example, check data obtained from a check received at financial institutions 125a-c may be stored in check data storage 132, check data obtained from a check received at financial institution 140 may be stored in check data storage 142, and check data obtained from a check received at financial institution 150 may be stored in check data storage 152. The information of the check data may be arranged in any format. In one implementation, the information may be provided as a string of data in the format of field (label: value), such as account number (label:value), amount (label:value), name (label:value), etc. The check data may be stored as any type of electronic file in any type of file format, for example. The check data storage may be any type of memory or storage device and may comprise a database, for example.

In one embodiment, a PS-PLATFORM server 120 may communicate with financial institutions 125a-c. For example, in one implementation, the PS-PLATFORM server 120 may be housed at an intermediary financial service institution. For another example, the PS-PLATFORM server may be associated with one or more of the financial institutions 125a-c.

In one implementation, the PS-PLATFORM server 120 may comprise a computer system, such as a server, that comprises one or more processors and/or software modules that are capable of receiving and servicing requests from the financial institutions 125a-c, accessing check data storage 122, 132, 142, and/or 152, and storing data in the check data storage 122. An example computing environment in which the PS-PLATFORM server 120 may be embodied is described with respect to FIG. 6.

In one implementation, the PS-PLATFORM server 120 may receive a request for information from one of the financial institutions (e.g., financial institutions 125a-c) regarding a check that has been presented for deposit at that financial institution and may determine whether the check has already been presented for deposit to any of the other financial institutions (e.g., financial institutions 140, 150). This may be performed by the PS-PLATFORM 120 querying the other financial institutions or their associated check data storages.

For example, in one implementation, a user 105 may present a check 118 for deposit to financial institutions 125a-c. The financial institutions 125a-c may obtain check data from the check 118 and store the check data in the check data storage 132. Additionally, the financial institutions 125a-c may send the check data to the PS-PLATFORM 120 in the form of a data file. In an alternative implementation, the PS-PLATFORM server 120 may receive an image of the check and obtain deposit information from the image, and store the obtained information for validation.

In one implementation, responsive to receiving the check data from financial institutions 125a-c, the PS-PLATFORM server 120 may access the check data storage 142 and 152, either directly or via a request to the financial institutions 140, 150, respectively, to determine whether the check 118 has already been presented to the financial institution 140 or 150. Such a determination may be made by comparing identifying information (e.g., account number, check number, routing number, account name, etc.) of the check 118 to information stored in the check data storages 142, 152. If there is a match of such identifying information with information stored in one of the check data storages 142, 152, then it may be determined that the check 118 has previously been presented for processing and the check being currently presented to the financial institutions 125a-c is invalid.

Moreover, in one implementation, the PS-PLATFORM server 120 may access the check data storage 132, either directly or via a request to the financial institutions 125a-c to determine whether the check 118 has already been presented to the financial institutions 125a-c.

In one embodiment, if the check 118 has already been presented to the financial institutions 125a-c, 140, or 150, the PS-PLATFORM 120 may advise the financial institutions 125a-c and the financial institutions 125a-c may deny the processing (e.g., deposit or cashing) of the check 118. In this way, real time validation may be provided to the financial institutions 125*a-c* regarding whether the check 118 was deposited earlier elsewhere.

In one implementation, the PS-PLATFORM server 120 may comprise check data storage 122 (e.g., a database) and may receive and store check data from the financial institutions 125*a-c* for the checks the financial institutions 125*a-c* receive for processing from users. Thus, when the PS-PLATFORM server 120 receives a request for information from one of the financial institutions regarding a check that has been presented for deposit at that financial institution, the PS-PLATFORM server 120 may query its own check data storage 122 to determine whether the check has already been presented for deposit to any of the other financial institutions.

For example, the user 105 may present the check 118 for processing (e.g., deposit, cashing, etc.) to financial institutions 125*a-c*. The financial institutions 125*a-c* may obtain check data from the check 118 and send it to the PS-PLATFORM server 120 for storage in the check data storage 122. The PS-PLATFORM server 120 may access the check data storage 122 to determine whether the check 118 has already been presented to a financial institution for processing. If the check 118 has already been presented to a financial institution, the PS-PLATFORM server 120 may advise the financial institutions 125*a-c* and the financial institutions 125*a-c* may deny the deposit of the check 118. The PS-PLATFORM server 120 may thus act as a clearinghouse that stores the information provided by each of the financial institutions 125*a-c*. In such an implementation, the check data storages of the financial institutions (e.g., the check data storages 132, 142, 152) may not be used to store the check data and/or may not be queried by the PS-PLATFORM server 120 to determine whether the check has already been presented for deposit to any of the other financial institutions. In this manner, the PS-PLATFORM server 120 does not request or access check data storage of the financial institutions, such as check data storages 132, 142, 152.

In one implementation, the PS-PLATFORM server 120 may generate and transmit a notification to the financial institution that the check 118 is written on (i.e., the paying financial institution) that the check 118 has been presented (e.g., represented) to a financial institution for deposit. In this manner, the financial institution receiving the notification may cancel the check 118 or otherwise flag the check 118 or data pertaining to the check 118, such as in storage (e.g., a database) that maintains a record and information pertaining to the check 118. This may allow the paying financial institution to avoid providing funds upon a representment of the check 118 by the user 105. So after the check 118 has been presented once for deposit or cashing, the check 118 can no longer be presented, even if the check 118 is not physically altered or damaged ("franked") after the initial presentment.

In one implementation, the PS-PLATFORM server 120 may be considered to be channel agnostic as it may provide real time check validation information to a financial institution regardless of the channel(s) that the check is presented to the financial institution(s) for the initial processing and each subsequent presentment for processing. Channels may include, for example, remote deposit including check scanning and imaging, bank teller, ATM, and ACH (Automated Clearinghouse). In an alternative implementation, the PS-PLATFORM server 120 may provide check validation information to a financial institution in batch files, e.g., periodically, intermittently and/or continuously.

In an alternative implementation, the PS-PLATFORM server 120 may provide validation data upon request from a financial institution. For example, in one implementation, the financial institution may send a request to the PS-PLATFORM server 120 at the time of check presentment to determine if the check has already been presented. Such request may be generated via telephone calls, emails, instant messages, and/or the like. Information provided to the PS-PLATFORM server 120, checked by the PS-PLATFORM server 120, and/or provided by the PS-PLATFORM server 120 may include, but not limited to timestamp, MICR (magnetic ink character recognition) data, amount, check number, routing number, account number, signature line, endorsement, payee, and/or the like.

Figure 1B:
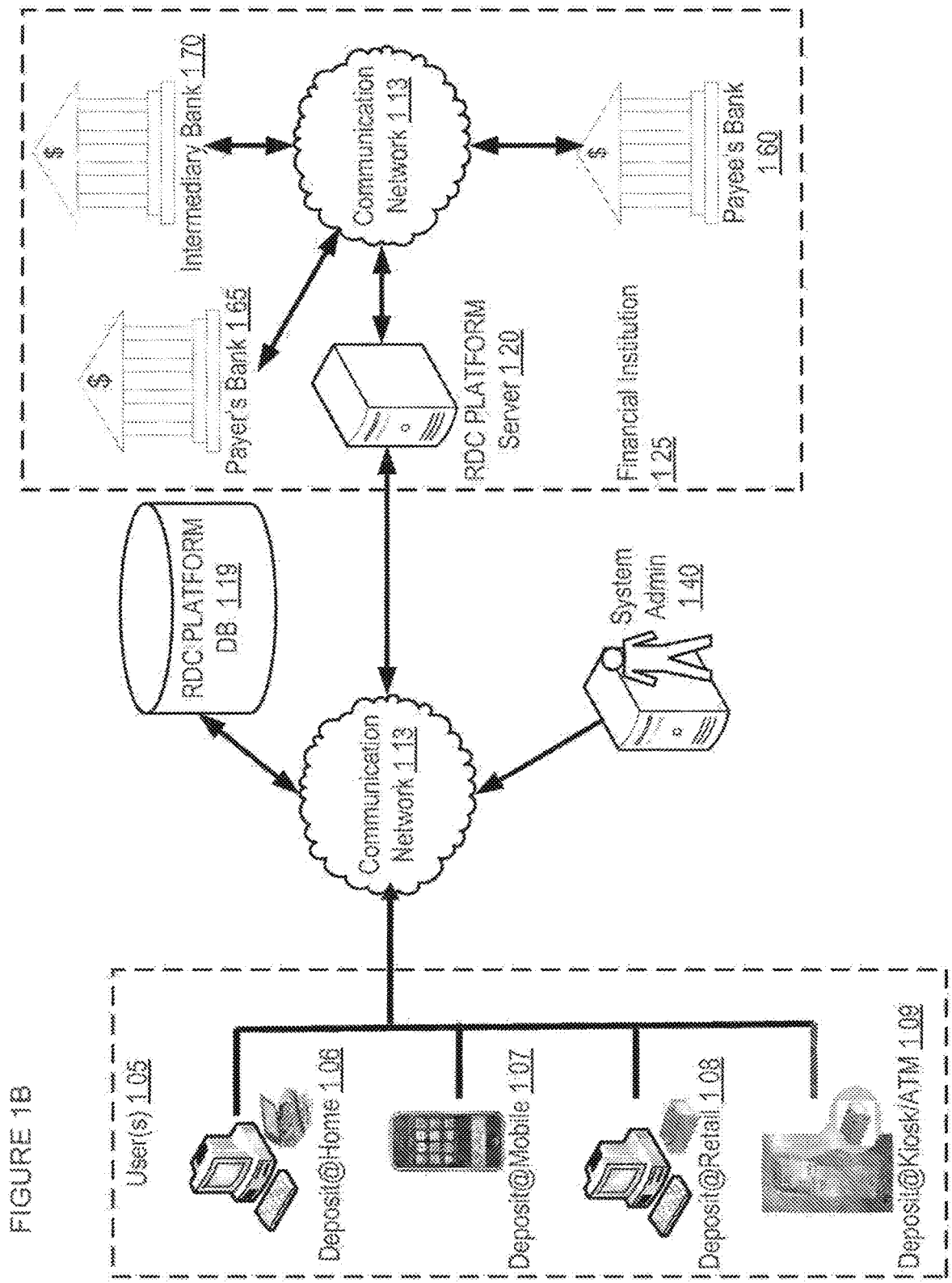
FIG. 1B is of a block diagram illustrating an overview of an implementation of data flows between a PS-PLATFORM system and affiliated entities in embodiments of the PS-PLATFORM.

FIG. 1B provides a block diagram illustrating one embodiment of PS-PLATFORM via remote deposit capture in embodiments of the PS-PLATFORM. In FIG. 1B, a user (or users) 105 operating different depositing devices 106-109, a PS-PLATFORM server 120, a PS-PLATFORM database 119, a payer's bank 165, a payee's bank 160 and a system administrator 140 are shown to interact via a communication network 113.

In one embodiment, the user 105 may be a payee who may deposit a check into an account at the payee's bank 160 by converting the check into electronic data (e.g., digital check images, etc.) and sending the data to the bank via a communication network 113. In one implementation, secured transport protocol such as SSL, and/or the like may be employed for the communication between the user 105 and the PS-PLATFORM server 120. In one embodiment, the user 105 may deposit the check on different occasions and through a variety of different devices and technologies of generating electronic check data. For example, in one implementation, the user 105 may deposit the check at home 106 by obtaining a check image via an image capture device (e.g., a camera, a scanner, etc.) controlled by a home computer. In another implementation, the user 105 may use a mobile device with a built-in camera (e.g., iPhone, BlackBerry, etc.) to take a picture of the check. In another implementation, the user 105 may deposit the check at a retail Point of Sale (POS) terminal 108, a kiosk or a Check 21 ATM 109, etc., by submitting the paper check to the deposit facility to generate images of the check for deposit. In a further implementation, the user 105 may take live video of the check via a device with built-in video camera (e.g., Apple iPhone, etc.) and send the video clip of the check to the PS-PLATFORM server 120.

In one embodiment, the electronic data sent from the user 105 may include extracted data information from the check. For example, in one implementation, the user 105 may use a Magnetic Ink Character Recognition (MICR) device to scan and translate the MICR information (e.g., account number, routing number, check number, etc.) located on the check and transmit the data to the PS-PLATFORM server 120 along with digital image files or video clip files of the check. In one implementation, the electronic data may include a user entered value indicating an amount to be deposited, and/or other user submitted information.

The PS-PLATFORM facilitates connections through the communication network 113 based on a broad range of protocols that include WiFi, Bluetooth, 3G cellular, Ethernet, ATM, and/or the like. In one embodiment, the communication network 113 may be the Internet, a Wide Area Network (WAN), a public switched telephone network (PSTN), a cellular network, a voice over internet protocol (VoIP) network, a Local Area Network (LAN), a Peer-to-Peer (P2P) connection, an ATM network and/or the like. In one implementation, the user 105 may communicate with financial institutions 125 by phone, email, instant messaging, facsimile, and/or the like.

In one embodiment, the financial institutions 125 may be any type of entity capable of processing a transaction involving a check deposit. For example, the financial institution 125 may be a retail bank, investment bank, investment company, regional branch of the Federal Reserve, clearinghouse bank, correspondent bank, and/or the like. In one embodiment, the financial institution 125 may include a PS-PLATFORM server 120, the payee's bank 160 and the payer's bank 165. In one implementation, the PS-PLATFORM server 120 may be housed within the payee's bank 160 as a built-in facility of the payee's bank for processing remote check deposits. In another implementation, the PS-PLATFORM server 120 may be associated with an entity outside the payee's bank, as a remote deposit service provider.

In one embodiment, the PS-PLATFORM server 120 may receive and process electronic data of deposit information from the user 105 via the communication network. For example, in one implementation, the PS-PLATFORM server 120 may generate check image in compliance with deposit formats (e.g., a Check 21 compliant check image file, a X9.37 cash letter check image, and/or the like), based on the received electronic data from the user 105. In one implementation, the PS-PLATFORM server may analyze metadata associated with the received check image/video files such as GPS information, time stamp of image capture, IP address, MAC address, system identifier (for retail POS/kiosk deposits) and/or the like.

In a further implementation, the PS-PLATFORM server 120 may receive and process biometrics data from the user 105. For example, in one implementation, a payee may be instructed to submit an image or video clip of himself/herself In such cases, the PS-PLATFORM may perform face recognition procedures for user authentication, obtaining payee information for check clearance, and/or the like.

In one implementation, upon receipt and approval of the electronic deposit data, the payee's bank 160 may credit the corresponding funds to the payee's account. In one implementation, the PS-PLATFORM server 120 may clear the check by presenting the electronic check information to an intermediary bank 170, such as a regional branch of the Federal Reserve, a correspondent bank and/or a clearinghouse bank. In one embodiment, the payer's account at the payer's bank 165 may be debited the corresponding funds.

In one embodiment, the PS-PLATFORM entities such as the PS-PLATFORM server 120, and/or the like, may also communicate with a PS-PLATFORM database 119. In some embodiments, distributed PS-PLATFORM databases may be integrated in-house with the PS-PLATFORM server 120, and/or 2 the payee's bank 160. In other embodiments, the PS-PLATFORM entities may access a remote PS-PLATFORM database 119 via the communication network 113. In one embodiment, the PS-PLATFORM entities may send data to the database 119 for storage, such as, but not limited to user account information, application data, transaction data, check image data, user device data, and/or the like.

In one embodiment, the PS-PLATFORM database 119 may be one or more online database connected to a variety of vendors and financial institutions, such as hardware vendors (e.g., Apple Inc., Nokia, Sony Ericsson, etc.), deposit banks (e.g., Bank of America, Wells Fargo, etc.), service vendors (e.g., clearinghouse banks, etc.) and/or the like, and obtain updated hardware driver information, software updates from such vendors. In one embodiment, the PS-PLATFORM server 120 may constantly, intermittently, and/or periodically download updates, such as updated user profile, updated software programs, updated command instructions, and/or the like, from the PS-PLATFORM database 119 via a variety of connection protocols, such as Telnet FTP, HTTP transfer, P2P transmission and/or the like.

In one embodiment, a system administrator 140 may communicate with the PS-PLATFORM entities for regular maintenance, service failure, system updates, database renewal, security surveillance and/or the like via the communication network 113. For example, in one implementation, the system administrator 140 may be a system manager at the payee's bank, who may directly operate with the PS-PLATFORM server 120 via a user interface to configure system settings, inspect system operations, and/or the like.

Figure 2A:
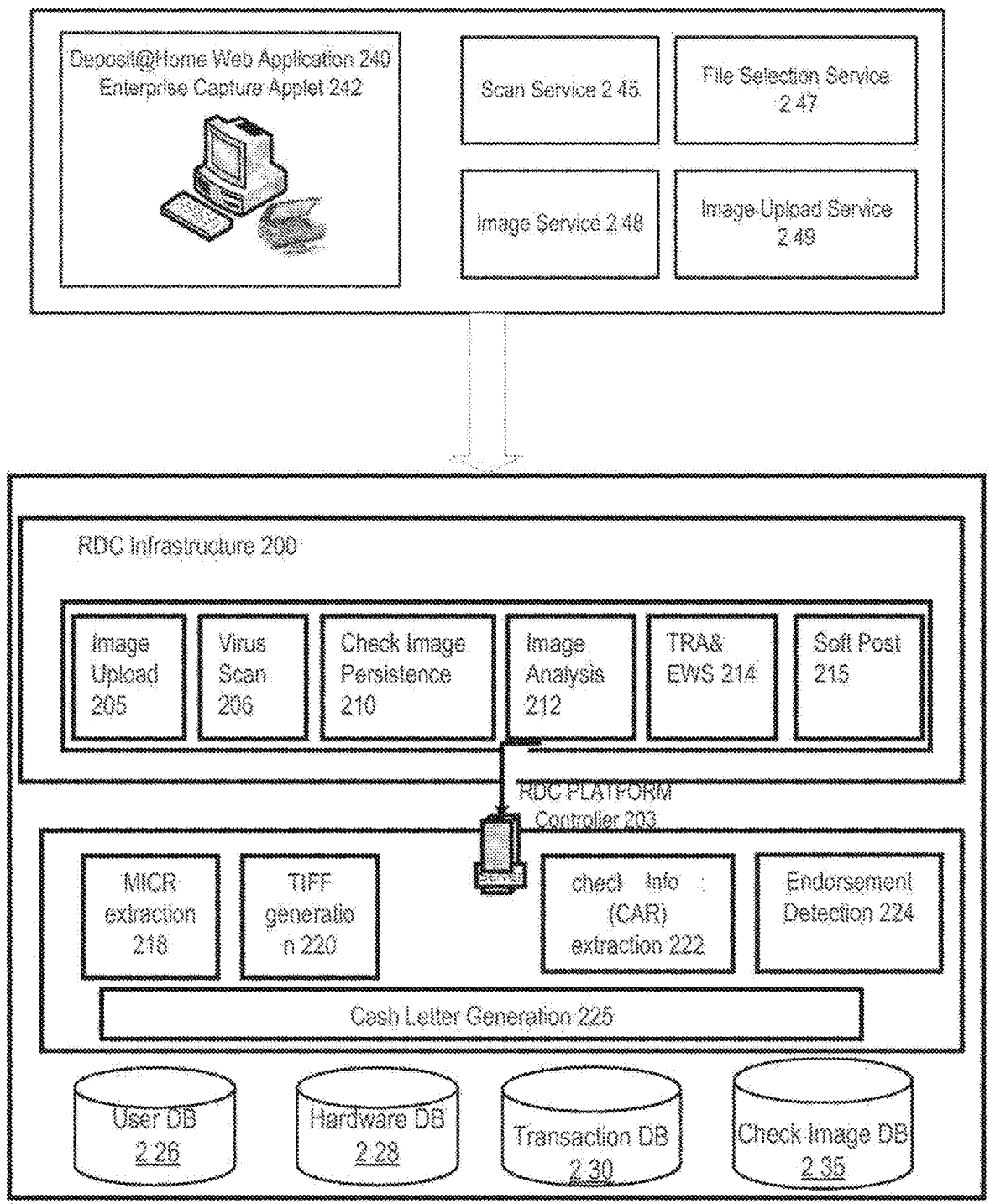
FIG. 2A provides a diagram of exemplary infrastructures of the PS-PLATFORM system for home deposit, mobile deposit, kiosk/ATM/Retail deposit in one embodiment of the PS-PLATFORM.
Figure 2B:
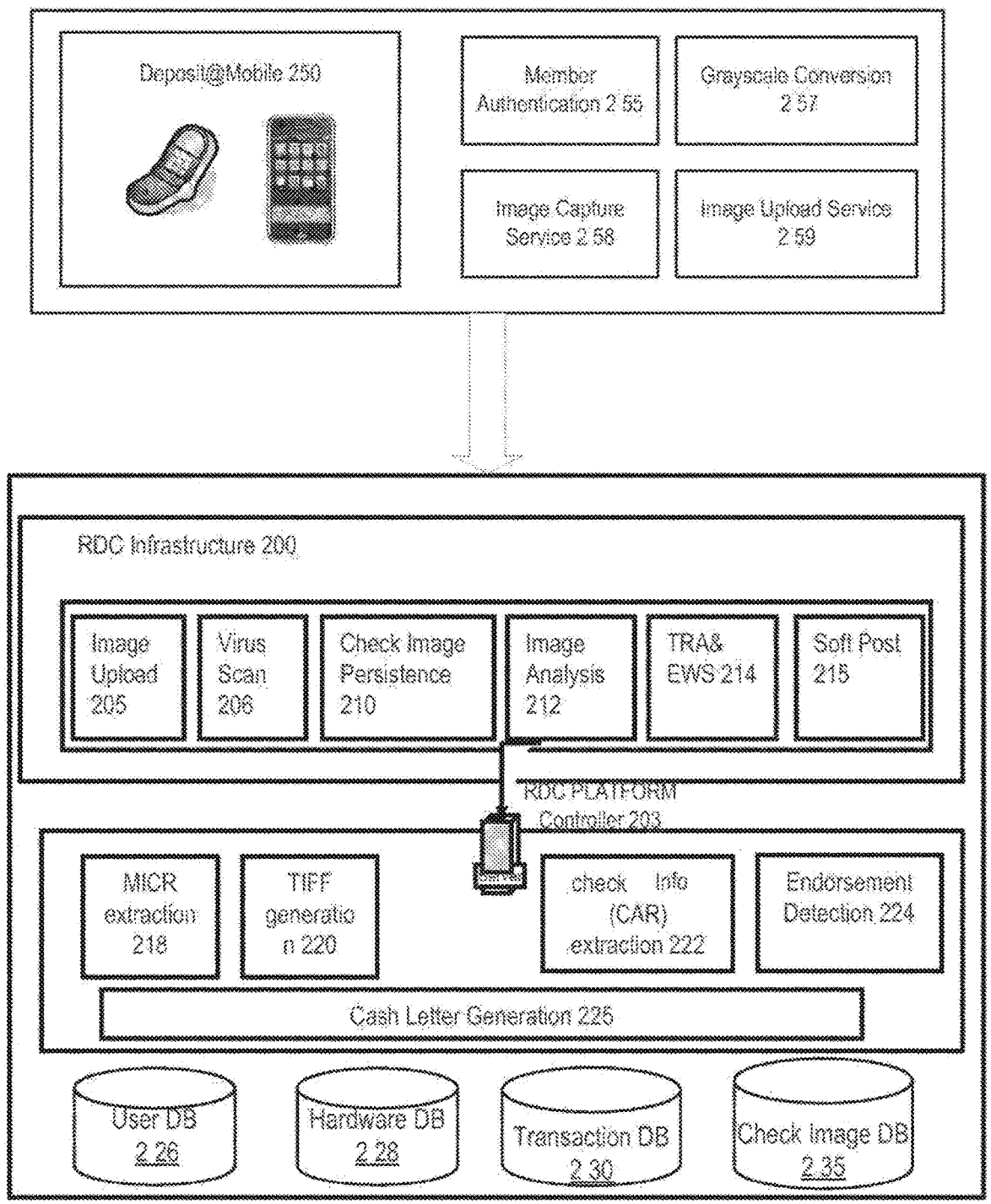
FIG. 2B provides a diagram of exemplary infrastructures of the PS-PLATFORM system for home deposit, mobile deposit, kiosk/ATM/Retail deposit in one embodiment of the PS-PLATFORM.
Figure 2C:
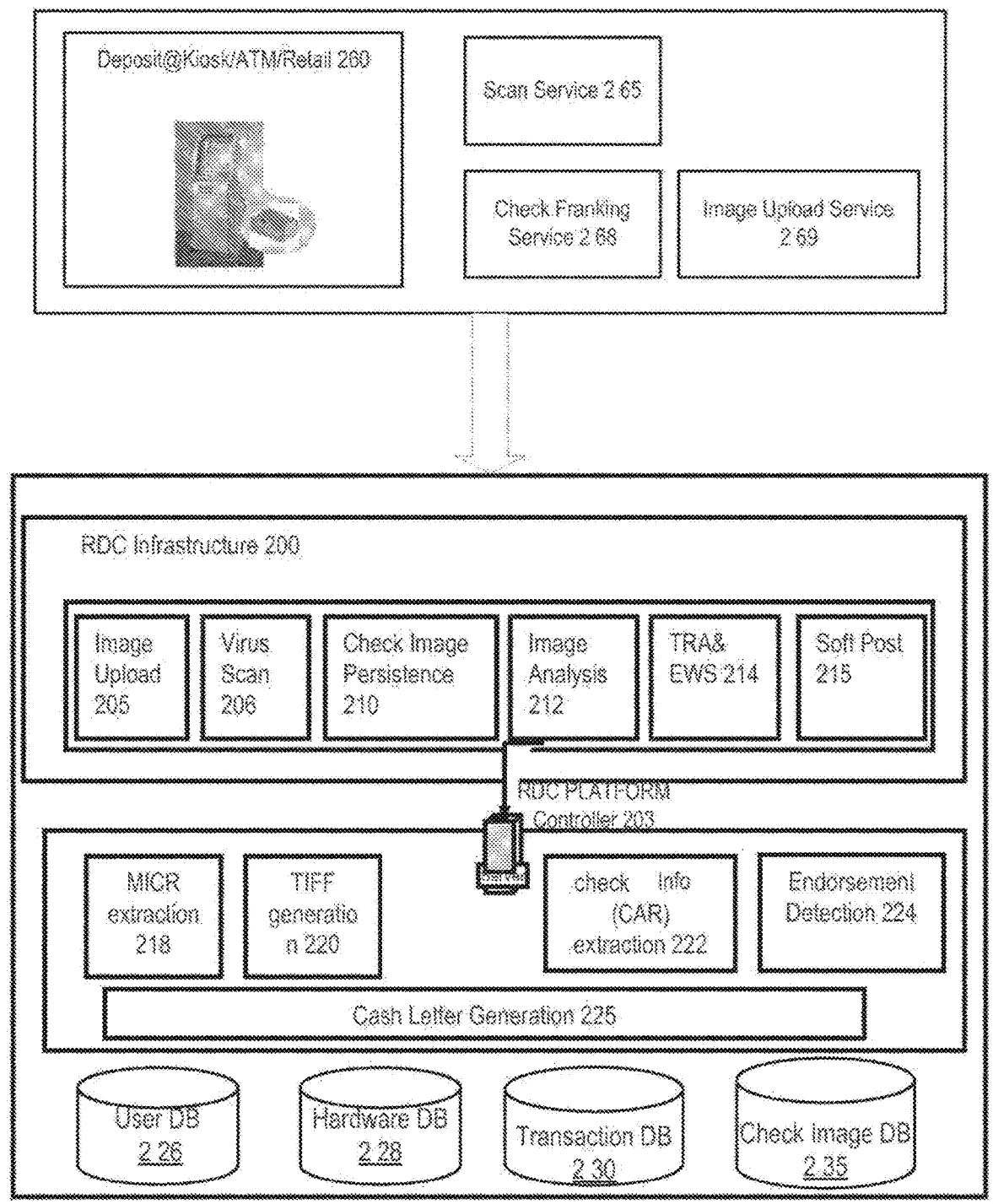
FIG. 2C provides a diagram of exemplary infrastructures of the PS-PLATFORM system for home deposit, mobile deposit, kiosk/ATM/Retail deposit in one embodiment of the PS-PLATFORM.

FIGS. 2A-E provide diagrams of example infrastructures of the PS-PLATFORM system for home deposit, mobile deposit, kiosk/ATM/Retail deposit in one embodiment of the PS-PLATFORM. In some embodiments, as shown in FIGS. 2A-C, the PS-PLATFORM infrastructure 200 may contain a number of functional modules and/or data stores. A PS-PLATFORM controller 203 may serve a central role in some embodiments of PS-PLATFORM operation, serving to orchestrate the reception, generation, modification, and distribution of data and/or instructions, to, from, and between PS-PLATFORM modules and/or mediate communications with external entities and systems.

In one embodiment, the PS-PLATFORM controller 203 may be housed separately from other modules and/or databases within the PS-PLATFORM system, while in another embodiment, some or all of the other modules and/or databases may be housed within and/or configured as part of the PS-PLATFORM controller. Further detail regarding implementations of PS-PLATFORM controller operations, modules, and databases is provided below.

In the implementation illustrated in FIG. 2A, the PS-PLATFORM controller 203 may be configured to couple to external entities via a user interface and a network interface. The user interface may, for example, receive and configure user control commands sent to/from the PS-PLATFORM, secured user account information, user submitted configuration data, and/or the like. In one implementation, the user interface may include, but not limited to devices such as, keyboard(s), mouse, stylus(es), touch screen(s), digital display(s), and/or the like. In various implementations, the network interface may, for example, serve to configure data into application, transport, network, media access control, and/or physical layer formats in accordance with a network transmission protocol, such as, but is not limited to, FTP, TCP/IP, SMTP, Short Message Peer-to-Peer (SMPP) and/or the like. For example, the network interface 210 may be configured for receipt and/or transmission of data to an external and/or network database. The network interface may further be configurable to implement and/or translate Wireless Application Protocol (WAP), VoIP and/or the like data formats and/or protocols. The network interface may further house one or more ports, jacks, antennas, and/or the like to facilitate wired and/or wireless communications with and/or within the PS-PLATFORM system.

In one implementation, the PS-PLATFORM controller 203 may further be coupled to a plurality of modules configured to implement PS-PLATFORM functionality and/or services. The plurality of modules may, in one embodiment, be configurable to establish a secured communications channel with a remote image capture device and implement a remote deposit service application. In some embodiments, the remote deposit service application may obtain and analyze check images, and generate virtual checks (e.g., Check 21 X9.37 cash letter files, etc.) for deposit. In one embodiment, the daemon application may comprise modules such as, but not limited to a Image Upload module 205, a Virus Scan module 206, a Check Image Persistence module 210, an Image Analysis module 212, a TRA & EWS Service module 214, a Soft Post module 215, a MICR Extraction module 218, a TIFF Generation module 220, a Check Information Extraction module 222, an Endorsement Detection 224, a Cash Letter Generation module 225, and/or the like.

In one embodiment, the Image Upload module 205 may establish a secured communications channel with a user image capture device and receive submitted check images. In one embodiment, the Image Upload module 205 may initialize an image upload application which may remotely control the image capture device to obtain and upload check images via the secured communications channel as will be further illustrated in FIGS. 4A-C. In one embodiment, the Image Upload module 205 may also receive streamed video and/or video files of checks. In one embodiment, the Virus Scan module 206 may inspect the received digital files to prevent, detect, and remove malware, including computer viruses, worms, Trojan horses and/or the like. For example, in one implementation, the PS-PLATFORM may employ antivirus software such as, but not limited to McAfee VirusScan, Symantec AntiVirus Scan, and/or the like.

In one embodiment, the Check Image Persistence module 210 may check the persistence of the received check image files. For example, in one implementation, the Check Image Persistence module 210 may check the image file format, file storage pattern, and/or the like. In one implementation, the Check Image Persistence module 210 may check the storage format of the metadata associated with the check image file.

In one embodiment, the Image Analysis module 212 may process the received check digital file, such as image usability and quality check, video frame image grab, and/or the like, as will be further illustrated in FIGS. 5 and 6A-H. In one embodiment, the TIFF Generation module 220 may convert a received color image to a grayscale image prior to image processing of module 212.

In one embodiment, the Magnetic Ink Character Recognition (MICR) Extraction module 218 may perform an optical character recognition (OCR) procedure on the processed check image and extract the MICR line on the check. Checks typically contain MICR information (e.g., routing number, account number and check number) on the bottom left-hand corner of the check. In one embodiment, the Check Information Extraction module 222 may perform an optical character recognition (OCR) procedure to extract information of the check, including the payee's name, the deposit amount, check number, and/or the like. In one embodiment, the Endorsement Detection module 224 may detect whether the check image contains a depositor's signature.

In another embodiment, the MICR information may consist of characters written in a magnetic ink. The MICR information may be read electronically by passing the check through the MICR device, which may translate the characters by magnetizing the ink. If a user converts the check into electronic data by scanning the check using a MICR device, the MICR module may directly parse the information contained in the MICR data submitted by the user.

In one embodiment, the Soft Post module 215 may provisionally credit the payee's account with the deposit amount after processing the received check image. In one embodiment, the Cash Letter Generation module 225 may generate and submit an X9.37 cash letter check image file to a clearinghouse bank (e.g., a regional branch of the Federal Reserve Bank, etc.) to clear the transaction and/or implement representment check after the soft post, as will be further illustrated in FIGS. 8A-C.

In one implementation, the PS-PLATFORM controller 203 may further be coupled to one or more databases configured to store and/or maintain PS-PLATFORM data. A user database 226 may contain information pertaining to account information, contact information, profile information, identities of hardware devices, Customer Premise Equipments (CPEs), and/or the like associated with users, device configurations, system settings, and/or the like. A hardware database 228 may contain information pertaining to hardware devices with which the PS-PLATFORM system may communicate, such as but not limited to Email servers, user telephony devices, CPEs, gateways, routers, user terminals, and/or the like. The hardware database 228 may specify transmission protocols, data formats, and/or the like suitable for communicating with hardware devices employed by any of a variety of PS-PLATFORM affiliated entities. A transaction database 230 may contain data pertaining to check deposit transactions. In one embodiment, the transaction database 230 may include fields such as, but not limited to: check deposit timestamp, payee's name, payee's bank name, account number, bank routing number, deposit amount, deposit method, deposit device, check image index, check clearance information, and/or the like. A check image database 235 may contain a repository of processed check images associated with a transaction.

The PS-PLATFORM database may be implemented using various standard data-structures, such as an array, hash, (linked) list, struct, structured text file (e.g., XML), table, and/or the like. For example, in one embodiment, the XML for a transaction in the transaction database 225 may take a form similar to the following example:

<Transaction>

. . .

<ID>MyTransaction1_0008</ID>
<Receive Time>5/12/2009 11:30:00</Receive Time>
<Device-ID>iPhone 6HS8D</Device-ID>
<Payee_Name>
Joe Dow
</Payee_Name>
<Payee_Bank>First Regional Bank</Payee_Bank>
<Deposit_amount>1000.00<Deposit_amount>
<Post_Time>5/12/2009 11:31:23</Post_Time>
<Image_ID>MyImage3214232</Image_ID>
<Clearance_bank>Clearinghouse Bank </Clearance_bank>
<Deposit_status>confirmed</Deposit_status>

. . .

</Transaction>

In FIG. 2A, in one implementation, a home scanner or other home image capture device connected to a computer may be utilized for home deposit. In one embodiment, the home deposit may be implemented via a web application 240 and/or an enterprise capture applet 242 (if the depositor is an enterprise entity) embedded in a deposit website. For example, in one implementation, a user may visit a PS-PLATFORM website to perform remote deposit. In one implementation, the deposit web service may include scan service 245 to control the scanner to obtain images of a check, image service 248 to allow a user to save and edit check image files, file selection service 247 and image upload service 249 to facilitate a user to select and upload a check image file and/or the like, as will be further illustrated in FIGS. 4A-C.

In another embodiment, for mobile deposit 250, as shown in FIG. 2B, a pre-installed RDC application on the mobile device, or the embedded RDC component of a website may control the mobile device to perform member authentication 255, image capturing 258, grayscale conversion 257 of the check image, and image upload 259. For example, in one implementation, the PS-PLATFORM may prompt the mobile device user to login at the RDC website with a username and password. For another example, the PS-PLATFORM may identify the user mobile device to authenticate the user as a member if the mobile device is registered for the RDC service.

In another embodiment, as shown m FIG. 2C, for kiosk/ATM/retail deposit 260, the facility may provide scan service 265, image upload service 269 and check franking service 268. For example, in one implementation, the deposit facility at the kiosk/ATM/retail may print "ELECTRONICALLY PRESENTED" across the front of the original check when the check is scanned to avoid representment of the check, and endorse the back of the check with deposit confirmation.

Figure 2D:
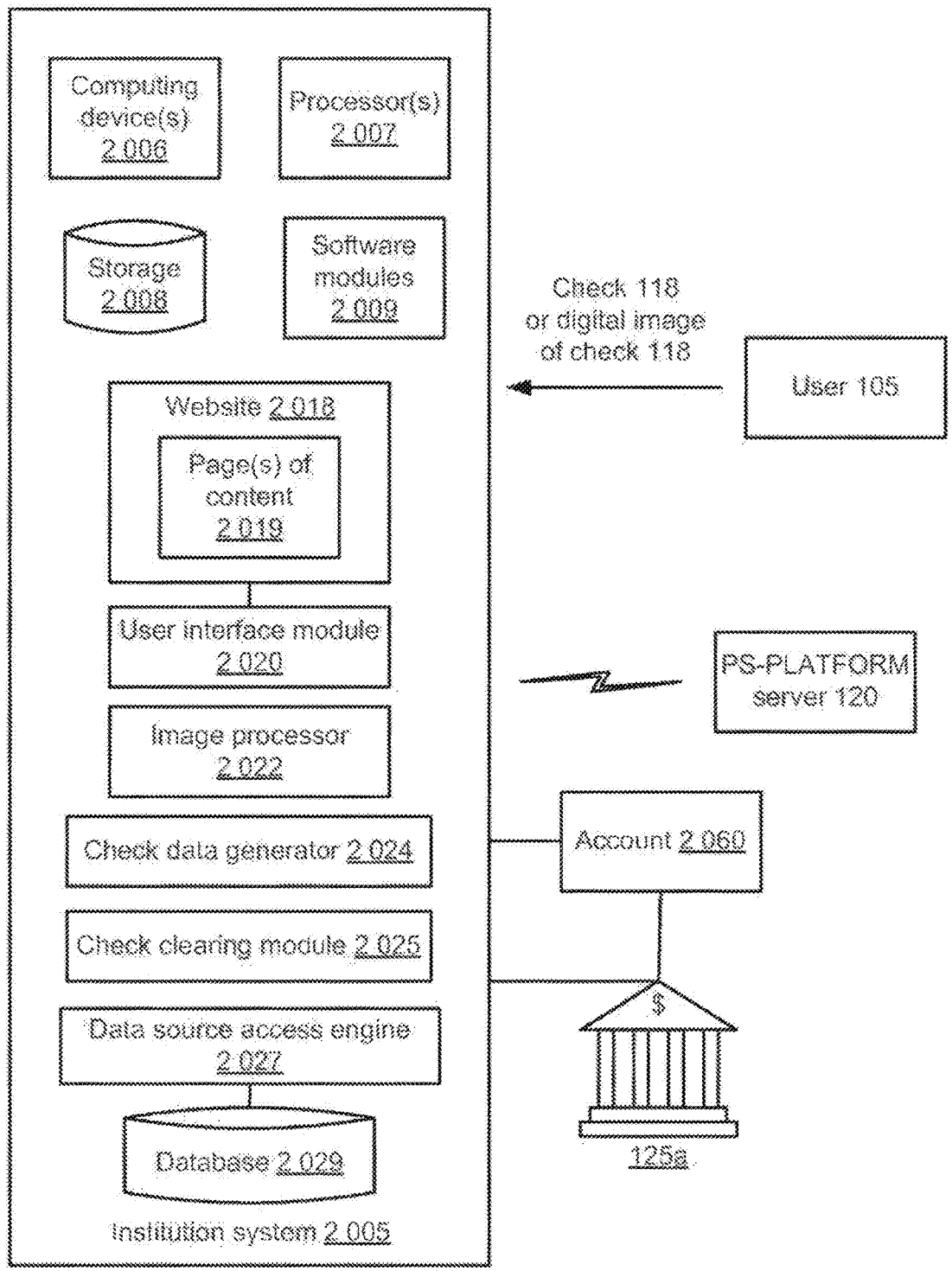
FIG. 2D provides a diagram of exemplary infrastructures of the PS-PLATFORM system for home deposit, mobile deposit, kiosk/ATM/Retail deposit in one embodiment of the PS-PLATFORM.

FIG. 2D provides a block diagram of another implementation of a system in which example embodiments and aspects may be implemented. In one embodiment, the user 105 may own an account 2060 that may be held at financial institution 125a and is accessible via an institution system 2005. In one embodiment, the institution system 2005 may be affiliated with one of the financial institutions, such as financial institution 125a. In an alternative embodiment, the institution system 2005 may be integrated with the PS-PLATFORM server 120.

In one embodiment, the account 2060 may be any type of deposit account for depositing funds, such as a savings account, a checking account, a brokerage account, and the like. The user 105 may deposit the check 118 or other negotiable instrument in the account 2060 either electronically or physically. The financial institutions 125a-c may process and/or clear the check 118 or other negotiable instrument. The user 105 may communicate with financial institutions 125a-c by way of a communications network such as an intranet, the Internet, a local area network (LAN), a wide area network (WAN), a wireless fidelity (WiFi) network, a public switched telephone network (PSTN), a cellular network, a voice over Internet protocol (VoIP) network, and the like. The user 105 may communicate with financial institutions 125a-c by phone, email, instant messaging, text messaging, web chat, facsimile, mail, and the like. Financial institutions 125a-c also may communicate with each other and the PS-PLATFORM server 120 by way of a communications network.

In an implementation, the user 105 may receive payment from another individual such as a payor in the form of the check 118 or other negotiable instrument that is drawn from an account at one of the financial institutions 125a-c. The user 105 may endorse the check 118 (e.g., sign the back of the check 118) and indicate an account number on the check 118 for depositing the funds.

The user 105 may present the check 118 to the financial institutions 125a-c for processing (e.g., to deposit or cash the check 118) using any channel, such as presenting the physical check 118 to the financial institution 125a (e.g., via a teller), providing the check 118 in an ATM associated with the financial institution 125a, or remotely depositing the check 118 by providing an image of the check 118 to the financial institution 125a. It is noted that although examples described herein may refer to a check, the techniques and systems described herein are contemplated for, and may be used for, checking the validity of any negotiable instrument such as a money order, a cashier's check, a check guaranteed by a bank, or the like.

In an implementation, the user 105 may access the financial institutions 125a c via the institution system 2005 by opening a communication pathway via a communications network 113 using a user computing device. There may be several ways in which the communication pathway may be established, including, but not limited to, an Internet connection via a website 2018 of the institution system 2005. The user 105 may access the website 2018 and log into the website 2018 using credentials, such as, but not limited to, a username and a password.

Each financial institution 125a-c may receive or generate a digital image representing a check they receive for deposit and may use any known image processing software or other application(s) to obtain the check data of the check from the digital image. For example, each financial institution 125a-c may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may obtain the check data and generate a data file to be sent to the PS-PLATFORM server 120.

The electronic devices may receive the digital image and may parse or otherwise obtain the check data from the check (e.g., the bank from which the check is drawn, place of issue, check number, date of issue, payee, amount of currency, signature of the payor, routing/account number in MICR format, transit number, etc.). A data file may be generated that comprises some or all of the check data. The data file may be any type of data file comprising data in any type of format from which data pertaining to the check may be stored and retrieved. The data file may be stored in check data storage of the financial institution or the PS-PLATFORM server 120. The data file may be provided to the PS-PLATFORM server 120.

After the financial institution that has received the check for deposit is advised by the PS-PLATFORM server 120 that the check has not been previously deposited or cashed (e.g., received a notification from the PS-PLATFORM server 120 that the check is valid), the financial institution may clear the check using known techniques. Each financial institution may comprise a check clearing module (e.g., the check clearing module 2025 of the institution system 2005) that may communicate with a check clearinghouse such that a Check 21 compliant data file, for example, may be delivered to the check clearinghouse and funds may be received by the financial institution.

In an implementation, the user 105 may use an imaging device (e.g., scanner, camera, etc.) to generate a digital image of the check 118. The digital image may be used to create a digital image file that may be sent to the institution system 2005 and used by the financial institutions 125a-c, in conjunction with the institution system 2005, to process a deposit or cashing of the check 118 whose image is comprised within the digital image file. In an implementation, the digital image file may be augmented by secondary data which may be information relating to the deposit of the check 118, such as an account number and a deposit amount, for example.

In one embodiment, the user 105 may place the check 118 on a background and generate a digital image comprising an image of the check 118 (e.g., a check image) and a portion of the background (e.g., a background image) using the imaging device or other device such as a camera that may be standalone or part of a phone or other user computing device. Any background may be used. It is noted that although examples and implementations described herein may refer to a check image, the term "check image" may refer to any foreground image in a digital image (as opposed to the background image). Thus, the "check image" may refer to the foreground image in implementations involving any negotiable instrument, form, or document.

In one embodiment, a user computing device may be integral with the device used to make the digital image of the check 118 and/or the digital image file or separate from the device used to make the digital image of the check 118 and/or the digital image file. As shown and discussed in FIG. 1B, the user computing device may be a personal computer (PC), a handheld computing device, a PDA (personal digital assistant), a mobile phone, or a smart phone, for example. The user computing device may comprise the imaging device. In an implementation, the user computing device may be a mobile computing device that comprises a camera which can capture a digital image of the check 118 by taking a picture of the front and/or back of the check 118. The user 105 may send the digital image file or just the digital image of the check 118 to the institution system 2005 using the mobile computing device. It is contemplated that any device that is capable of generating a digital image may be used to make a digital image of the check 118 which may be processed as described herein.

In one embodiment, the digital image file comprising an image of the check 118 may be transmitted to the institution system 2005. The user 105 may send the digital image file and any secondary data to the institution system 2005 along with a request to deposit the check 118 into an account, such as the account 160. Any technique for sending a digital image file or digital image to the institution system 2005 may be used, such as providing a digital image file from storage to the website 2018 associated with the institution system 2005.

In one embodiment, the financial institutions 125*a-c* in conjunction with the institution system 2005 may process the deposit request (or check cashing request, for example) using the digital image of the check 118 received from the user 105 or the actual check 118 that may be presented by the user 105 to the financial institutions 125*a-c*. In an implementation, upon receiving the actual check 118, the financial institutions 125*a-c* may use an imaging device or other computing device to create a digital image of the check 118. Thus, when the check is presented to the financial institutions 125*a-c* for processing, such as deposit or cashing, an image of the check may be made (if the check is received physically as opposed to electronically) and passed to an image processor 2022.

In an implementation, the institution system 2005 may comprise an image processor 2022 that processes the digital image of the check 118. In an implementation, the institution system 2005 may retrieve the image of the check 118 from the digital image file and process the check 118 from the image for deposit. Any image processing technology, software, or other application(s) may be used to retrieve the image of the check 118 from the digital image file and to obtain the check data of the check 118 from the digital image file. The institution system 2005 may determine whether the financial information associated with the check 118 may be valid.

In an implementation, the image of the check 118 may be operated on by the image processor 2022. These operations, at a high level, are intended to ensure that the image of the check 118 is suitable for one or more subsequent processing tasks. These operations may include any of the following: deskewing, dewarping, magnetic ink character recognition, cropping (either automatically, or having the user 105 manually identify the corners and/or edges of the check 118 for example), reducing the resolution of the image, number detection, character recognition, and the like.

For example, the image processor 2022 may deskew and/or dewarp the image using known techniques such that the image properly rotated and aligned. The image processor 2022, in further examples, may perform one or more other cleaning or processing operations. This may include down-converting the image received from the image capture module to a suitable size, such as 200 dots per inch (DPI) resolution or in a resolution range such as 200 DPI to 400 DPI, 300 DPI to 500 DPI, etc., and/or converting the image to grayscale or black and white. Such operation(s) may reduce the file size of the check image. The image processor 2022 may additionally perform any of the following operations, in further examples: convert from JPEG to TIFF, detect check information, perform signature detection on the image of the check, and the like. Alternatively or additionally, edge detection may be used to detect the check. Edge detection techniques are well known and any suitable method may be used herein.

With respect to number and character recognition, commercial check scanners have used characteristics of the MICR encoding to detect information about the check, such as the bank's routing number and the account number. However, the characteristics that these scanners have used are the magnetic characteristic of the ink itself and these scanners have used methods similar to those of magnetic audio tape readers. In an implementation, a software object of the institution system 2005 may optically recognize the characters on the MICR line. The institution system 2005 may perform the operations and generate a data file comprising the data from the check. In an implementation, in addition to being used to determine whether the check has been previously processed for example, such data may be used by a financial institution to generate a Check 21 compliant format or file or substitute check.

In an implementation, the image processor 2022 may process multiple frames of the image if the image is comprised of multiple frames (e.g., the front side and the back side of the check 118). For example, after receiving the digital image file, the image processor 2022 may retrieve the image(s) of the check 118 and process the image or an image based on the image for deposit. The image processor 2022 may use any known image processing software or other application(s) to obtain the image and any relevant data of the check 118 from the digital image file. The image processor 2022 has access to data, files, and documents pertaining to the user 105 as well as any other data, files, and documents that are internal or external to the institution system 2005 that may be useful in processing the digital image file and/or the data contained therein.

The image processor 2022 may extract data from the image of the check 118 and provide the data to a check data generator 2024. The check data generator 2024 may generate a data file that comprises the appropriate check data from the check 118. In an implementation, the data file may be stored in storage of the financial institutions 125a-c, such as check data storage 132 or storage 2008, for example. The data file may be sent to the PS-PLATFORM server 120 either upon request from the PS-PLATFORM server 120 (e.g., pursuant to another financial institution requesting validation of a check presented to that financial institution for processing) or upon generation of the data file (e.g., to be stored in storage of the PS-PLATFORM server 120, to be analyzed for validation of the check for the financial institution providing the data file, etc.). Thus, in an implementation, the check data generator 2024 may generate a data file and provide it to the PS-PLATFORM server 120. In response, the PS-PLATFORM server 120 may advise the financial institutions 125a-c whether to accept the check or not, or may provide real time validation information that may be analyzed by the financial institutions 125a-c in determining whether or not to accept the check. If the presented check is determined to be valid, the check may then be sent for clearing.

If a digital image of the check 118 is not used, a representative of the financial institution 103 may manually obtain data from the check 118 and provide that data to the check data generator 2024, e.g., via a computing device associated with the institution system 2005, such as one of the computing devices 2006.

After receiving validation of the check 118 from the PS-PLATFORM server 120, the check 118 (or data from the check 118) may be provided to a check clearing module 2025 of the institution system 2005. The check clearing module 2025 may perform known check clearing processes on the check 118 in order to credit the funds of the check 118 to the account 160. In an implementation, the check clearing module 2025 may provide the image of the check 118 or data from the check 118 to a clearinghouse to perform the check clearing operations. Check clearing operations are used by banks to do the final settlement of the check 118, such as removing funds from the account of the payor and transferring those funds to the user's bank. The user's bank may choose to make the funds available to the user 105 immediately and take on the risk that the check 118 does not clear. However, for various reasons, the bank may only make those funds available to the user 105 after the check 118 finally clears.

In an implementation, to credit funds to the account, the financial institution may generate an ACH debit entry and/or a substitute check. ACH transactions typically include payment instructions to debit and/or credit an account. Banks often employ ACH service providers to settle ACH transactions. Examples of ACH service providers include regional branches of the Federal Reserve and the Electronic Payments Network (EPN). The ACH service provider may process the debit entry by identifying the account and bank from which the check may be drawn. If the payor's bank verifies the transaction, the ACH service provider may settle the transaction by debiting the payor's bank and crediting the user's bank. The payor's bank may then debit the payor's account. It will be appreciated that the examples herein are for purposes of illustration and explanation only, and that an embodiment is not limited to such examples.

In one embodiment, the institution system 2005 may include a user interface module 2020 and a data source access engine 2027. The user interface module 2020 may generate and format one or more pages of content 2019 as a unified graphical presentation that may be provided to a user computing device associated with the user 105 (e.g., if the user 105 is depositing the check electronically via a user computing device). In an implementation, the page(s) of content 2019 may be provided to the user computing device via a secure website 2018 associated with the institution system 2005.

In one embodiment, the institution system 2005 has the ability to retrieve information from one or more data sources 2029 via the data source access engine 2027. Data pertaining to the user 105 and/or the account 160 and/or validating, processing, and clearing of a check may be retrieved from data source(s) 2029 and/or external data sources. The retrieved data may be stored centrally, perhaps in storage 2008. Other information may be provided to the institution system 2005 from the user 105 or the PS-PLATFORM server 120.

In one embodiment, database(s) 2029 may contain data, metadata, email, files, and/or documents that the institution system 2005 maintains pertaining to the user 105, such as personal data such as name, physical address, email address, etc., and financial data such as credit card numbers and deposit account numbers. Such data may be useful for validating and/or processing the check 118 or a digital image of the check 118. Additionally or alternatively, the financial institutions 125a-c or the institution system 2005 may access this information when clearing a check.

In one embodiment, the institution system 2005 may comprise one or more computing devices 2006. The computing device(s) 2006 may have one or more processors 2007, storage 2008 (e.g., storage devices, memory, etc.), and software modules 2009. The computing device(s) 2006, including processor(s) 2007, storage 2008, and software modules 2009, may be used in the performance of the techniques and operations described herein.

Within embodiment, examples of software modules 2009 may include modules that may be used in conjunction with receiving and processing a digital image or digital image file comprising an image of the check 108, retrieving data from the digital image or digital image file, generating a data file for use by the framework 120 and/or other financial institutions in validating and/or processing the check 108, and requesting and receiving validation information from the framework 120 pertaining to a check, for example. While specific functionality is described herein as occurring with respect to specific modules, the functionality may likewise be performed by more, fewer, or other modules.

Figure 2E:
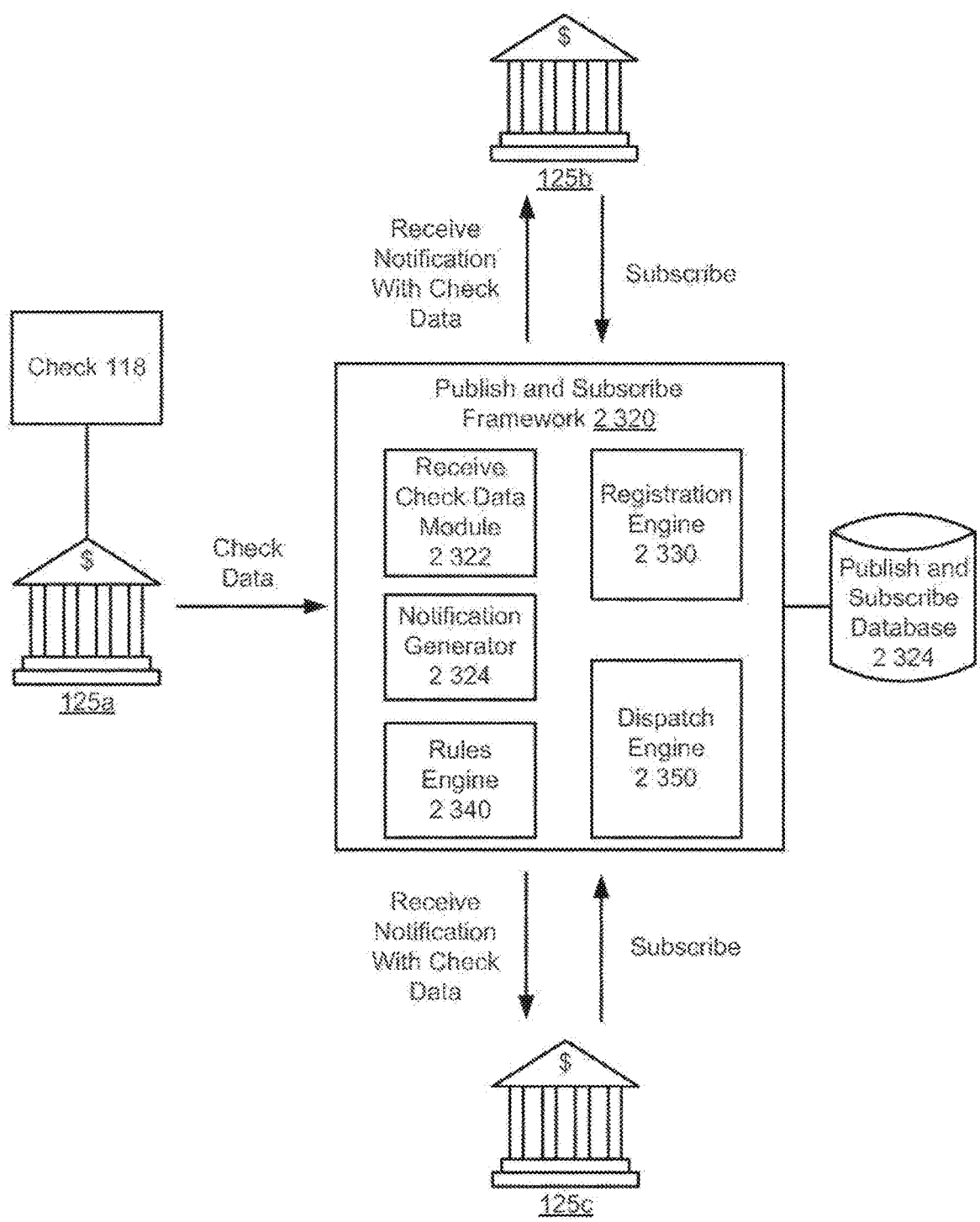
FIG. 2E provides a diagram of exemplary infrastructures of the PS-PLATFORM system for home deposit, mobile deposit, kiosk/ATM/Retail deposit in one embodiment of the PS-PLATFORM.

FIG. 2E provides a block diagram of another implementation of a system in which example embodiments and aspects may be implemented. In one embodiment, the PS-PLATFORM may use publish and subscribe techniques for communicating check data and/or validation information to the financial institutions 125a-c that are in communication with a publish and subscribe framework 320 (may be referred to herein as a PS-PLATFORM 2320).

In one embodiment, communication models are used to handle receiving messages from and distributing messages to multiple nodes in a distributed computing environment. An example of a communication model is the publish and subscribe model. Entities that produce the messages or information are "publishers" and entities that are interested in the messages are "subscribers". The publish and subscribe model involves an asynchronous messaging capability and is event-driven because communication between the producer of information and the consumer of information is triggered by business events, such as the presentment of a check, such as a check 118, to a financial institution, such as the financial institution 125a.

In one implementation, a variety of data structure and file formats may be utilized to generate a message, which may include a numeric ID uniquely identifying the message. For example, in one implementation, the message ID may be a 4 digit number where the first 2 digits indicate a type of the message, e.g., 09xx indicates the message is related to remote deposit, etc., and the next two digits may further indicate the type of the deposit message, e.g., 0901—Deposit Initiation, 0902—Deposit Reversal, 0903—Deposit Response, 0904—Deposit Notification, 0905—Deposit Reversal Notification, and/or the like. In one implementation, the remote deposit message may include fields as shown in the following example:

| Message Field | Description |
| --- | --- |
| Message id | Numeric ID to uniquely identify the RDC message, e.g., "0904", etc. |
| Bank id | Number identifying the bank/bank terminal where the deposit transaction was initiated |
| Deposit timestamp | Time of deposit transaction |
| Location | Unique indicator of the location of capture (e.g., POS device ID, IP address of device of capture, GPS location for a mobile deposit) |
| Deposit metadata [1 . . . N] | Information of one to many deposit slips tied to the capture transaction |
| Security token | A base-64 encoded token string to secure the deposit metadata and the security tokens of the associated checks in this transaction |
| Check ids | List of unique check identifiers for the check item associated with this deposit |
| Deposit transit number | Transit routing number of payee deposit account for credit |
| Deposit account number | Payee account # for credit |
| Amount | Numeric amount to be credited |
| Check [1 . . . N] | Information on one to many check items |
| Check id | Unique identifier for the check item in the message |
| Payor transit number | Transit routing number of payor account for debit (e.g., Transit field in the check MICR) |
| Payor account number | Payor account # for debit (e.g., account # from On-us field in the check MICR) |
| Micr | Complete MICR string extracted from check item |
| Check number | Number identifying the check item (e.g., check # from On-us field in the check MICR, if present) |
| Check date | Date of the check |
| Courtesy amount [car] | Numeric Amount detected on the check item |
| Legal amount [lar] | Full worded amount detected on the check item |
| Payor name | Name of the payor |
| Payor address | Address of the payor |
| Memo | Memo field description (e.g., Memo entry on the front of the check item) |
| Signature detection | A Boolean to indicate if a signature was detected (e.g. signature on the front of the check item) |
| Signature code | A numeric coded stream of the signature |
| Endorsement detection | A Boolean to indicate if the endorsement was detected (e.g., endorsement on the back of the check item) |
| Endorsement code | A numeric coded stream of the endorsement |
| Front image | Bit stream containing the image information of front of check |
| Back image | Bit stream containing the image information of back of check |
| Security token | A base-64 encoded token string to secure the metadata and images of this check transaction |
| Response | The response information |
| Response code | Numeric code indicating the response type |
| Response detail | String indicating the response detail |

For another example, an example XML implementation of the remote deposit message may take a form similar to the following:
</RDC>
<?xml xmlns:xs=http://www.w3.org/2001/XMLSchema version="1.0" encoding="ISO-8859-1" ?><RDC><Message ID>0901</Message ID><CAPTURE METADATA>
  <Bank ID>0011913102</BankID>
  <Deposit Timestamp>01212009:12:20:35</Deposit Times tamp>
  <Location>0731460: 3744795<Location>
</CAPTURE METADATA>
<DEPOSIT SLIP>
  <DEPOSIT METADATA>
  <Check ID>CHQ0017</Check ID>
  <Deposit Transit Number>35706112</Deposit Transit Number>
  <Deposit Account Number>01123456</Deposit Account Number>
  <Amount>55 0.37</Amount>
  </DEPOSIT METADATA>
  <Security Token>
TWFuIGlzIGRpc3RpbmdlaXNoZWQsIG5vdCBv
  bmx5IGJ5IGhpc    yByZWFzb24sIGJ1dCBieSB
  OaGlz    IHNpbmdlbGFyIHBhc3Npb24gZnJvbS
  BvdGhlciBhbmltYWxzL
  CB3aGljaCBpcyBhIGxlc3Qgb2Yg=
  </Security Token>
. . .
</DEPOSIT SLIP>
<CHECK>
  <Check ID>CHQ0017</Check ID>
  <CHECK METADATA>
  <Payor Transit Number>01136822</Payor Transit Number>
  <Payor Account Number>112234</Payor Account Number>
  <MICR>A021001208A7000609C11051</MICR>
  <Check Number>11051</Check Number>
  <Check Date>12252008</Check Date>
  <CAR>55.37</CAR>
  <Memo>Christmas Ornaments Purchase</Memo>
  </CHECK METADATA>
  <Front Image>FFD8FFE000104A4 . . . 6494600010
  </Front Image>
  <Back Image>7020332E3000384 . . . 494D040407
  </Back Image>
  <Security Token>
dGhlIG1pbmQsIHRoYXQgYnkgYSBwZXJzZXZlc
  mFuY2Ugb2YgZ
  GVsaWdodCBpbiB0aGUgY29udGlud
  WVkIGFuZCBpbmRlZmF0aW
  dhYmxlIGdlbmVyYXRpb24gb2Yga2
  5vd2xlZGdlLCBleGNlZWR
  zIHRoZSBzaG9ydCB2ZWhlbWVuY2Ugb
  2YgYW55IGNhcm5hbCBw bGVhc3VyZS4=
  </Security Token>
. . .
</CHECK>
. . .
</RDC>

In one embodiment, publish and subscribe systems comprise publishers which generate messages and subscribers which receive the messages. Depending on the implementation, the framework 2320 may act as a publisher of a message (e.g., comprising a notification and/or check data)

or as a message broker which receives a message from one of the financial institutions and sends the message to one or more subscribers (e.g., financial institutions) that have previously subscribed to receive some or all of these notifications.

In one embodiment, a messaging system uses a set of rules to ensure that a particular message is provided to the proper subscriber(s). A rule is a condition that describes the message or messages that are desired by a subscriber. As described herein, a rules engine 2340 may be used to apply the rules to the check data for determining which entities to send the messages. There are a variety of standards governing the expression of the rules and the structure of the messages, and any standard(s) may be used with the techniques and operations described herein.

For example, in one implementation, a financial institution, e.g., payor's bank may request to subscribing for deposit information of all negotiable instruments issued by the payor's bank. In one implementation, the PS-PLATFORM may send a message comprising deposit information to the subscribed payor's bank when a negotiable instrument issued by the payor's bank is processed. In another implementation, the PS-PLATFORM may generate a bulk of messages comprising deposited negotiable instrument information within a period of time. In one implementation, the PS-PLATFORM may generate messages to the subscriber periodically. In an alternative implementation, the PS-PLATFORM may send subscribers notifications upon request, e.g., in response to receiving a clearinghouse request for a proposed deposit of a negotiable instrument.

For another example, a subscription rule from a financial institution may specify a time range of desired information, which may request the PS-PLATFORM provide deposit information within the specified period of time, e.g., the past 6 months. In another implementation, the subscription rule may further specify a variety of parameters for the deposit information, such as a range of deposit amount (e.g., an amount greater than 1000 USD, etc.), a set of payor's banks (e.g., information with regard to negotiable instruments issued by the set of payor's banks may be monitored, etc.), a range of deposit occurrences (e.g., the most recent 10 deposits associated with one account may be monitored, etc.) and/or the like. In a further implementation, any combination of the discussed example parameters may be employed by the subscription rule.

In one implementation, the subscription rule may be implemented with a variety of data-structures, such as an array, hash, (linked) list, struct, structured text file (e.g., XML), table, and/or the like. For example, in one embodiment, an example XML for a subscription rule may take a form similar to the following example:

</RDC>
<?xml xmlns:xs=http://www.w3.org/2001/XMLSchema version="1.0" encoding="ISO-8859-1" ?>
<RDC>
<Message ID>0916</Message ID>
<Subscription Rule>
  <Rule ID>0009314</Rule ID>
  <Subscriber ID>0011913102</Subscriber ID>
  <Subscriber Name>
    ABC Bank
    </Subscriber Name>
  <Security Token>
DGhlIG1pbmQsIHRoYXQgYnkgYSBwZXJzZXZ
  lcmFuY2Ugb2YgZ
  GVsaWdodCBpbiB0aGUgY29udGludWV
  kIGFuZCBpbmRlZmF0aW
dhYmxlIGdlbmVyYXRpb24gb2Yga25vvd
2xlZGdlLCBleGNlZWR
zIHRoZSBzaG9ydCB2ZWhlbWVuY2Ug
b2YgYW55IGNhcm5hbCBw bGVhc3VyZS4=
</Security Token>
<Notification Trigger>
<Trigger 1>Payor Bank=ABC Bank</Trigger 1>
<Trigger 2>Payee Bank=ABC Bank</Trigger 2>
</Notification Trigger>
<Notification Condition>
  <Condition 1>MICR Transit field matches any of 011312239 011331365 011665344
</Condition 1>
<Condition 2>Check amount exceeds 50000 and MICR Transit starts with 01131
</Condition 2>
</Notification Condition>
<CALLBACK SERVICE>
<URL>www.abcbank.com/chkMonSvc/ . . . </URL>
. . .
</CALLBACK SERVICE>
</Subscription Rule>

In an implementation, the publish and subscribe framework 2320 is content-based. In a content-based system, messages are only delivered to a subscriber if the attributes or content of those messages (pursuant to the check data) match constraints defined by the subscriber. Thus, a subscriber registers to receive messages based on particular data, such as the account on which the check is drawn, the routing number, the name, etc. The framework 2320 sends the message to the subscriber only if the subscription matches the data.

In one embodiment, a subscriber may subscribe by submitting one or more rules to the framework 2320. Each rule may describe the message or messages that are desired by the subscriber using the check data. The rules engine 2340 may be used to apply the stored subscription rules to messages published or otherwise provided by the framework 2320 pursuant to the check data. If an incoming message or check data satisfies a subscription rule, then the message, the check data, and/or a notification is published to the particular subscriber that submitted the subscription rule. Incoming check data is evaluated against a set of subscription rules to determine which subscribers are to receive a message.

In an implementation, the messages that are delivered to subscribers who are qualified to receive them may include not only messages generated based on the check data of the presented check, but also messages that have been published at an earlier time and that have been stored in storage of the framework 2320 such as a publish and subscribe database 2324. Previously published messages that were stored in the publish and subscribe database 2324 and that satisfy the subscription rule(s) may be delivered to the subscriber. Having been stored in the publish and subscribe database 2324, the previously published messages can be retrieved for publication to the subscriber using known data retrieval methods used by database servers.

In an implementation, a subscriber may specify the delivery mechanism, the destination, and the notification protocol of the message as part of the subscription requesting the message. For example, the subscriber may specify when registering that they would like to receive messages by means of email. The subscriber may then specify an email address at which to receive the message. Alternatively, the subscriber may specify that they would like their messages delivered to a remote database by means of a database link. In one embodiment, the database link can be created using SQL and may define a database name, a path, a logon account, and a protocol used to connect to the remote database. In addition, the subscriber may specify how quickly they would like to have a message delivered, such as within one second, one minute, etc., of the creation of the message.

In one embodiment, the publish and subscribe framework 2320 may operate to provide message brokering services between the financial institutions involved in an exchange of messages. The framework 2320 may be implemented in a server or other computing device, and may comprise a receive check data module 2322, a notification generator 2324, a registration engine 2330, a rules engine 2340, and a dispatch engine 2350.

In one embodiment, the receive check data module 2322 may receive check data 2315 from a financial institution when the financial institution receives a check for processing (e.g., deposit or cashing) from a user. The check data 2315 comprises data pertaining to the check (e.g., the check 118) that has been presented from the user to the financial institution (e.g., the financial institution 125a) for processing.

In one embodiment, the registration engine 2330 may receive preferences from financial institutions 125a-c and may use the preferences to register the financial institutions 125a-c as subscribers. Rules may be established using the preferences of the financial institution that allow message (e.g., check data and/or notification) routing decisions to be made based on, for example, user identification, paying bank, amount of check, time of day, transaction type, presentment method, level of authentication, transaction profile, and/or other criteria.

In one embodiment, the rules engine 2340 checks the received check data against the rules. If a rule is satisfied, a notification is generated by the notification generator 2324. The notification may be sent to the dispatch engine 2350. In an implementation, the dispatch engine 2350 sends the notification and/or check data over a subscribed feed to the financial institution whose rules meet the received check data. The notification with check data may be sent by any known communication channel, such as a communication channel previously selected by the financial institution when registering as a subscriber. In an implementation, the notification with check data may be sent by email, text message, instant message, facsimile, or telephone, for example.

In an implementation, each financial institution may subscribe to a feed of its own checks and may be apprised of a check that is on them and that is being presented to any financial institution associated with the publish and subscribe framework 2320. This gives the financial institution the ability to determine from a database or other storage of check processing data accessible by the financial institution whether a payment has previously been made on the check (i.e., whether the check has been processed previously). If the payment has previously been made on the check, then payment of the check due to representment of the check may be disallowed and avoided. If the payment has not been made already on the check, the financial institution may allow payment to be made on the check. In an implementation, if the payment has not been made already on the check, the financial institution may memo post the check, deduct money from the account holder, and leverage the float on the money between that moment in time and when the check is presented for clearing.

PS-PLATFORM User-Server Flow Overview

Figure 3A:
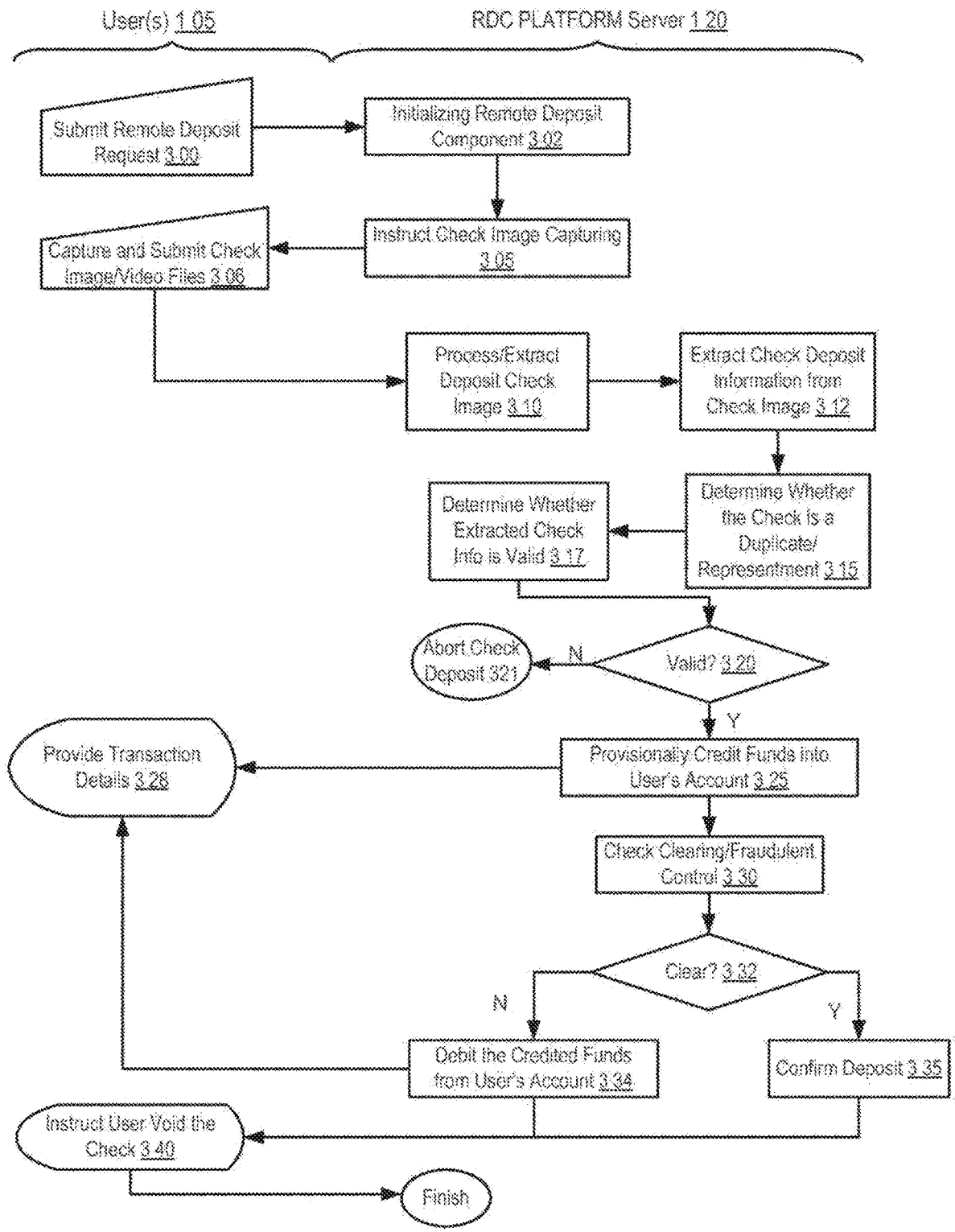
FIG. 3A provides a diagram illustrating aspects of remote deposit of checks in one embodiment of the PS-PLATFORM.

FIG. 3A is of a logic flow diagram illustrating aspects of remote deposit of checks in one embodiment of the PS-PLATFORM. In FIG. 3A, a user may submit a remote deposit request 300. For example, in one embodiment, the PS-PLATFORM may operate a web site which guides a user through the process of collecting images of a check to be deposited. In some implementations, the web site may facilitate a browser-executable component (e.g., applets, scripts, etc.), that drives the process of collecting images. In one implementation, a user may visit a website controlled by the PS-PLATFORM via a web browser on the user's home computer and submit a request for remote deposit via the user interface of the webpage.

In another embodiment, for kiosk/ATM/retail deposit, a user may be instructed from an ATM/kiosk screen to place or insert the check into a check deposit slip for scanning, and/or the like.

In another embodiment, for mobile deposit, a user operating a mobile device may access the PS-PLATFORM website via the mobile device, or may launch a PS-PLATFORM component pre-installed on the mobile device and connect to the PS-PLATFORM server to submit deposit requests via the PS-PLATFORM component.

In one embodiment, m response to the user request, the PS-PLATFORM server may initialize a remote deposit component 302. For example, in one implementation, the PS-PLATFORM may retrieve and load a user interface page for remote deposit. In one embodiment, the PS-PLATFORM may instruct the user to capture and submit an image or video streaming of the check 305-306, as will be further illustrated in FIGS. 4A-C. In one implementation, the initialized remote deposit component may authenticate the user by prompting the user to login a remote deposit system with a user name and password if the user is an existing member of the PS-PLATFORM. For example, in one implementation, a remote depositor may access a remote deposit service website, and submit a request by clicking on a "deposit" button on the webpage. The PS-PLATFORM may then lead to a login webpage, prompting the depositor to login to the remote deposit service with a user name and password.

For another example, for mobile deposit via a mobile device, the user may launch a "remote deposit" application on a menu of the mobile device to send a request for mobile deposit (e.g., via SMS, etc.), and the PS-PLATFORM may determine whether the mobile device has been registered based on its physical address (MAC address). In a further implementation, the PS-PLATFORM may instruct the user to submit biometrics information for authentication. For example, if the user is operating a video camera, video files and/or live video streaming of the user may be transmitted to the PS-PLATFORM to authenticate the user by face recognition procedures.

In one embodiment, the PS-PLATFORM may process the received check image or video file 310 (as will be further illustrated in FIGS. 6A-H). For example, in one implementation, the PS-PLATFORM may process the received check image or video file to generate an enhanced digital check image in order to extract deposit information, and convert the check image to an image file format in compliance of virtual check standard (e.g., X9.37 cash letter image files, etc.). In one embodiment, the PS-PLATFORM may extract check deposit information from the processed check image 312. For example, in one implementation, an Optical Character Recognition (OCR) procedure may be applied to the enhanced check image and extract information such as the amount of deposit, the account number, banking routing number, payee's name, deposit date, endorsement, the magnetic ink character recognition (MICR) line which contains information of the account number of bank routing number, and/or the like. In another implementation, the PS-PLAT- FORM may analyze any metadata and additional submitted information associated with the check image, such as GPS information if image is submitted by a GPS enabled mobile device, time stamp of image capture, IP address of the image capture device, MAC address, system identifier (for retail POS/kiosk deposits), manually entered deposit amount, user identification (such as account name and password) and/or the like.

In one implementation, the PS-PLATFORM may determine the check is a duplicate or representation 315, (as will be further illustrated in FIG. 8). In one implementation, the PS-PLATFORM may perform the representment inspection at a payee's bank prior to provisional deposit 325. In another implementation, the PS-PLATFORM may send deposit data to an external agency for representment service.

In one embodiment, the PS-PLATFORM may verify the check image based on the extracted information, e.g., determining whether the extracted check information is valid 317. For example, in one implementation, the extracted information from the check image may be compared with the user submitted deposit information, e.g., payee's name, deposit amount, etc. For another example, the PS-PLATFORM may check if a proper endorsement is contained on the back side of the check image.

In one embodiment, if the check is not valid 320, the bank may reject the check image and abort check deposit 321. In another embodiment, if the check is valid, the PS-PLATFORM may provisionally credit the indicated amount of funds into the user's amount 325. For example, in one implementation, the PS-PLATFORM may post the deposit to the payee's bank, and the payee's bank may provisionally credit the deposit amount to the payee's account.

Figure 8A:
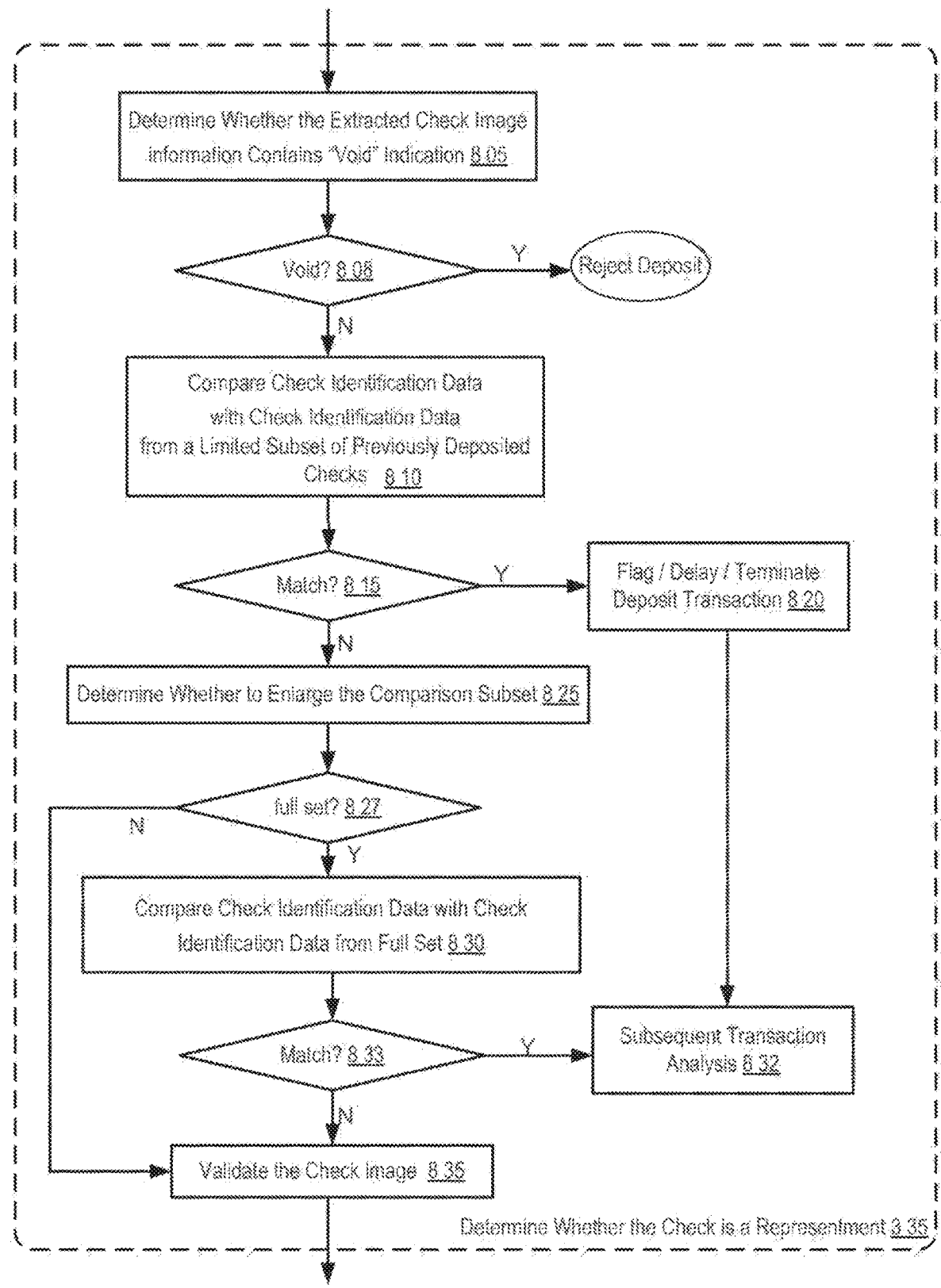
FIG. 8A provides a diagram illustrating aspects of check representment detection and check clearance in one embodiment of the PS-PLATFORM.
Figure 8B:
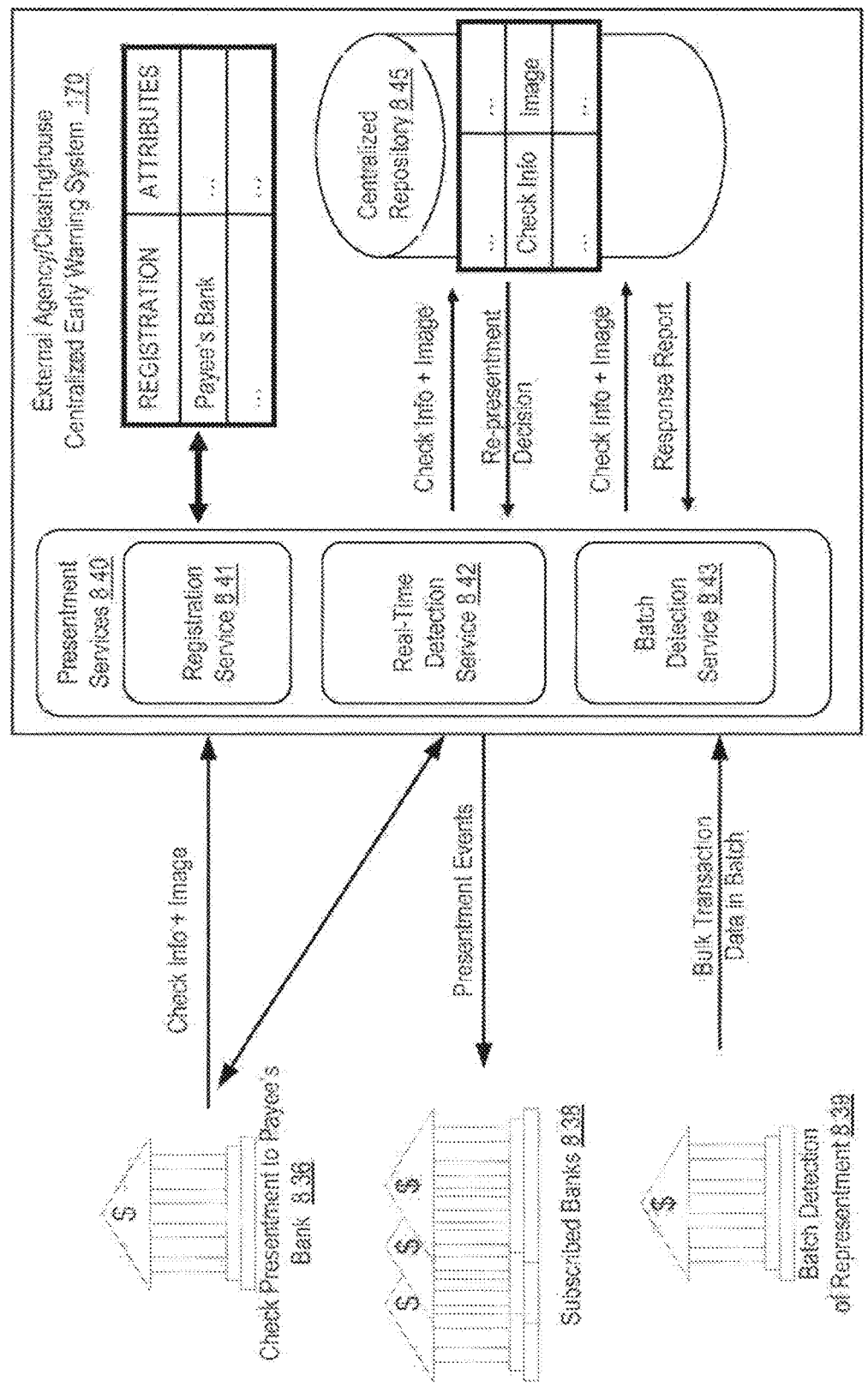
FIG. 8B provides a diagram illustrating aspects of check representment detection and check clearance in one embodiment of the PS-PLATFORM.

In one embodiment, the PS-PLATFORM may perform a check clearing procedure to control fraudulent items 330, as will be further illustrated in FIG. 8B. For example, the PS-PLATFORM may send X9-37 letter check images to a regional branch of the Federal Reserve, a correspondent bank, a clearinghouse bank and/or the like to clear the check. If the PS-PLATFORM receives a positive result of the check clearing 332, the deposited credit may be confirmed 335. Otherwise, the provisionally credited funds may be deducted from the payee's account 334, and the transaction details may be provided to the user 328.

In an alternative embodiment, the bank may process the ACH debit entry, substitute check, and/or electronic image. As noted above, the bank may present the ACH debit entry to an ACH service provider (e.g., EPN), which may be responsible for settling the transaction between the payee's bank and the payer's bank. The bank also may convert the digital image into a substitute check and present the substitute check to an intermediary bank (e.g., a regional branch of the Federal Reserve) to complete the check clearing process. In one implementation, the bank may debit the payee's account if the original check is not received and/or sent within a predetermined period of time. For example, the bank may require that the payee send the check and have it postmarked within five business days of sending the electronic data representative of the check. If the check is not postmarked within the predetermined period of time, the financial institution may void the provisional credit (e.g., withdraw funds from the account).

In one embodiment, upon completion of the deposit, the PS-PLATFORM may further instruct the user to void the physical check 340 to avoid representment. For example, in one embodiment, the PS-PLATFORM may instruct the user to place the physical check to a certain equipment such that a stimuli may be applied to the physical check to permanently modify the check as "void". For another example, if the deposit takes place at a kiosk or ATM, the deposit facility may print "ELECTRONICALLY PRESENTED" across the front of the original check when the check is scanned by equipment designed to convert the check to an electronic image for further processing. For another example, in one implementation, the MICR information of a check may be printed using a magnetic ink or toner containing iron oxide, which may be magnetically voided. For another example, the physical check may contain a radio frequency identification (RFID) tag. When the RFID tag receives a particular radio signal, the RFID tag may be modified as "void". For further examples, if the physical checks contain tags sensitive to heat, the check may be voided by the heat generated by the application of a bright light source, such as one that may be found in a scanner.

In an alternative implementation, the PS-PLATFORM may instruct the user to physically destroy the check and submit digital evidence of check detriment. For example, the user may tear the check, capture an image of the torn check pieces, and submit the captured image to the PS-PLATFORM for verification, as shown in FIG. 11H. For another example, if the user operates a video camera, the user may submit live video streaming, and/or a video file, showing the deposited paper check being destroyed.

In one embodiment, the PS-PLATFORM may create a record of the deposited check and store the deposited check record in a repository to prevent check re-presentment. For example, in one implementation, the PS-PLATFORM may store an image of the check associated with extracted information, such as payee's name, deposit date, bank name, MICR information including the bank routing number and account number, and/or the like. In another implementation, the PS-PLATFORM may create a record of the check based on a portion of the check image which may be unique to represent the check. For example, in one implementation, the created check record may only include an image of the front side of a check.

Alternative Embodiments of PS-PLATFORM User-Server Flow Overview

Figure 3B:
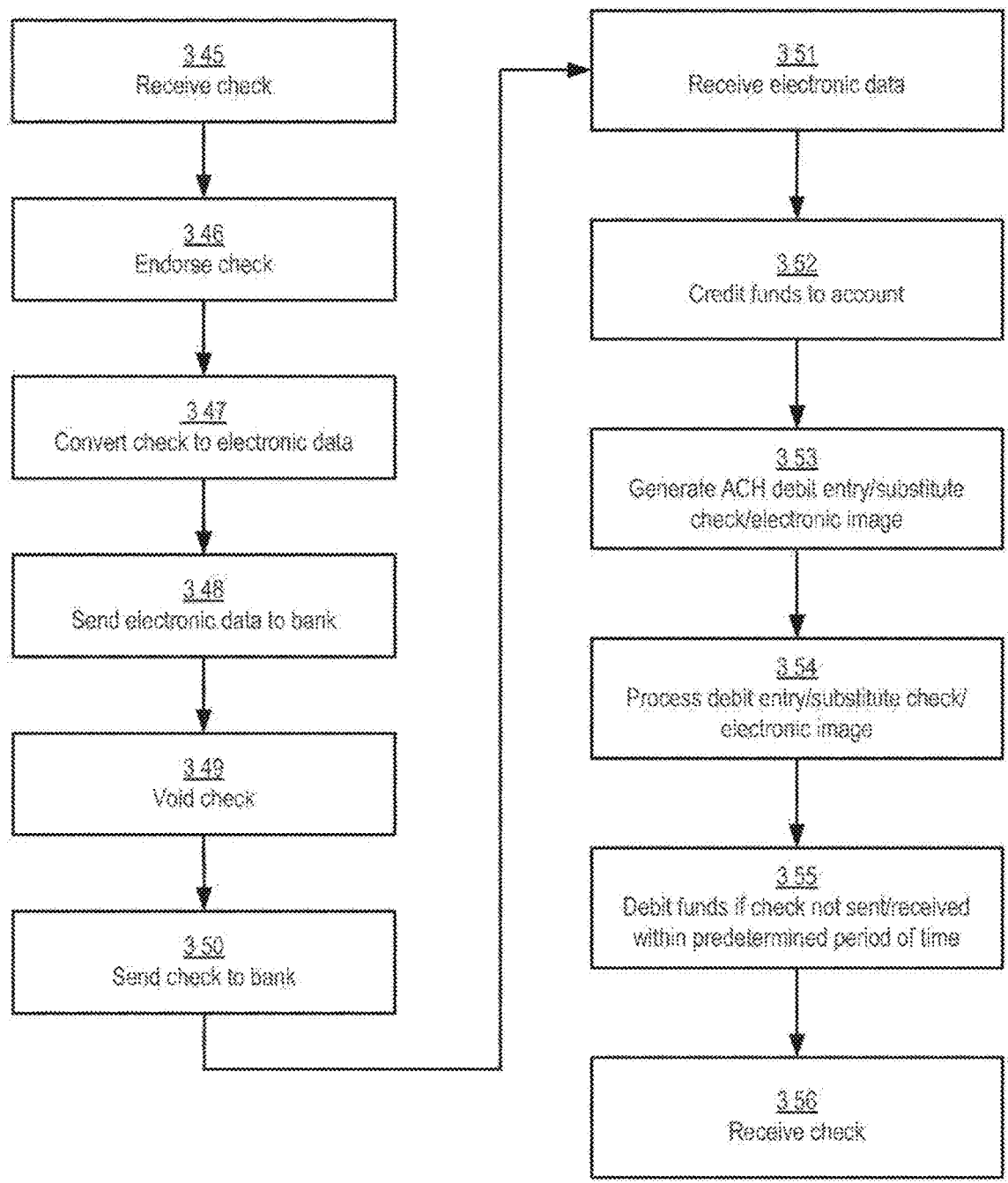
FIG. 3B provides a diagram illustrating aspects of remote deposit of checks in one embodiment of the PS-PLATFORM.
Figure 3C:
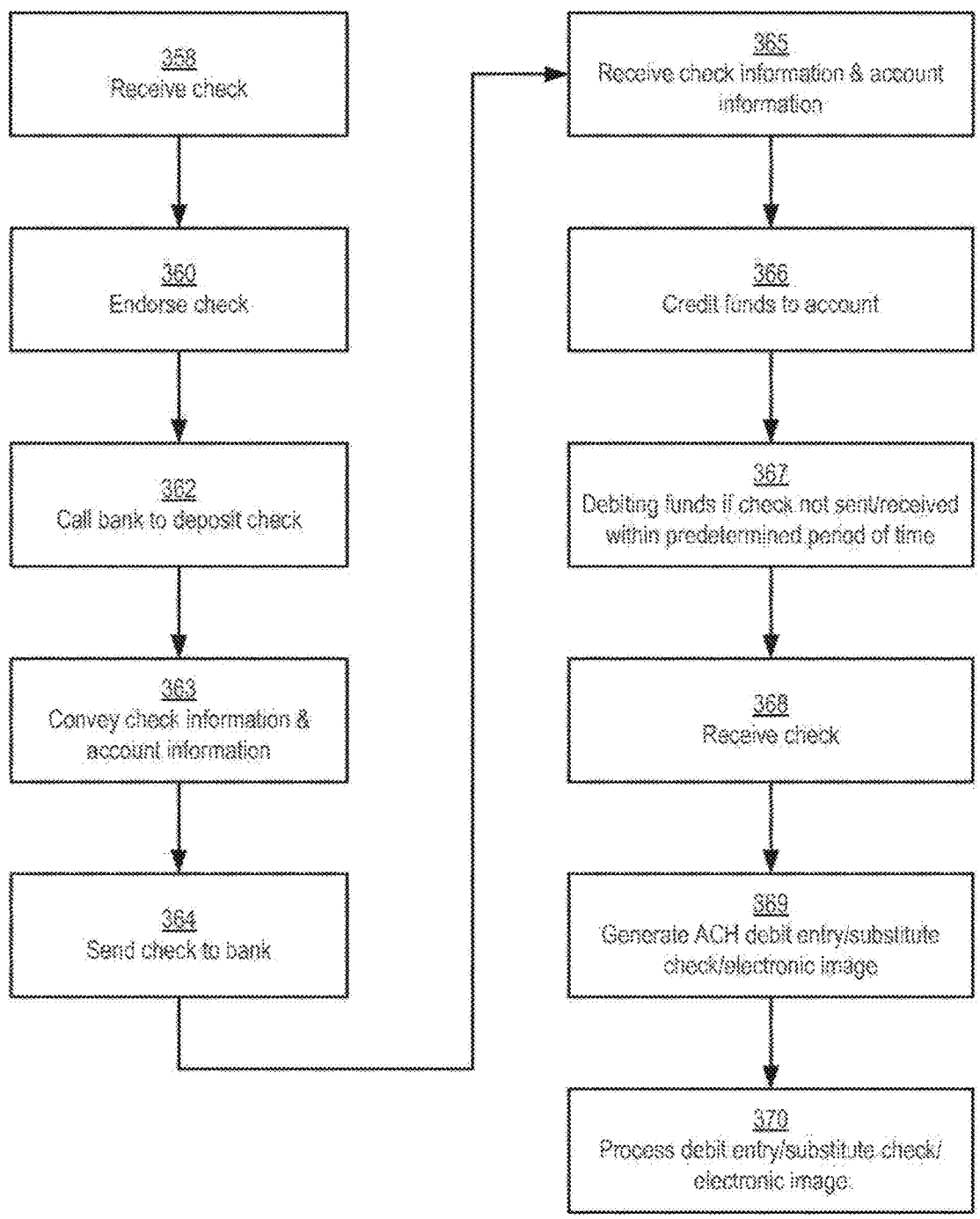
FIG. 3C provides a diagram illustrating aspects of remote deposit of checks in one embodiment of the PS-PLATFORM.

FIGS. 3B-3C provide logic flow diagrams illustrating aspects of remote deposit of checks in alternative embodiments of the PS-PLATFORM.

FIG. 3B is a flow diagram illustrating an example method of remotely depositing checks. As shown in FIG. 3B, at 345, an account owner (i.e., the payee) may receive a check from a third party (i.e., the payer). At 346, the payee may endorse the check by signing the back of the check in the designated field. If the payee wishes to deposit the check into an account, such as a savings and/or checking account, the payee also may write an account number below the signature. At 347, the payee may convert the check into electronic data. This may be accomplished in any number of ways. For example, the payee may create a digital image of the first side of the check, the second side of the check, or both. The digital image may be created using a general purpose flatbed scanner, digital camera, photocopier, fax machine, and the like.

The payee also may convert the check into electronic data by scanning the check using a Magnetic Ink Character Recognition (MICR) device. Checks typically contain MICR information (e.g., routing number, account number and check number) on the bottom left-hand corner of the check. The MICR information usually consists of characters written in a magnetic ink. The MICR information may be read electronically by passing the check through the MICR device, which may translate the characters by magnetizing the ink.

As shown in FIG. 3B, at 348, the payee may send the electronic data to a bank that is associated with an account for depositing funds. Any means for transmitting electronic data over a communications network is consistent with an embodiment. For example, if the payee creates a digital image of the check, the image may be sent to the bank by attaching the image to an email. If the electronic data is in the form of MICR information captured by a MICR device, the device may have an output component for transmitting the electronic data to the bank over the communications network. In addition, the electronic data may include information pertaining to the account for depositing funds, such as the account number and/or the name on the account. The account number may appear on the check itself, below the signature endorsing the check. The account number and/or name on the account also may appear in an email, either with or without the digital image, for example.

At 349, the payee may void the check. For example, the payee may write and/or stamp "void" on the check. At 350, the payee may send the check to the financial institution associated with the account for depositing funds. The check may be sent via a common carrier, such as the United States Post Office, FedEx®, United Parcel Service®, and the like. The process may then proceed to 350. It will appreciated that 349 and 350 may be performed to provide additional security features. For example, by removing the check from circulation, it may be less likely that the check will be deposited more than once.

At 351, the bank may receive the electronic data representative of the check along with information pertaining to the account for depositing funds. At 352, the bank may credit funds to the account. The credit may be a provisional credit, enabling the payee to access the funds while the check is being cleared. A provisional credit may be voided if the bank determines that the transaction is erroneous and/or fraudulent.

At 353, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN). In an embodiment, a payee may receive a check in return for the sale of goods, such as a used car, for example. The payee may endorse the check and/or send electronic data representative of the check to the payee's bank, which may be referred to as the originating depository financial institution (ODFI). As noted above, the electronic data may be generated in any number of ways. For example, the payee may use a MICR device to scan and translate the MICR information (e.g., account number, routing number, check number, etc.) located on the check and transmit the data to the payee's bank along with information pertaining to the account for depositing funds. Upon receipt of the MICR information and account information, the payee's bank may credit funds to the payee's account and generate an ACH debit entry to the payer's account, which may be presented to the ACH service provider for processing.

The ACH service provider may process the debit entry by identifying the account and bank from which the check is drawn. The bank from which the check is drawn (i.e., the payer's bank) may be referred to as a receiving depository financial institution (RDFI). If the payer's bank verifies the transaction, the ACH service provider may settle the transaction by debiting the payer's bank and crediting the payee's bank. The payer's bank may then debit the payer's account.

A substitute check is typically a paper reproduction of an original check and may be the legal equivalent of the original check. Substitute checks were authorized under The Check Clearing for the 21st Century Act, commonly known as Check 21. The Act was enacted to facilitate the check clearing process by allowing banks to transmit electronic images of checks (e.g., substitute checks) to other banks rather than physically sending the original paper checks. Check 21 does not require that banks use substitute checks. In fact, many banks may have voluntary agreements to accept certain electronic images of checks even though the images may not qualify as substitute checks under Check 21. If a bank does not have a voluntary agreement and/or refuses to accept an electronic image, the financial institution is required under Check 21 to accept a substitute check in lieu of the original check.

In an embodiment, a payee may receive a check as a birthday gift, for example. The payee may endorse the check and/or send electronic data representative of the check to the payee's bank. As noted above, the electronic data may be generated in any number of ways. For example, the payee may use a general purpose flatbed scanner and/or digital camera to create a digital image of the front and back of the check. The payee may then attach the digital images to an email and send the digital image to the payee's bank along with information pertaining to the account for depositing funds. Upon receipt of the digital images and/or account information, the payee's bank may credit funds to the payee's account. If the payee's bank and the payer's bank have a voluntary agreement for accepting electronic images of checks, the payee's bank may generate an electronic image of the check and/or simply forward the digital images received from the payee to the payer's bank. If there is no agreement between the banks, the payee's bank may convert the digital images into a substitute check and present the substitute check to the payer's bank and/or a check clearing service provider (e.g., a regional branch of the Federal Reserve) to clear the check.

Returning to FIG. 3B, at 354, the bank may process the ACH debit entry, substitute check, and/or electronic image. As noted above, the bank may present the ACH debit entry to an ACH service provider (e.g., EPN), which may be responsible for settling the transaction between the payee's bank and the payer's bank. The bank also may convert the digital image into a substitute check and present the substitute check to an intermediary bank (e.g., a regional branch of the Federal Reserve) to complete the check clearing process. At 355, the bank may debit the payee's account if the original check is not received and/or sent within a predetermined period of time. For example, the bank may require that the payee send the check and have it postmarked within five business days of sending the electronic data representative of the check. If the check is not postmarked within the predetermined period of time, the financial institution may void the provisional credit (e.g., withdraw funds from the account). At 356, the financial institution may receive the check from the payee. It will appreciated that 355 and 356 may be performed to provide additional security features by removing the check from circulation.

FIG. 3C is a flow diagram illustrating an alternative embodiment of an example method of remotely depositing checks. As shown in FIG. 3C, at 358, a payee may receive a check from a third party payer. At 360, the payee may endorse the check by signing the back of the check in the designated field. If the payee wishes to deposit the check into an account, such as a savings and/or checking account, the payee also may write an account number below the signature. At 362, the payee may call a bank associated with an account for depositing funds and request that the check be deposited into the account. Any method of contacting the bank is consistent with an embodiment. For example, the payee may use a phone, email, instant messaging, and/or a fax machine to make the request.

At 363, the payee may convey the check information and/or information pertaining to the account for depositing funds. For example, the payee may convey the MICR information (e.g., account number, routing number, check number, etc.) on the check. In addition, the payee may convey the account number of the account where the funds are to be deposited. Any method of conveying the information is consistent with an embodiment. For example, as noted above, the payee may use a phone, email, instant messaging, and/or fax machine. At 364, the payee may void the check and/or send the check to the bank. The process may then proceed to 365.

It will be appreciated that 364 may be performed to provide additional security features. For example, by removing the check from circulation, it may be less likely that the check will be (willfully or accidentally) deposited more than once. In addition, by requiring the payee to produce the check, the financial institution may prevent the deposit of fraudulent checks.

At 365, the bank may receive the check information and account information. At 366, the bank may credit funds to the account. As noted above, the credit may be a provisional credit, enabling the payee to access the funds while the transaction is being processed. At 367, the bank may void the provisional credit if the original check is not sent and/or received within a predetermined period of time. At 368, the bank may receive the check. At 369, the bank may generate an ACH debit entry, substitute check, and/or electronic image. At 370, the bank may process the ACH debit entry, substitute check, and/or electronic image. It will appreciated that 369 and 370 may be performed to provide additional security features.

Other security features may be consistent with an embodiment. For example, the bank may only permit certain payees to remotely deposit checks. By way of example, and not limitation, the bank may accept electronic data representative of a check and/or accept a request to deposit a check if the payee's account is in good standing. The payee's account may be considered in good standing if the payee has a positive account balance, has a predetermined amount of funds in the account, and/or is not delinquent on any payments to the bank. The bank also may receive the electronic data and/or request but credit funds to the account if the account is in good standing as of the time the electronic data and/or request was received. In addition, the bank may impose additional requirements on a payee remotely depositing a check into an account that is not in good standing. For example, as noted above, the bank may provisionally credit the payee's account upon receipt of the electronic data and/or request but may require the payee to send the check to the bank. Thus, the account may be debited if the check is not sent and/or received within a predetermined amount of time.

In some embodiments, the PS-PLATFORM may impose limitations on the deposit amount and/or the availability of the deposit. For example, the PS-PLATFORM may place a daily, weekly, and/or other periodic limit for the total amount of remote deposits for a given period. The PS-PLATFORM may additionally or alternatively limit the number of periodic transactions for a given user. Depending on the implementation, such limits may be pre-specified for users (such as a default of limiting users to 3 remote deposits per day, and limiting total daily deposits to $10,000) and/or determined based on risks associated with a use and/or a transaction. For example, a user may have a pre-specified deposit limit of $10,000 per day, but if the user requests and/or attempts to deposit an amount greater than that (e.g., a check for $15,000), rather than simply rejecting the deposit, the PS-PLATFORM may notify the user that the amount is greater than there specified deposit limit. In some such embodiments, the PS-PLATFORM may allow the user to request that the deposit limit be raised for this transaction, in some embodiments for an associated fee, and the PS-PLATFORM may notify a pre-specified bank or financial institution administrator to approve or reject the request.

In some embodiments, the PS-PLATFORM may include user and/or transaction information in the notification to assist the administrator in making the decision, such information including the location of the user requesting the deposit, the bank on which the deposited information is drawn, the amount of time the user has been associated with the institution, prior deposit/banking history, etc. The PS-PLATFORM may additionally or alternatively limit the availability of some or all of the funds of deposit(s) that exceed the pre-specified amount.

Similarly, the PS-PLATFORM may limit the availability of deposited funds according to similar defaults and/or determinations. For example, if the user is depositing funds from a location (e.g., as determined by GPS metadata associated with a deposit from a mobile device) that is outside the user's normal geographic region (e.g., the user's mailing address and surrounding area), the amount of funds made immediately available may be less than if the user is making the deposit from his or her home. Similarly, the amount of the deposit, the account(s) to which the deposit is applied, user account balance(s), user tenure with the financial institution, and/or other information may be utilized by the PS-PLATFORM in determining the amount(s) and timeline for availability.

In one implementation, the PS-PLATFORM utilizes a risk matrix, with various weighted risk factors corresponding to risk information, to determine account limitations. In another implementation, the PS-PLATFORM may utilize risk information in a risk calculation, in which each piece of risk information is assigned a value and the amount available is determined based on the total risk value of the collected information. For example, a deposit of over $5000 may have a higher risk value than a smaller deposit amount, and, as such, may have more restrictions on availability of the full amount. Similarly, a deposit by a user that had been with a bank for 10 years may be determined to have a lower risk value than a user who had just become a member of the bank. In some implementations, the amounts available and/or the deposit limits may be determined by the PS-PLATFORM utilizing determined risk scores and thresholds such that a user who is determined to have a very low risk value has very few limitations imposed on his or her account, a user that has a determined risk value that exceeds a first threshold but is less than a second threshold may have moderate restrictions associated with his or her account, and a user that has a determined risk value that exceeds the second threshold may have even more restrictions applied to his or her account. In some embodiments, the PS-PLAT- FORM may utilize local and/or national regulations in determining and/or applying limitations to accounts and/or deposits.

PS-PLATFORM Exemplary User Interface for Deposit Limit

FIG. 3D shows a schematic user interface illustrating. In some embodiments, the PS-PLATFORM may impose limitations on the deposit amount and/or the availability of the deposit. For example, the PS-PLATFORM may place a daily, weekly, and/or other periodic limit for the total amount of remote deposits for a given period. The PS-PLATFORM may additionally or alternatively limit the number of periodic transactions for a given user. Depending on the implementation, such limits may be pre-specified for users (such as a default of limiting users to 3 remote deposits per day, and limiting total daily deposits to $10,000) and/or determined based on risks associated with a use and/or a transaction. For example, a user may have a pre-specified deposit limit of $10,000 per day, but if the user requests and/or attempts to deposit an amount greater than that (e.g., a check for $15,000), rather than simply rejecting the deposit, the PS-PLATFORM may notify the user that the amount is greater than there specified deposit limit as shown in FIG. 3D. In some such embodiments, the PS-PLATFORM may allow the user to request that the deposit limit be raised for this transaction 371, in some embodiments for an associated fee, and the PS-PLATFORM may notify a pre-specified bank or financial institution administrator to approve or reject the request.

In some embodiments, the PS-PLATFORM may include user and/or transaction information in the notification to assist the administrator in making the decision, such information including the location of the user requesting the deposit, the bank on which the deposited information is drawn, the amount of time the user has been associated with the institution, prior deposit/banking history, etc. The PS-PLATFORM may additionally or alternatively limit the availability of some or all of the funds of deposit(s) that exceed the pre-specified amount Similarly, the PS-PLATFORM may limit the availability of deposited funds according to similar defaults and/or determinations. For example, if the user is depositing funds from a location (e.g., as determined by GPS metadata associated with a deposit from a mobile device) that is outside the user's normal geographic region (e.g., the user's mailing address and surrounding area), the amount of funds made immediately available may be less than if the user is making the deposit from his or her home. Similarly, the amount of the deposit, the account(s) to which the deposit is applied, user account balance(s), user tenure with the financial institution, and/or other information may be utilized by the PS-PLATFORM in determining the amount(s) and timeline for availability.

In one implementation, the PS-PLATFORM utilizes a risk matrix, with various weighted risk factors corresponding to risk information, to determine account limitations. In another implementation, the PS-PLATFORM may utilize risk information in a risk calculation, in which each piece of risk information is assigned a value and the amount available is determined based on the total risk value of the collected information. For example, a deposit of over $5000 may have a higher risk value than a smaller deposit amount, and, as such, may have more restrictions on availability of the full amount. Similarly, a deposit by a user that had been with a bank for 10 years may be determined to have a lower risk value than a user who had just become a member of the bank. In some implementations, the amounts available and/ or the deposit limits may be determined by the PS-PLATFORM utilizing determined risk scores and thresholds such that a user who is determined to have a very low risk value has very few limitations imposed on his or her account, a user that has a determined risk value that exceeds a first threshold but is less than a second threshold may have moderate restrictions associated with his or her account, and a user that has a determined risk value that exceeds the second threshold may have even more restrictions applied to his or her account. In some embodiments, the PS-PLATFORM may utilize local and/or national regulations in determining and/or applying limitations to accounts and/or deposits.

In one implementation, if the PS-PLATFORM determines the deposit amount has exceeded a maximum one-time remote deposit amount defined by the payee's bank. If yes, the PS-PLATFORM may notify the user via a user interface and provide options for the user to proceed. For example, the user may select to submit a request to raise the deposit limit 371, cancel the remote deposit and exit 372, or to only deposit the maximum available amount for next business day availability and send the deposit information to a closest branch for in-person deposit service 373.

PS-PLATFORM Account Selection

Figure 3E:
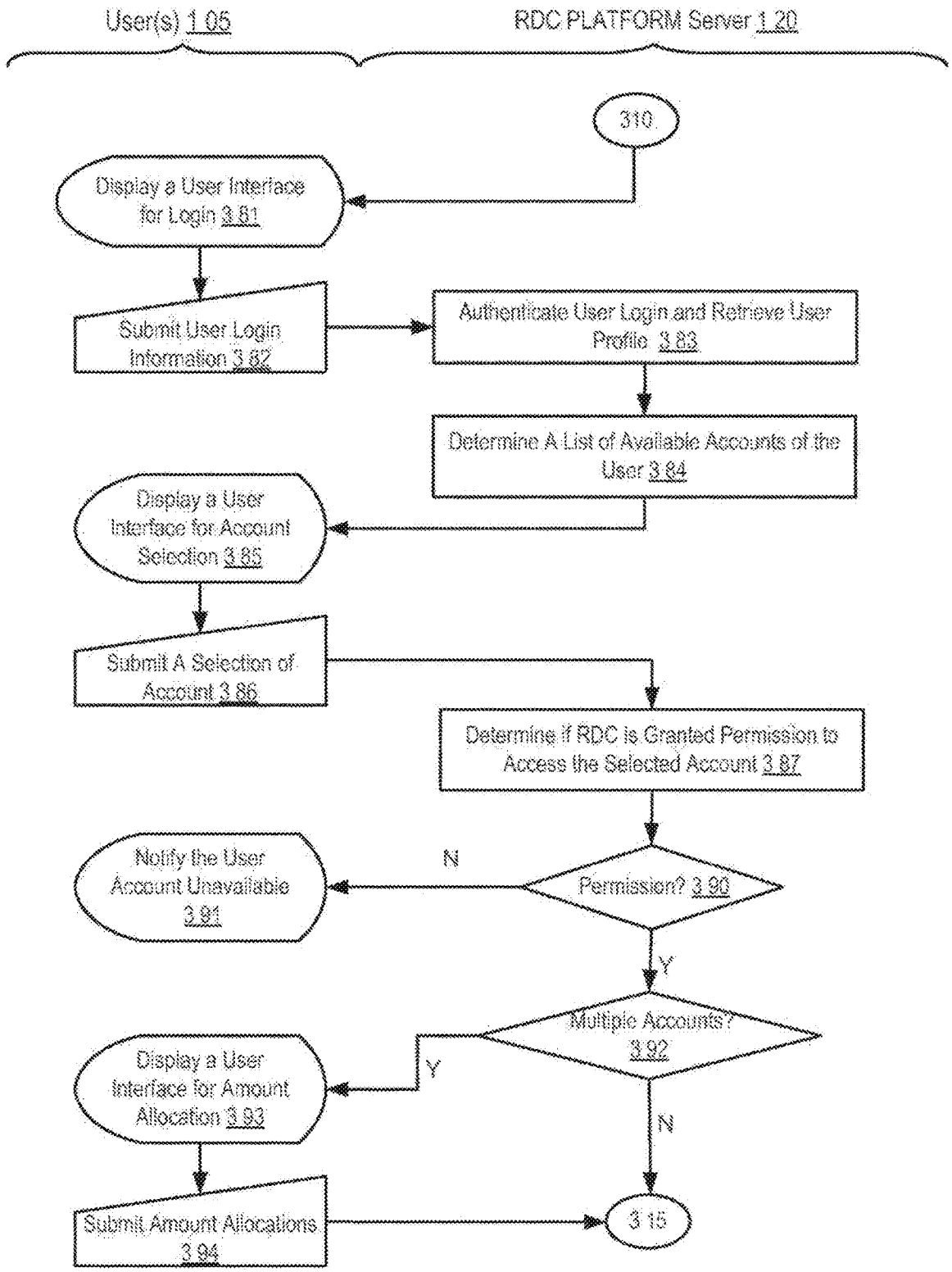
FIG. 3E provides a diagram illustrating aspects of remote deposit of checks in one embodiment of the PS-PLATFORM.

FIG. 3E provides a logic flow diagram illustrating aspects of remote deposit with account selection in one embodiment of the PS-PLATFORM. To reduce the processing necessary to deposit a check remotely into an account other than a primary financial account, such as a checking account, the PS-PLATFORM may provide the depositor the ability to select from a list of accounts an account in which to deposit the check. In one embodiment, upon initializing the PS-PLATFORM component 310, the PS-PLATFORM server may prompt the user to login the PS-PLATFORM system. For example, in one implementation, the PS-PLATFORM may display a user interface for login 381 at the RDC website, and instruct the user to submit user login information 382, such as a username and a password etc. In another implementation, the PS-PLATFORM may directly recognize the user device by its hardware tag, e.g., the mobile device MAC address, and/or the like, if the user has registered the user device with the PS-PLATFORM.

In one embodiment, the PS-PLATFORM server may authenticate the user login, and then retrieve user profile 383. In one implementation, the user profile may record information including the user name, user contact information, user credit history, user account information, and/or the like. In one implementation, to assist the depositor in determining which accounts may be available for deposit, the PS-PLATFORM may determine a list of available accounts associated with the user for deposit 384. For example, the PS-PLATFORM may retrieve a list of user authorized accounts for remote deposits. For another example, if the PS-PLATFORM is affiliated with a payee's bank, the PS-PLATFORM may only retrieve a list of user accounts associated with the payee's bank. For another example, the PS-PLATFORM may determine that, based upon the types of the accounts, checking, savings, and investment accounts, may be available for deposit of the negotiable instrument.

In an alternative implementation, if an indication of deposit amount is available at 384, for example, the user has submitted an amount of deposit to PS-PLATFORM, or the account selection 381-391 take place after the user has submitted a check image and the PS-PLATFORM has processed the check image to obtain deposit data, the PS-PLATFORM may determine a list of available accounts for deposit based on the requirement of each account. For example, the PS-PLATFORM may filter accounts that have a maximum allowable deposit amount lower than the deposit amount. For another example, to assist the depositor in determining which accounts may be available for deposit, a financial institution may display a list of financial accounts to the depositor. In a further implementation, if the PS-PLATFORM is affiliated with a financial institution, the PS-PLATFORM may generate a list of accounts, wherein the PS-PLATFORM is granted access to the account by the account owner even if the account is at a different financial institution. For example, a user may submit a remote deposit request to the PS-PLATFORM server at Bank A but Bank A may provide an option for the user to directly deposit the check into his/her account at Bank B, if Bank A is authorized by the user to access his/her account at Bank B.

In one embodiment, the PS-PLATFORM may display a user interface for account selection 385, e.g., a dropdown list, a click-and-choose list, etc., and the user may submit a selection of account 386. The PS-PLATFORM may then determine whether the PS-PLATFORM is granted permission to access the selected account 387. For example, in one implementation, as discussed above, if the PS-PLATFORM is associated with a first payee's bank, but the selected account is associated with a different payee's bank, then the first bank needs to be granted permission by the account owner to access the account at the different bank in order to proceed with check deposit. For another example, if the PS-PLATFORM is a remote deposit service agency, then the PS-PLATFORM may only access an account at a payee's bank only with authorization of the account owner.

In one embodiment, if the permission is granted 390, the PS-PLATFORM may proceed to determine whether the submitted selection of accounts include more than one account 392; and otherwise, the PS-PLATFORM may notify the user that the selected account is unavailable 391. In one embodiment, if there are multiple accounts selected 392, the PS-PLATFORM may display a user interface for amount allocation 393 the user and request the user submit amount allocations 394 for each selected account. For example, in one implementation, if the user selected to deposit into both a checking account and a savings account, the user may then split the deposit amount and enter the portions of amount associated with each account for deposit processing.

FIG. 3F provides an example of a schematic screen shot illustrating a user interface presenting a list of selectable accounts within one embodiment of PS-PLATFORM. A financial institution may determine that, based upon some criteria as discussed above, checking account, saving account, and investment account, may be available for deposit of the negotiable instrument. A depositor may then select from a list of selection boxes which account to deposit the negotiable instrument. As shown in FIG. 3F, the depositor has selected the checking account and the investment account. Thus, the depositor may be further requested to enter a first amount to be deposited into the checking account and a second amount to be deposited into the investment account, respectively.

Figure 3G:
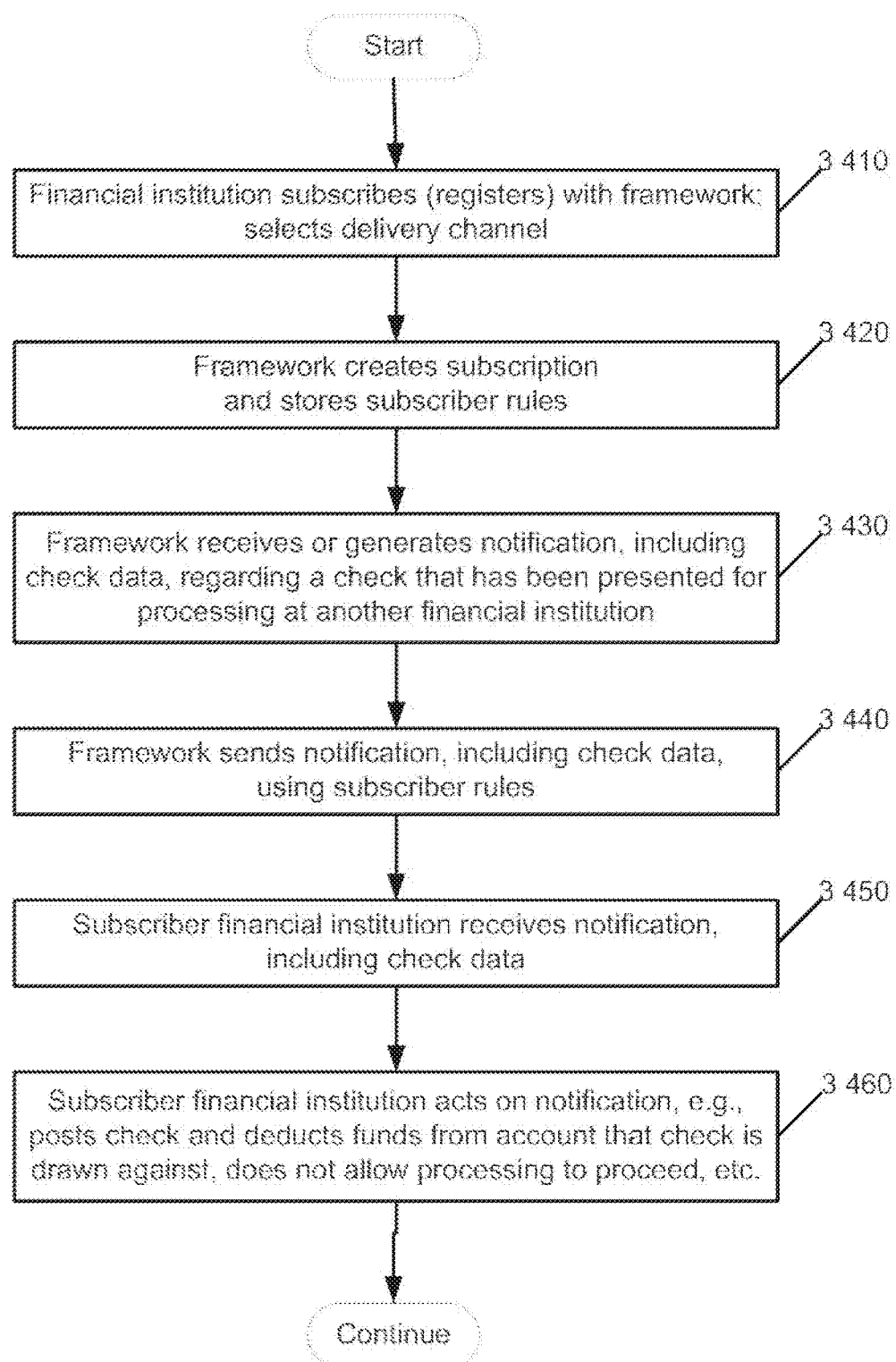
FIG. 3G provides a logic flow of an implementation of the PS-PLATFORM.

FIG. 3G provides a logic flow of an implementation of the PS-PLATFORM that may be used for transmitting check data using publish and subscribe within one embodiment of the PS-PLATFORM. The process illustrated in FIG. 3G may be implemented in a system illustrated in FIGS. 1A-B and 2A-E.

In one embodiment, at 3410, a financial institution, such as the financial institutions 125a-c, may register with the publish and subscribe framework 2320 as a subscriber. The financial institution may provide the framework 2320 with notification preferences, constraints, and/or rules as to the messages and/or data (e.g., notifications, check data, etc.) the financial institution is to receive. For example, a rule may be that a notification is to be provided to the financial institution regarding every check whose data is received by the framework 2320 having a routing number assigned to that financial institution. This may be accomplished using a nine-digit routing number located on the bottom left hand corner of the check. A unique routing number may be assigned to every financial institution in the United States.

In one embodiment, the financial institution may also select one or more delivery channel preferences and/or protocols for receiving the messages and/or data. For example, the financial institution may select that a notification is to be delivered via a delivery channel such as EJB (Enterprise Java Beans), SOAP (Simple Object Access Protocol), or email (SMTP (Simple Mail Transfer Protocol)), for example.

In one embodiment, at 3420, the framework 2320 may create the subscription for the financial institution using the registration engine 2330 and may store the subscriber rules in storage, such as in the publish and subscribe database 2324. Known subscription creation techniques may be used.

In one implementation, at 3430, the framework 2320 may receive and/or generate a notification regarding a check that has been presented for processing at another financial institution. The receive check data module 2322 may receive the check data and the notification generator 2324 may generate the notification. The notification may comprise check data.

At 3440, the framework may send the notification to the subscriber financial institution via the dispatch engine 2350 in accordance with the subscriber rules as checked by the rules engine. Thus, the notification is sent via a subscribed feed. If the check data meets the rules provided by the subscriber financial institution, then the notification may be sent to the subscriber financial institution.

At 3450, the subscriber financial institution receives the notification via the subscribed over the delivery channel feed that the subscriber financial institution had selected during registration. At 3460, the subscriber financial institution may act on the notification. For example, the subscriber financial institution may check its storage to determine if the check has already been processed and funded. In such a case, it may be determined that the check is being represented and the subscriber financial institution may deny payment of the represented check. Additionally or alternatively, the subscriber financial institution may send an instruction to the financial institution that has received the check from a user for processing to discontinue processing the check and not allow the check to be deposited or cashed. As another example, upon receiving the notification, the subscriber financial institution may post the check and deduct the funds from the account that the check is drawn against.

FIG. 3H provides logic flow of another implementation of the PS-PLATFORM that may be used for transmitting check data using publish and subscribe within embodiments of the PS-PLATFORM. The process illustrated in FIG. 3H may be implemented in a system such as FIG. 2E. In one embodiment, a user (e.g., an account owner, payee, etc.) may receive a check from a payor. In an embodiment, the check includes a MICR line that encodes the check number, the payor's bank, and the account at the bank upon which the check is drafted. The payor determines the amount of the check and the payee, enters both on the check, may add additional information (such as what the payment was for), signs the check, and delivers it to the payee. The user may endorse the check by signing the back of the check in the designated field. If the user wishes to deposit the check into an account, such as a savings and/or checking account, they also may write an account number below the signature.

In one embodiment, after the user endorses the check, they may present the check to a financial institution (e.g., the payee's bank) for deposit using any known technique, such as remote deposit, via an ATM, or presenting the check to a teller at the financial institution, for example. The financial institution bank receives the check (or an image of the check) at 3510.

In an implementation, with respect to remote deposit, a request for access may be received from the user who wishes to deposit a check remotely. The user may request access to a deposit system operated by a financial institution as described above by way of a computing device, such as a PC or a mobile device, such a cellular phone, a PDA, a handheld computing device, etc., operated by the user. The access may be through some sort of user login, in some examples.

In one implementation, the user may transmit an image file of the check to a financial institution that may be associated with an account for depositing funds, where it is received. For example, the user may send the image file of the check to the financial institution by attaching the image file to an email. Alternatively, the image file may be sent using various means, including, but not limited to, an Internet connection via a website of the financial institution or a wireless cellular transmission. In an implementation, the image file may be sent to the financial institution via streaming. The user may send the image file and any secondary data to the financial institution, using any technique, along with a request to deposit the check into a particular user account.

At 3520, the financial institution obtains check data from the check, e.g., by processing one or more images of the check with a computing device (e.g., the image processor 2222) or by a representative of the financial institution obtaining data from the check. In an implementation, the financial institution may open an image file of the check 118 and parse financial information from the image file to obtain the check data such as the check data of the check 118. The image file may be processed using any known technology to retrieve the check data.

In an implementation, the financial institution may capture the check information by a scan to create an image of the front and back of the check and may process the image to obtain information such as the payee name, bank, payee's account number, the amount of the check, and the MICR data. The obtained check data may be stored in storage of the financial institution, in an implementation.

In one embodiment, the image may be cleaned by the institution system using cleaning operations described herein (e.g., deskewed, dewarped, cropped, etc.). In an implementation, the image of the check on a background may be processed using techniques to remove warping or dewarp the image, to crop the image, to deskew the image (e.g., rotate the image to horizontal), to identify the corners, etc. Any similar image processing technology may be used, such as edge detection, filtering to remove imagery except the check image or check data in the received digital image file, image sharpening, and technologies to distinguish between the front and the back sides of the check. The financial institution may identify and/or remove at least a portion of data that is extraneous to the check, such as background data.

In one implementation, cleaning operations may be augmented by detecting operations, e.g., after the cleaning operations are performed, that obtain data from the image. In an implementation, the detection operations may include any of the following: optically read the MICR line, courtesy amount recognition (CAR), legal amount recognition (LAR), signature block, and payee. Such operations obtain data pertaining to the check, for example.

In an implementation, a data file comprising some or all of the data obtained may be generated by the institution system. Any data file format may be used. The data pertains to the check being processed for deposit or cashing, for example, and may also comprise secondary information which may be information relating to the check, such as an account number, a deposit amount, or a routing number associated with the check, and/or relating to the account for depositing funds, such as the account number and/or the name on the account. In an implementation, the signature from the check may be copied and stored as an image in the data file. In such an implementation, the information from the check other than the signature may be recreated by the institution system (e.g., machine-recreated) and stored in the data file, whereas the signature may be copied, but not machine-recreated, and also stored in the data file. The data file may be stored in storage, such as a database, associated with the institution system.

At 3530, the financial institution may send the check data (e.g., as a data file) to a framework, such as the publish and subscribe framework 2320, via a communications network. The data file may be transmitted to the framework 2320 using various means, including, but not limited to, an Internet connection (e.g., via a website) or a cellular transmission. The framework 320 may receive the check data and, at 3540, may compare the check data with the subscriber rules that have been previously stored in storage, such as the publish and subscribe database 2324.

At 3550, the framework 2320 may send the check data to subscriber financial institutions that meet the subscriber rules. In an implementation, a subset of the check data may be sent and/or a notification may be generated and provided to the subscriber financial institutions that meet the subscriber rules. The framework 2320 may generate and transmit an advisory to one or more financial institutions regarding the check whose data is represented in the data file. The advisory may contain information pertaining to the check, such as a bank identifier, the account number, and the check number, for example. The receiving financial institution(s) may use the information in the advisory to flag or otherwise cancel the check 118 so that the check 308 may not be fraudulently or mistakenly represented. At 3560, the framework 2320 may store the check data in storage of the framework, such as in the publish and subscribe database 2324 or other storage.

PS-PLATFORM Image Submission

Figure 4A:
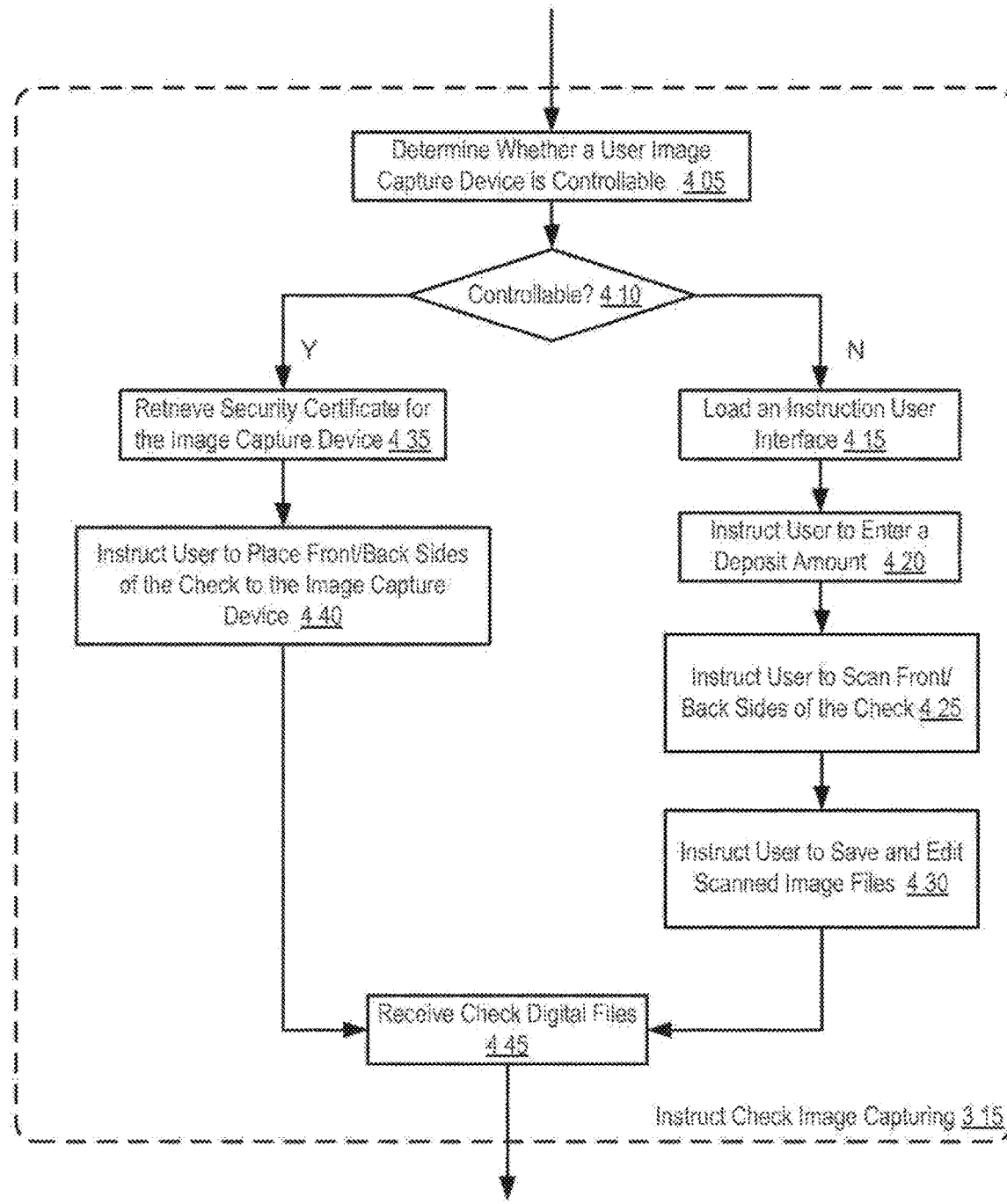
FIG. 4A provides a diagram illustrating aspects of instructing check image capturing and uploading in one embodiment of the PS-PLATFORM.
Figure 4B:
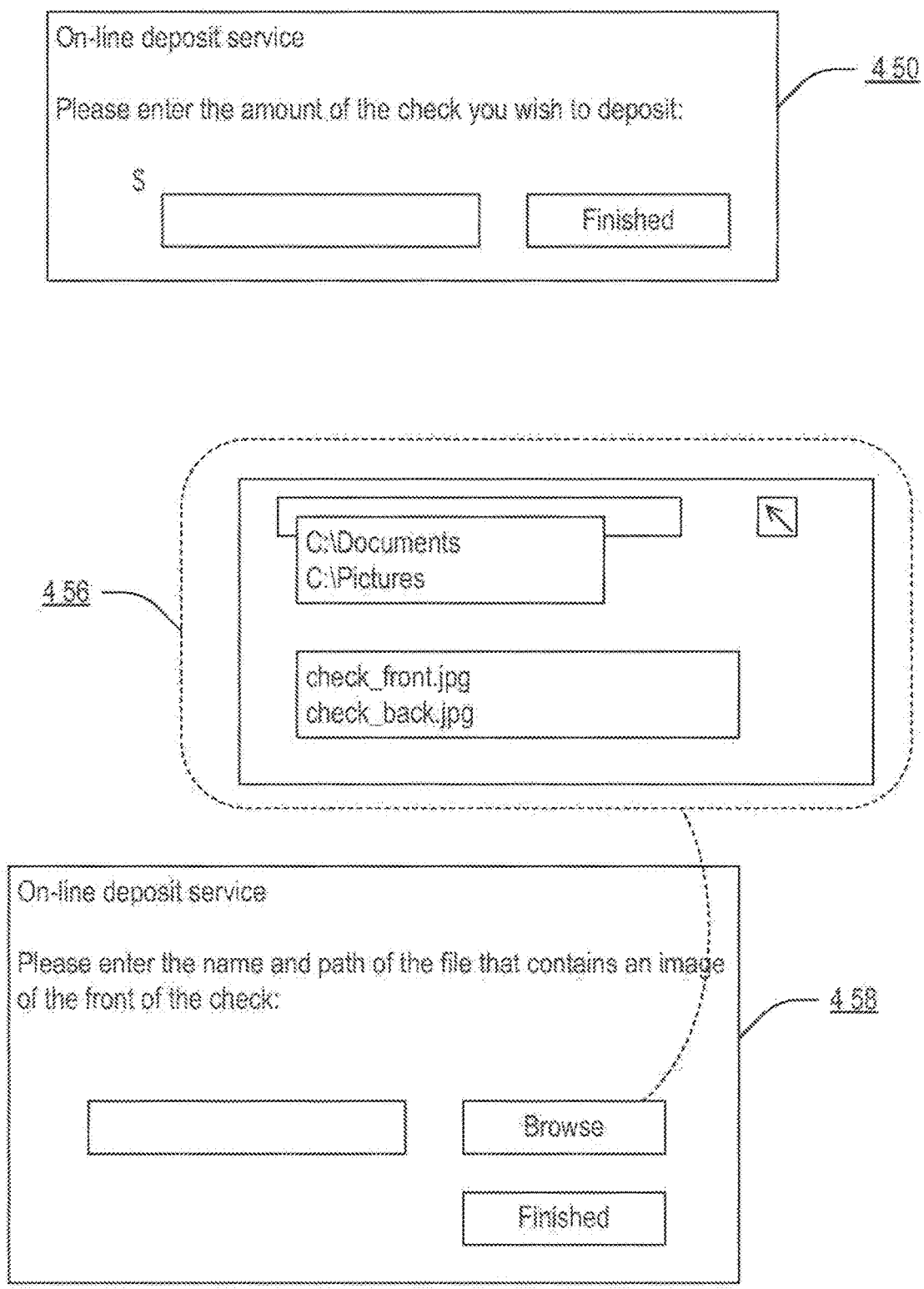
FIG. 4B provides a diagram illustrating aspects of instructing check image capturing and uploading in one embodiment of the PS-PLATFORM.

FIG. 4A provides a logic flow diagram illustrating aspects of instructing check image capturing and uploading in one embodiment of the PS-PLATFORM. In one embodiment, upon receiving a remote deposit request from a user, the PS-PLATFORM may determine whether a user image capture device is controllable 405. In one implementation, the PS-PLATFORM server may remotely control a scanner connected to a home computer, a built-in camera of a mobile device, an ATM/kiosk machine, and/or the like. For example, in one implementation, if a user visits a PS-PLATFORM website via a home computer, a mobile device and/or the like, an embedded browser component running on the website, such as JAVA applets, Flash scripts, etc., may determine whether the PS-PLATFORM server can control a user image device via the user terminal device. For another example, in one implementation, the PS-PLATFORM server may establish a secure communications channel with a user mobile device, and directly control the built-in camera of the mobile device via hardware interfaces. For another example, in one implementation, the PS-PLATFORM server may directly control an ATM/kiosk machine via a specialized deposit communications channel.

In one embodiment, for different devices (e.g., scanners, digital camera, mobile devices, etc.), certain permissions may be used in order to allow the browser component to remotely control the image capture device. For example, in one implementation, a user image device may require certificate authentication to allow secure remote control from the PS-PLATFORM server. Such certificates may be digital signatures interfacing an image capture device driver, a Secure Socket Layer (SSL) encrypted certificate, and/or the like.

In one embodiment, if the image capture device is a scanner, the drivers of the scanner may be different for different operating environments—e.g., the same scanner may use a different driver depending on whether it is being operated from an environment based on one of the WINDOWS operating systems, an environment based on one of the operating systems used in APPLE computers, an environment based on aversion of the LINUX operating system, etc. For example, a Canon imageFORMULA DR-7580 Production Scanner requires a DR-7580 ISIS/Twain Driver version 1.7 for Windows 2000 SP4, XP 32 bit SP3, XP 64 bit SP3, Vista 32 bit SP2, Vista 64 bit SP2, Windows 7 32 bit and Windows 7 64 bit, and Canon LiDE 50 drivers for Mac OS X. In that case, each driver may use different certificates, and different environments may use various different environment-specific technologies to allow the scanner to be controlled from a remote web server. In such cases, the PS-PLATFORM may obtain a large number of certificates, and may interface with a large number of different technologies, to support a large number of scanner-environment combinations and/or other image capture device environment, in order to allow its software to control scanners for a variety of customers.

As such, in one embodiment, if the user image capture device is remotely controllable by the PS-PLATFORM server via 410, the PS-PLATFORM may retrieve security certificate for the corresponding image capture device 435, and control the image capture device to obtain the check images. For example, in one implementation, the browser component, which may be a security JavaScript running on the web browser application, may create a device digital certificate to enable HTTPS on the image capture device. In one implementation, the JavaScript may download a certificate from the remote PS-PLATFORM if available to interface with the driver of the image capture device, and create a public key for the certificate to be used in SSL encryption to establish an encrypted channel between the PS-PLATFORM server and the image capture device.

In one implementation, the PS-PLATFORM may instruct a user to place the front/back sides of the check in front of the image capture device to create images of the check 440. For example, in one implementation, if a scanner connected to a computer is used, the browser component running on a home computer connected to a scanner may control the home scanner to start upon user request and automatically collect the images in an appropriate format and resolution, and can then upload the image for deposit. In such cases, the user may place the physical check in the scanner bed and to click "start" on the browser interface. In one implementation, the browser component may instruct the user to flip the physical check and repeat the process for both sides of the check via a web page interface, in order to obtain images of the front and the back.

For another example, in one implementation, a mobile device, such as an Apple iPhone may initiate a pre-installed program, or download and install a software package instantly from the PS-PLATFORM server, which may facilitate the PS-PLATFORM controlling the mobile device (e.g., the iPhone) to obtain and upload check images. In such cases, a user may position the mobile device and take pictures or videos of both sides of the check, as illustrated in FIG. 11A-H. In a further implementation, if the mobile device is an Apple iPhone, the PS-PLATFORM may further instruct the user to configure the system settings of the built-in camera to obtain images in compliance with quality standards, such as grayscale requirement, resolution requirement, image file size requirement, and/or the like.

For another example, in one implementation, for kiosk/ATM deposit, a user may be instructed from the screen of a kiosk/ATM machine to place or insert the check into a check deposit slip for scanning, and/or the like.

In one implementation, the PS-PLATFORM may also instruct the user to enter an amount of the check to be deposited. For example, in one implementation, the user may enter a deposit amount on a PS-PLATFORM website, on a kiosk/ATM machine, or send an amount number to the PS-PLATFORM server from a mobile device, and/or the like.

In an alternative implementation, the PS-PLATFORM may implement an "atomic deposit" without requesting the user to input deposit information in addition to the check image submission. In this case, the user device (e.g., the mobile device, the home scanner, etc.) may be decoupled from the transaction once the submission of the digital image file for deposit of the check is made. The transaction is thereafter managed by the PS-PLATFORM server. In this manner, incomplete transactions are avoided by moving the transaction processing to the PS-PLATFORM server side at a financial institution (e.g., payee's bank, etc.) after the user submits the digital image file. Any loss or severing of a communications connection between the user computing device and the PS-PLATFORM server, such as due to browser navigation away from the PS-PLATFORM web page, communication failures, user logouts, etc., on the user side, will not affect the processing and the deposit of the check in the digital image file. Thus, the transaction will not be left in an orphaned state.

Figure 4C:
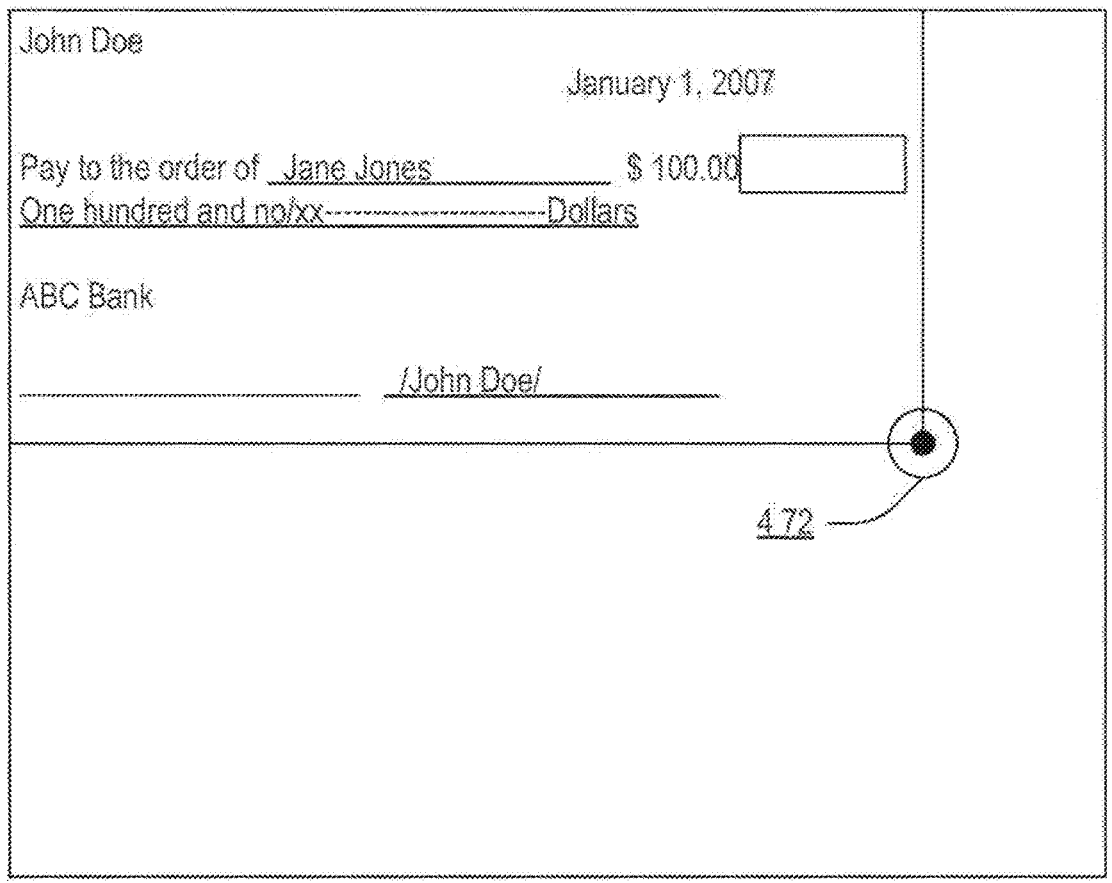
FIG. 4C provides a diagram illustrating aspects of instructing check image capturing and uploading in one embodiment of the PS-PLATFORM.
Figure 4D:
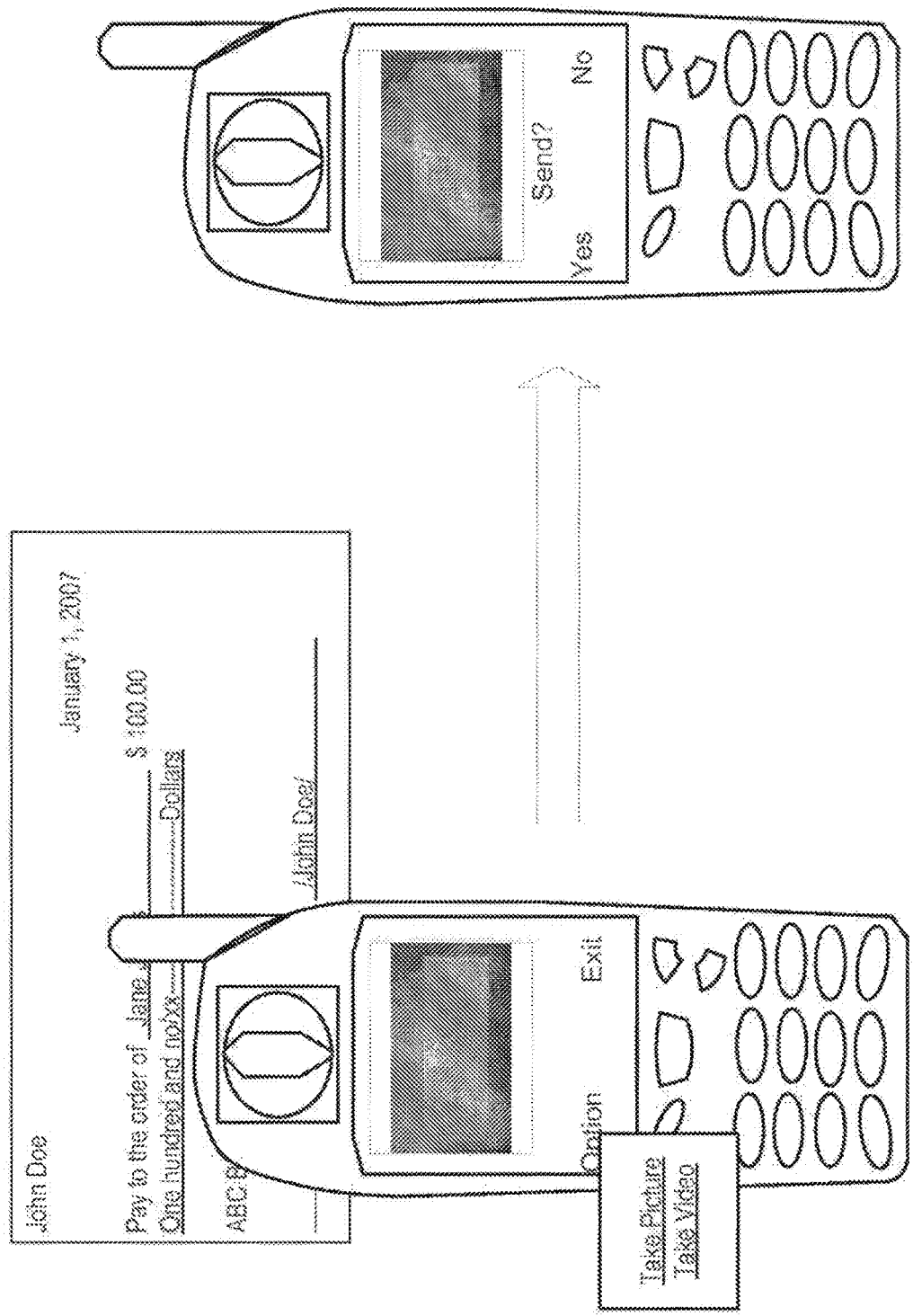
FIG. 4D provides a diagram illustrating aspects of instructing check image capturing and uploading in one embodiment of the PS-PLATFORM.

In another embodiment, if the image capture device is not controllable by the browser application component, the PS-PLATFORM may load an instruction user interface page 415, and instruct the user manually upload the check images. For example, in one implementation, the PS-PLATFORM server may not have certificates for scanner drivers for a Macintosh computer. In one implementation, the PS-PLATFORM may instruct the user to enter a deposit amount 420 (as illustrated in a schematic user interface 450 shown in FIG. 4B), and to scan front/back side of the check and save the scanned image files 425. In one implementation, the PS-PLATFORM may instruct the user to save the scanned image files in a specified format (e.g., tiff, JPEG etc.) 430, as illustrated in the schematic user interface 456 and 458 of FIG. 4B. In one implementation, the PS-PLATFORM may instruct the user to edit the check image file prior to uploading 430. For example, in one implementation, as shown in FIG. 4C, the PS-PLATFORM may instruct the user to crop the check image via an image editing component, during which the user may submit a selection of check image corner 472 via a user interface. In a further implementation, the PS-PLATFORM may instruct the user to convert the obtained check image into a grayscale image prior to uploading the image file. In one implementation, the user may send the obtained check images to PS-PLATFORM server via email, mobile MMS, PS-PLATFORM browser uploading, and/or the like (as shown in FIG. 4D).

In one embodiment, the PS-PLATFORM may receive check digital files 445 from the remote user device. In one implementation, the user may send the obtained check images to PS-PLATFORM server via email, mobile MMS, PS-PLATFORM browser uploading, and/or the like. In one embodiment, if the user image capture device is video-enabled, the PS-PLATFORM may receive video clips of the check. In one implementation, video files may be saved in a series of compliant formats (e.g., AVI, MPEG4, RM, DIVX, etc.) and submitted to the PS-PLATFORM server in similar manners with those of submitting check image files as discussed above. In one implementation, the PS-PLATFORM may instruct or assist the user to compress one or more video files into a package (e.g., WinZip package, etc.) and submit the pack to the PS-PLATFORM.

In another implementation, live video streaming of a check may be captured and transmitted to the PS-PLATFORM server. For example, a user may request to establish a real-time video streaming link with the PS-PLATFORM server when submitting the remote deposit request. In such cases, the user device and the PS-PLATFORM server may employ streaming video streaming software packages such as Apple Quicktime Streaming Servers, Marcromedia Communication Server, and/or the like. In one implementation, the user may create a video in a common streaming media format such as MPEG4, 3GPP and/or the like, and upload an encrypted HTTP streaming video on the PS-PLATFORM web server. For example, in one implementation, a user may employ an Apple iPhone may establish HTTP live streaming to the PS-PLATFORM server via Quicktime Software systems.

PS-PLATFORM Check Image Enhancement

Figure 5:
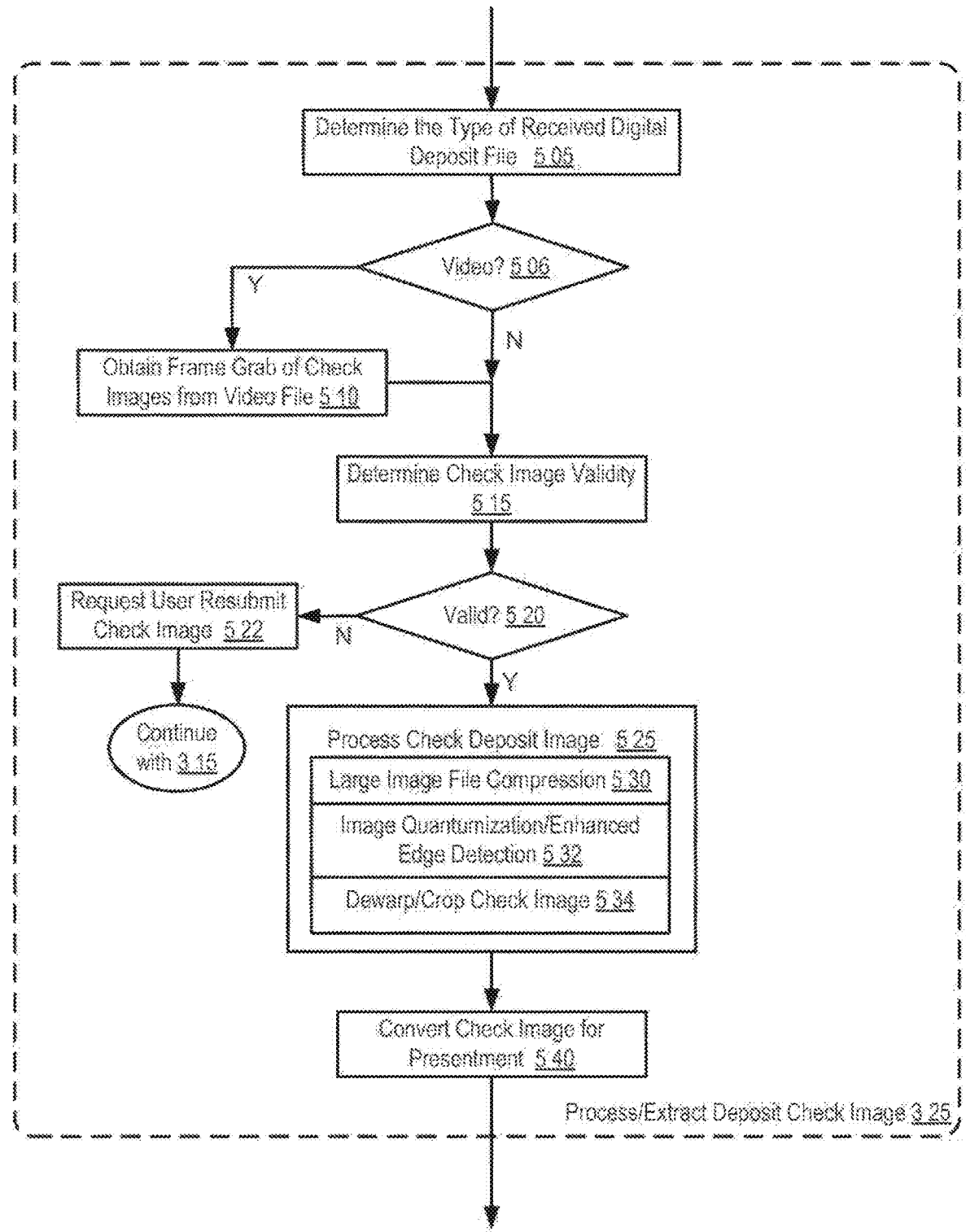
FIG. 5 is of a logic flow diagram illustrating aspects of processing and extracting deposit check images in one embodiment of the PS-PLATFORM.

FIG. 5 is of a logic flow diagram illustrating aspects of processing and extracting deposit check images in one embodiment of the PS-PLATFORM. In one embodiment, the PS-PLATFORM may determine a type of the received digital deposit file 505, e.g., whether it is streaming video, a video file, or an image file. For example, in one implementation, the PS-PLATFORM may rely on the file extension of the received digital file to determine its type, i.e., ".wmy," ". avi," ".rm", "0.3GPP" are video files, and ".jpg," ".tiff", ".bmp" are image files.

In one embodiment, if a video file is received or live video streaming is detected 506, the PS-PLATFORM may generate still check images from the video streaming 510. For example, in one implementation, the PS-PLATFORM may utilize video screen capture software packages to generate screen frame grabs and save the grabbed image files. In one implementation, software such as Apple QuickTime, WM Capture, CamStudio, and/or the like, may be employed to obtain frame grabs of the check video streaming.

In one embodiment, if the received digital deposit file is an image file, or at least one check image file has been grabbed from the received video clip, the PS-PLATFORM may determine whether the check image is valid 515. In one implementation, the PS-PLATFORM may determine the usability and quality of the check image. For example, in one implementation, the PS-PLATFORM may check whether the check image is in compliance with the image format requirement, the resolution requirement (e.g., at least 200 dpi), and/or the like.

In a further implementation, the PS-PLATFORM may perform an Optical Character Recognition (OCR) procedure on the generated check image to determine whether the characters on the check image is legible, and/or whether an endorsement is contained on the back side image of the check. Depending upon the standards imposed by the Check 21 Act and the payee's bank's own internal image standards, the verification of the digital image may vary. For example, the Check 21 Act may require that the image be of a certain image quality. Although there are several ways in which image quality may be determined, one manner in which it may be done is to perform an OCR operation on the check to determine if at least a portion of the information in the image is determinable. The bank may first attempt to extract and recognize characters within the digital image. Any extracted characters may then be compared to previously known information or information submitted by the account owner in the deposit request. For example, the bank may attempt to find and OCR the MICR line at the bottom of the digital image. If the MICR line is unreadable or the characters identified do not correspond to known and verifiable information, the bank may reject the image.

In one implementation, if the check image fails to meet the system requirements 520, the PS-PLATFORM may send a request to the user for resubmission of a check image 522. In another implementation, if the check image is determined to be valid 520, the PS-PLATFORM may proceed to process the check deposit image 525, including large image file compression 530, image quantumization and enhanced edge/corner detection 532, and dewarping/cropping the check image 534 for presentment, as will be further illustrated in FIGS. 6B-F. For example, in one implementation, the PS-PLATFORM may compress the image file in order to save storage space (e.g., 2 megabits per image).

In one embodiment, the PS-PLATFORM may convert the processed check image for presentment and deposit 540. For example, in one implementation, the PS-PLATFORM may save the check image in compliance with the requirements of the payee's bank for substitute checks, such as a Check 21 X9.37 cash letter file, and/or the like.

Figure 6A:
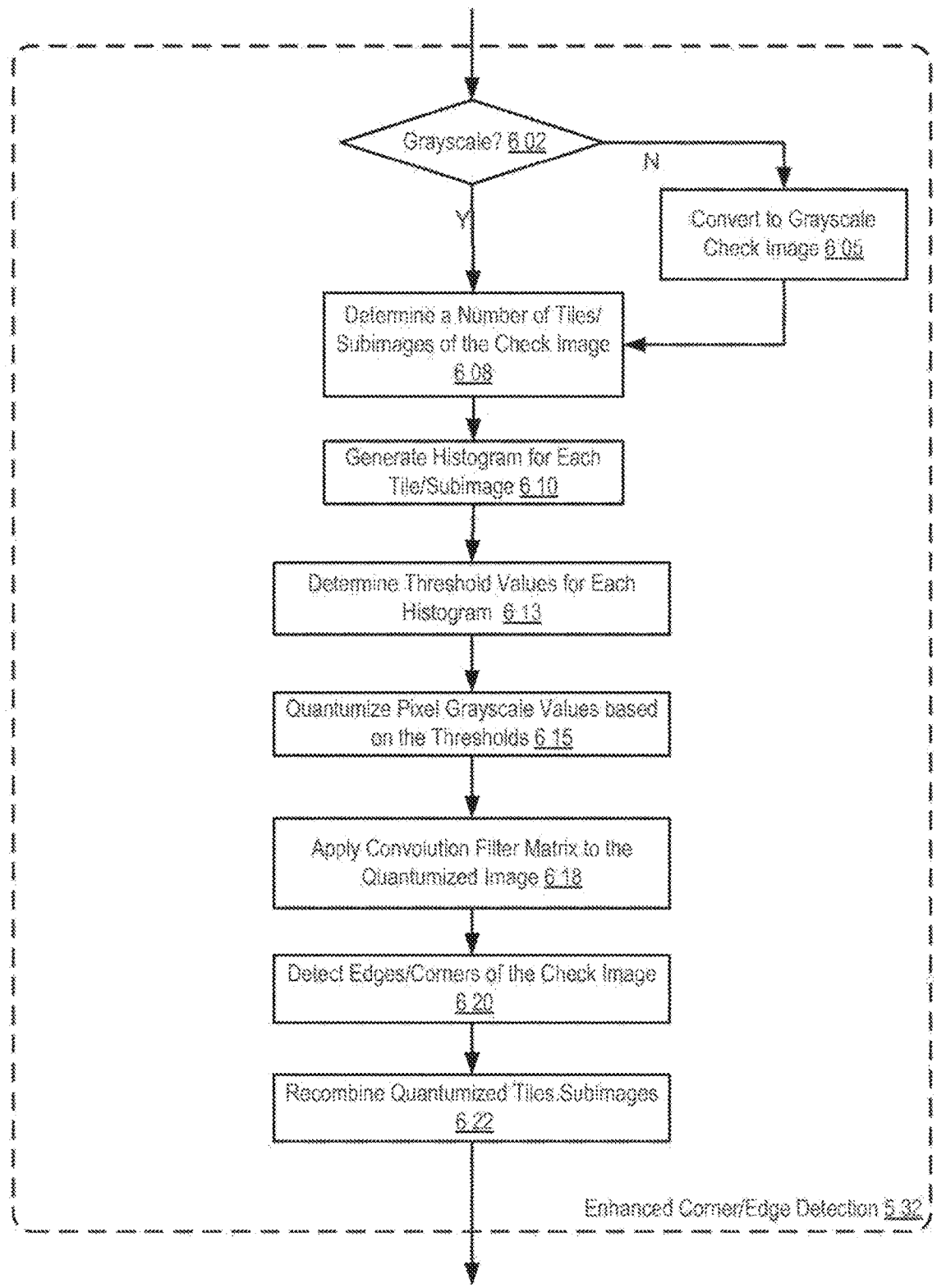
FIG. 6A provides a logic flow diagram illustrating aspects of an enhanced corner/edge detection using image quantumization in one embodiment of the PS-PLATFORM.

FIG. 6A provides a logic flow diagram illustrating aspects of an enhanced corner/edge detection using image quantumization 532 in one embodiment of the PS-PLATFORM. As shown in FIG. 6A, the PS-PLATFORM may determine whether the check image is a grayscale image 602. If not, the PS-PLATFORM may convert the color image into a grayscale check image 605. For example, in one implementation, the PS-PLATFORM may turn the luminance value of every pixel of the color check image into a grayscale pixel luminance value, and a C# implementation may take a form similar to:

```
public Bitmap ConvertToGrayscale(Bitmap source)
{
    Bitmap bm=new Bitmap(source.Width,source.Height);
    for(int y=0;y<bm.Height;y++)
    {
        for(int x=0;x<bm.Width;x++)
        {
            Color c=source.GetPixel(x,y);
            int luma=(int)(c.R*0.3+c.G*0.59+c.B*0.11);
            bm.SetPixel(x,y,Color.FromArgb(luma,luma,
                luma));
```

}
}
    return bm;
}

In one embodiment, the PS-PLATFORM may determine and divide the check image into a number of tiles/sub-images 608. For example, a sub-image may be parsed from the original check image at pixel (100,350) with a width of 100 pixels and height of 50 pixels. In one implementation, the number of tiles/subimages may be pre-determined by a system operator as a constant. In another implementation, the number may be determined by a formula in proportion to the size of the image. In one embodiment, for each tile/sub-image, a histogram may be generated 610. FIG. 6C shows an example histogram chart, wherein the X axis denotes the gray value and the Y axis 505 denotes the number of counts of gray.

In one embodiment, grayscale threshold values for each histogram may be determined 613, using a variety of algorithm such as, but not limited to statistical analysis (as will be further illustrated in FIG. 6D), minimum fuzziness algorithm (as will be further illustrated in FIG. 6E), Otsu algorithm, and/or the like. In one embodiment, grayscale threshold values may be determined by image binarization are then determined (309) (405) using statistical analysis of the histogram 501. In one embodiment, the grayscale check image may be quantumized 615 based the determined threshold values for each tile/sub-image. For example, in one implementation, the background of the check in a relatively dark color may be converted to black. For another example, the grayscale check image may be binarized into black and white only, i.e., if the gray value of a pixel is greater than the determined threshold value, it is determined as "white"; otherwise it is determined as "black".

In one embodiment, the PS-PLATFORM may apply a convolution filter matrix to the quantumized image 618. The convolution filter matrix may be designed to sharpen and enhance edges of the quantumized check image. For example, in one implementation, the PS-PLATFORM may employ a Java Advanced Image (JAI) package for one implementation of applying a sample edge-enhancing convolution filter matrix, which may take a form similar to:

float data [ ]={0f, 0f, 0f, −1f, −1f, −1f, 0f, 0f, 0f, 0f, −1f,
    −1f, −3f, −3f, −1f, −1f, 0f, 0f, −1f, −3f, −3f, −1f, −3f,
    −3f, −1f, 0f, −1f, −3f, −3f, −6f, 20f, −6f, −3f, −3f, −1f,
    −1f, −3f, −1f, 40f, 20f, 40f, −1f, −3f, −1f, −1f, −3f, −3f,
    −6f, 20f, −6f, −3f, −3f, −1f, −f, −1f, −3f, −3f, −1f, −3f,
    −3f, −1f, 0f, 0f, −1f, −1f, −3f, −3f, −3f, −1f, −1f, 0f, 0f,
    0f, 0f, −1f, −1f, −1f, 0f, 0f, 0f},
  KernelJAI kernel=new KernelJAI (new Kernel (9, 9, data));
  PlamarImage temp=JAI.create("convolve", img, kernel);

In one embodiment, the PS-PLATFORM may detect edges/corners of the check image 620 (as will be further illustrated in FIG. 6F) based on the enhanced image, and recombine the quantumized and enhanced tiles/subimages into a single check image 622.

Figure 6B:
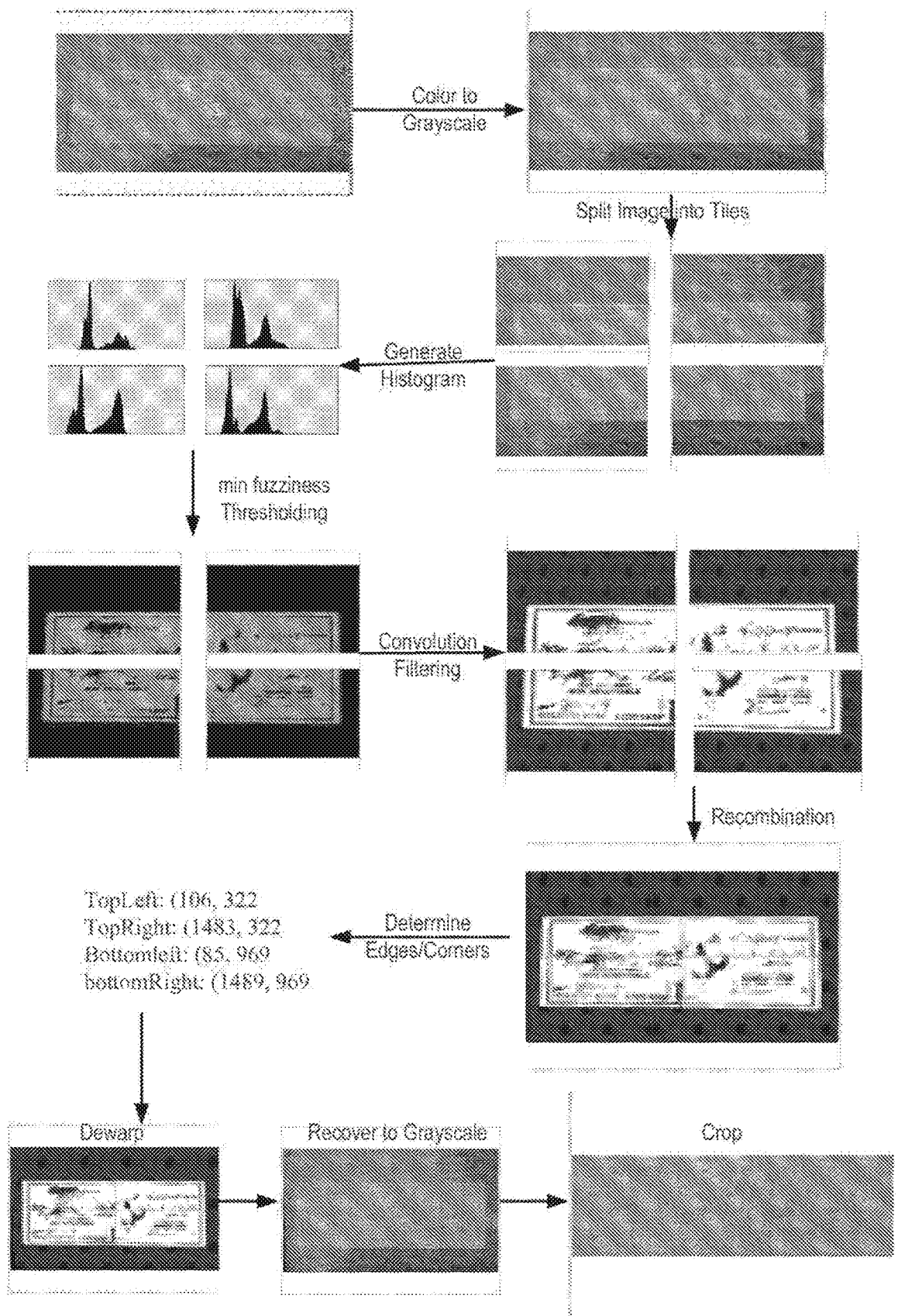
FIG. 6B provides an example illustrating aspects of an enhanced corner/edge detection using image quantumization in one embodiment of the PS-PLATFORM.
Figure 6C:
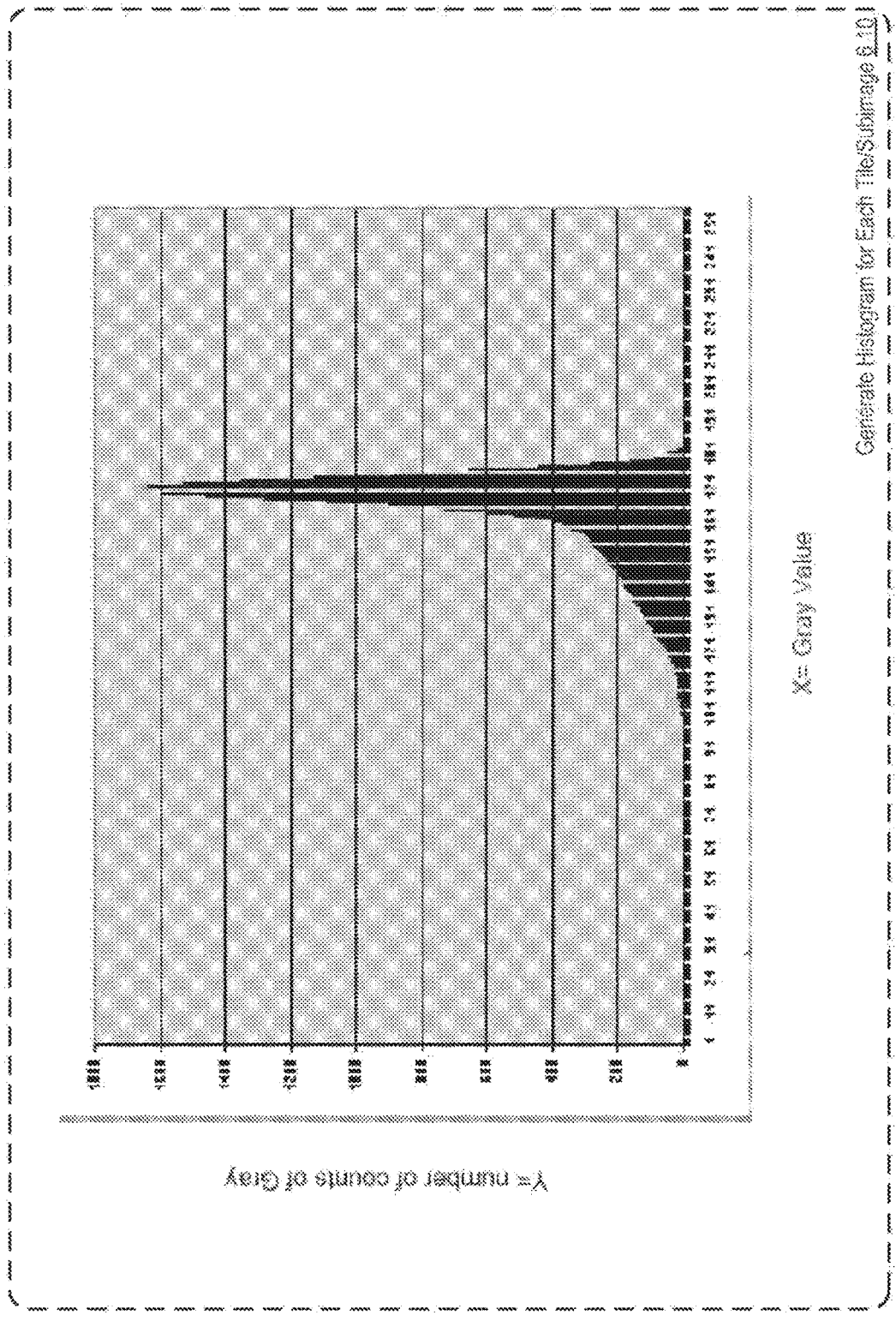
FIG. 6C provides an example illustrating aspects of an enhanced corner/edge detection using image quantumization in one embodiment of the PS-PLATFORM.

FIG. 6B provides an example of check image processing illustrating changes in the check image during the process of FIG. 6A in one embodiment of the PS-PLATFORM.

Figure 6D:
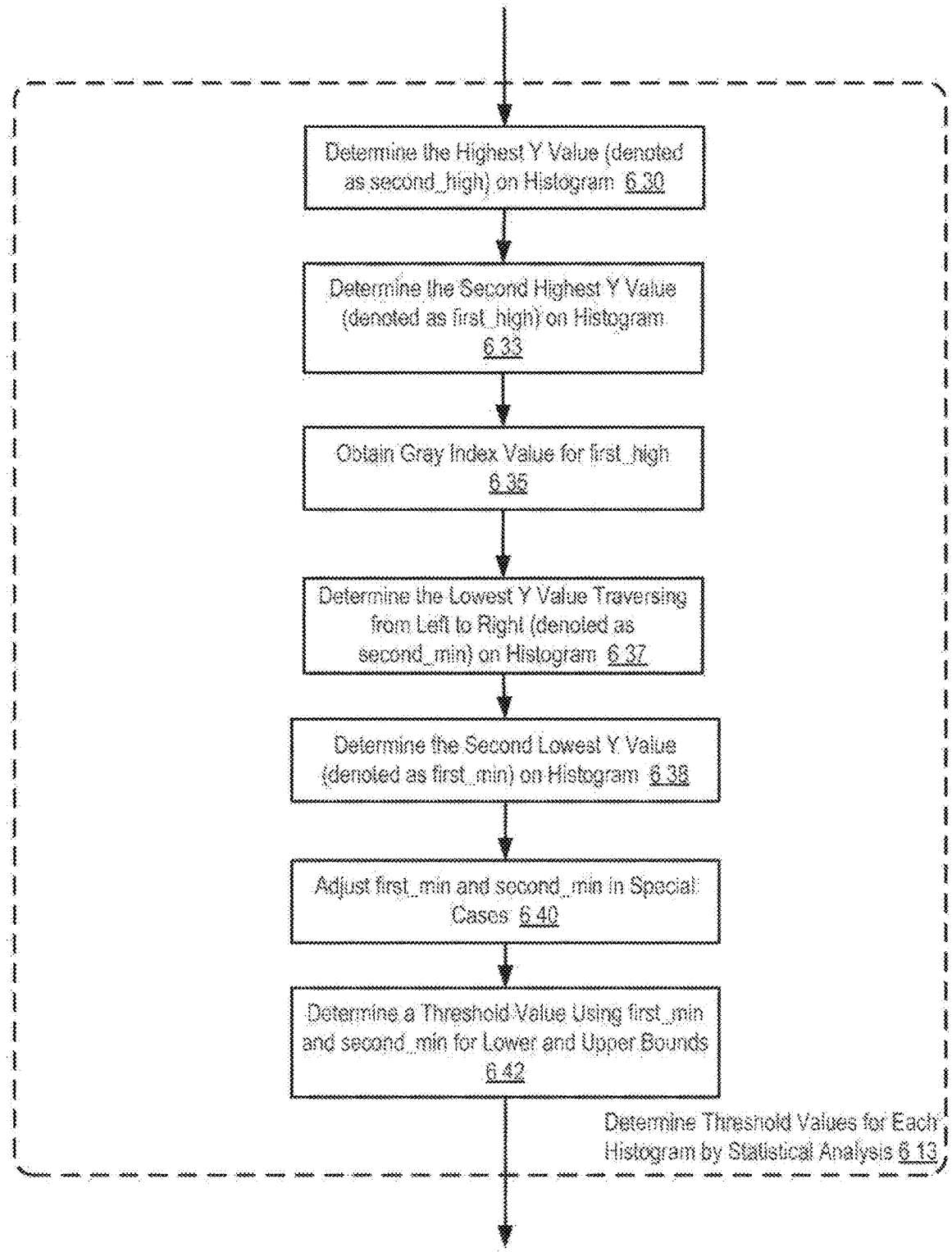
FIG. 6D provides a logic flow diagram illustrating aspects of an enhanced corner/edge detection using image quantumization in one embodiment of the PS-PLATFORM.

FIG. 6D provides a logic flow diagram illustrating aspects of determining threshold values for the example histogram shown in FIG. 6B by statistical analysis in one implementation of the PS-PLATFORM. In one embodiment, the point having the highest Y value (counts of gray) on the histogram may be located 630. This point may be denoted as "second_high" for the example histogram shown in FIG. 6B since there are two peaks of Y values. Then the point on the histogram having the second highest Y value is located, denoted as "first_high" 633. The indexed gray value is also tracked for these Y values "first_high" and "second_high".

In one implementation, "first_high" may be located by going from left to right on the histogram and comparing the number of counts (Y) of each indexed value (X) to the previous value until the reaching a right X limit. This may be started with a maximum value number of gray level counts being the gray level count Y at point [o] [o] of the histogram. The right X limit going from left to right is set to a mode value unless the "second_high" X value is less than the mode value. In that case, the right traversing limit becomes "second_high". The "first_high" gray index X value is then obtained 635. For discrete distributions, in one implementation, the mode is the value with the greatest frequency and for continuous distributions, it is the point where the probability density is at a maximum. It is possible for a distribution to have two or more modes.

In one embodiment, the lowest Y value traversing from left to right on the histogram may be located, denoted as "first_min" 637. Also, the lowest Y value traversing from right to left on the histogram may be located, denoted as "second_min" 638. In one implementation, the procedures for locating "first_min" and "second_min" may be similar with that of finding "first_high" and "second_high" on the histogram within the interval bounded by "first_high" and the mode value. The resulting point found is denoted as "first_min". In one implementation, "first_min" may be set to o by default. If nothing is found, the index gray value is at point [o] [o] or the gray value count for gray value zero(black). In one implementation, the PS-PLATFORM may then locate "second_min" by traversing from right to left on the histogram within the interval bounded by "first_min" and "second_high." The resulting minimum value located is denoted as "second_min."

In one embodiment, "first_min" and "second_min" may be adjusted 640 in special cases. In one implementation, if "first_min" and "second_min" are the same, then the PS-PLATFORM may check whether "second_min" is greater than a boundary value "B1", wherein boundary values "B1" and "B2" are defined such that B1 is the upper bound of gray value encompassing significant magnitudes of order in gray value counts and B2 is the lower bound of the gray value on the histogram such that magnitudes of order in gray value counts converge to sufficiently small count value or zero from the histogram. For example, in one implementation, the image boundaries may be 0 and 255 if there exists a full gray value usage for a given image. In one implementation, if the "second_min" is greater than "B1," then "second_min" is reset to be the resulting value of "second_min" minus the standard deviation times a scaling factor "k", e.g., a suggested scaling factor in such cases is k=0.3. In that case, the adjusted "second_min" would be (second_min−(standard deviation*0.3)), the "first_min" may then be set to B1.

In another implementation, if the determined "first_min" as of 638 is greater than zero but the determined "second_min" as of 637 returns empty or by default is 0, then the "second_min" may be reset to be "first_min" subtracted by the standard deviation multiplied by a scaling constant k. In this case, a suggested scaling constant is k=1.

For example, in one implementation, a Java implementation of the algorithm of locating "first_min", "second_min" on a given histogram by statistical analysis 630-640, may take a form similar to:

```
...
private static int[ ] findHistExtremalows(Histogram histogram,
int numberBins)
{
    int histoBins=histogram.getBins( );
    int max=0;
    int low=0;
    int i=0;
    int flag=0;
    int[ ] highs= new int[2];
    int[ ] lows=new int[2];
    int numb=histoBins[0][i];
    int holder;
    int q=0;
    int first_min =
    0;
    low=numb;
    int j=−1;
       do{
            numb=histoBins[0][i+1];
            if(numb>histoBins[0][i]&&numb>max)
            {
                  max=numb;
                  j=i;
                  j++;
            }
            //q=i;
            while(numb==histoBins[0][i]&&numb==
            max&&(i+1)<histoBins.length)
            {
                   numb=histoBins[0][i+1];
                   i++;·
                   q++;
            }
            if(j>0)
            {
                   j+=(q/2);
                   q=0;
            }
            i++;·
    }while(i<numberBins−1);
    highs[0]=j;
    int second_high=j;
    //System.out.println("\n\n second high:"+second_high);
    numb=histoBins[0][i];
    //System.out.print("\nMode:"+histo-
    gram.getModeThreshold(2)[0]);
    max=histoBins[0][0];
    j=0;
    int limit=(int) histogram.getModeThreshold(2)[0];
    if(second_high<histogram.getModeThreshold(2)[0])
    {
           limit=second_high;
    }
    for(i=0;i<limit;i++)
    {
            numb=histoBins[0][i+1];
            if(numb>=histoBins[0][i]&&numb>max)
            {
                  max=numb;
                  j=i;
                  j++;
            }
            while(numb==histoBins[0][i]&&numb==max)
            {
                   numb=histoBins[0][i+1];
                   i++;·
                   q++;
                       }
            if (j>0)
            {
                   j+=(q/2);
                   q=0;
            }
    /// i++;
```

-continued

```
    }
    int first_high=j;
    //System.out.println("\n\n first high:"+(first_high));
    if(first_high>=histogram.getModeThreshold(2)[0])
    {
             first_high=(int) histogram.getModeThreshold(2)[0];
    }
    int min=histoBins[0][first_high];
    int empty_flag=0;
    if(second_high<0)
    {
         second_high=100;
         empty_flag=1;
    }
    for(i=first_high;i<second_high&&i<numberBins−1;i++)
    {
             numb=histoBins[0][i+1];
             if(numb<=histoBins[0][i]&&numb<min)
             {
                 min=numb;
                 j=i;
                 j++;
             }
    while(numb==histoBins[0][i]&&numb==
    min&&numb<min)
    {
             numb=histoBins[0][i+1];
             i++;·
             q++;
    }
    if(j>0)
    {
             j+=(q/2);
             q=0;
    }
    }
         if(empty_flag==1)
         {
                 second_high=0;
         }
         first_min=j;
         //System.out.println("\n\n first min:"+(first_min));
         j=0;
         min=histoBins[0][second_high];
         for(i=second_high;i>first_min;i−−)
         {
                 numb=histoBins[0][i−1];
                 if(numb<histoBins[0][i]&&numb<min)
                 {
                   min=numb;
                   j=i;
                   j−−;
                 }
            while(numb==histoBins[0][i]&&numb==
            min&&numb<min)
            {
                   numb=histoBins[0][i−1];
                   i−−;
                   q−−;
            }
            if(j>0)
            {
                    j+=(q/2);
                    q=0;
            }
         }
    int second_min=j;
    //System.out.println("\n\n second min:"+(second_min));
    lows[0]=first_min;
    lows[1]=second_min;
       //i will be first boundary
       return lows;
}
...
```

In one embodiment, threshold values may then be determined using the determined and adjusted "first_min" and "second_min" as lower and upper bounds 642. In one implementation, an image processing clamp method may be adopted which requires input parameters such as the boundary gray level values "first_min" and "second_min", and returns the threshold value. For example, in one implementation, a Java implementation of a clamp function may take a form similar to:

int clamp(int x, int low, int high) {
    return (x<low) ?Low: ((x>high) ?high: x);
  }

Figure 6E:
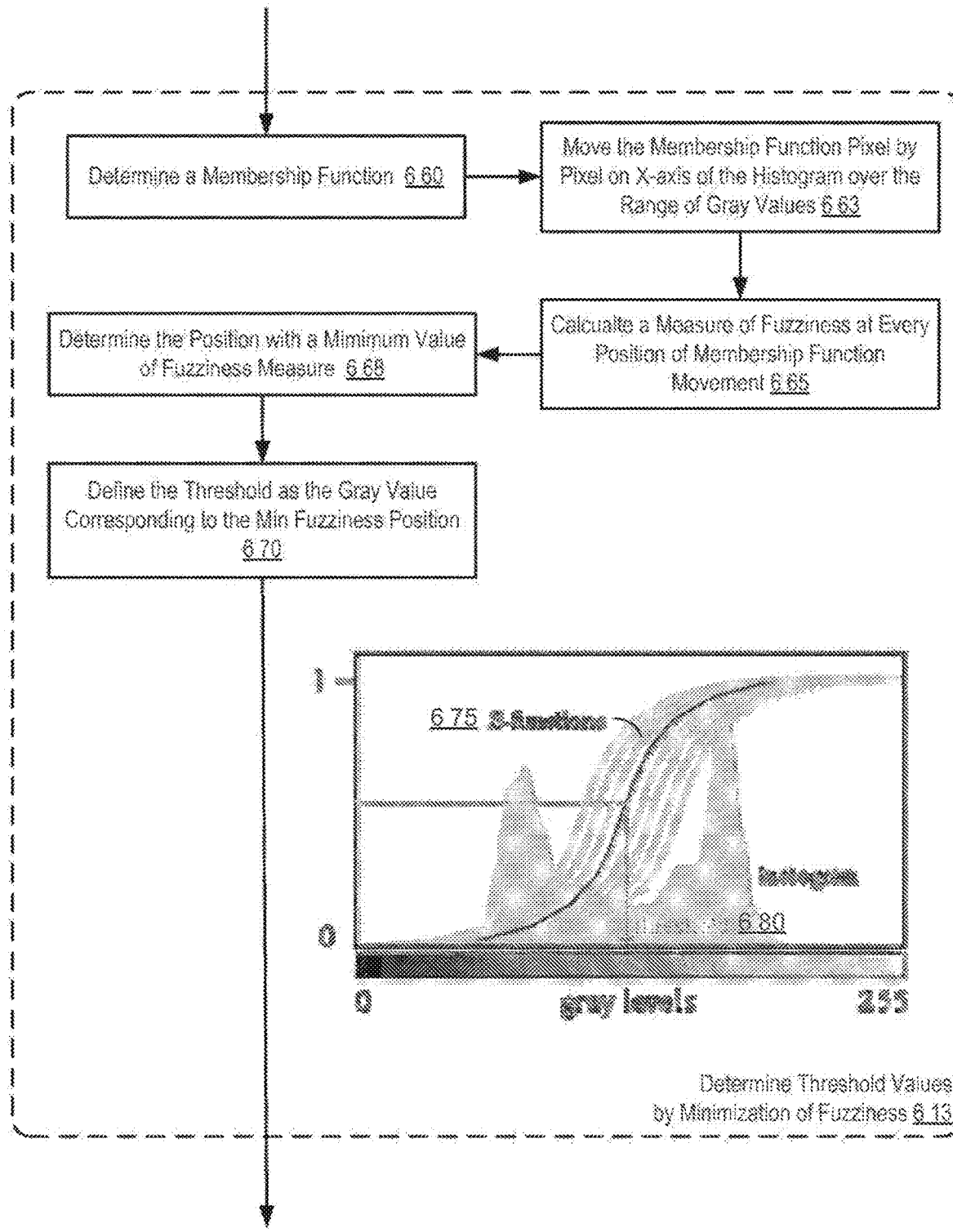
FIG. 6E provides a logic flow diagram and an example illustrating aspects of an enhanced corner/edge detection using image quantumization in one embodiment of the PS-PLATFORM.

FIG. 6E is of a logic diagram illustrating aspects of determining grayscale threshold values by minimization of fuzziness in an alternative embodiment of the PS-PLATFORM. In one embodiment, the PS-PLATFORM may determine a member function 660 for, e.g., a standard S function which may be defined as:

$$S(x) = \frac{1}{2}\left[\text{erf}\left(\frac{x}{\sqrt{2}}\right) + 1\right],$$

and move the membership function pixel by pixel on the X-axis of the histogram over the range of gray values 663 (as shown in 675). At every position of the membership movement, a measure of fuzziness may be calculated 665 based on the a variety of measure definitions, such as but not limited to linear index of fuzziness, quadratic index of fuzziness, logarithmic fuzzy entropy, fuzzy correlation, fuzzy expected value, weighted fuzzy expected value, fuzzy divergence, hybrid entropy, and/or the like. For example, in one implementation, the measure of fuzziness may be calculated via the logarithmic fuzzy entropy, which may be defined as:

$$H(S) = \frac{1}{MN\ln 2}\sum_m\sum_n G_n(S_{mn}),$$

where $G_n(S_{mn})=-S_{mn}\ln S_{mn}-(1-S_{mn})\ln(1-S_{mn})$, and $S_{mn}$ is the membership function value at pixel (m,n) for an image of size M×N.

In one embodiment, the PS-PLATFORM may determine the position with a minimum value of the calculated fuzziness measure 668, and then define the grayscale threshold as the gray value corresponding to the minimum fuzziness position 670, as shown in 680.

Figure 6F:
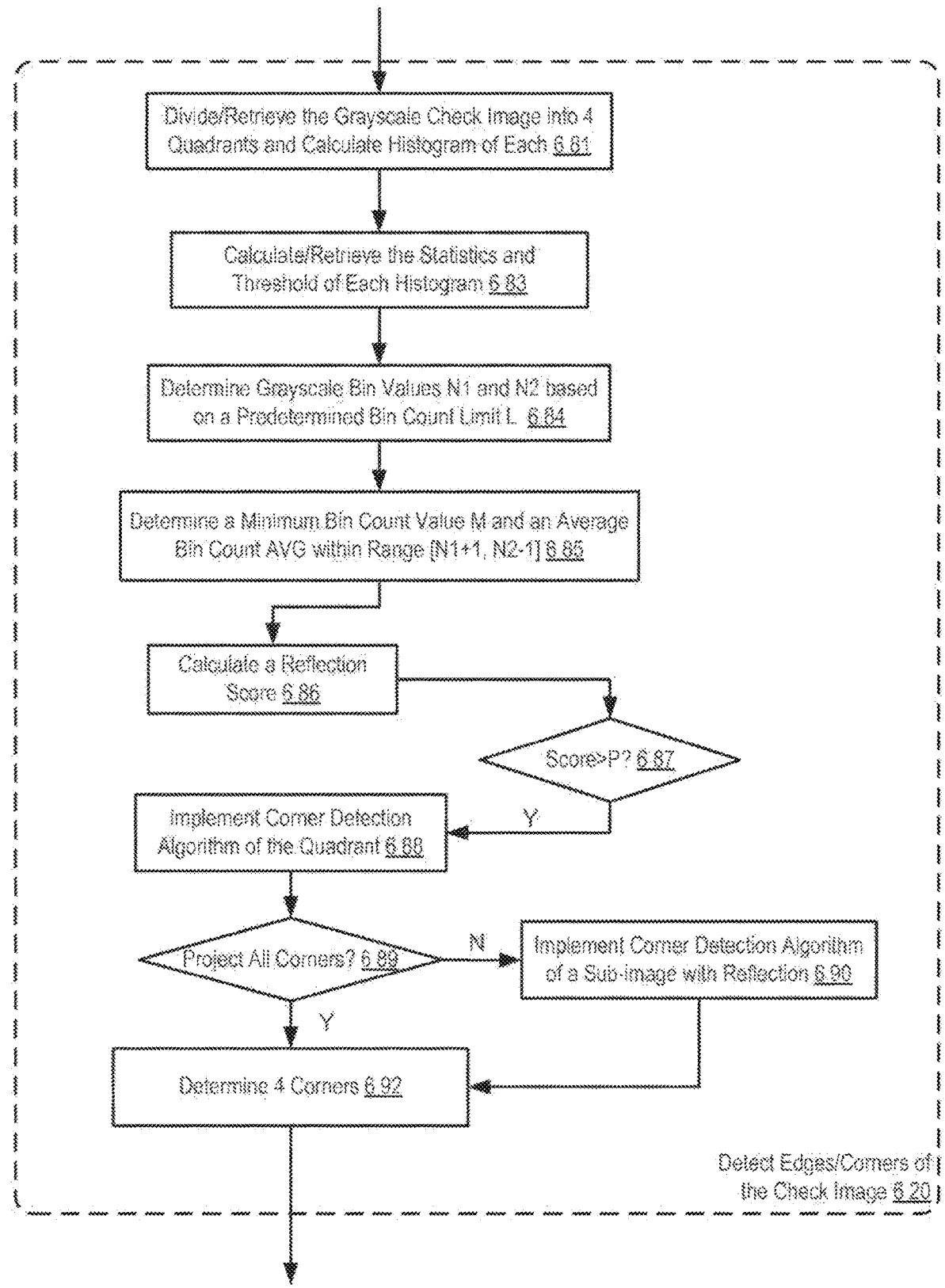
FIG. 6F provides a logic flow diagram illustrating aspects of an enhanced corner/edge detection using image quantumization in one embodiment of the PS-PLATFORM.

In one embodiment, if the grayscale check image has vague corners or edges, the enhanced quantumized image may contain reflection at the edge/corners, as shown in 693-694 of FIG. 6F. In one embodiment, a reflection detection algorithm may be implemented to avoid false corner detection.

FIG. 6E provides a logic flow diagram illustrating aspects of edge/corner detection of the check image based on reflection in one embodiment of PS-PLATFORM. In one embodiment, for a given check image, the PS-PLATFORM may divide the grayscale check image into four quadrants and calculate the histogram of each quadrant 681, or retrieve the generated histogram of four quadrants if available at 608 and 610, and calculate/retrieve the statistics and the determined threshold of each histogram 683. For example, in one implementation, statistical information such as the histogram entropy, maximum entropy threshold, mean grayscale count, maximum variance of grayscale count, mode threshold, moment, deviation, and/or the like, may be calculated.

In one embodiment, grayscale bin values N10 and N2 may be determined based on a predetermined bin count limit L 684 satisfying: (i) N1 and N2 are greater than or equal to the corresponding gray value of the bin count limit L; (ii) N1 is less than the minimum fuzziness threshold T of the histogram; and (iii) N2 is greater than the minimum fuzziness threshold T of the histogram. FIG. 6F shows an example of determining N1 and N2 on a given histogram in one embodiment of the PS-PLATFORM.

In one embodiment, the PS-PLATFORM may determine a minimum bin count value M and an average bin count value AVG within the histogram window defined by the range [N1+1, N2−1] 685 (as illustrated by the red circle 695 in FIG. 6F). The PS-PLATFORM may then proceed to calculate a reflection score of the histogram 686. For example, in one implementation, the reflection score may be calculated based on the following formula: Score=(AVG−M)/(AVG+M), where the score is normalized to [0,1].

In one embodiment, if the calculated reflection score is less than a predetermined minimum score P 687 (e.g., P=0.4), then it may indicate a corner sub-image without reflection. The PS-PLATFORM may proceed to implement corner detection algorithm of the quadrant 688. For example, the PS-PLATFORM may implement detection algorithm such as the Moravec corner detection algorithm, the multi-scale Harris operator, the Shi and Tomasi corner detection algorithm, the level curve curvature approach, LoG, DoG, and DoH feature detection, the Wang and Brady corner detection algorithm, the SUSAN corner detector, the Trajkovic and Hedley corner detector, the FAST feature detector, automatic synthesis of point detectors with Genetic Programming, affine-adapted interest point operators, and/or the like.

In one embodiment, if the reflection score is less than P, then the corner sub-image is considered to be with reflection, and the corner detection implementation may be skipped to avoid a false or misleading corner. In this case, the determined corners may be less than four. In one embodiment, the PS-PLATFORM may determine whether the determined corners are sufficient to project all four corners by symmetry 689. For example, in one implementation, if there are three reflection-free corners and one corner with reflection, or two diagonal corners without reflections, then the position(s) of the corner(s) with reflection may be determined by symmetric projection 692. In another implementation, if there is only one reflection-free corner, or two reflection-free corners on a horizontal/vertical line, the PS-PLATFORM may determine that there is not sufficient information to project all four corners. In that case, the PS-PLATFORM may implement corner detection algorithm of a quadrant with reflection 690 (e.g., a corner with relatively higher reflection score), and provide additional information to determine all four corners of the check image 692.

Figure 6H:
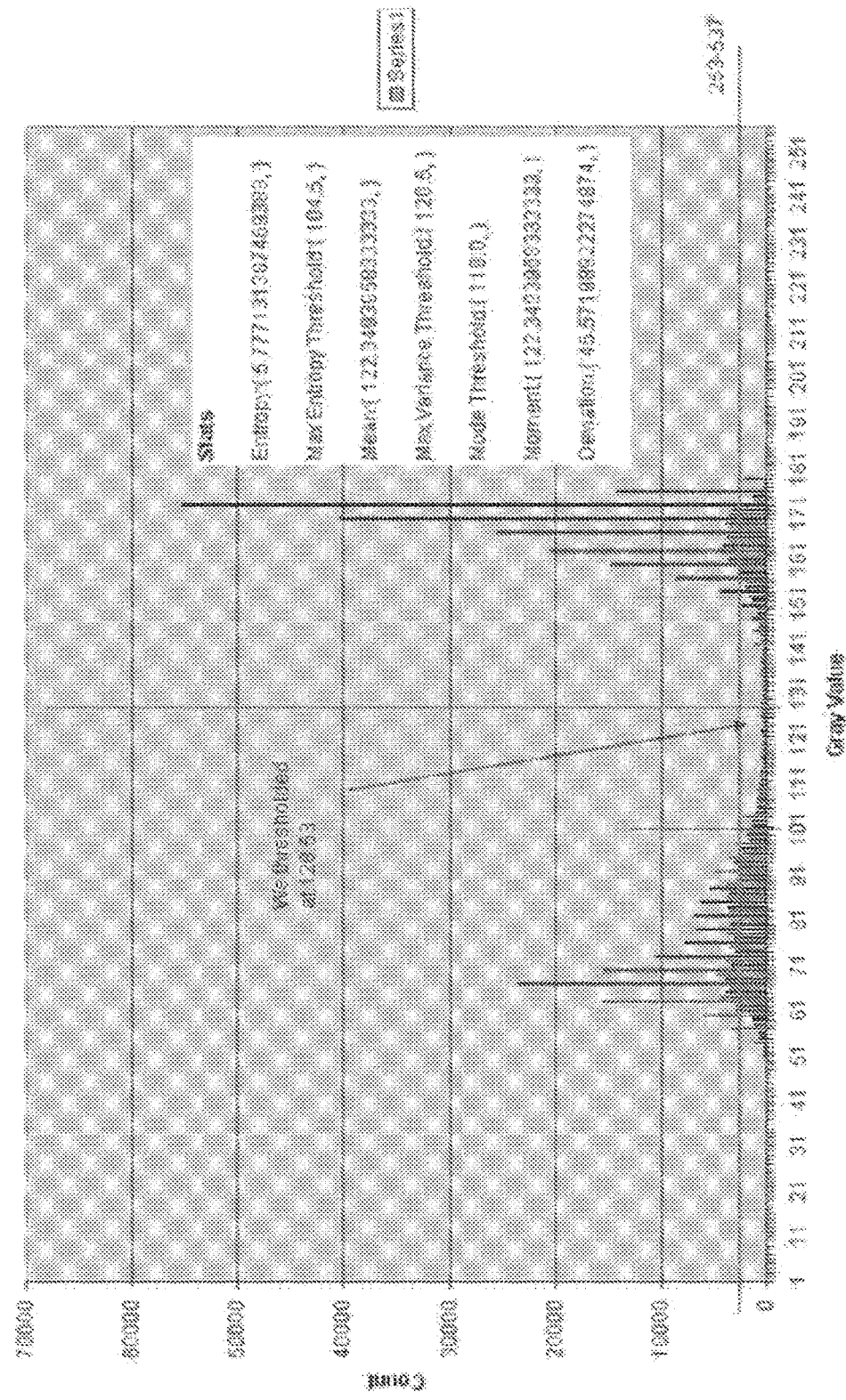
FIG. 6H provides an example illustrating aspects of an enhanced corner/edge detection using image quantumization in one embodiment of the PS-PLATFORM.
Figure 6J:
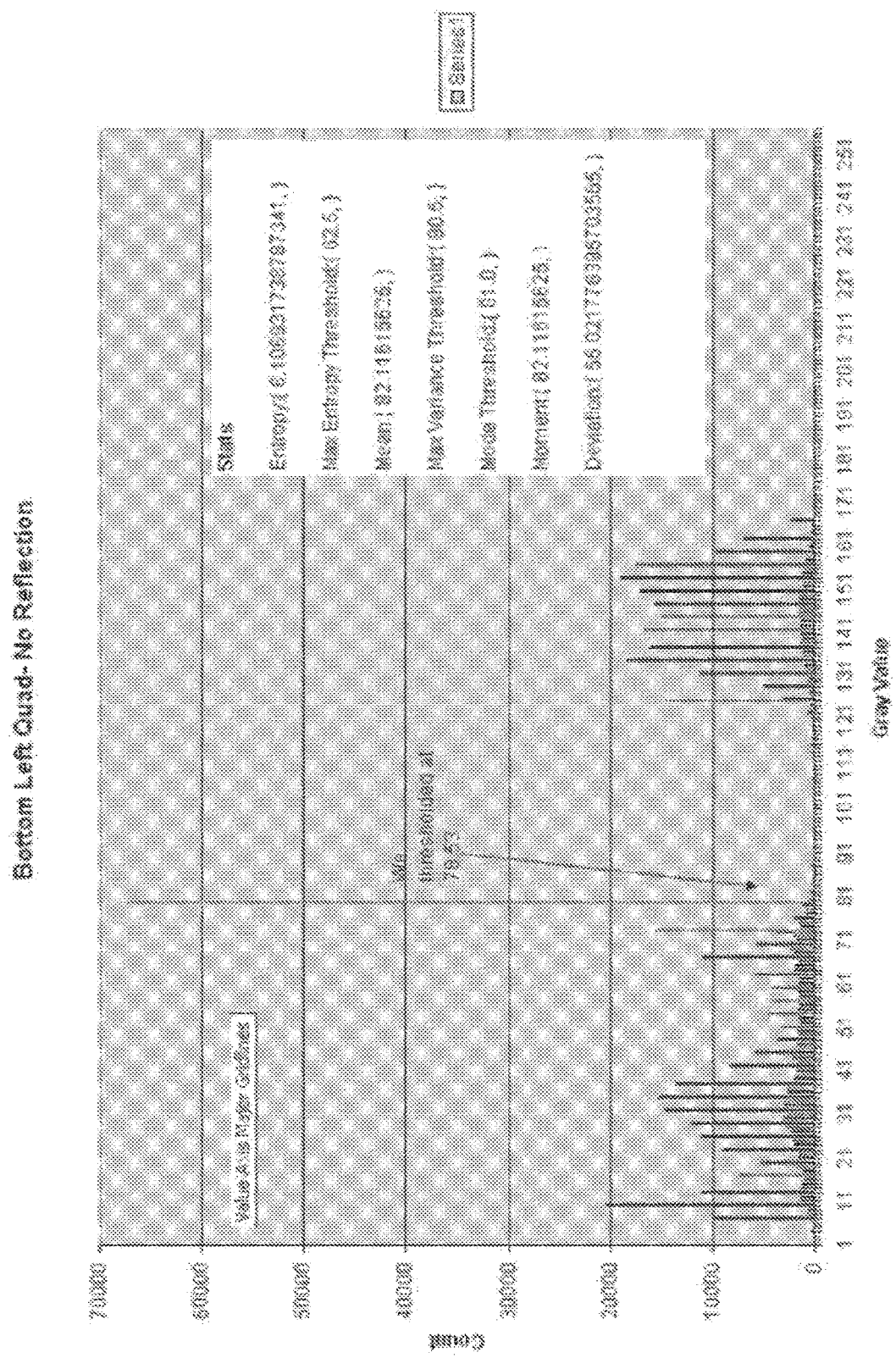
FIG. 6J provides an example illustrating aspects of an enhanced corner/edge detection using image quantumization in one embodiment of the PS-PLATFORM.
Figure 6K:
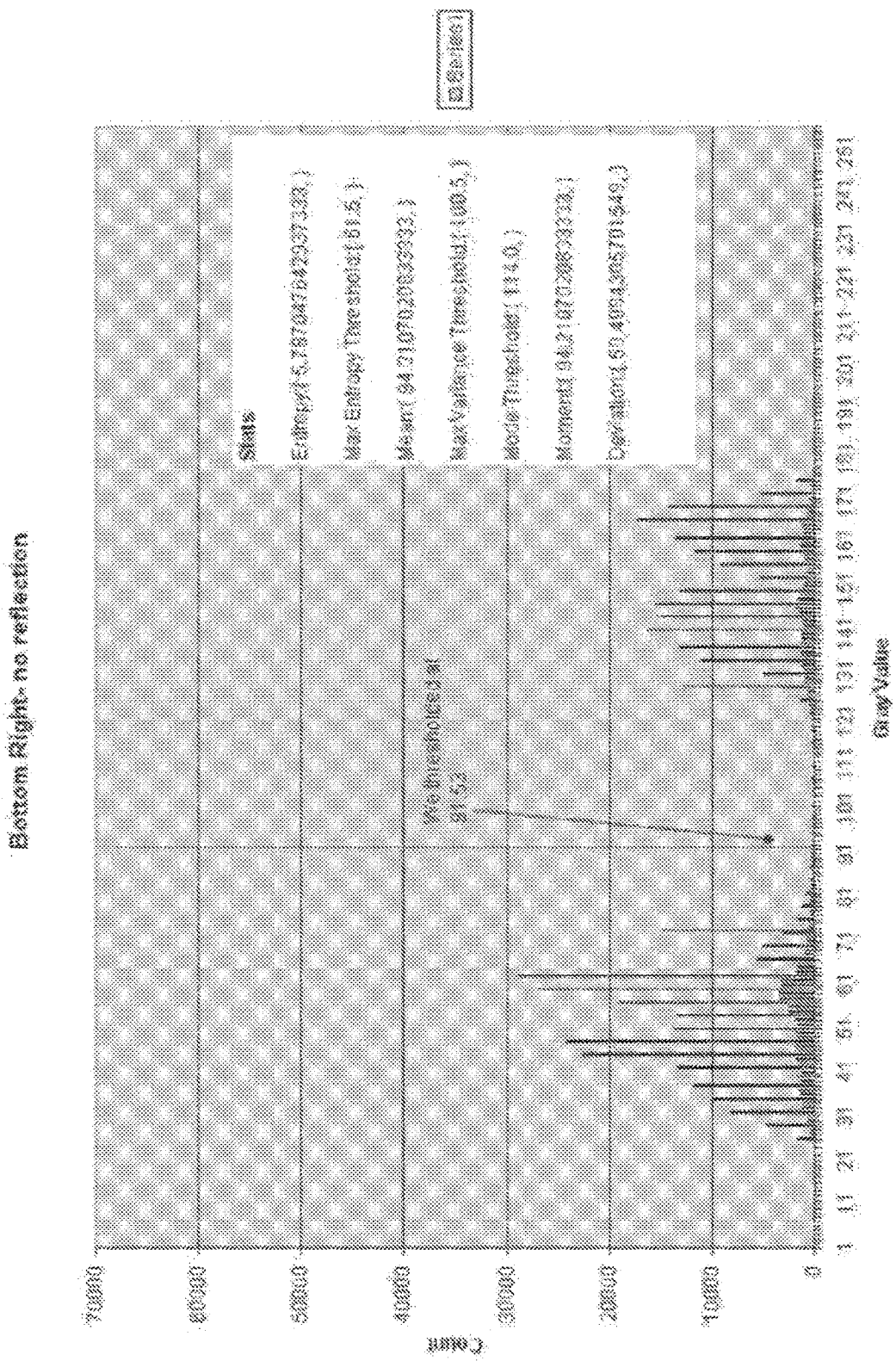
FIG. 6K provides an example illustrating aspects of an enhanced corner/edge detection using image quantumization in one embodiment of the PS-PLATFORM.

FIG. 6G provides an example of the histogram analysis of the four quadrants of the grayscale image 693 of FIG. 6F in one embodiment of the PS-PLATFORM. In FIG. 6G, the histogram analysis shows that the bottom two quadrants are with no reflection (as shown in FIG. 6J and FIG. 6K), but the top two are with reflection (as shown in FIG. 6H and FIG. 6I). In that case, the determined bottom corners may not provide sufficient information to project the other two corners. In one implementation, the PS-PLATFORM may determine the corner of the top left quadrant with some reflection, and determine the top right corner with large reflection by symmetry.

In one embodiment a received check image may contain a skewed, distorted or warped image of a check. In such cases, the check image needs to be "dewarped" prior to information extraction. For example, skew is the difference in rotation off an axis between a feature in the digital image and the same feature in the physical embodiment of the digital image. The determination of skew of digital images captured using handheld digital cameras typically are computed in 3-dimensions. For exemplary purposes only, the following deskew process uses an x and y axis, though it should be understood that the principles and methods for determining skew in three (3) dimensions use the same principles and are considered to be incorporated into the present subject matter.

Figure 7:
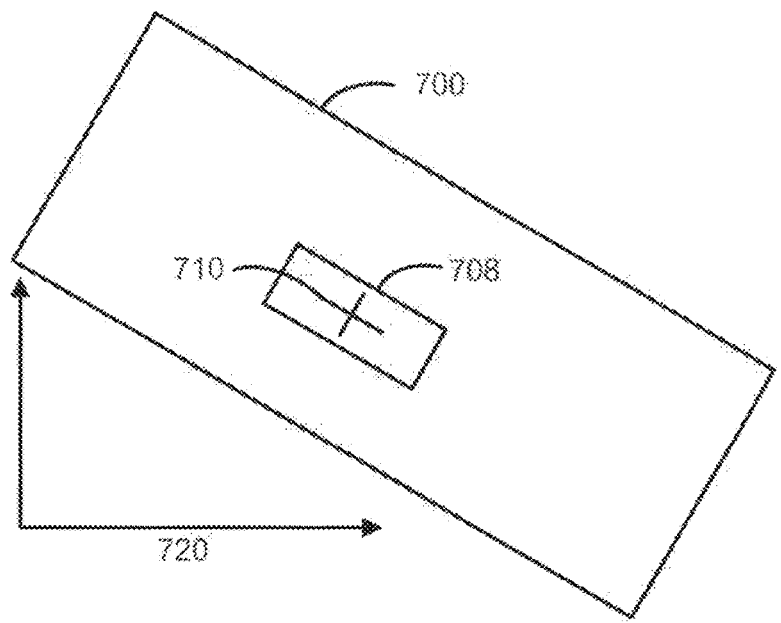
FIG. 7 illustrates examples of digital images of check 700 which are skewed, warped or distorted in one embodiment of the PS-PLATFORM.
Figure 7:
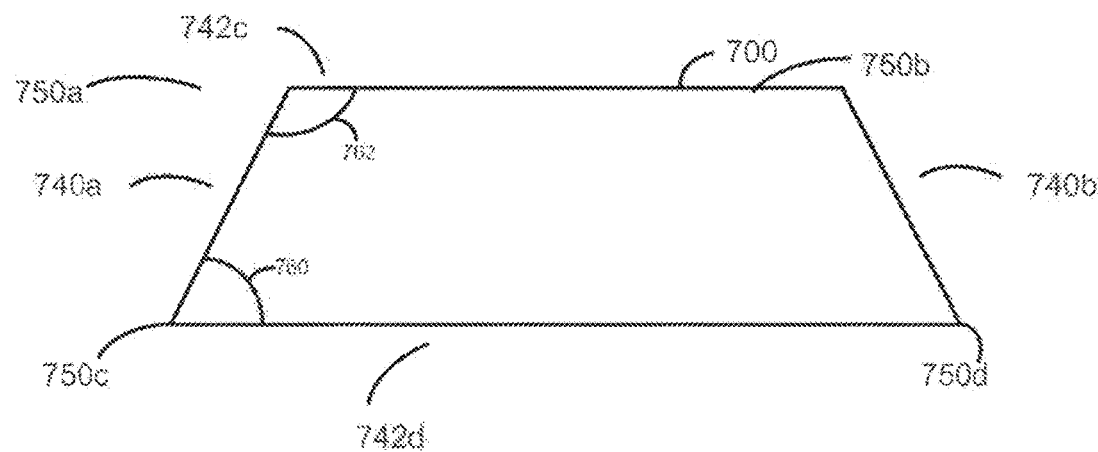

FIG. 7 illustrates examples of digital images of check 700 which are skewed, warped or distorted. In one embodiment, the original check 700 has a box 708 which has character "+" 710 within the box. As shown in the figure, if the skew is significant, for Example, character "+" 710 may be interpreted as an "X" rather than a "+". In order to determine the identification of characters in check 700, the skew of the digital image may need to be determined and compensated for prior to character extraction and recognition, as described below.

In another embodiment, the digital image may be distorted to a degree so that the shape of the check image is not rectangular, but rather, trapezoidal, as shown in the figure. The image may be distorted in other manners, and thus, the present subject matter is not limited to a trapezoidal distortion. It should be appreciated that an image may be distorted in ways other than the non-limiting and exemplary trapezoidal distortion. The present disclosure is not limited to any one type of distortion.

For example, in one implementation, check 700 has sides 740*a-d* and corners 750*a-d*. The check image may appear not to be rectangular as sides 742*a* and 742*b*, while parallel to each other, are shown to not be equal in length. Sides 742*c* and 742*d*, while also parallel to each other, are shown to not be equal in length, angles 762 and 760 are not 90 degrees.

To deskew an image, the angle of a reference line within the digital image is determined. More than one reference line may be used as well. The angle of the line or lines is determined using a coordinate system as a reference. For example, the angle of the line is determined in reference to a set of axes, such as y-axis and x-axis 720 of The image is then digitally rotated so that the angle is zero (0), and another attempt at OCR is performed on the image to determine if the rotated digital image is acceptable for use.

When processing a check, there may be useful reference points in the check that facilitates the proper rotation of the image. For example, a check typically has several horizontal lines near the bottom of the check, used by the check writer to sign the check and to note the use of the check. Additionally, checks are typically rectangular in shape. A determination may be made to use the two long edges of the digital image and/or the lines within the check as reference points. If the image is rotated so that the long lines and/or the lines within the check are horizontal, the check image may be properly deskewed. After deskewing, if necessary, the bank may then perform an OCR operation again to determine if information may be extracted, recognized and verified. If the information is verified, the bank may then process the deposit request.

In one embodiment, if the four corners of the check image has been determined, the PS-PLATFORM may determine whether the check image is skewed, warped or distorted. For example, in one implementation, the slope of a line between two corners may be used to determine the amount of distortion. If the line is strictly horizontal or vertical, then the image is considered to be without distortion. Otherwise, the image may be modified to remove the distortion. In one implementation, the PS-PLATFORM may implement techniques such as spatial transformation (also known as image warping) and/or the like based on the determined four corners of the check image to remove distortion and skew.

For example, a Java implementation using the JAI packages of dewarping a check image may take a form similar to:

```
. . .
ParameterBlockJAI    pb=new    ParameterBlockJAI
   ("Warp");
pb.addSource(image);
pb.setParameter("warp", new WarpPerspective(pt));
pb.setParameter("interpolation",
   new InterpolationBilinear( ));
RenderedOp rop=null;
/*
*perform the Warp operation
*/
rop=new RenderedOp("Warp", pb, null);
if (rop.getWidth( )>image.getWidth( )*3
   ||rop.getHeight( )>image.getHeight( )*3)
{
return cropped;
}
holder=rop.getAsBufferedImage( );
ParameterBlockJAI    pb2=new    ParameterBlockJAI
   ("Warp");
pb2.addSource(virtimage);
pb2.setParameter("warp", new WarpPerspective(pt));
pb2.setParameter("interpolation",
   new InterpolationBilinear( ));
RenderedOp rop2=null;
/*
*perform the Warp operation
*/
rop2=new RenderedOp("Warp", pb2, null);
virtimage=rop2.getAsBufferedlmage( );
//ImageAnalysis.savelmage(holder,
//"c:temptesterouputafterwarp-Gray.jpg");
//virtimage=
   //ImageManipulation.virtualEdgeEnhance2(holder);
}
. . .
```

PS-PLATFORM Representment Detection/Clearance

Figure BA provides a logic flow diagram illustrating aspects of check representation detection in one embodiment of the PS-PLATFORM. In one embodiment, based on the extracted information of the check image, the PS-PLATFORM may determine whether the extracted information contains a "void" check indication 805. For example, in one implementation, the check may have been voided by a punched hole and/or a written "VOID" on the physical check, or have a modified section, such as a modified RFID tag, and/or the like. In one embodiment, if the check is a void check 808, the PS-PLATFORM may reject deposit.

In another embodiment, if no such "void check" indication is found, the PS-PLATFORM may compare check identification data with the check identification data within a limited subset of previously deposited checks 810, e.g., checks deposited to the same payee's account within the past ten months, the last one hundred deposits to the same payee's account, etc. For example, in one implementation, check identification data may comprise Check identification data is any data that identifies the financial instrument in a relatively unique fashion. For example, check identification data may comprise MICR data such as payer account number, payer bank routing number, and check number, payer information such as payer name and address, the deposit amount of the check and or the like. In one implementation, check image characteristics such as a combination of characteristics from a payer signature line may also be used as check identification data. In one implementation, log files containing check identification data may be kept for all deposits. Transaction logs may be maintained for customer accounts, or for the financial institution as a whole.

In one implementation, if there is a match 815 with any previously deposited check, the PS-PLATFORM may flag, delay or terminate the deposit transaction 820. For example, in one implementation, flagging the transaction may indicate to setting a flag that will cause some further scrutiny 832 of the transaction at a later time. The subsequent transaction analysis 832 may automatically analyze further aspects of the check and comparing it to a suspected duplicate check, or may report to a system operator (e.g., bank clerks, etc.). For another example, the PS-PLATFORM may delay transaction by causing the transaction to be delayed and processed at a later time. In one implementation, delaying and flagging may be used together to provide adequate time for additional scrutiny required by the flag. In a further implementation, the PS-PLATFORM may terminate and abort the transaction.

In one embodiment, when the transaction is flagged, delayed, or terminated, a notification may be sent to a customer advising them of the action and optionally of the reason for the action as well. In one embodiment, the customer may be notified that the check has been identified as a possible duplicate and may be instructed to provide additional check identification data, such as re-capturing and submission of a new check image.

In one embodiment, if there is no match detected in the comparison of 810, the PS-PLATFORM may determine whether to enlarge the comparison range of previously deposited checks 825. If so 827, the PS-PLATFORM may enlarge the comparison range to compare check identification data within a full set of previously deposited checks 830. For example, in one implementation, the PS-PLATFORM may further search and compare the check identification data with all the stored deposit information in the database.

In one implementation, the limited subset comparison may be performed in real time, and the remainder of the comparison may be conducted at a later time. For example, in one implementation, the PS-PLATFORM may perform a multiple representment check within a 6-month database in real time on all PS-PLATFORM channels and records. In another implementation, the PS-PLATFORM may call a service to handle bulk transactions at batch time and to obtain a consolidated re-presentment report response, as will be further illustrated in FIG. 8B.

After a full set comparison, if a match is located 833, the PS-PLATFORM may perform subsequent transaction analysis 832 of the check deposit. Otherwise, the check is considered to be valid 835, and the PS-PLATFORM may proceed to deposit funds to the payee's account.

In one embodiment, the representment detection in one embodiment of the PS-PLATFORM as shown in FIG. 8A may be implemented in a real-time manner at the PS-PLATFORM server and/or the payee's bank prior to soft posting. In another embodiment, the PS-PLATFORM and/or the payee's bank may send deposit data to a centralized warning system, such as an external agency, a clearinghouse bank, and/or the like, to detect check representment. In one implementation, the centralized warning system may inspect deposit data with financial institutions other than the payee's bank to identify checks that have already been presented. In a further embodiment, the centralized warning system may provide representment service both in real time and at batch time and subscribe a payee's bank for check presentment notification. FIG. 8B provides a combined logic and block diagram illustrating an example implementation of representment service at a centralized warning system in one embodiment of the PS-PLATFORM.

In one embodiment, when the PS-PLATFORM receives a check presentment to a payee's bank 836, the PS-PLATFORM may process the request and send extracted deposit information and check images to a centralized warning system for presentment services 840. In one embodiment, the presentment services 840 may include registration service 841, real-time detection service 842 and batch detection service 843. In one implementation, the payee's bank may subscribe via the registration service 841 in order to receive presentment notification published by the warning system. In one implementation, attributes associated with the payee's bank may be maintained in a registration repository, such as a list of the transit routing numbers the payee's bank owns, callback service URL for presentment notification, callback credentials, and/or the like. For example, in one implementation, when a payee's bank sent check information and check images to the centralized warning system for representment check, the system may send check presentment notifications to a variety of subscribed banks 838.

In one embodiment, the real-time detection service 842 may implement a representment search within a centralized repository 845 of previously deposits. In one implementation, the real-time detection service may take a form similar to the process shown in FIG. 8A.

In one embodiment, the batch detection service B43 may process representment detection for bulk transactions in an "off-line" manner. For example, in one implementation, a payee's bank 839 may use this service to send all remote-deposit transactions at the end of each day for re-presentment validation and expects a next-day response. In one implementation, an X9.37 image cash letter containing the remote deposit transactions may be submitted to the centralized warning system and a response report containing presentment/re-presentment information may be published to the payee's bank 839.

Figure 8C:
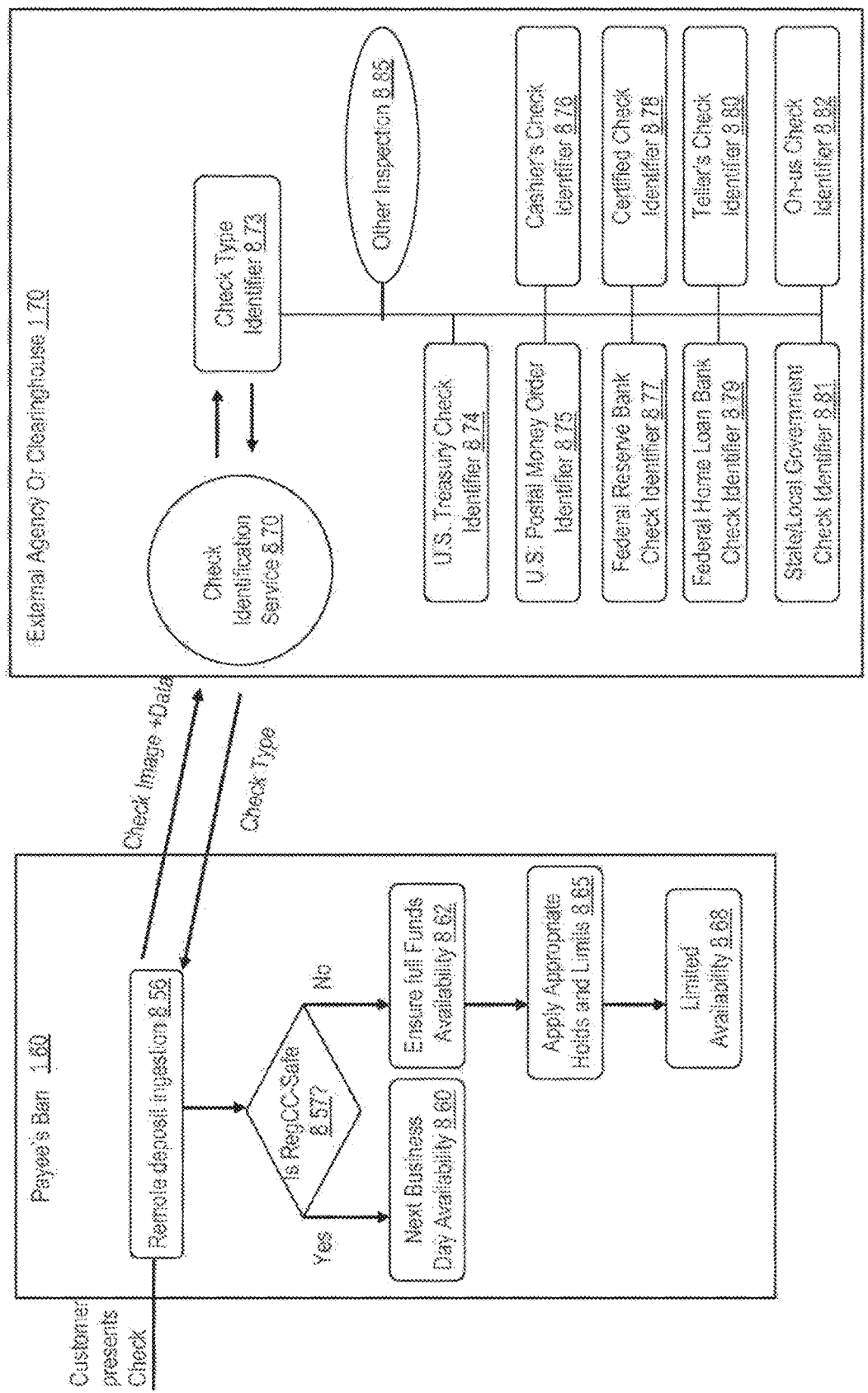
FIG. 8C provides a diagram illustrating aspects of check representment detection and check clearance in one embodiment of the PS-PLATFORM.

FIG. 8C provides a combined logic and block diagram illustrating check clearance and fraudulent control in one embodiment of the PS-PLATFORM. In FIG. 8B, in one embodiment, the payee's bank may ingest and process remote deposit data 856. For example, as discussed in FIG. 1, a PS-PLATFORM server may be housed at the payee's bank to receive and process remote deposit. In one embodiment, the payee's bank may establish a secure communications connection with an external agency or clearinghouse bank (e.g., a local branch of the Federal Reserve Bank, etc.), for example, via encrypted FTP, and/or the like. In one implementation, the payee's bank 160 may send deposit data, such as a Check 21 X9.37 check image file, and the extracted check identification data, to the external agency to perform a clearinghouse check.

In one embodiment, the clearinghouse bank may provide check identification service 870 to identity a type of the check 873. For example, in one implementation, a check type identifier 873 at the clearinghouse bank may determine whether the deposited check is a U.S. Treasury check 874, a U.S. Postal money order 875, a cashier's check 876, a Federal Reserve Bank check 877, a certified check 878, a Federal Home Loan Bank check 879, a teller's check 880, a state/local government check 881, an on-us check 882, and/or the like, based on the received check information. In one implementation, the check type identifier 873 may inspect the MICR information on the check to determine its type. In one embodiment, if the check type identifier 873 is unable to determine the type of the check, the identification service 870 may proceed to other inspection procedures 885 to determine whether the deposited check is fraudulent. For example, in one implementation, the identification service 870 may send alerts and present the check data to fraudulence experts.

In one embodiment, the external agency or clearinghouse bank may return an indication of the check type to the payee's bank. In one implementation, the payee's bank may determine whether the check is a Regulation CC compliant based on the received check deposit data and the check type indication from the clearinghouse 857. For example, in one implementation, U.S. treasury checks, certified checks and/or the like, may be considered as Regulation CC safe and eligible for next business day availability of deposit confirmation 860. In another implementation, if the check is not Regulation CC safe, the payee's bank may inspect the payee's account to ensure full funds availability in account to cover the deposited amount upon fraud 862, and apply appropriate holds and limits on the deposit amount 865. The deposit may render limited fund availability 868 from the payee's bank.

For example, in one implementation, a user may request to deposit a $1000.00 non-Regulation CC safe check, but only has $500.00 existing amount in the account. In such cases, the PS-PLATFORM may receive and verify remote deposit data from the user and the payee's bank may provisionally credit $1000.00 to the user's account. In one implementation, the payee's bank may generate a substitute check and send the substitute check for clearinghouse check. In one implementation, if the payee's bank receives a clearinghouse result indicating that the deposited check is not Regulation CC compliant, the payee's bank/PS-PLATFORM may notify the user via a user interface to provide a variety of options of deposit, e.g., display messages on the RDC Deposit website, send emails/instant messages to the user device, and/or the like. For example, the user may choose to deposit the maximum allowable funds at the moment, or to cancel the deposit, or to provisionally post the check but mail the physical check to the bank for clearance, and/or the like.

FIG. 8D provides a data flow diagram illustrating check data registration and subscription service in one embodiment of the PS-PLATFORM. In one embodiment, a financial institution (e.g., a payee's bank) 8002 may provide check deposit service, which may register with the PS-PLATFORM for subscription of check deposit data. Upon receiving a deposit request of a check and related deposit information (e.g., an image of the check, an amount of the check, a deposit account, a check number, a routing number, etc.), the payee's bank 8002 may provide such deposit information 8003 for clearinghouse check 8004.

In one implementation, the clearinghouse 8004 may process the received check deposit information, and send the data to a representment data store 8005 for representment detection. For example, in one implementation, a query may be formed based on the received check deposit information within the stored check data at 8005.

In an alternative implementation, if the payee's bank 8001 is a subscriber with the PS-PLATFORM, e.g., registered for the deposit data publishing service, PS-PLATFORM may query a "listener registration" data store 8007 for the payee bank's subscription, and send published messages associated with the subscription to the payee's bank 8002. For example, the payee's bank 8002 may subscribe for information regarding for a payee's most recent 50 deposits. In that case, the clearinghouse may inspect the subscribed information regarding to the payee's most recent 50 deposits to detect check representment. In one embodiment, the PS-PLATFORM may update registration information periodically, intermittently and/or responsively to client request. In one implementation, a financial institution may provide information for registration with subscription service such as, but not limited to, a list of the transit routing numbers it owns, callback service URL for presentment notification, callback credentials, and/or the like.

In another implementation, if a funding bank 8010, e.g., a payor's bank, has subscribed with the PS-PLATFORM, the clearinghouse may send a presentment notification published by a warning system to the payor's bank.

In one implementation, the PS-PLATFORM may detect representment by using the check item metadata information, and perform a search and compare on the check item repository to detect re-presentment. If a match is not found, the PS-PLATFORM may record the check item transaction information and add it to the previously presented check repository. For example, in one implementation, the PS-PLATFORM may use the transit routing number from the check item metadata and publishes the presentment/re-presentment information to a subscriber bank (e.g., the payee's bank) the check item was drawn on "checkDeposited". In the case of a reversal of presentment it removes the record of the check item and publishes the reversal of presentment information to the subscriber bank that the check item was drawn on "checkDepositReversed".

In an alternative embodiment, if the payee's bank provides an X9.37 image cash letter containing the remote deposit transactions for clearinghouse check, the PS-PLATFORM may utilize information contained in the cash letter, and publish presentment/representment notifications to the subscriber bank.

Figure 8E:
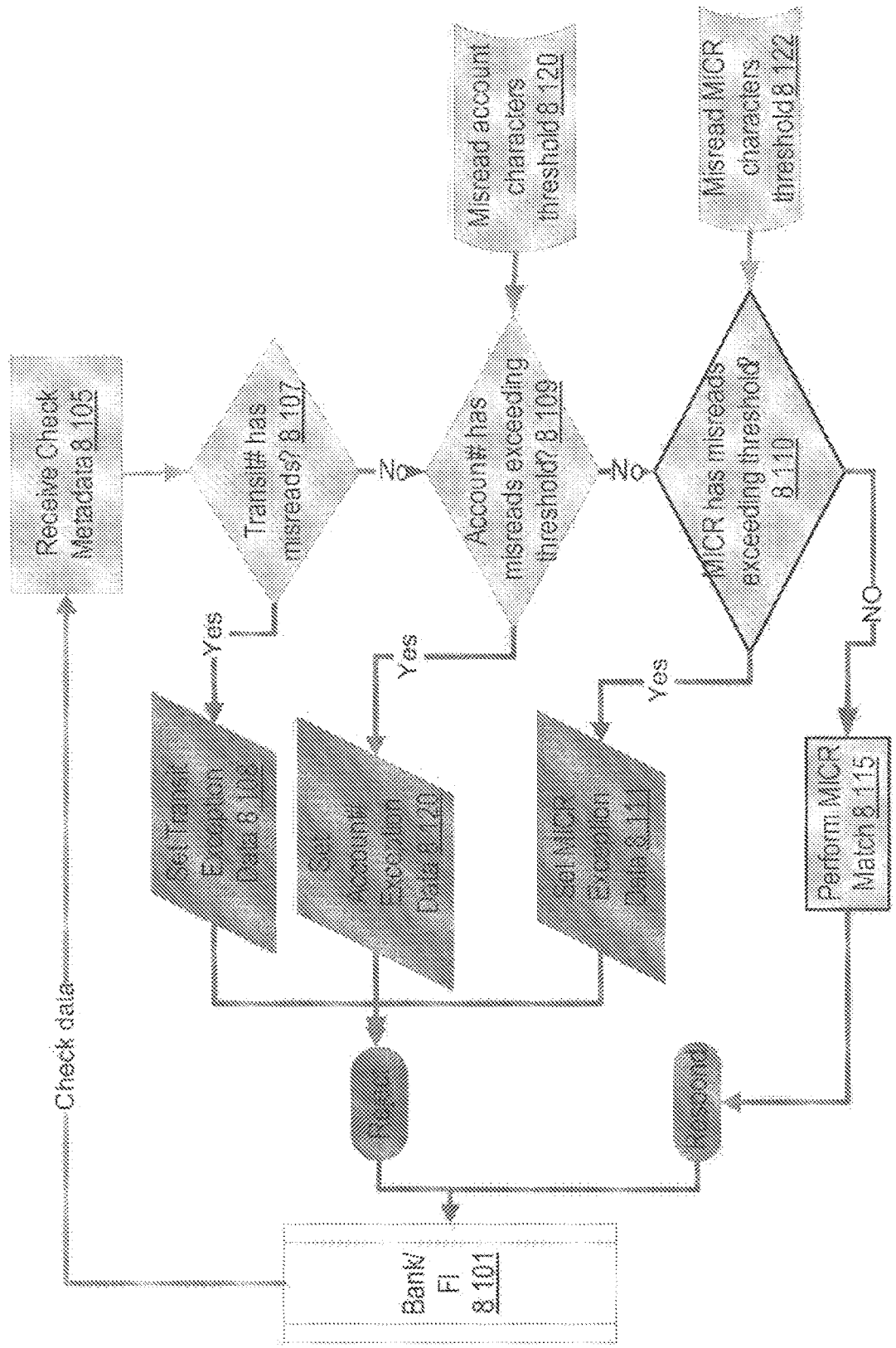
FIG. 8E provides a diagram illustrating aspects of check representment detection and check clearance in one embodiment of the PS-PLATFORM.
Figure 8F:
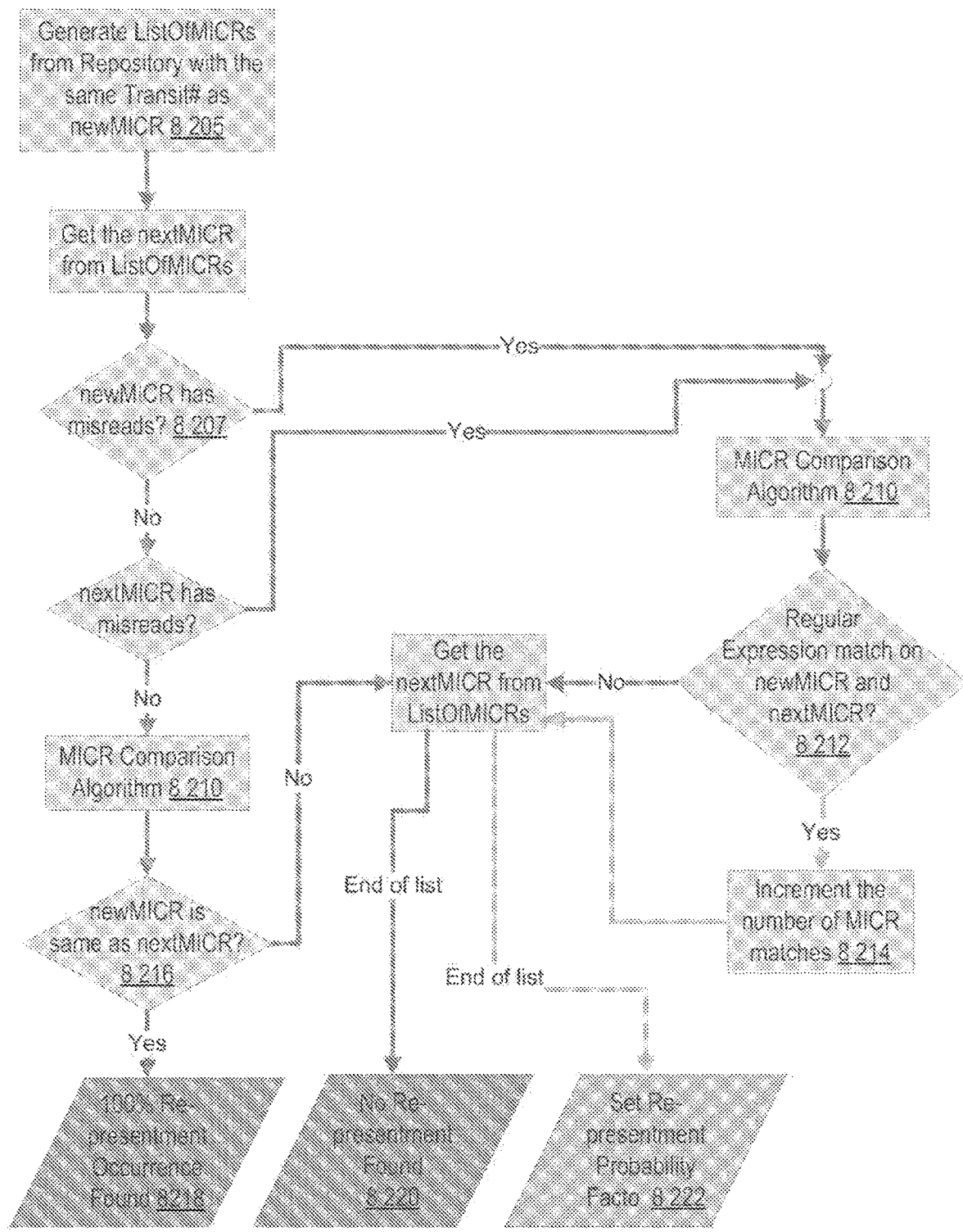
FIG. 8F provides a diagram illustrating aspects of check representment detection and check clearance in one embodiment of the PS-PLATFORM.

FIGS. 8E-F provide logic flows of duplicate detections within embodiments of the PS-PLATFORM. In one embodiment, as shown in FIG. 8E, when the PS-PLATFORM receives check metadata 8101 from a financial institution 8101, the PS-PLATFORM may determine whether the transit routing number 8107 is misread, the account number has misreads exceeding a threshold 8109, and/or the MICR has misreads exceeding a threshold 8110. If yes, the PS-PLATFORM may send exception data 8108, 8120 and 8111 to the financial institution rejecting the deposit.

For example, in one implementation, the check metadata received from a financial institution may comprise fields similar to the following:

| Metadata Field | Description |
| --- | --- |
| Deposit Timestamp | Time of check presentment |
| Transit Number | Transit routing field |
| Account Number | Account Number |
| Amount | Check Amount |
| MICR string | Complete MICR string extracted from Check Transit routing field On-Us field (Account# and check#) Amount field (optional) Auxiliary on-us field (optional) External process control field (optional) |
| MICR Misread Symbol | Character used to indicate misread characters in MICR and Account fields |

-continued

| Metadata Field | Description |
| --- | --- |
| Check Number | Check Number |
| Courtesy amount [CAR] | Numeric Amount on the check |
| Legal amount [LAR] | Full amount worded on the check |
| Check date | Date of the check |
| Payer name | Name of the payer |
| Payer address | Address of the payer |

In one embodiment, the account number misread characters threshold 8120 and the MICR misread characters threshold 8122 may be specified by the PS-PLATFORM system administrator. If the received check metadata does not violate any of the criteria, the PS-PLATFORM may proceed with a MICR match 8115 to detect representment and send the result to the financial institution.

In one embodiment, as shown in FIG. 8F, MICR comparison is performed between the new MICR and a list of MICRs with same transit Routing number. For example, in one implementation, the PS-PLATFORM may generate a list of MICRs from the stored previously presented check data with the same transit number in the received check data 8205. If the MICR strings being compared have no misread characters 8207, a string comparison of the MICRs is performed 8210. The resulting response will indicate either a definite match at 8218 or no-match 8220. In one implementation, the PS-PLATFORM may further determine whether to increase MICR bits for comparison 8214.

In one implementation, a MICR reader may use different characters to indicate the 4 MICR symbols on the extracted MICR string. For example, some readers may use the 'A' 'B' 'C.' 'D' format, e.g., A021001208A7000609C11051, and some users may use ';' ':' '<' '-',e.g., :083000593:6901526<1672. For another example, MICR misreads may be represented by characters like '*', '@', e.g., A131476231A62**125C10302, and blank spaces in the MICR line may be preserved.

In one implementation, at MICR comparison 8210, the MICR string from the check metadata may be modified to replace all non-numeric characters except misreads with spaces, which preserves blank spaces in the original MICR string. For example, the obtained MICR may be a string with numerals, misreads and blank spaces. For previously discussed examples, the modified MICR strings may take forms similar to "021001208 7000609 11051," "083000593 6901526 1672," "131476231 62**125 10302," and/or the like. In one implementation, a MICR string retrieved from previously stored record may also be modified as above.

In one implementation, a string comparison of the two MICRs may be made to determine a match 8212. In the case of misreads, a regular expression based comparison is made. Persistence of all MICR strings in the previously stored record may have the original MICR characters used to represent the symbols so as to preserve the original data.

In one implementation, if there are misreads in either of the MICR, a regular expression (RegEx) comparison is performed. This returns a successful match only if the non-misread characters between the two MICRs match exactly.

The list is further traversed to determine the number of MICR strings that matched on the RegEx comparison.

For example, in one implementation, if the PS-PLATFORM detects the MICR in the received check data is the same as a MICR in the generated list 8216, then a representment occurrence is detected and a notification may be generated. For another example, if the PS-PLATFORM has traversed the list of MICR and does not find a match 8220, in one implementation, the PS-PLATFORM may send a notification to the financial institution indicating no re-presentment has been found 8220. In an alternative implementation, the PS-PLATFORM may include a re-presentment probability factor and number of potential matches 8222 in the notification to indicate an estimate of potential re-presentment.

Figure 8G:
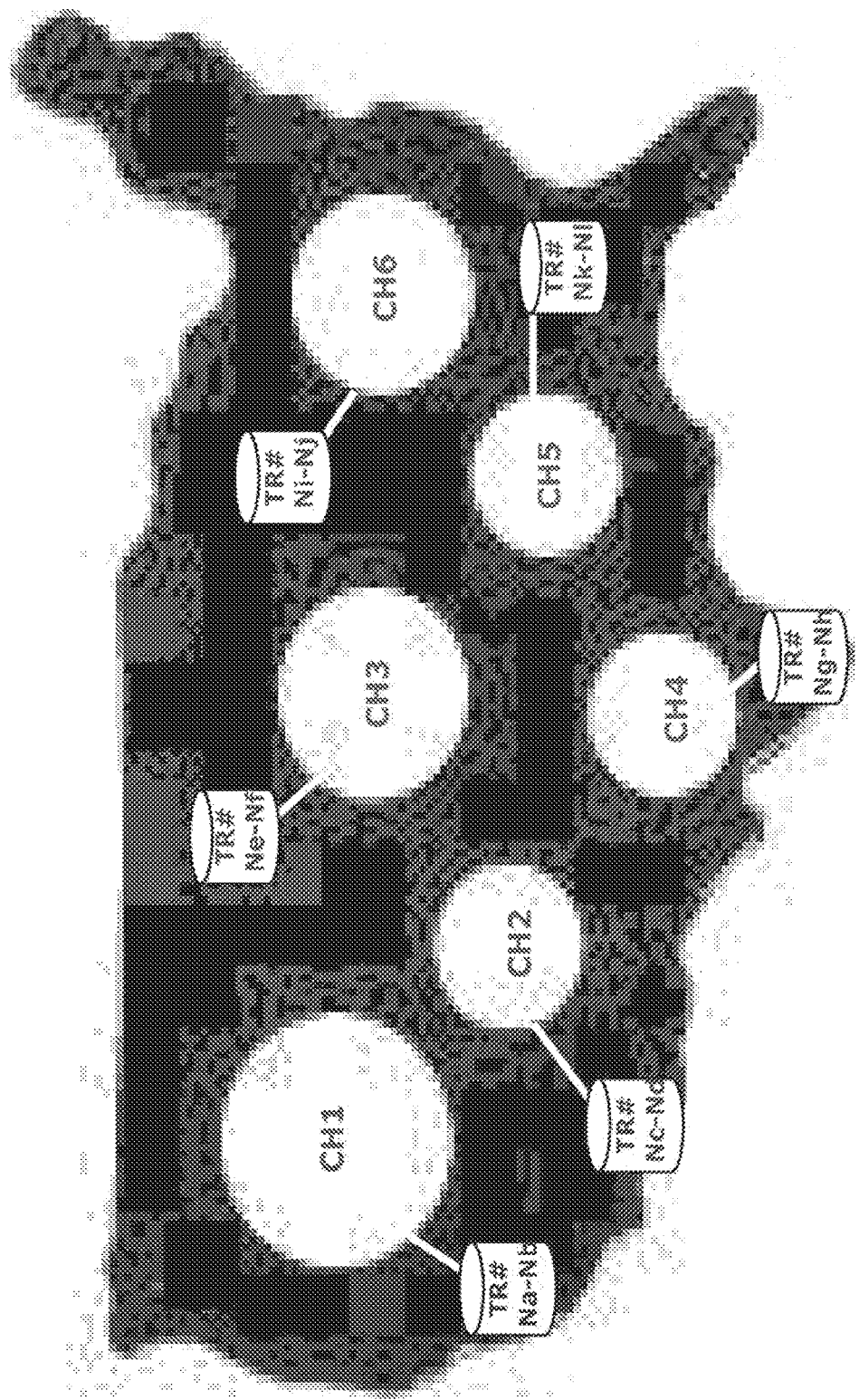
FIG. 8G provides a diagram illustrating aspects of check representment detection and check clearance in one embodiment of the PS-PLATFORM.
Figure 8H:
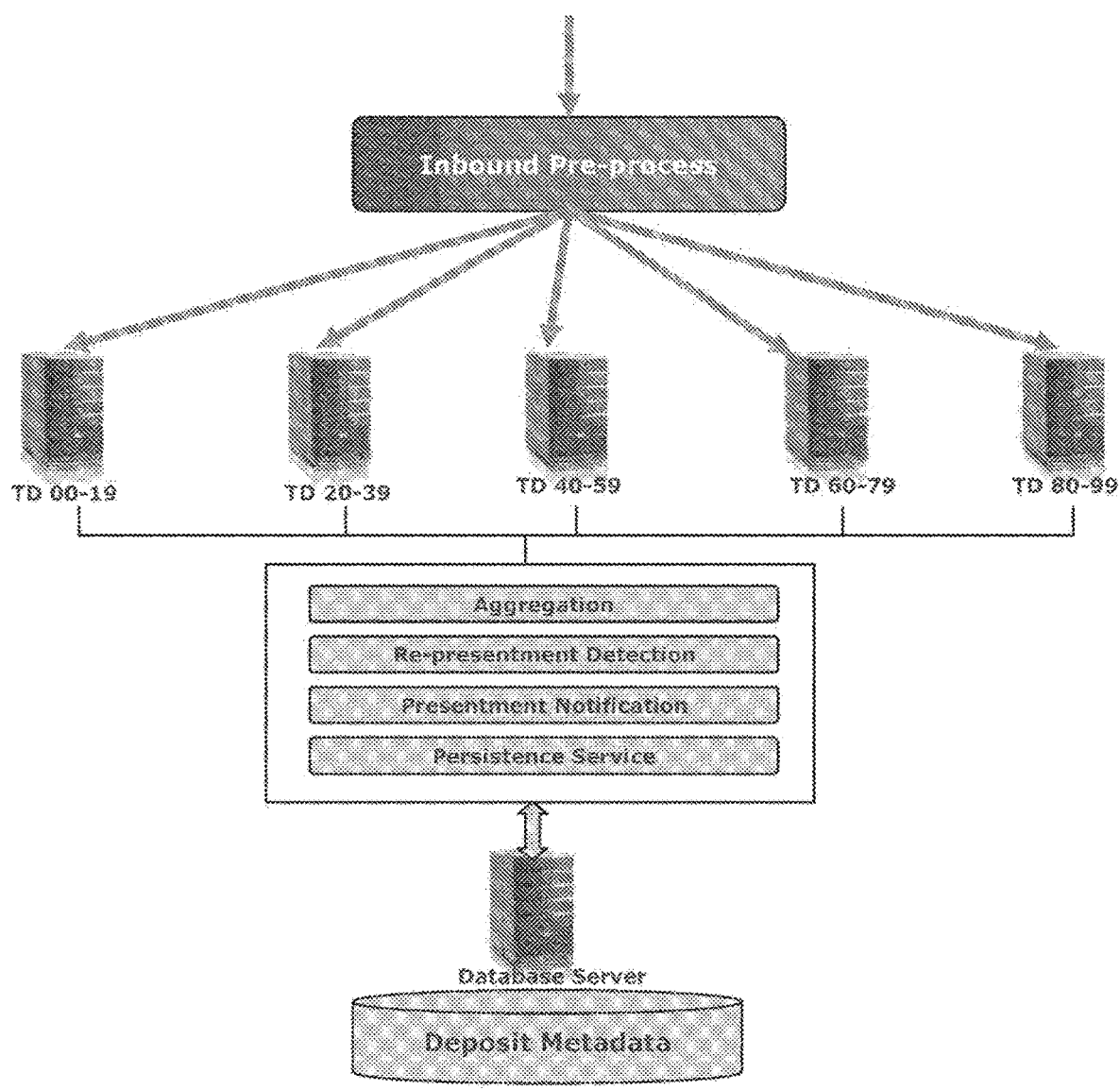
FIG. 8H provides a diagram illustrating aspects of check representment detection and check clearance in one embodiment of the PS-PLATFORM.

FIGS. 8G-H provide diagrams illustrating an example of distributed PS-PLATFORM system within embodiments of the PS-PLATFORM. In one embodiment, the PS-PLATFORM clearinghouse may be partitioned into distributed clearinghouse units to assist scalability. For example, as shown in FIG. 8G, each PS-PLATFORM clearinghouse may be responsible for a range of transit routing numbers, and each MICR with the transit number in this range is handled by a specific clearinghouse. In one implementation, the PS-PLATFORM may allocate the range of routing numbers based on high and low frequency of occurrences to ensure a fair balance of load among clearinghouses.

In one implementation, a subscriber bank may reach each distributed clearinghouse and exchange information via routing between clearinghouses. In one implementation, a central data repository of check data may be employed for each distributed clearinghouse to access. In alternative implementation, distributed database may be associated with each clearinghouse.

FIG. 8H illustrates an example implementation of architecture of a clearinghouse within embodiments of the PS-PLATFORM. In one implementation, the PS-PLATFORM clearinghouse may adopt server fanning to address scalability due to the enormous volume of deposit information it may have to handle. As shown in FIG. 8H, a load balancing Terminal Digit (TD) sorting based on the last two digits of the transit routing number may determine a range of transit routing number for each distributed clearinghouse server. Each server may aggregate the information and check for re-presentment. In one implementation, if a clearinghouse is subscribed to by the payor bank, a notification of check presentment may be sent to the payor's bank based on its subscription rule, e.g., when a check associated with the payor's bank is deposited.

Alternative Embodiments of PS-PLATFORM Representment Detection

In an alternative embodiment, a dead-check repository may be employed to store records of negotiable instruments, such as checks, that have been processed by a network of financial institutions. The records, accessible when preparing to deposit, either remotely or physically, a negotiable instrument, serve as an indication to a financial institution as to whether the negotiable instrument has been previously presented. Thus, accessing the record before confirming the deposit secures deposits by preventing re-presentment of negotiable instruments.

Figure 9A:
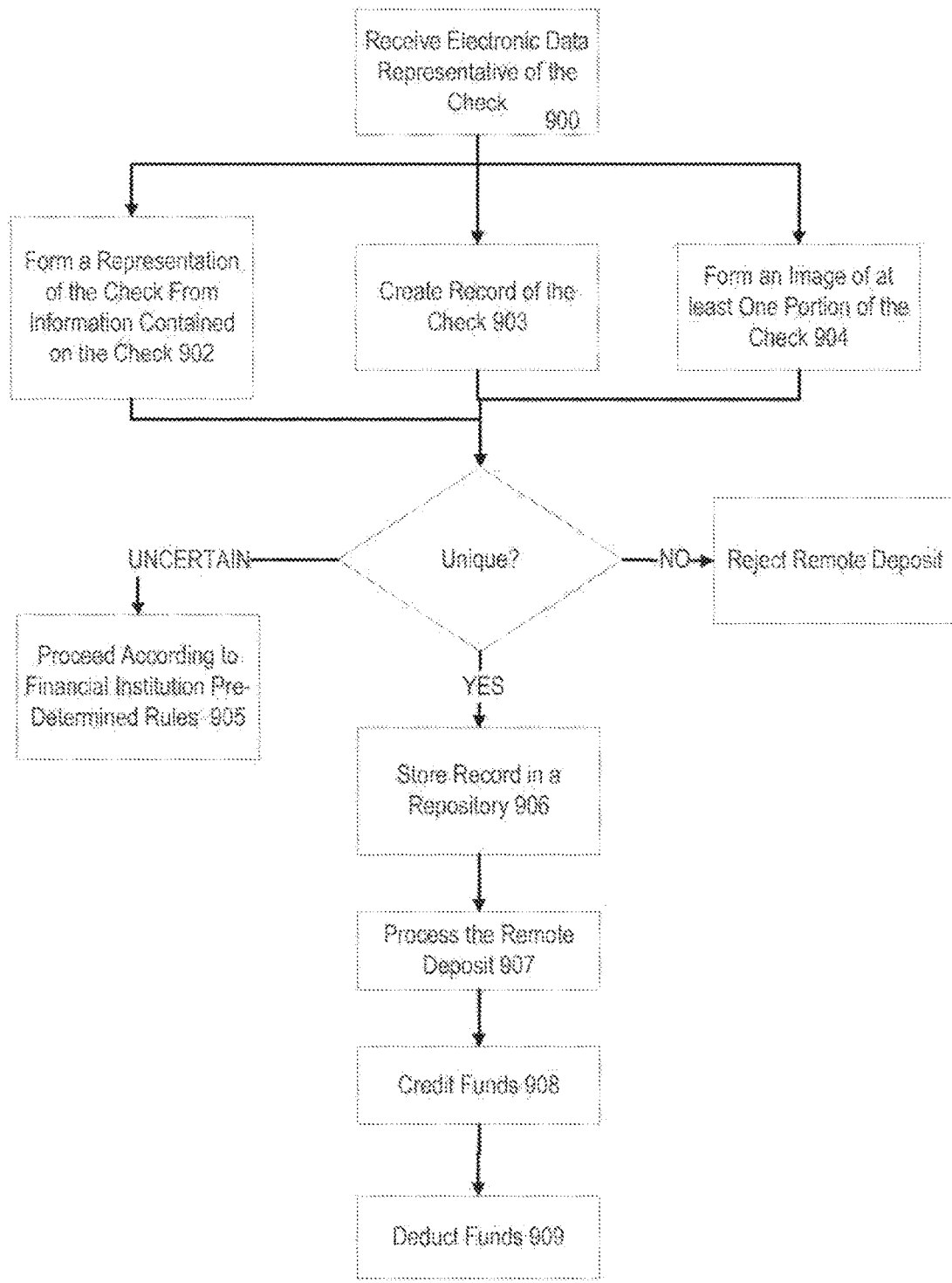
FIG. 9A provides a logic flow diagram illustrating aspects of alternative embodiments of the PS-PLATFORM.

FIG. 9A is a flow chart illustrating an example method of securing a deposit of a negotiable instrument, such as, for example, a check from payer to payee. At 900, electronic data representative of the check to be deposited, remotely or physically, is received at a financial institution. At 903, a record of the check may be created to, for example, assist in securing the remote deposit of the check by preventing re-presentment of the check. The unique front portion of the check, containing information unique to the check and available through the electronic data representative of the check, may be used to create the record.

Alternately, at 904, the record of the check may be created by financial institution and may include forming a representation of the check from information contained on the check. The representation may be an image. For example, if the electronic data representative of the check is in the form of a digital image, the digital image may be used as the record of the check. Alternatively, the representation may be a data string including one or more identifying characteristics of the check organized in a predefined order.

Alternate to 903 or 904, at 902, if the electronic data representative of the check is a digital image of the check, the record of the check may be created by financial institution and may include forming an image of one or more portions of the electronic data representative of the check. In this manner, one or more portions of the check deemed to include identifying characteristics may be used as the record of the check. If more than one portion is used to create the record, the portions may be subsequent portions, with each portion containing one or more identifying characteristics. Or the image may comprise non-subsequent portions of the check. For example, the portion of the check containing the date and check number may be placed next to the portion of the check containing the signature of the payer to form the record of the check.

Other means of creating a record of the check may be employed. Furthermore, financial institution may not be responsible for creating the record of the check and may instead provide, by way of network for example, the electronic data representative of the check to an outside source (not shown) or to another financial institution capable of creating the record. The outside source or other financial institution may create the record by forming a representation of the check from information contained on the check, by forming an image of one or more portions of the check, or by other means. The record may then be sent to financial institution through network for example.

An analysis may be performed to determine whether the record of the check, created by one of financial institution or an outside source, is unique or has already been created and stored in the repository. The analysis may include comparing the created record to a plurality of records stored in dead-check repository.

If the record of the check has not already been stored in the repository, the record may serve as an indication that the check attempted to be deposited by payee has not previously been deposited. Accordingly, financial institution may proceed with the remote deposit as desired by payee. Additionally, financial institution may perform actions to assist in subsequent record assessments used to determine if subsequent remote and/or physical deposits may be processed.

At 888, the unique record of the check is stored in dead-check repository. At 907, following the storing of the check in a dead-check repository 906, the remote deposit is processed. At 908, funds associated with the check are credited to account held with financial institution. At 909 the funds identified by the check are deducted from the account of payer, for example, account associated with the check.

If it is determined that the record of the check already exists in dead-check repository, then the remote deposit is desirably rejected and/or other predetermined actions may be taken (e.g., notify the payer, the payee, the financial institution, other financial institutions). Alternatively, the dead-check repository may detect similarities but not an exact match between the record being verified and a record stored in dead-check repository. For example, one inconsistency between the record being verified and a stored record may exist, while multiple portions of the record being verified may match the stored record. If such an inconsistency leads to an uncertainty in the unique record determination, at 905, financial institution may proceed depending upon predetermined rules developed by financial institution.

Figure 9B:
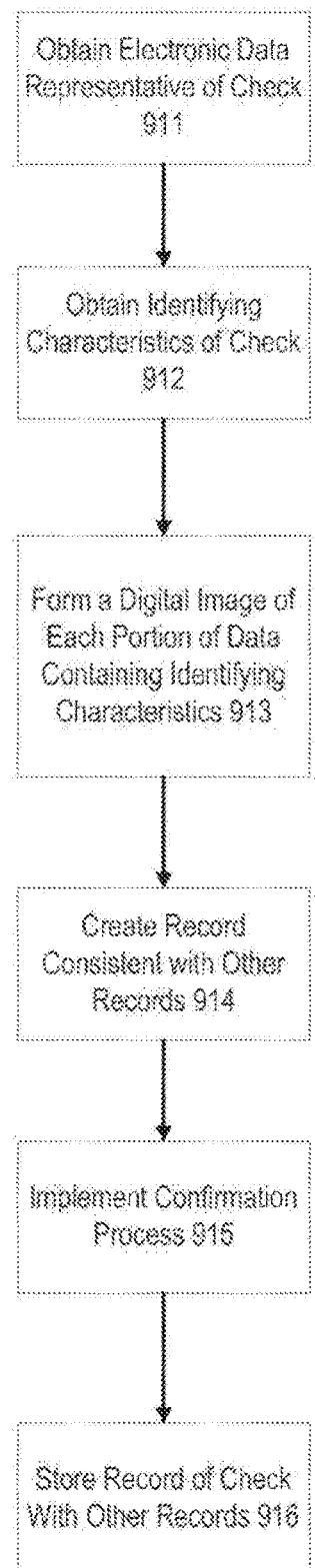
FIG. 9B provides a logic flow diagram illustrating aspects of alternative embodiments of the PS-PLATFORM.

FIG. 9B is a flow chart illustrating an example method of verifying a negotiable instrument, such as, for example, a check. At 911, electronic data representative of the check is received at, for example, one of financial institutions, for example, financial institution. The electronic data representative of the check may be received as a digital image of the check from payee or from one of financial institutions.

At 912, financial institution, upon receipt of the check, obtains identifying characteristics of the check. Several identifying characteristics may include, but are not limited to, the signature of payer, the date as indicated by payer, and the account number associated with account from which the funds identified on the check will be deducted. At 913, a digital image comprising some or all the portions of the electronic data representative of the check and/or the identifying characteristics may be formed. The digital image may be a smaller sized image than the electronic data representation of the check, for example.

At 914, a record of the check in a format consistent with the format of the records stored in dead-check repository is created. The creation of the record in a format consistent with the stored records may include, for example, forming a composite digital image comprising each digital image of each portion. Each digital image may be arranged in a predefined manner to form the composite digital image consistent with the plurality of records stored in the dead-check repository.

At 915, a confirmation process is implemented to determine if the record of the check is unique or has already been stored in the repository. As the record has been formed to be consistent with the format of the other records stored in dead-check repository, the confirmation process may include a direct comparison between the created record and the stored records. Optionally at 916, the record of the check is stored with the plurality of records currently stored in the database. If the record matches a record already stored in the repository, the record may be stored with the previously stored record to serve as an indication that the check associated with the record was presented for re-presentment, for example.

Figure 9C:
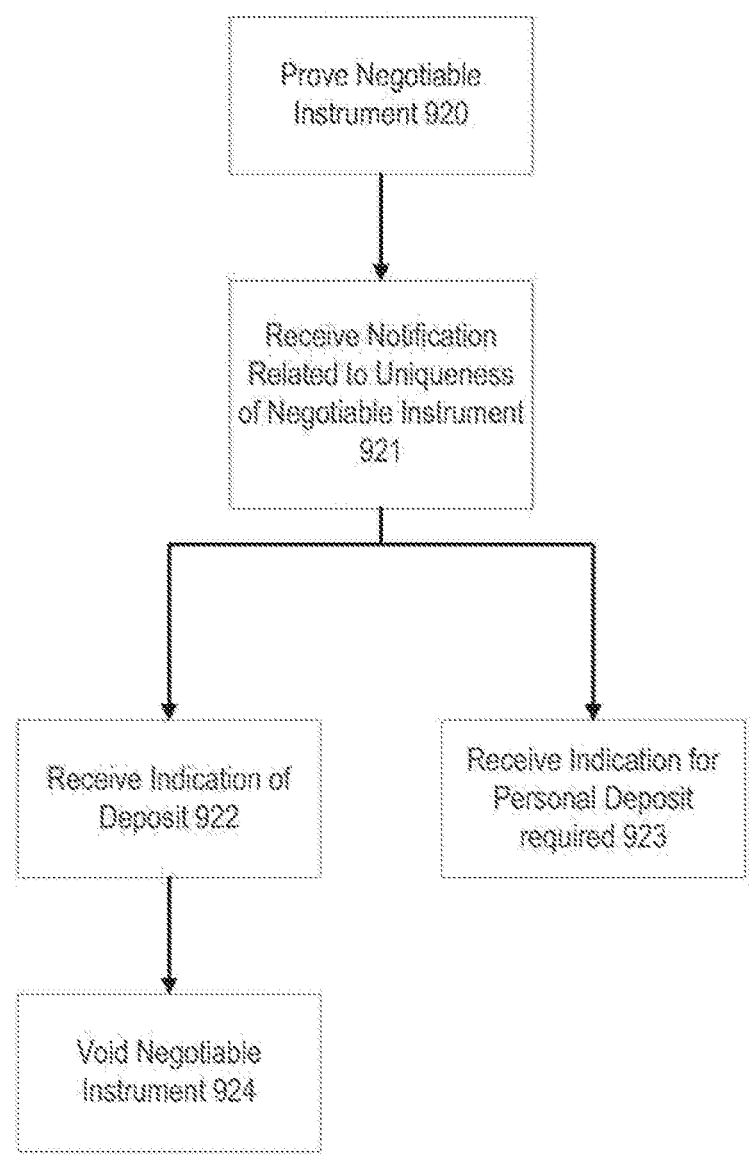
FIG. 9C provides a logic flow diagram illustrating aspects of alternative embodiments of the PS-PLATFORM.

FIG. 9C is a flow chart illustrating a method of remotely depositing a negotiable instrument. At 920, a negotiable instrument is provided by, for example, payee, to, for example, financial institution for providing funds indicated by the negotiable instrument into account. Providing the negotiable instrument may include creating a digital image of the negotiable instrument by, for example, scanning the negotiable instrument with a scanner or copy machine. The digital image may then be sent in an email attachment, for example, from the payee's or other user's remote location to financial institution.

At 921, payee is provided with a notification related to the uniqueness or verification of the negotiable instrument, based on a comparison of a record created based on the negotiable instrument and previously generated records stored in a repository, for example. The notification may be provided electronically though email or text message over network, for example. If the notification is that the negotiable instrument is unique or does not already exist in the repository, then at 922, payee receives indication that the appropriate funds have been deposited into account owned by payee. If, on the other hand, the notification indicates that the negotiable instrument is not unique or already exists in the repository, at 923 payee receives an indication and e.g., a notification to visit or otherwise contact financial institution 120*a* in order to attempt to deposit the negotiable instrument.

At 924, payee may be required by, for example financial institution, to void the negotiable instrument. This may include sending a copy of the negotiable instrument to financial institution or to an entity as indicated by financial institution. Payee may be required to perform the void process within a predetermined period of time.

Alternative Embodiments of PS-PLATFORM: Voiding a Check

When a negotiable instrument is deposited using electronic means, there may arise the situation when the physical negotiable instrument "transforms" to exist in essentially two forms: the original physical negotiable instrument and the newly generated digital form. While the newly generated digital form may undergo processing through the federal check clearinghouse, the physical form is typically left in possession of the bearer of the negotiable instrument, e.g., the person that deposited the check. Although a financial institution may send instructions to the depositor to destroy or transfer possession of the physical negotiable instrument upon transmission of the digital form, the financial institution may have little to no way to force the depositor to actually destroy the negotiable instrument without limiting access to the funds. Unless the depositor destroys the negotiable instrument, the duality described above may continue to propagate, i.e., both the physical negotiable instrument and the digital form may continue to exist contemporaneously.

Thus, a financial institution may wish to cause the alteration of the physical negotiable instrument with or without the assistance of the depositor to render the physical form of the negotiable instrument non-negotiable. In other words, the financial institution may cause the alteration of the appearance of the physical negotiable instrument to a point that makes it difficult or impossible to present the physical negotiable instrument in another transaction, thus effectively destroying the negotiable instrument, with or without the participation of the depositor. For example, the appearance of the negotiable instrument may be changed to show the term, "VOID". Thus, if the negotiable instrument is presented again, the term may indicate that the holder negotiable instrument has previously deposited or attempted to deposit the negotiable instrument. The negotiable instrument may be altered in other ways and is not limited to the term used above.

Figure 10A:
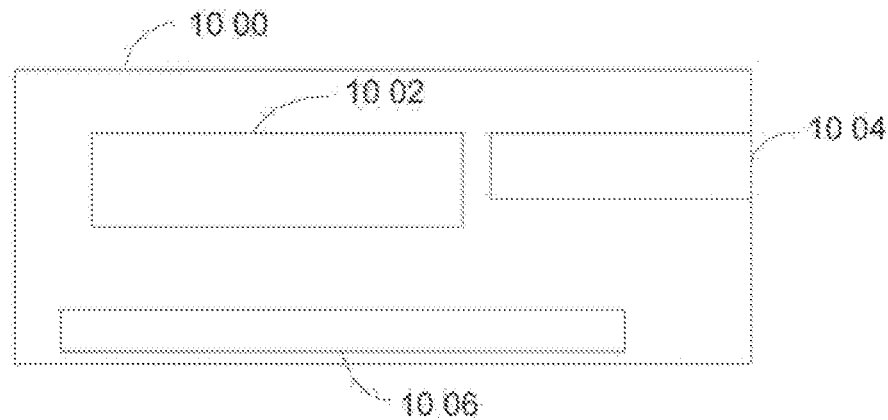
FIG. 10A provides a diagram illustrating aspects of alternative embodiments of voiding a check of the PS-PLATFORM.
Figure 10A:
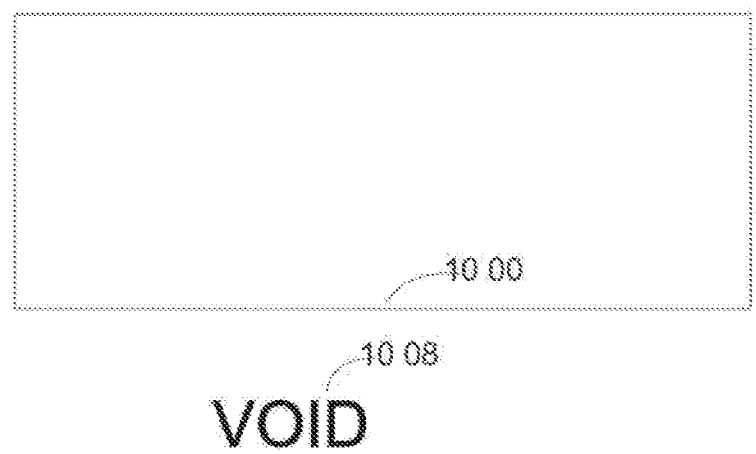
Figure 10A:
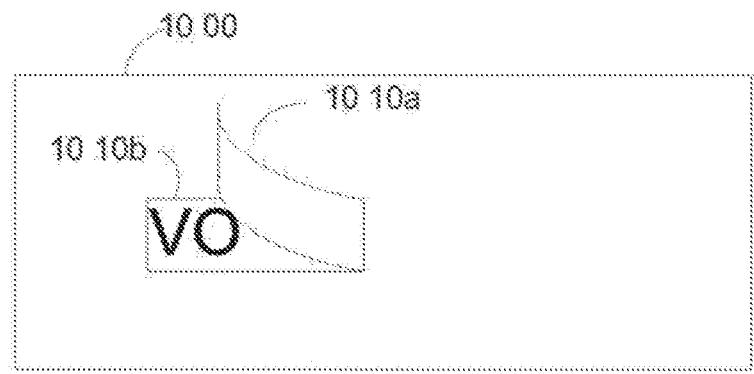

FIG. 10A is illustrative of the modification of a negotiable instrument. Shown in FIG. 10A is check 1000 having redemption amount section 1004, which indicates the amount of funds to be deposited into an account, and magnetic ink character recognition (MICR) section 1006. The MICR section typically includes account information of the negotiable instrument, namely the routing number of the bank that holds the account and the account number the negotiable instrument is to be drawn against, e.g., the bank and the account from which the funds are to be withdrawn. The MICR information is typically printed using a magnetic ink or toner containing iron oxide. In a deposit process, the image of check 1000 may be a first electronic data of the check as well as other information, such as sections 1006 or 1004, which may be second electronic data.

In one embodiment, check 1000 also has unmodified modifiable section 1002. Unmodified modifiable section 1002 may use various types of modifiable inks or other mechanisms so that when a stimulus is applied to unmodified modifiable section 1002, the ink or mechanism changes in appearance or structure to indicate a deposit process may have occurred. The change may be permanent or temporary. There are various types of ink that may be used, the present disclosure not being limited to any one particular type. Some examples of modifiable inks are inks sensitive to light, heat or sound. An ink that is sensitive to light may be configured to modify based upon exposure to a certain magnitude of light for a certain period of time. For example, a light sensitive ink may change its appearance based upon a bright light, such as a light from a scanner, being applied for a long period of time. The time may be determined based upon various scan speeds of a typical scanner. For example, the scan speed of a scanner at a high resolution may be slower than the scan speed of a scanner at a low resolution.

If the ink is sensitive to heat, the ink may be configured to modify its appearance based upon the heat generated by the application of a bright light source, such as one that may be found in a scanner. If the light source is applied for a long period of time, the ink may be configured such that the heat generated by the absorption of the light by the ink will create a certain amount of heat within the ink, thus causing the change in the ink. Unmodified modifiable section 1002 may also have a mechanism sensitive to other types of stimuli, such as a radio frequency identification (RFID) tag. When the RFID tag receives a particular radio signal, the RFID tag may be modified. When the RFID tag is read at a later time, the modification may indicate that the deposit of the negotiable instrument may have occurred. The RFID tag may also, among other uses, be used to track the location of check 1000.

In an alternative embodiment, check 1000 has modified modifiable section 1008, which was unmodified modifiable section 1002. After the application of a stimulus to unmodified modifiable section 1002, the ink or mechanism within unmodified modifiable section 1002 may be changed to show modified modifiable section 1008. Check 1000 now shows the term, "VOID" within modified modifiable section 1008. The change may be used to provide information to prevent a second or subsequent presentment of check 1000 for deposit.

In an alternative embodiment, an ink sensitive to various stimuli that modifies after removal of a protective cover may be employed. Check 1000 has removable coating 1010*a* which seals modifiable ink section 1010*b* from exposure to stimuli. The stimuli may be of various types, including, but not limited to, air or light. For example, prior to deposit of the negotiable instrument, there may be a requirement to remove coating 1010*a* to indicate the underlying code, which is shown as "VO". Upon removal of coating 101*oa*, ink section 1010*b* is exposed to light, causing the ink to modify to show "VO". Thus, coating 1010*a* may be of a range of materials that blocks the exposure of section 1010*b* to a stimulus.

Once exposed, ink section 1010*b* may be permanently or temporarily modified. Ink section 1010*b* indicia may also be encoded to increase the difficulty of defeating the void process. For example, ink section 1010*b* may be a bar code unique to check 1000 itself and may be designed in a manner that is difficult to determine what the bar code will be. In order to deposit check 1000, coating 1010*a* may be removed to show the encoded indicia. If the indicia is encoded, the user may be forced to remove coating 1010*a* because of the difficulty of determining the code without exposing the indicia by removing coating 1010*a*.

Figure 10B:
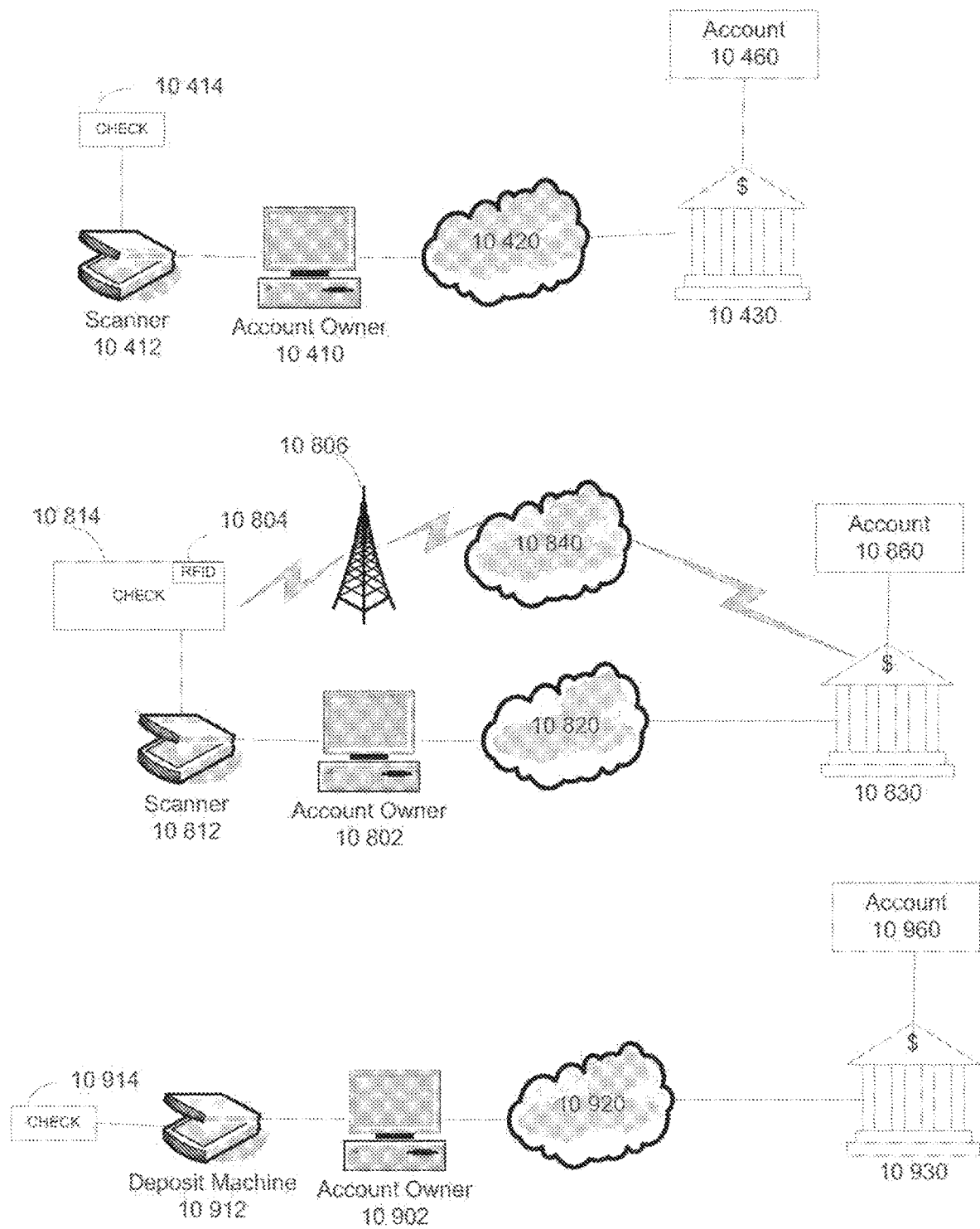
FIG. 10B provides a diagram illustrating aspects of alternative embodiments of voiding a check of the PS-PLATFORM.

FIG. 10B illustrate example systems to deposit a check into an account within embodiments of PS-PLATFORM. In one exemplary and non-limiting embodiment, account owner 10410 has account 10460 with bank 10430. Account owner 10410 opens a communication pathway with bank 10430 via Internet connection 10420 to send a deposit request to deposit check 10414 into account 10460. Account owner 10410 scans at least one surface of check 10414 using scanner 10412. Scanner 10412 creates a digital image of the surface of check 10414 that was scanned and saves that digital image as a digital image file. The digital image file may also contain other information about check 10414, including MICR information, account information, or deposit amount. Account owner 10410 transmits the digital image file to bank 10430, which processes the deposit.

After the deposit is processed, bank 10430 may wish to prevent the use of check 10414 in another deposit operation. In one exemplary and non-limiting embodiment, bank 10430 may cause the modification of check 10414 to prevent a subsequent presentment of check 10414. Bank 10430 may send a communication to account owner 10410 to void the check. The communication may be directed at scanner 10412 with or without the knowledge of account owner 10410. In other words, bank 10430 may not complete the deposit operation if account owner 10410 intercedes in the void operation. Bank 10430 may send a signal to scanner 10412 to scan a surface of check 10414 at a speed to cause the modification of an ink section on check 10414, as described above. Once the scan operation is completed, bank 10430 may wait to complete the deposit operation until a communication or notice is received that check 10414 was voided. The notice may include the slow scanned image showing the modification of check 10414.

In an alternative embodiment, a user receives 10500 a check from another individual, for example, if the user is owed money or the check is used as payment for a good or service. The user endorses 10502 the check by signing the check, thus indicating the intent to deposit the check into an account. The user generates 10504 a digital image file by scanning at least one surface of the check using a scanner. The user sends 10506 the digital image file to the bank which controls the user's account. After processing the deposit request, a communication is generated and transmitted to void 10508 the check. The communication may be directed to the user and/or may be directed to another mechanism. For example, the communication may be directed to the user's scanner with or without the knowledge of the user. The communication may contain instructions to re-scan the check at a certain speed to cause the application of a stimulus to modify the check.

In an alternative embodiment, the bank receives 10600 a deposit request from a user. After acknowledging the deposit request, the bank then receives 10602 a digital image of the check. The digital image may be used by the bank to process the deposit request. The digital image may be used alone or in conjunction with additional information such as MICR information. After verifying 10604 the digital information, the bank processes 10606 the deposit request. The verification may include, but is not limited to, the verification of the quality of the digital image, the verification of any data retrieved from the digital image, the verification of additional information received along with the digital image, and/or the verification that the check has not been deposited before. After the bank verifies 10604 the digital information received and processes 10606 the deposit request, the bank then may transmit 10608 a void signal to void the check. As described earlier, there may be various manners m which to void the check, including, but not limited to, the application of a stimulus such as light, heat or sound. Upon application of the stimulus, the check is voided 10610.

In an alternative embodiment, a scanner is used to apply the stimulus. A bank receives 10700 a deposit request. The bank then receives 10702 a digital image of the check and account information. The bank verifies 704 the information and processes 10706 the deposit request. After the deposit is in process, to complete the process, the bank transmits 10708 a void signal to the user's scanner. The void signal may contain instructions to rescan a surface of the check at a certain speed to cause the application of a stimulus. The ink may be modified based upon the application of a certain magnitude or brightness of light, or heat may be generated by that brightness of light, for a certain amount of time, which may correspond to a scan speed. After the stimulus is applied, the bank deposits 10710 the funds into the user's account.

The present disclosure may incorporate a check modifiable by various stimuli. In an alternative embodiment, a system may use radio waves to modify a check. Check 10814 has embedded RFID tag 10804. RFID tag 10804 is an object that is sensitive to radio signals and can be incorporated into check 10814. RFID tag 10804 can be read and modified at various distances. Typically, an RFID tag, such as RFID tag 10804, has two parts: an integrated circuit for storing and processing information as well as receiving instructions via radio waves and an antenna for receiving and transmitting a signal. Some RFID tags do not have the integrated circuit, thus reducing cost and bulk of using an RFID tag.

The RFID tag may be programmed to initially indicate that check 10814 has not been deposited. Account owner 10802 may use scanner 10812 to deposit check 10814 into account 10860 of bank 10830 using communication pathway 10820. After check 10814 is deposited into account 10860, bank 10830 may wish to modify RFID tag 10804 to indicate that check 10814 has been deposited. Thus, when the information contained by RFID tag 10804 is subsequently read, RFID tag 10804 may indicate that check 10814 has previously been deposited. Bank 10830 may cause radio transmitter 10806 to transmit a radio communication, through communication connection 10840, to RFID tag 10804 of check 10814. The radio signal may cause RFID tag 10804 to modify its information to indicate that check 10814 has been previously deposited. Communication connection 10840 may be of various types, including, but not limited to, a wireless cellular connection or an internet connection. Additionally, radio transmitter 10806 may be of various types, including, but not limited to, a local internet access point and a cellular transceiver.

The type of scanner used may also be of various types. In an alternative embodiment, a scanner designed for the deposit and voiding of checks through remote means may be employed. Deposit machine 10912 is configured to provide deposit services. Deposit machine 10912 may be an integrated machine or a system having various parts, including a scanner to create a digital image of a check, such as check 10914 and a stimulus generator to cause the application of a stimulus to check 10914. Account owner 10902 initiates deposit machine 10912 to generate a digital image of check 10914, the image being transmitted to bank 10930 via communication connection 10920 for deposit into account 10960. After the bank processes the deposit of check 10914, bank 10930 may transmit a void signal to deposit machine 10912 to initiate a void process.

Figure 11A:
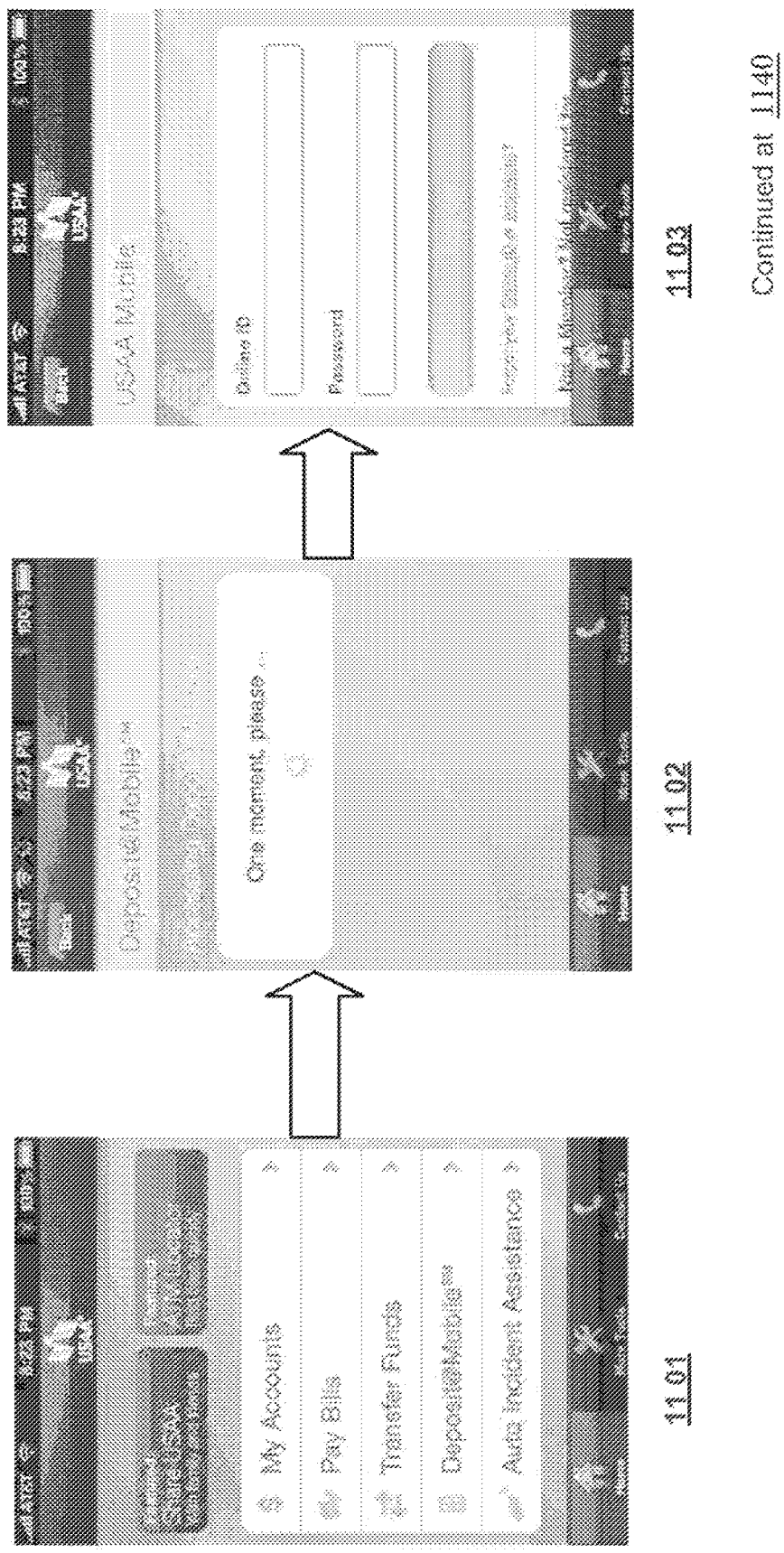
FIG. 11A provides provide a flow diagram of example screen shots of user interfaces illustrating aspects of remote deposit via a mobile device within one embodiment of the PS-PLATFORM.

The void signal may be transmitted using various communication methods, including, but not limited to, an internet connection, a telephone connection such as a wireless telephone, or a facsimile transmission if deposit machine 10912 is configured to receive facsimile messages. Deposit machine 10912 may void check 10914 according to the configuration of deposit machine 10912 and/or the void message received. For example, deposit machine 10912 may be configured to apply an ultraviolet light in response to a void signal. Deposit machine 10912 may also be configured to rescan check 10914 and send the rescanned digital image to bank 10930 to show that the void stimulus has been applied and that check 10914 has been voided PS-PLATFORM Example User Interfaces FIGS. 11A-H provide a flow diagram of example screen shots of user interfaces illustrating aspects of remote deposit via a mobile device within one embodiment of the PS-PLATFORM. As shown in FIG. 11A, in one embodiment, a user operating a mobile device (e.g., an Apple iPhone, etc.), may select to access PS-PLATFORM feature from the mobile device menu 1101, and the mobile device may then send to deposit request to a remote PS-PLATFORM server to establish a secured communications connection between the user device and the server 1102. Upon establishing the connection, the PS-PLATFORM may prompt the user to login to the PS-PLATFORM system via a login page 1103.

Figure 11B:
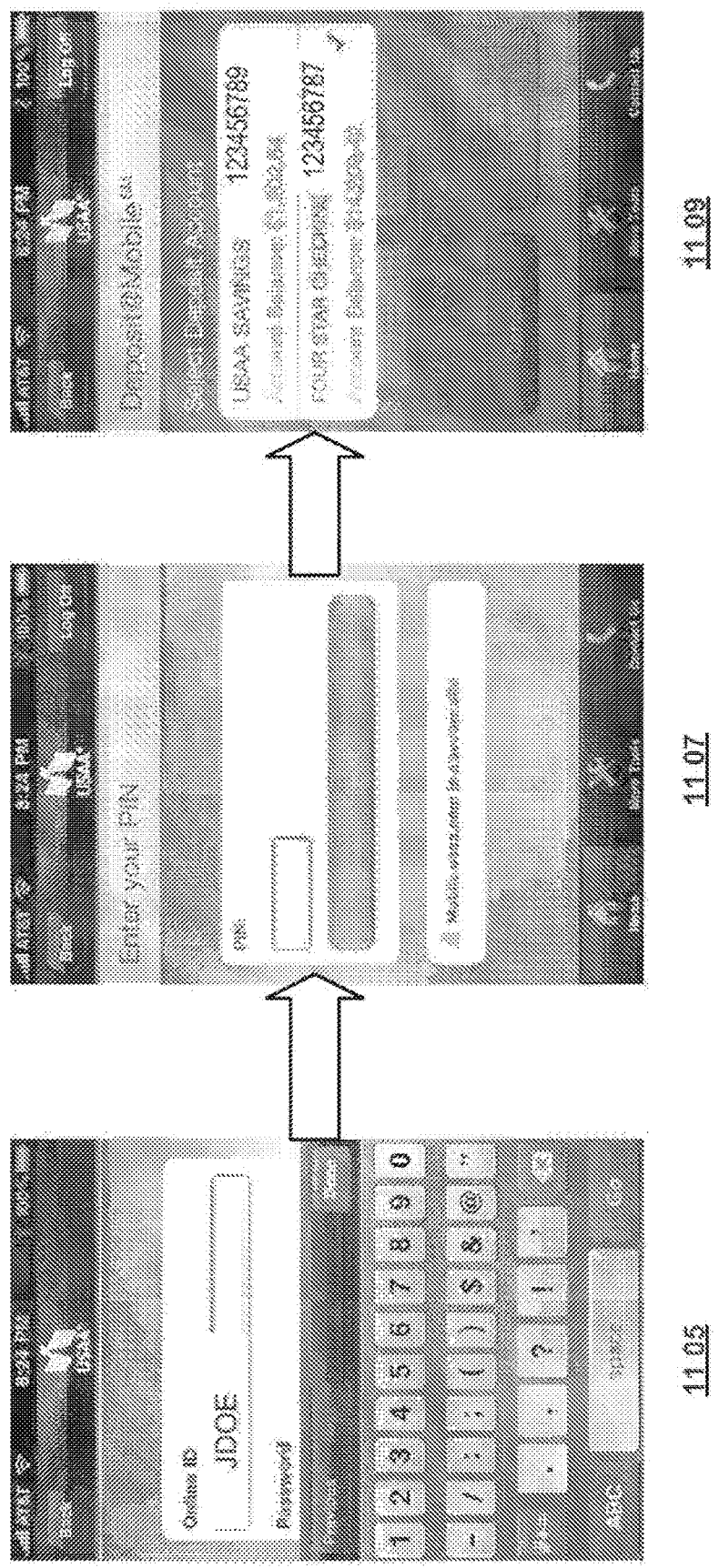
FIG. 11B provides a flow diagram of example screen shots of user interfaces illustrating aspects of remote deposit via a mobile device within one embodiment of the PS-PLATFORM.
Figure 11C:
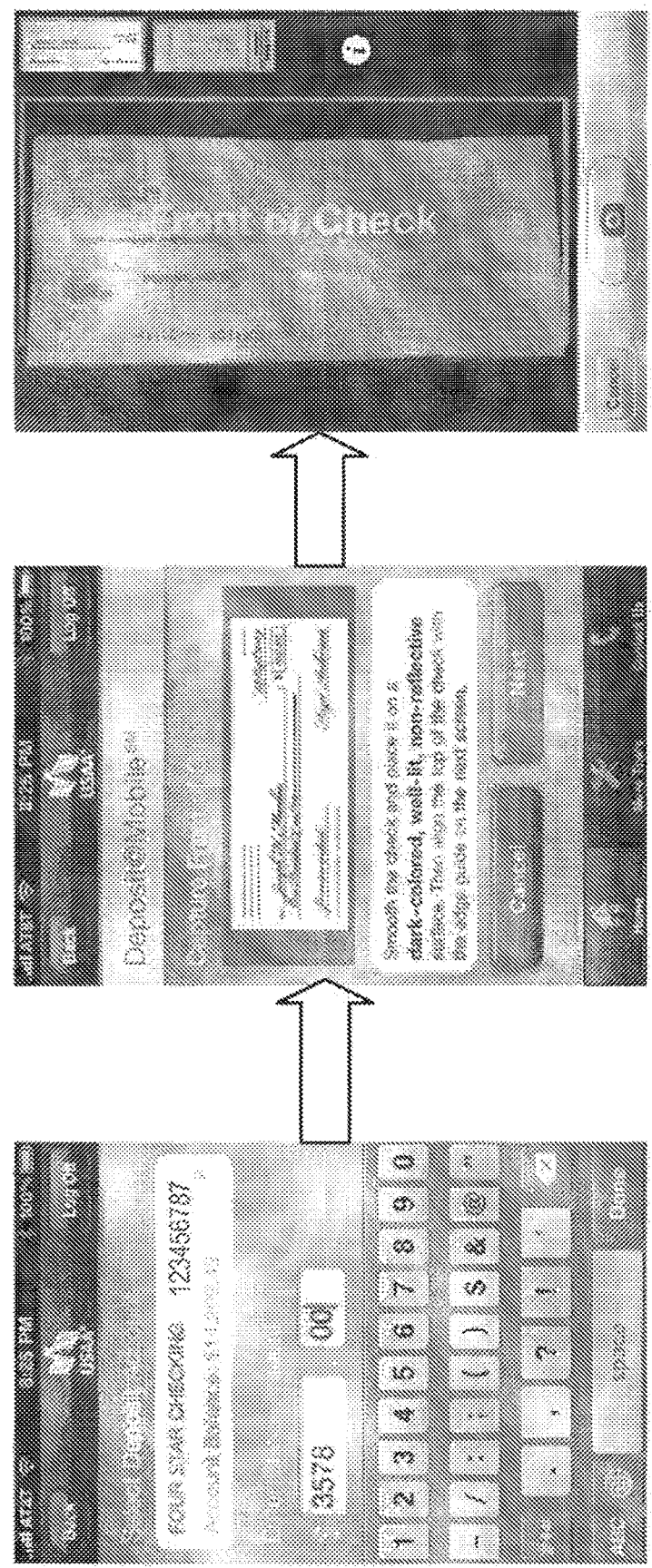
FIG. 11C provides a flow diagram of example screen shots of user interfaces illustrating aspects of remote deposit via a mobile device within one embodiment of the PS-PLATFORM.
Figure 11D:
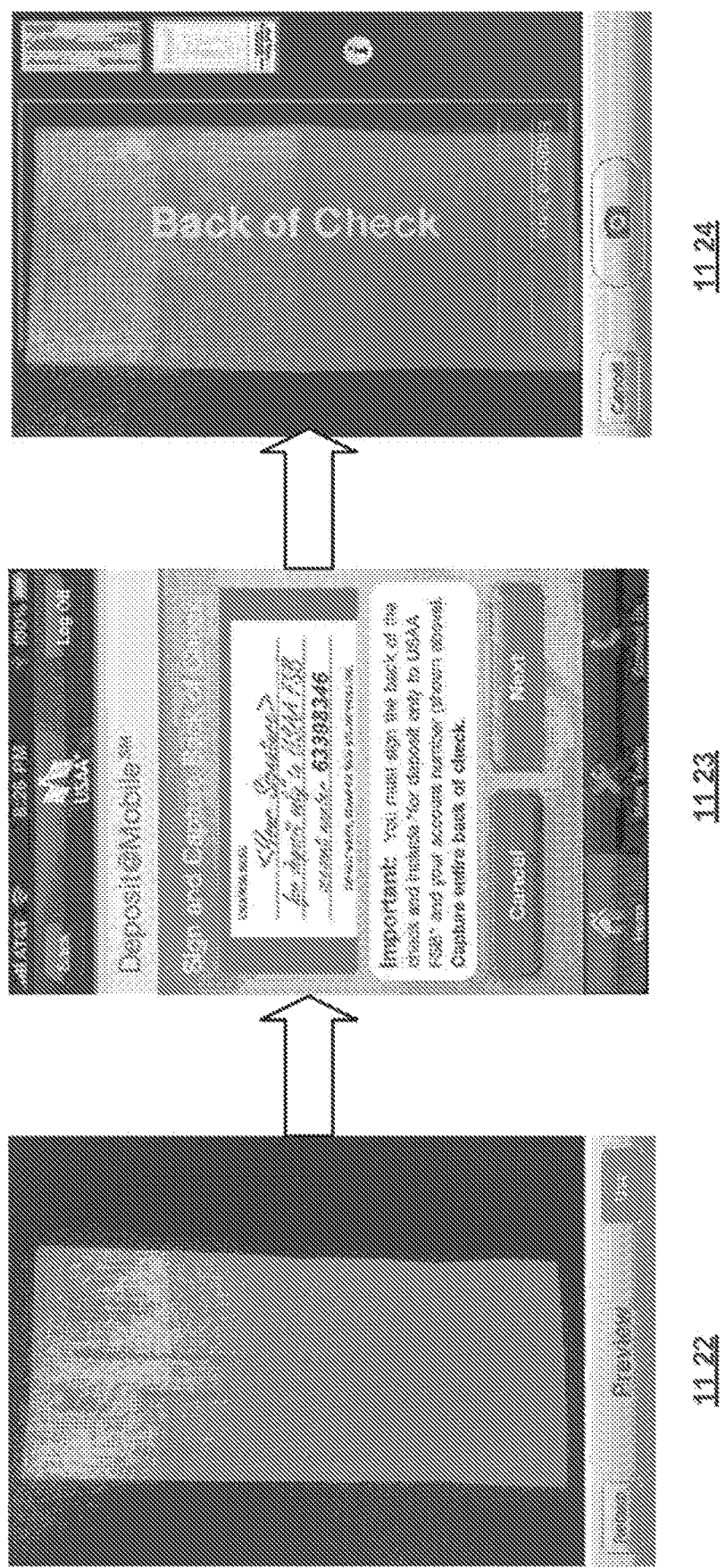
FIG. 11D provides a flow diagram of example screen shots of user interfaces illustrating aspects of remote deposit via a mobile device within one embodiment of the PS-PLATFORM.

In one embodiment, as shown in FIG. 11B, the user may type the "Online ID" 1105 and the "PIN" 1107 via the user interface. Upon authentication, the PS-PLATFORM may display a list of available accounts associated with the user 1109, and the user may select to deposit into the account "Four Star Checking" 1115. As shown in FIG. 11C, upon selection, the user may enter a deposit amount $3578.00. In one implementation, the PS-PLATFORM may request the user "capture front of check" and provide specific instructions 1118. For example, in one implementation, the PS-PLATFORM may request the user to smooth the check and place it on a dark-colored, well-lit and non-reflective surface. 1120 shows the user may place the check in front of the built-in camera of the mobile device to fit in the indicated area displayed on screen. Upon taking a picture of front side of the check 1122, the PS-PLATFORM may instruct the user to sign and capture back of the check in a similar manner 1123-1124.

Figure 11E:
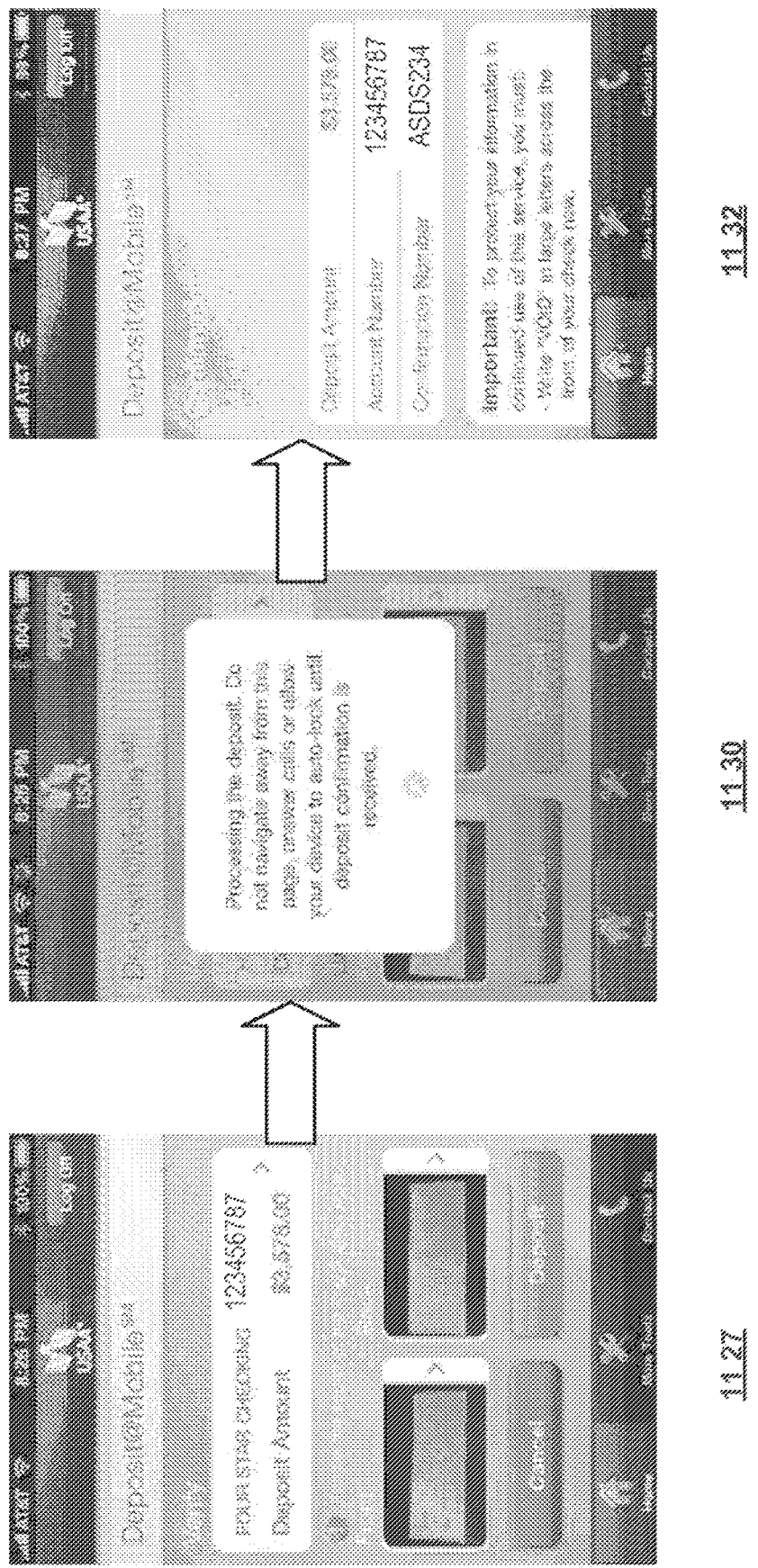
FIG. 11E provides a flow diagram of example screen shots of user interfaces illustrating aspects of remote deposit via a mobile device within one embodiment of the PS-PLATFORM.

In one embodiment, as shown in FIG. 11E, the PS-PLATFORM may present the captured images of the check (both front and back sides) to the user for confirmation 1127, and then process the deposit 1130. In one implementation, the PS-PLATFORM may send a notice of successful deposit to the user 1132 showing deposit amount, account number and a confirmation number.

Figure 11F:
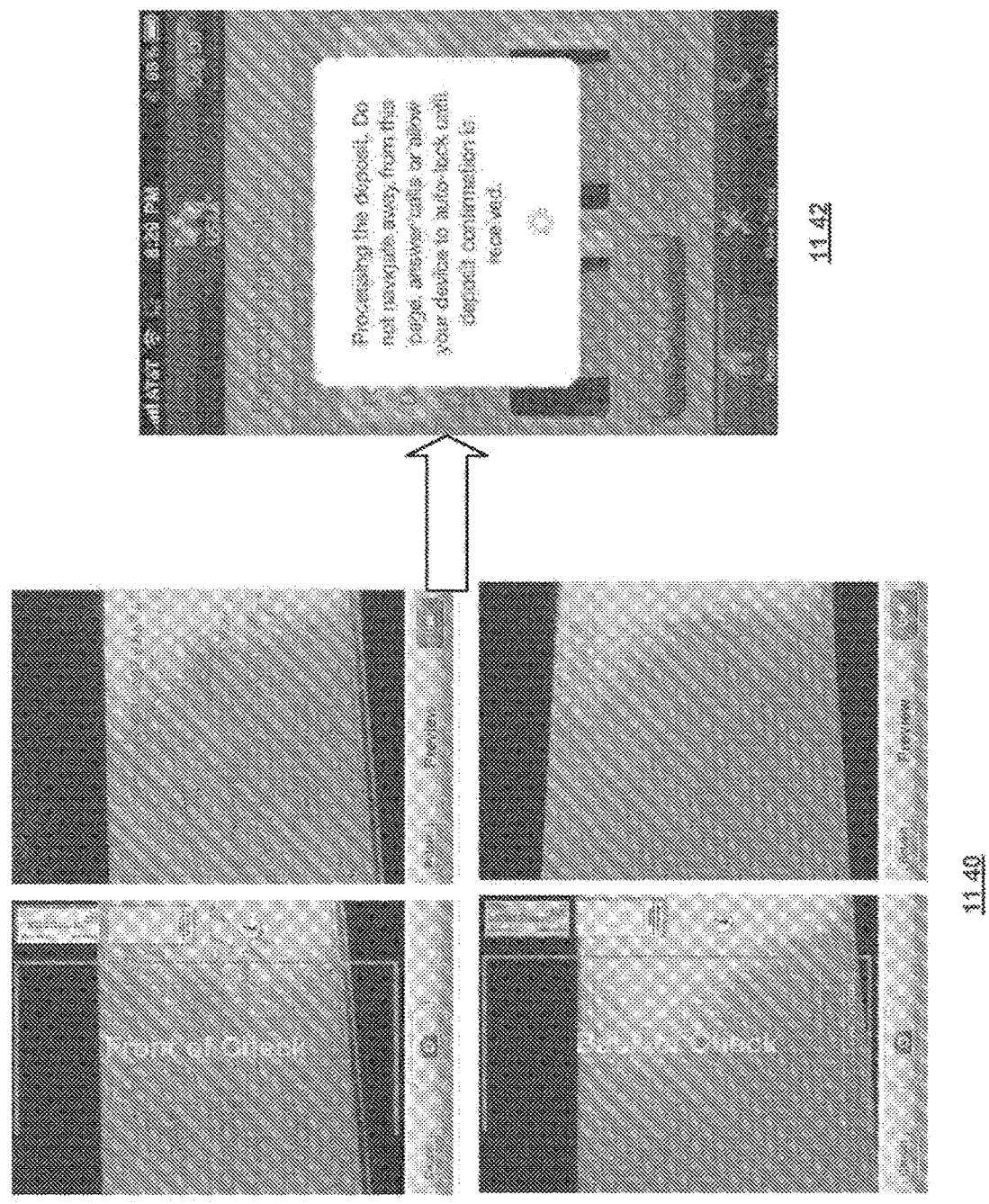
FIG. 11F provides a flow diagram of example screen shots of user interfaces illustrating aspects of remote deposit via a mobile device within one embodiment of the PS-PLATFORM.
Figure 11G:
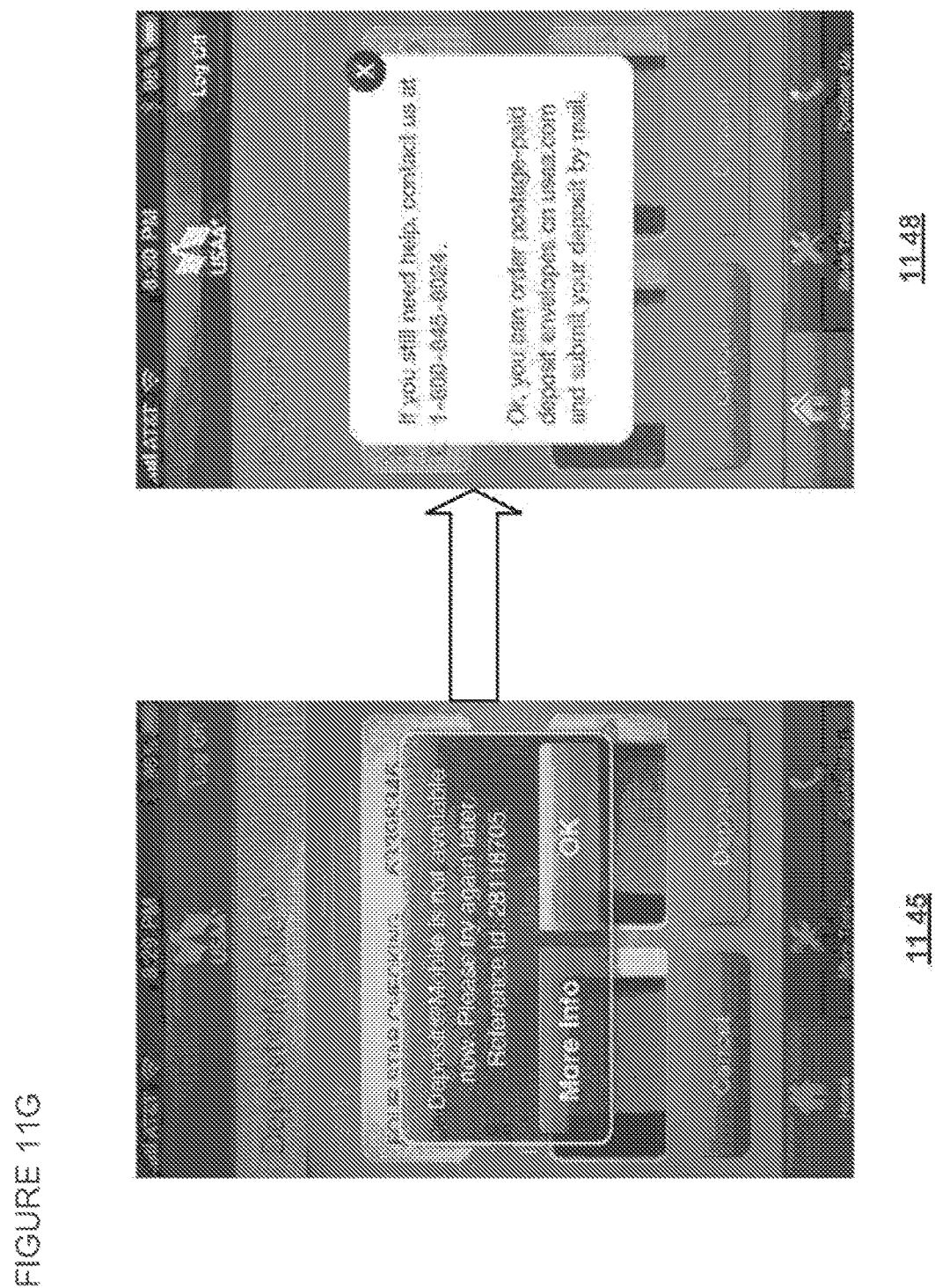
FIG. 11G provides a flow diagram of example screen shots of user interfaces illustrating aspects of remote deposit via a mobile device within one embodiment of the PS-PLATFORM.

In one embodiment, as shown in FIGS. 11F-G, if the images of the checks are not properly taken, e.g., the check is misaligned and the resulting images are incomplete 1140, submission of such unusable check images 1142 may lead to error messages. In one implementation, as shown in FIG. 11G, the PS-PLATFORM may inform the user the deposit cannot be performed 1145 and provide additional information 1148 such as a customer assistance phone number. In an alternative implementation, the PS-PLATFORM may request the user to re-take and re-submit images of the check.

FIG. 11H illustrates aspects of submitting a ripped paper check for verification after deposit in one embodiment of the PS-PLATFORM. As shown in FIG. 11H, a depositor may capture and submit an image of a check 1150, and after deposit the depositor may submit an image of ripped check to verify that the check has been voided 1155.

Figure 12A:
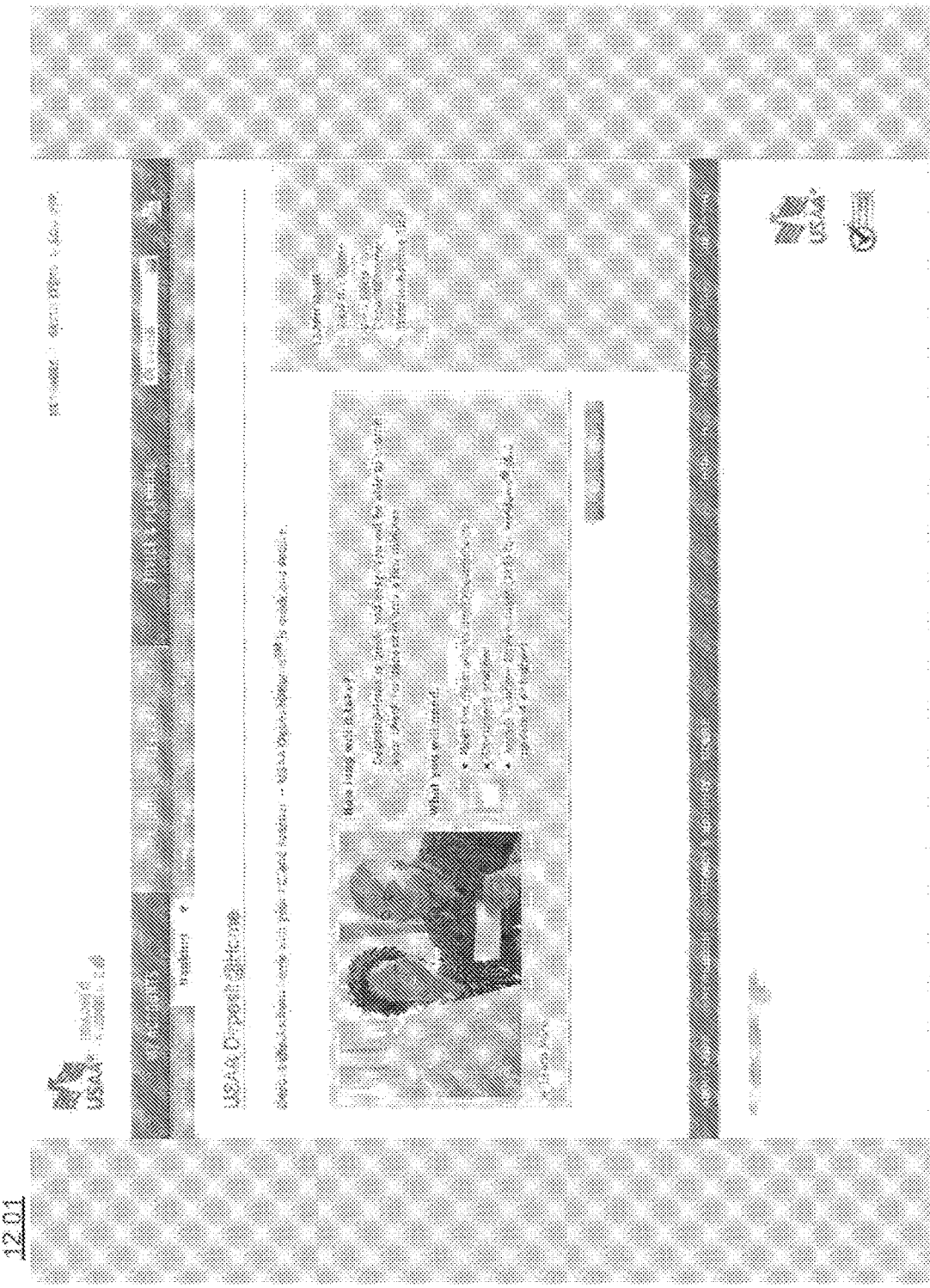
FIG. 12A provides an example screen shot of user interfaces illustrating aspects of remote deposit via a personal computer within one embodiment of the PS-PLATFORM.
Figure 12B:
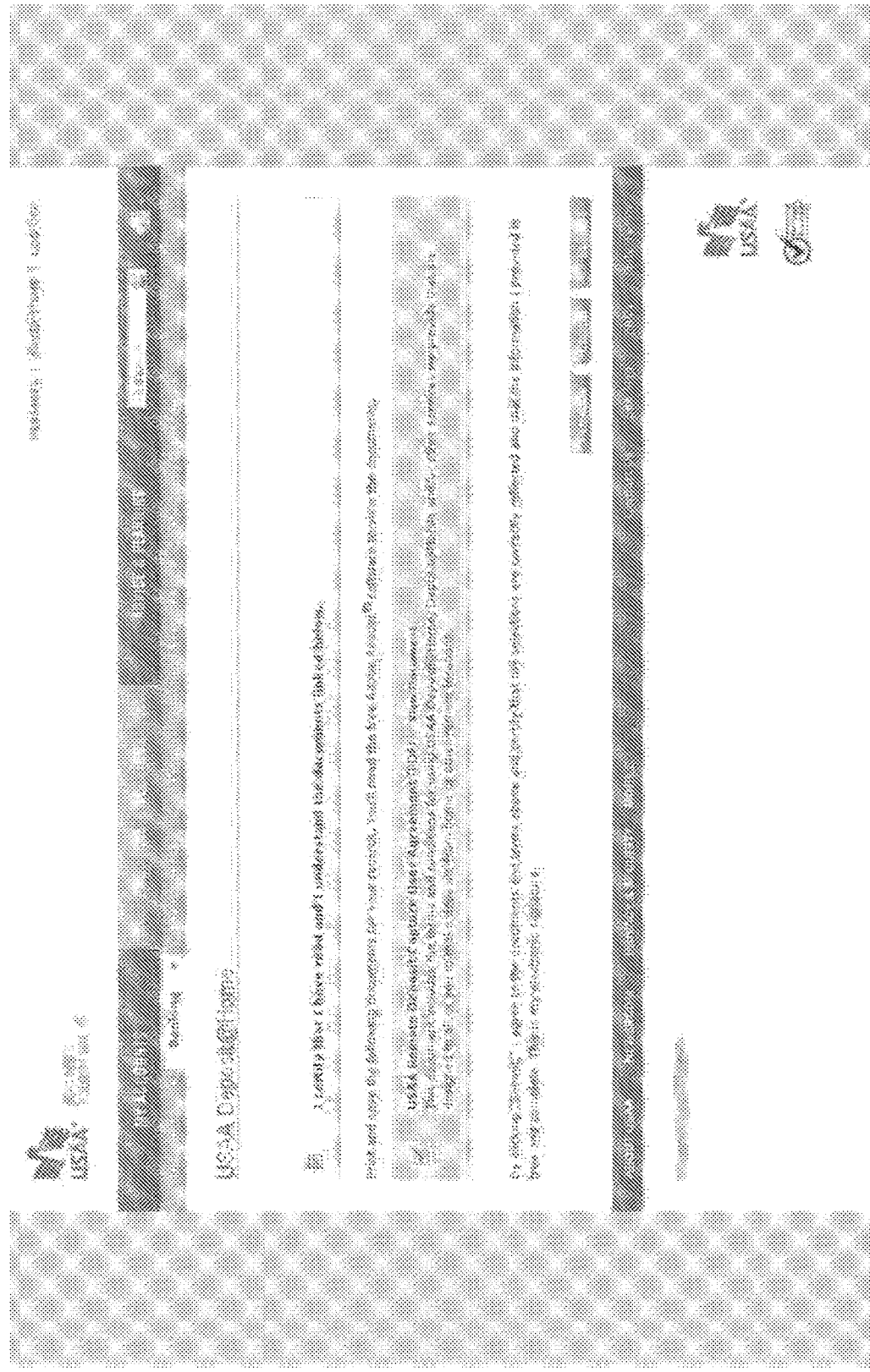
FIG. 12B provides another example screen shot of user interfaces illustrating aspects of remote deposit via a personal computer within one embodiment of the PS-PLATFORM.
Figure 12C:
FIG. 12C provides another example screen shot of user interfaces illustrating aspects of remote deposit via a personal computer within one embodiment of the PS-PLATFORM.
Figure 12D:
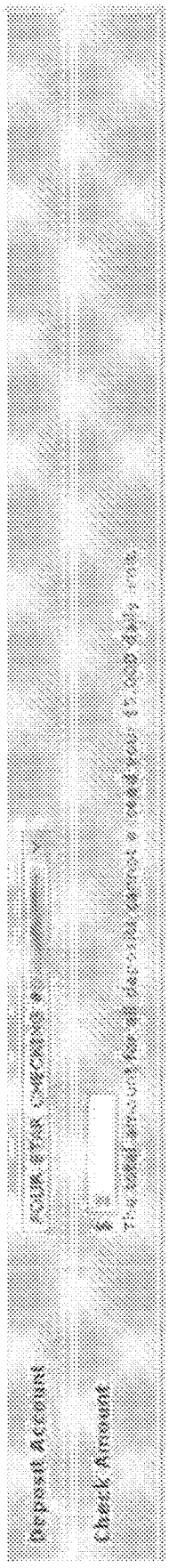
FIG. 12D provides another example screen shot of user interfaces illustrating aspects of remote deposit via a personal computer within one embodiment of the PS-PLATFORM.
Figure 12E:
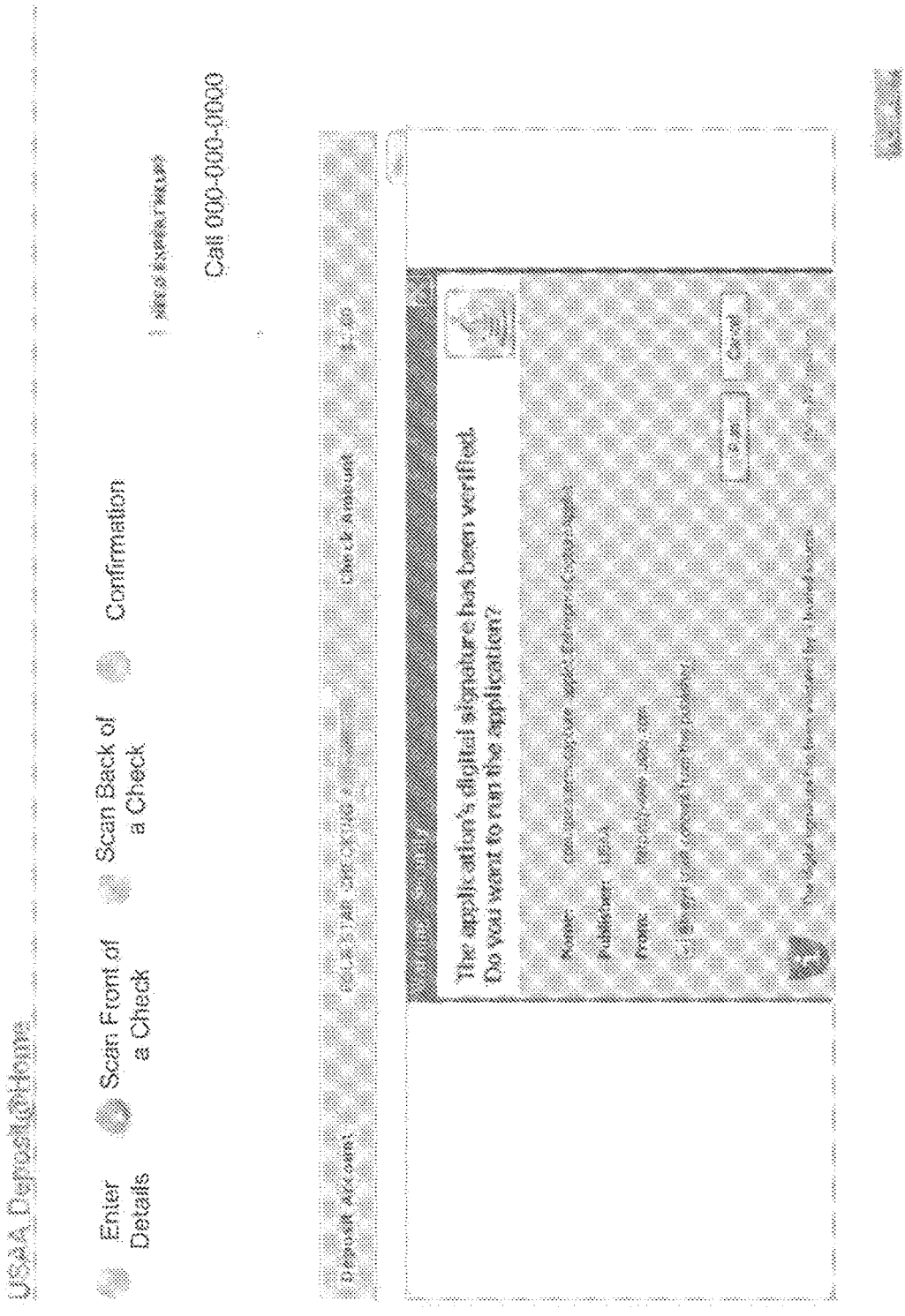
FIG. 12E provides another example screen shot of user interfaces illustrating aspects of remote deposit via a personal computer within one embodiment of the PS-PLATFORM.
Figure 12F:
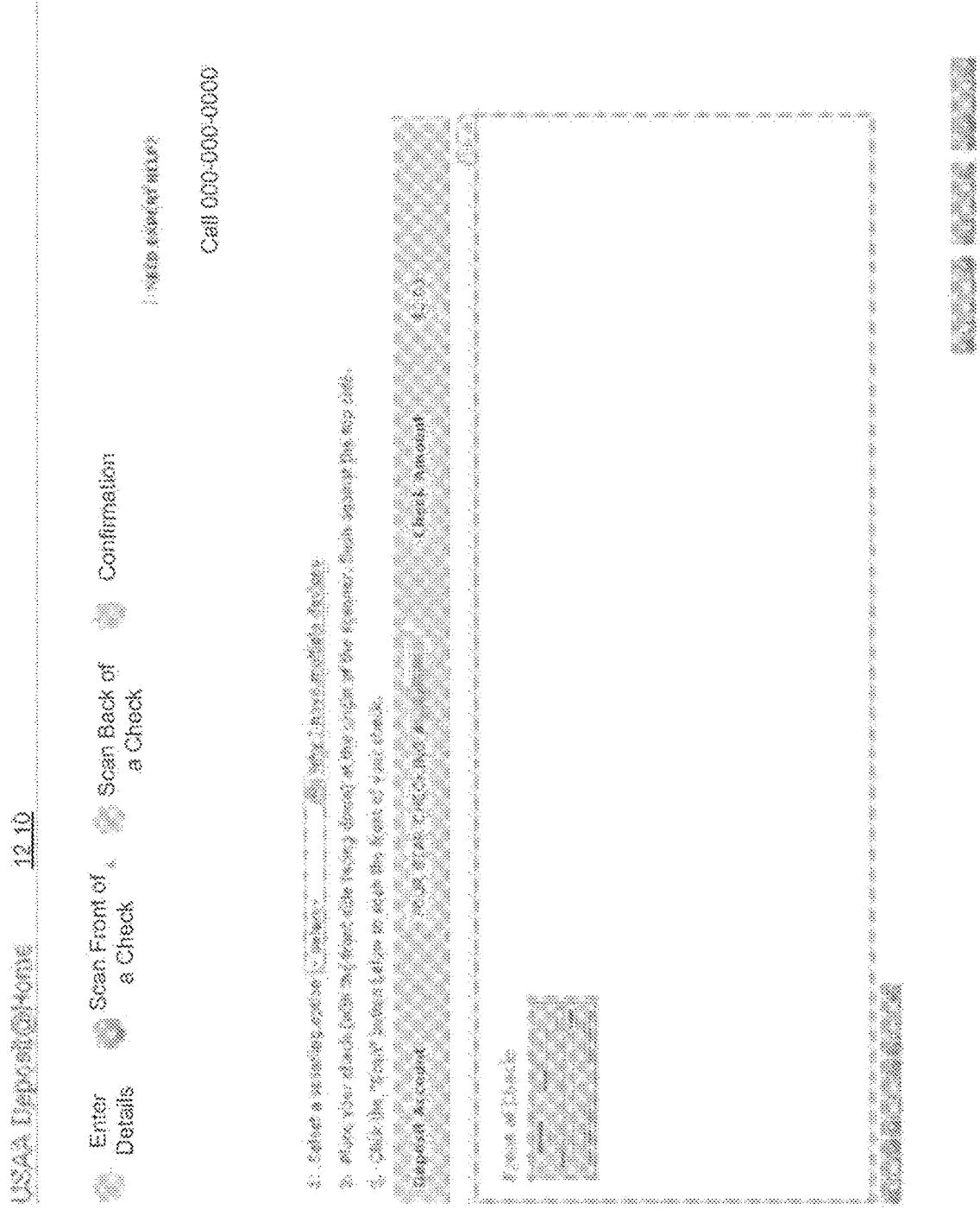
FIG. 12F provides another example screen shot of user interfaces illustrating aspects of remote deposit via a personal computer within one embodiment of the PS-PLATFORM.
Figure 12H:
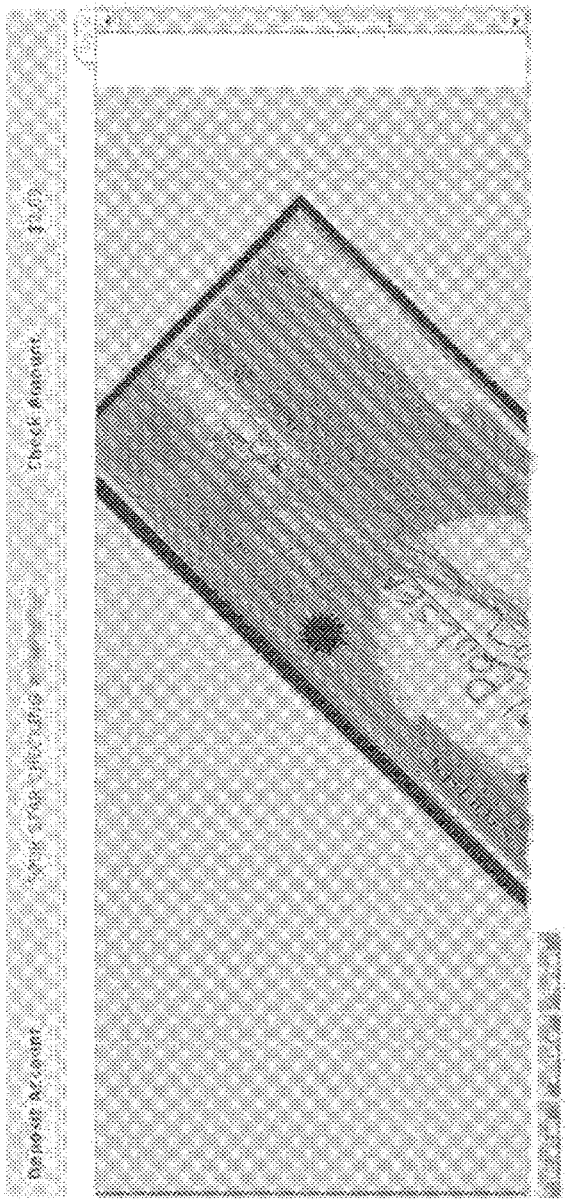
FIG. 12H provides another example screen shot of user interfaces illustrating aspects of remote deposit via a personal computer within one embodiment of the PS-PLATFORM.
Figure 12I:
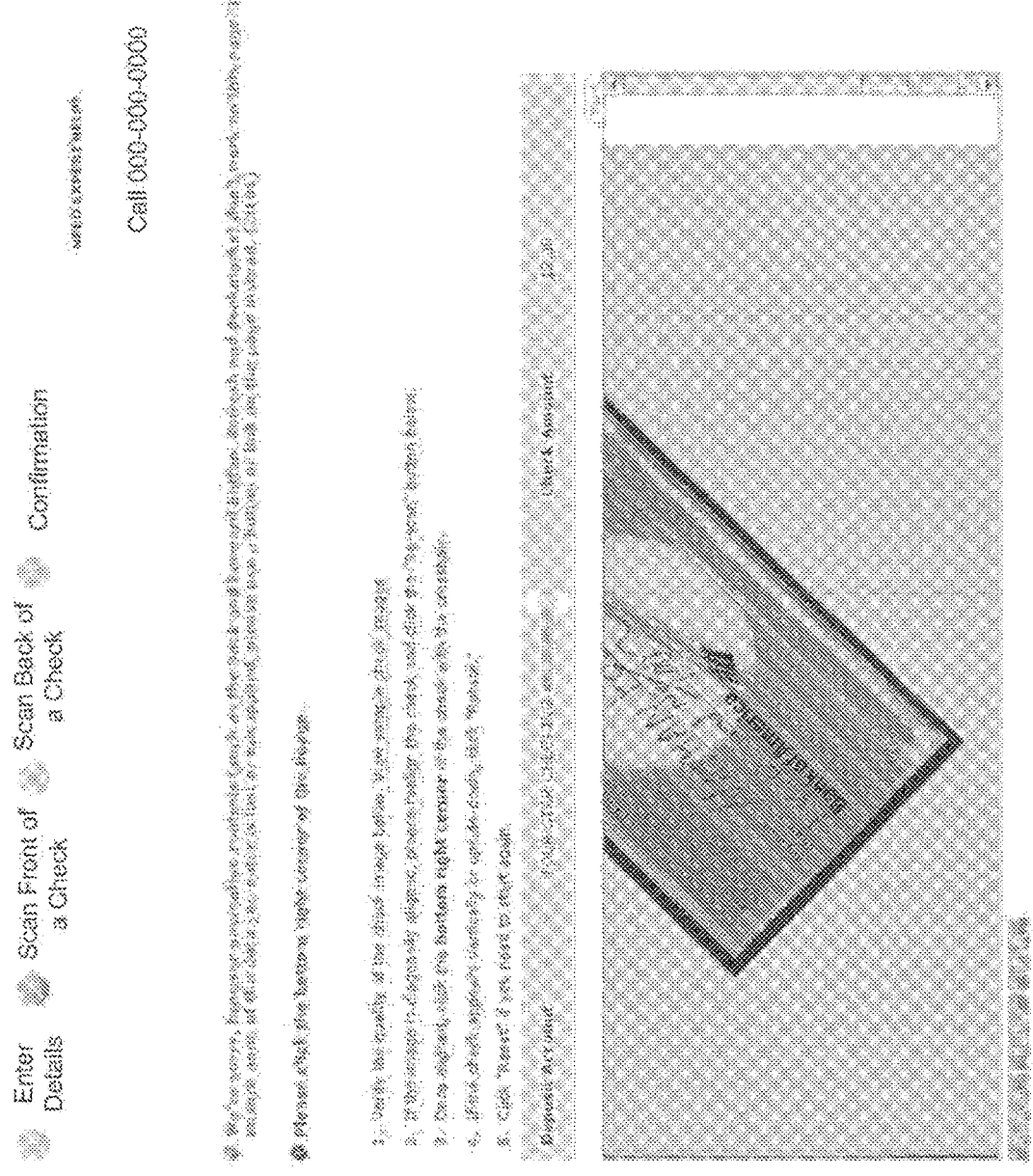
FIG. 12I provides another example screen shot of user interfaces illustrating aspects of remote deposit via a personal computer within one embodiment of the PS-PLATFORM.
Figure 12J:
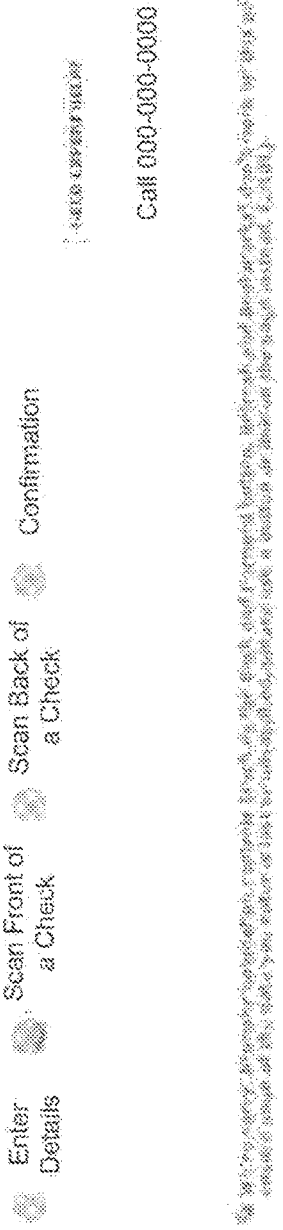
FIG. 12J provides another example screen shot of user interfaces illustrating aspects of remote deposit via a personal computer within one embodiment of the PS-PLATFORM.
Figure 12J:
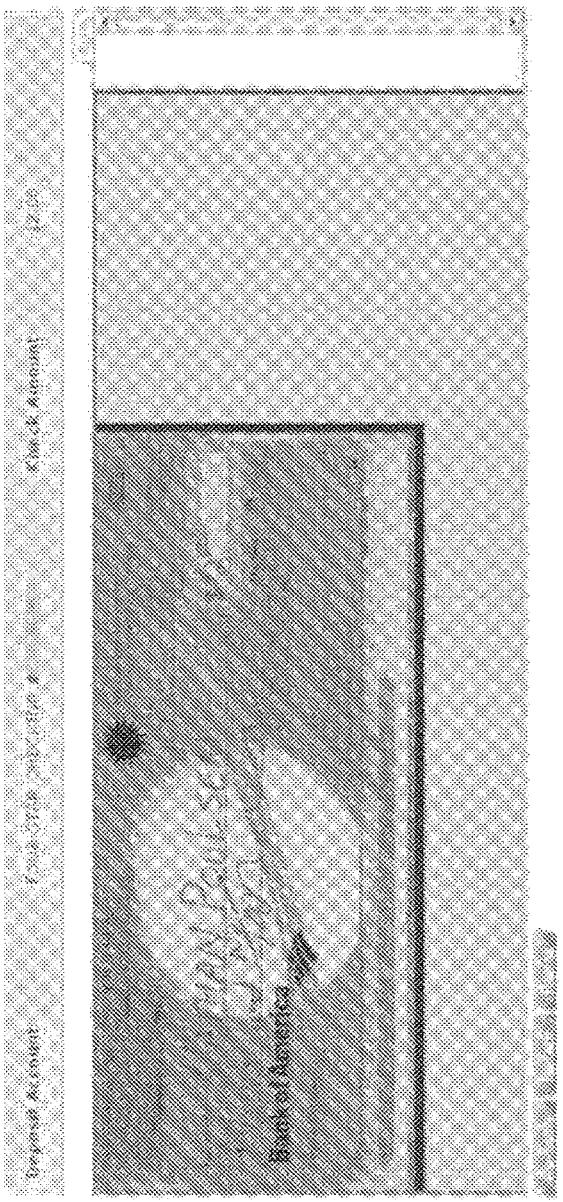
Figure 12K:
FIG. 12K provides another example screen shot of user interfaces illustrating aspects of remote deposit via a personal computer within one embodiment of the PS-PLATFORM.
Figure 12K:
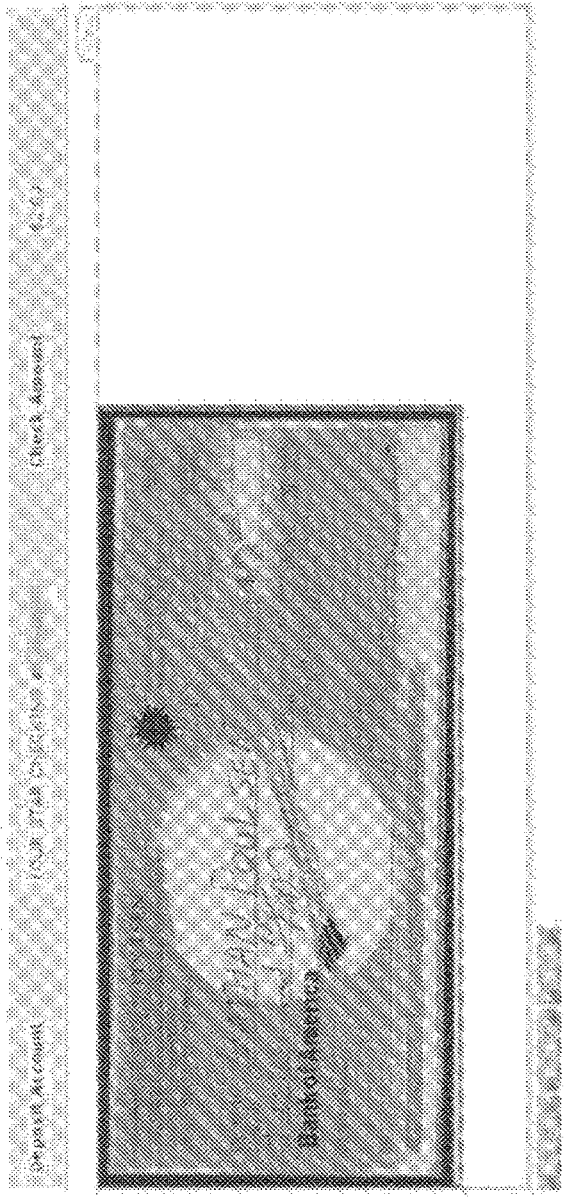
Figure 12L:
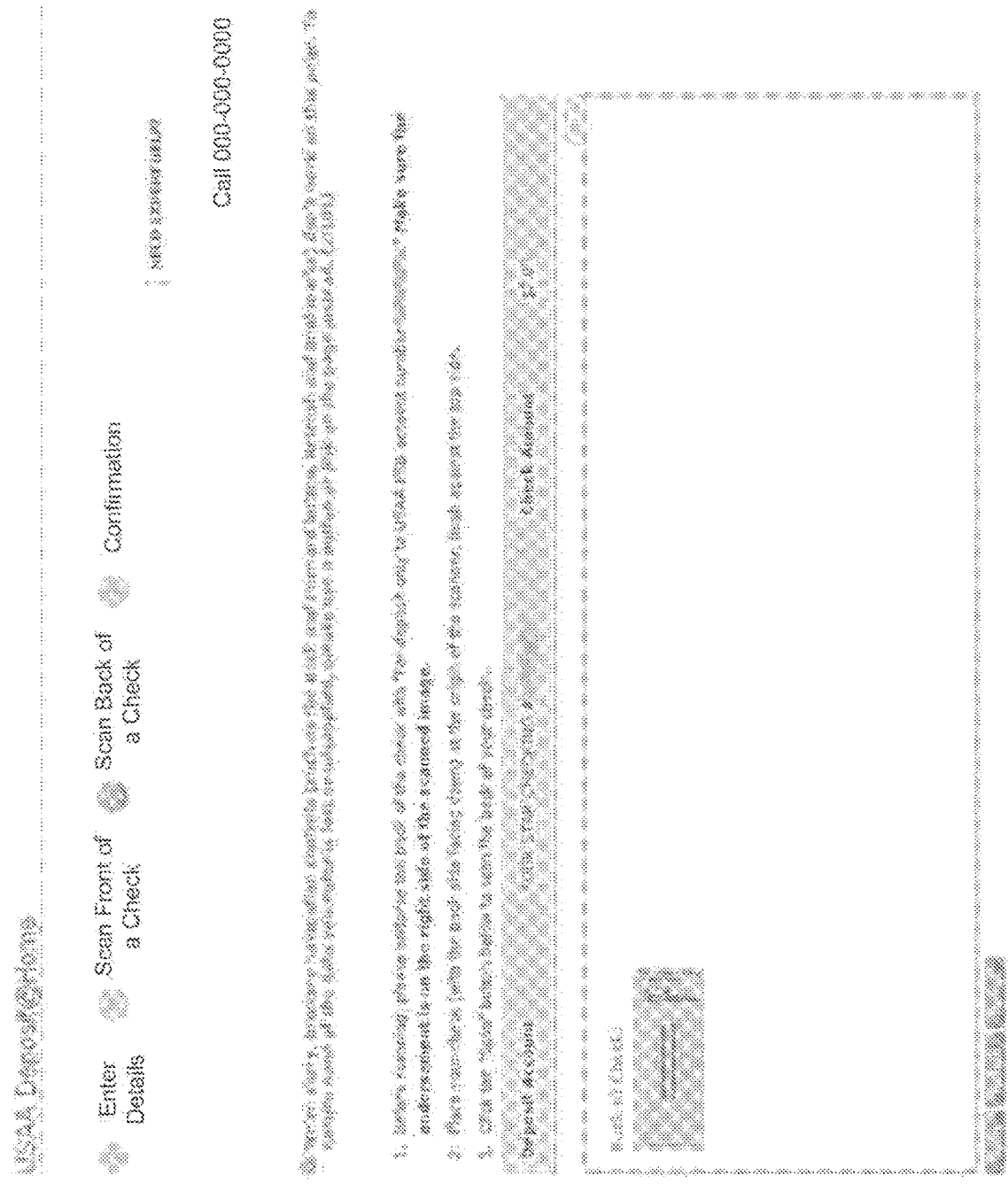
FIG. 12L provides another example screen shot of user interfaces illustrating aspects of remote deposit via a personal computer within one embodiment of the PS-PLATFORM.
Figure 12M:
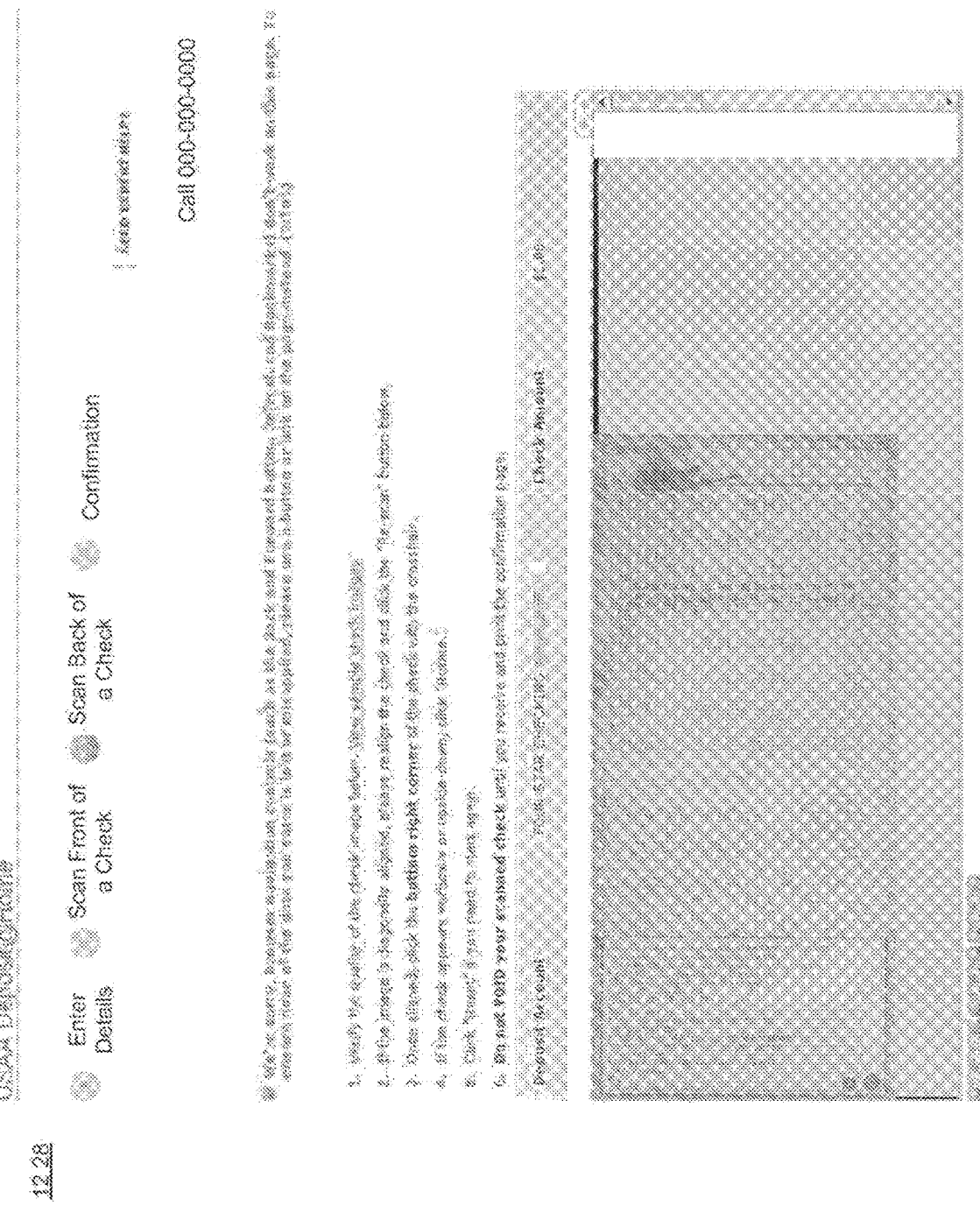
FIG. 12M provides another example screen shot of user interfaces illustrating aspects of remote deposit via a personal computer within one embodiment of the PS-PLATFORM.
Figure 12N:
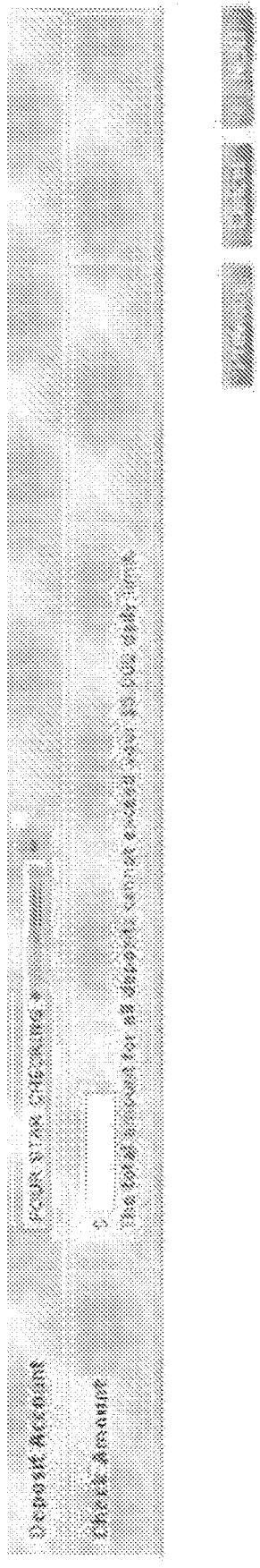
FIG. 12N provides another example screen shot of user interfaces illustrating aspects of remote deposit via a personal computer within one embodiment of the PS-PLATFORM.
Figure 12O:
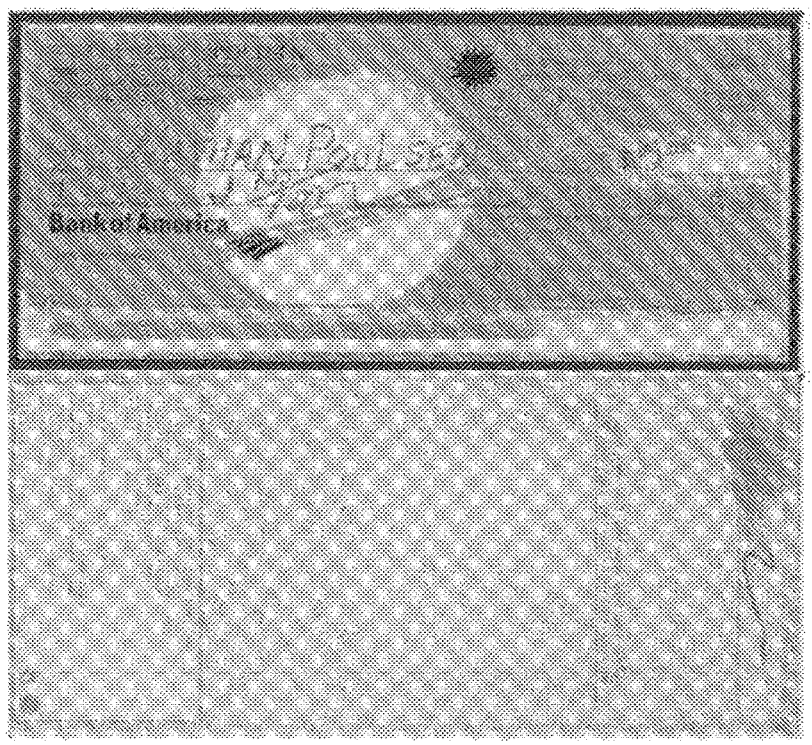
FIG. 12O provides another example screen shot of user interfaces illustrating aspects of remote deposit via a personal computer within one embodiment of the PS-PLATFORM.

FIGS. 12A-O provide example screen shots of user interfaces illustrating aspects of remote deposit via a website within one embodiment of the PS-PLATFORM. In one embodiment, a user may access a PS-PLATFORM website at a personal computer 1201, and the PS-PLATFORM may provide a user interface for user certification 1202. For example, a user has to review and agree with terms and conditions of PS-PLATFORM in order to proceed with remote deposit.

In one embodiment, the PS-PLATFORM may prompt the user to login with an online ID and password 1204. Upon successful login, the PS-PLATFORM may provide deposit account information to the user, and allow the user to input a deposit amount 1205. In one embodiment, the PS-PLATFORM may provide details for the user on digital signature verification of the website 1208, and instruct the user to scan a paper check 1210. In one implementation, the PS-PLATFORM may remotely control a scanner connected to the personal computer of the user, and let the user choose the scanner from a drop-down list 1212.

In one embodiment, the PS-PLATFORM may then instruct the user to place the paper check in the scanner bed. If the paper check is not properly positioned as shown, the PS-PLATFORM may display an incomplete, skewed or improperly positioned check image to the user 1215 and 1218 such that the user may choose to rescan. In one implementation, if the user has properly positioned the paper check in a rectangle area as instructed via the PS-PLATFORM interface 1220, the PS-PLATFORM may request the user to select a bottom right corner of the scanned check image and then detect an area of the image of the check from its background 1222. In one embodiment, the PS-PLATFORM may instruct the user to endorse the check and scan the back side of the check 1225. If the PS-PLATFORM detects that the check is not endorsed 1228, the image may be denied and an error message may be displayed 1230.

In one embodiment, if both sides of the check have been successfully scanned and the PS-PLATFORM verifies the uploaded images, the PS-PLATFORM may deposit the funds into the user account and provide deposit details to the user including the scanned check images. In one implementation, the PS-PLATFORM may instruct the user to void and dispose the deposited paper check 1235.

In one embodiment, an image of ripped check may be submitted to verify the check has been voided in a similar manner as shown in FIG. 11H.

PS-PLATFORM Controller

Figure 13:
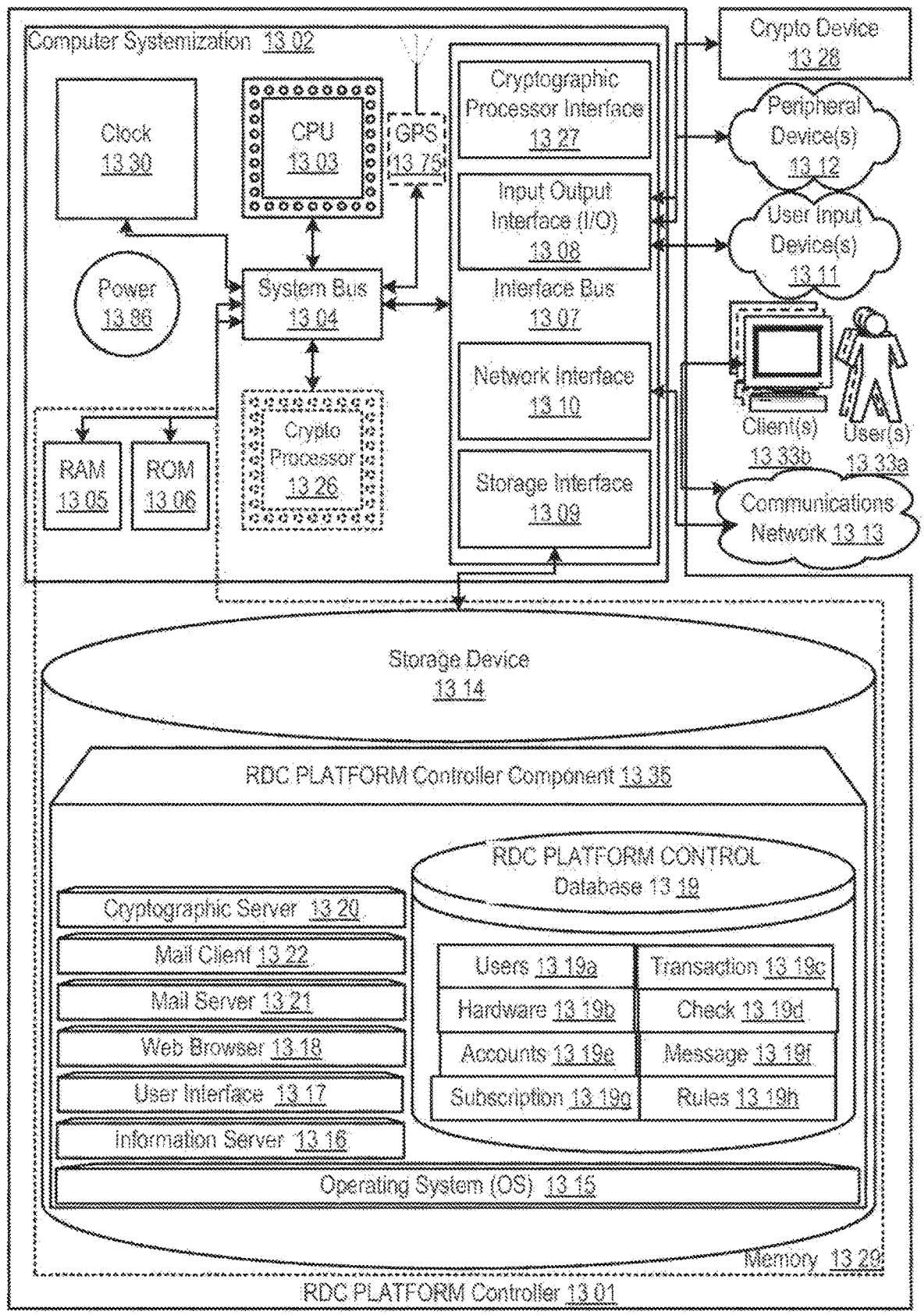
FIG. 13 is of a block diagram illustrating embodiments of the PS-PLATFORM controller.

FIG. 13 illustrates inventive aspects of a PS-PLATFORM controller 1301 in a block diagram. In this embodiment, the PS-PLATFORM controller 1301 may serve to aggregate, process, store, search, serve, identify, instruct, generate, match, and/or facilitate interactions with a computing device through secured banking technologies, and/or other related data.

Typically, users, which may be people and/or other systems, may engage information technology systems (e.g., computers) to facilitate information processing. In turn, computers employ processors to process information; such processors 1303 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1329 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the PS-PLATFORM controller 1301 may be connected to and/or communicate with entities such as, but not limited to: one or more users from user input devices 1311; peripheral devices 1312; an optional cryptographic processor device 1328; and/or a communications network 1313.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The PS-PLATFORM controller 1301 may be based on computer systems that may comprise, but are not limited to, components such as: a computer systemization 1302 connected to memory 1329.

Computer Systemization

A computer systemization 1302 may comprise a clock 1330, central processing unit ("CPU(s)" and/or "processor(s)" (these terms are used interchangeable throughout the disclosure unless noted to the contrary)) 1303, a memory 1329 (e.g., a read only memory (ROM) 1306, a random access memory (RAM) 1305, etc.), and/or an interface bus 1307, and most frequently, although not necessarily, are all interconnected and/or communicating through a system bus 1304 on one or more (mother)board(s) 1302 having conductive and/or otherwise transportive circuit pathways through which instructions (e.g., binary encoded signals) may travel to effect communications, operations, storage, etc. Optionally, the computer systemization may be connected to an internal power source 1386. Optionally, a cryptographic processor 1326 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the PS-PLATFORM controller and beyond through various interfaces. Should processing requirements dictate a greater amount speed and/or capacity, distributed processors (e.g., Distributed PS-PLATFORM), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the PS-PLATFORM may be achieved by implementing a microcontroller such as CAST's R8051XC2 microcontroller; Intel's MCS 51 (i.e., 8051 microcontroller); and/or the like. Also, to implement certain features of the PS-PLATFORM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the PS-PLATFORM component collection (distributed or otherwise) and/or features may be implemented via the microprocessor and/or via embedded components; e.g., via ASIC, coprocessor, DSP, FPGA, and/or the like. Alternately, some implementations of the PS-PLATFORM may be implemented with embedded components that are configured and used to achieve a variety of features or signal processing.

Depending on the particular implementation, the embedded components may include software solutions, hardware solutions, and/or some combination of both hardware/software solutions. For example, PS-PLATFORM features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the PS-PLATFORM features. A hierarchy of programmable interconnects allow logic blocks to be interconnected as needed by the PS-PLATFORM designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the PS-PLATFORM may be developed on regular FPGAs and then migrated into a fixed version that more resembles ASIC implementations. Alternate or coordinating implementations may migrate PS-PLATFORM controller features to a final ASIC instead of or in addition to FPGAs. Depending on the implementation all of the aforementioned embedded components and microprocessors may be considered the "CPU" and/or "processor" for the PS-PLATFORM.

Power Source

The power source 1386 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1386 is connected to at least one of the interconnected subsequent components of the PS-PLATFORM thereby providing an electric current to all subsequent components. In one example, the power source 1386 is connected to the system bus component 1304. In an alternative embodiment, an outside power source 1386 is provided through a connection across the I/O 1308 interface. For example, a USB and/or IEEE 1394 connection carries both data and power across the connection and is therefore a suitable source of power.

Interface Adapters

Interface bus(es) 1307 may accept, connect, and/or communicate to a number of interface adapters, conventionally although not necessarily in the form of adapter cards, such as but not limited to: input output interfaces (I/O) 1308, storage interfaces 1309, network interfaces 1310, and/or the like. Optionally, cryptographic processor interfaces 1327 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1309 may accept, communicate, and/or connect to a number of storage devices such as, but not limited to: storage devices 1314, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1310 may accept, communicate, and/ or connect to a communications network 1313. Through a communications network 1313, the PS-PLATFORM controller is accessible through remote clients 1333b (e.g., computers with web browsers) by users 1333a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PS-PLATFORM), architectures may similarly be employed to pool, load balance, and/or otherwise increase the communicative bandwidth required by the PS-PLATFORM controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1310 may be used to engage with various communications network types 1313. For example, multiple network interfaces may be employed to allow for the communication over broadcast, multicast, and/or unicast networks.

Input Output interfaces (I/O) 1308 may accept, communicate, and/or connect to user input devices 1311, peripheral devices 1312, cryptographic processor devices 1328, and/or the like. I/O may employ connection protocols such as, but not limited to: audio, analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1311 may be card readers, dongles, finger print readers, gloves, graphics tablets, joysticks, keyboards, mouse (mice), remote controls, retina readers, trackballs, trackpads, and/or the like.

Peripheral devices 1312 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the PS-PLATFORM controller may be embodied as an embedded, dedicated, and/or monitor-less (i.e., headless) device, wherein access would be provided over a network interface connection.

Cryptographic units such as, but not limited to, microcontrollers, processors 1326, interfaces 1327, and/or devices 1328 may be attached, and/or communicate with the PS-PLATFORM controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1329. However, memory is a fungible technology and resource, thus, any number of memory embodiments may be employed in lieu of or in concert with one another. It is to be understood that the PS-PLATFORM controller and/or a computer systemization may employ various forms of memory 1329. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1329 will include ROM 1306, RAM 1305, and a storage device 1314. A storage device 1314 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1329 may contain a collection of program and/or database components and/or data such as, but not limited to: operating system component(s) 1315 (operating system); information server component(s) 1316 (information server); user interface component(s) 1317 (user interface); Web browser component(s) 1318 (Web browser); database(s) 1319; mail server component(s) 1321; mail client component(s) 1322; cryptographic server component(s) 1320 (cryptographic server); the PS-PLATFORM component(s) 1335; and/or the like (i.e., collectively a component collection). These components may be stored and accessed from the storage devices and/or from storage devices accessible through an interface bus. Although non-conventional program components such as those in the component collection, typically, are stored in a local storage device 1314, they may also be loaded and/or stored in memory such as: peripheral devices, RAM, remote storage facilities through a communications network, ROM, various forms of memory, and/or the like.

Operating System

The operating system component 1315 is an executable program component facilitating the operation of the PS-PLATFORM controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the PS-PLATFORM controller to communicate with other entities through a communications network 1313. Various communication protocols may be used by the PS-PLATFORM controller as a subcarrier transport mechanism for interaction, such as, but not limited to: multicast, TCP/IP, UDP, unicast, and/or the like.

Information Server

An information server component 1316 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the PS-PLATFORM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the PS-PLATFORM database 1319, operating systems, other program components, user interfaces, Web browsers, and/or the like.

Access to the PS-PLATFORM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the PS-PLATFORM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the PS-PLATFORM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc., interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1317 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1318 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the PS-PLATFORM enabled nodes. The combined application may be nugatory on systems employing standard Web browsers.

Mail Server

A mail server component 1321 is a stored program component that is executed by a CPU 1303. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the PS-PLATFORM.

Access to the PS-PLATFORM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1322 is a stored program component that is executed by a CPU 1303. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1320 is a stored program component that is executed by a CPU 1303, cryptographic processor 1326, cryptographic processor interface 1327, cryptographic processor device 1328, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the PS-PLATFORM may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the PS-PLATFORM component to engage in secure transactions if so desired. The cryptographic component facilitates the secure accessing of resources on the PS-PLATFORM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The PS-PLATFORM Database

The PS-PLATFORM database component 1319 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the PS-PLATFORM database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the PS-PLATFORM database is implemented as a data-structure, the use of the PS-PLATFORM database 1319 may be integrated into another component such as the PS-PLATFORM component 1335. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1319 includes several tables 1319*a-h*. A users table 1319*a* includes fields such as, but not limited to: a user_ID, user_name, user_password, user_bank_ID, account_ID, transaction_ID, user_accountNo, user_transaction, user_hardware, and/or the like. The user table may support and/or track multiple entity accounts on a PS-PLATFORM. A hardware table 1319*b* includes fields such as, but not limited to: hardware_ID, hardware_type, hardware_name, data_formatting requirements, bank_ID, protocols, addressing_info, usage history, hardware_requirements, user_ID, and/or the like. A transaction table 1319*c* includes fields such as, but not limited to transaction_ID, transaction_time, transaction_account, transaction_payee, transaction_bank, transaction_payer, transaction_status, transaction_clearance, and/or the like. A check table 1319*d* includes fields such as check_ID, account_ID, transaction_ID, image_timestamp, image MICR, image_status, image user, image_device, image_account and/or the like. An accounts table 1319*e* includes fields such as, but not limited to account_ID, user_ID, bank_ID, account_number, routing number, account_type, account_amount, account_limit, and/or the like. A message table 1019*f* includes fields such as, but not limited to user_ID, bank_ID, message ID, message title, message body, message_timestamp, message_checkID, message_ruleID, message_subID, and/or the like. A subscription table 1019*g* includes fields such as, but not limited to subscription ID, subscription bank, subscription rule, subscription user, subscription_level, and/or the like. A rules table 1019*h* includes fields such as, but not limited to rule_ID, rule_bank, rule_user, rule_subscription, rule_title, rule body, rule_transaction, and/or the like.

In one embodiment, the PS-PLATFORM database may interact with other database systems. For example, employing a distributed database system, queries and data access by search PS-PLATFORM component may treat the combination of the PS-PLATFORM database, an integrated data security layer database as a single database entity.

In one embodiment, user programs may contain various user interface primitives, which may serve to update the PS-PLATFORM. Also, various accounts may require custom database tables depending upon the environments and the types of clients the PS-PLATFORM may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1319*a-d*. The PS-PLATFORM may be configured to keep track of various settings, inputs, and parameters via database controllers.

The PS-PLATFORM database may communicate to and/or with other components in a component collection, including itself, and/or facilities of the like. Most frequently, the PS-PLATFORM database communicates with the PS-PLATFORM component, other program components, and/or the like. The database may contain, retain, and provide information regarding other nodes and data.

The PS-PLATFORMS

The PS-PLATFORM component 1335 is a stored program component that is executed by a CPU. In one embodiment, the PS-PLATFORM component incorporates any and/or all combinations of the aspects of the PS-PLATFORM that was discussed in the previous figures. As such, the PS-PLATFORM affects accessing, obtaining and the provision of information, services, transactions, and/or the like across various financial institutions and communications networks.

The PS-PLATFORM component enabling access of information between nodes may be developed by employing standard development tools and languages such as, but not limited to: Apache components, Assembly, ActiveX, binary executables, (ANSI) (Objective-) C (++), C# and/or NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the PS-PLATFORM server employs a cryptographic server to encrypt and decrypt communications. The PS-PLATFORM component may communicate to and/or with other components in a component collection, including itself, and/or facilities of the like. Most frequently, the PS-PLATFORM component communicates with the PS-PLATFORM database, operating systems, other program components, and/or the like. The PS-PLATFORM may contain, communicate, generate, obtain, and/or provide program component, system, user, and/or data communications, requests, and/or responses.

Distributed PS-PLATFORMs

The structure and/or operation of any of the PS-PLATFORM node controller components may be combined, consolidated, and/or distributed in any number of ways to facilitate development and/or deployment. Similarly, the component collection may be combined m any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the PS-PLATFORM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method for implementing digital image processing on a digital image, comprising:
   validating, by a server computer according to an authentication process, a computing device based on a digital certificate assigned to the computing device;
   remotely controlling, by the server computer according to the authentication process, the computing device to generate a digital image of a document when the computing device is validated based on the digital certificate;
   receiving, by the server computer, the digital image of the document;
   receiving, by the server computer, metadata related to the document;
   determining, by the server computer, based on a character misread symbol in the metadata related to the document, whether the digital image includes one or more misread characters;
   determining, by the server computer, whether a number of the one or more misread characters exceed a predetermined misread threshold;
   when the number of the one or more misread characters does not exceed the predetermined misread threshold, determining, by the server computer, to proceed with processing of the digital image of the document; and
   when the number of the one or more misread characters does exceed the predetermined misread threshold, flagging, delaying, or terminating processing of the digital image of the document by the server computer.

2. The method of claim 1, wherein determining whether the digital image includes one or more misread characters comprises:
   determining whether one or more misread characters are included in a first portion of the digital image corresponding to an account field of the document; and
   determining whether one or more misread characters are included in a second portion of the digital image corresponding to a MICR line field of the document.

3. The method of claim 2, wherein determining whether the one or more misread characters exceed a predetermined misread threshold comprises:
   determining whether the one or more misread characters exceed a predetermined account field misread threshold; and
   determining whether the one or more misread characters exceed a predetermined MICR line misread threshold.

4. The method of claim 1, wherein:
   the metadata including a magnetic ink character recognition (MICR) string and a transit routing number; and
   the method further comprises:
      comparing the MICR string to previously received MICR strings;
      when the MICR string does not match any of the previously received MICR strings based on the comparing of the MICR string to the previously received MICR strings, determining duplicate document detection has not occurred; and
      when the MICR string does match any of the previously received MICR strings based on the comparing of the MICR string to the previously received MICR strings, flagging, delaying, or terminating processing of the digital image of the document.

5. The method of claim 4, wherein comparing the MICR string to previously received MICR strings comprises:
   comparing the MICR string to previously received MICR strings included on previously received digital images sharing the same transit routing number included in the metadata.

6. The method of claim 1, wherein the character misread symbol is a non-alphanumeric symbol.

7. The method of claim 1, further comprising:
   modifying the digital image to replace non-numeric characters in a MICR line with spaces.

8. The method of claim 1, further comprising:
   generating a document record including information identified from the digital image; and
   storing the document record and the digital image in a records database.

9. A server computer, comprising:
   a processor configured to implement an authentication process to:
      obtain a digital certificate assigned to a computing device;
      validate the computing device based on the digital certificate;
      remotely control, according to the authentication process, the computing device to generate a digital image of a document when the computing device is validated based on the digital certificate;
      determine, based on a character misread symbol in the metadata related to the document, whether the digital image includes one or more misread characters;
      determine whether a number of the one or more misread characters exceed a predetermined misread threshold;
      when the number of the one or more misread characters does not exceed the predetermined misread threshold, determine to proceed with processing of the digital image of the document; and
      when the number of the one or more misread characters does exceed the predetermined misread threshold, flag, delay, or terminate processing of the digital image of the document.

10. The server computer of claim 9, wherein the processor is configured to:
    determine whether one or more misread characters are included in a first portion of the digital image corresponding to an account field of the document; and
    determine whether one or more misread characters are included in a second portion of the digital image corresponding to a MICR line field of the document.

11. The server computer of claim 9, wherein the processor is configured to:
    determine whether the one or more misread characters exceed a predetermined account field misread threshold; and
    determine whether the one or more misread characters exceed a predetermined MICR line misread threshold.

12. The server computer of claim 9, wherein:
    the metadata including a magnetic ink character recognition (MICR) string and a transit routing number; and
    the processor is further configured to:
       compare the MICR string to previously received MICR strings;
       when the MICR string does not match any of the previously received MICR strings based on the comparing of the MICR string to the previously received MICR strings, determine duplicate document detection has not occurred; and when the MICR string does match any of the previously received MICR strings based on the comparing of the MICR string to the previously received MICR strings, flag, delay, or terminate processing of the digital image of the document.

13. The server computer of claim 12, wherein the processor is configured to:
compare the MICR string to previously received MICR strings included on previously received digital images sharing the same transit routing number included in the metadata.

14. The server computer of claim 12, wherein:
the character misread symbol is a non-alphanumeric symbol; and
at least the MICR string in the digital image has been digitally modified according to an optical character recognition (OCR) process.

15. The server computer of claim 9, wherein the processor is further configured to:
modify the digital image to replace non-numeric characters in a MICR line with spaces.

16. A non-transitory computer-readable medium storing processor executable instructions that, when executed by a processor, cause the processor to:
validate, according to an authentication process, a computing device based on a digital certificate assigned to the computing device;
remotely control, according to the authentication process, the computing device to generate a digital image of a document when the computing device is validated based on the digital certificate;
receive the digital image generated of the document;
receive metadata related to the document;
determine, based on a character misread symbol in the metadata related to the document, whether the digital image includes one or more misread characters;
determine whether a number of the one or more misread characters exceed a predetermined misread threshold;
when the number of the one or more misread characters does not exceed the predetermined misread threshold, determine to proceed with processing of the digital image of the document; and
when the number of the one or more misread characters does exceed the predetermined misread threshold, flag, delay, or terminate processing of the digital image of the document.

17. The non-transitory computer-readable medium of claim 16, wherein:
the metadata includes a magnetic ink character recognition (MICR) string and a transit routing number; and
the processor executable instructions, when executed by the processor, further cause the processor to:
compare the MICR string to previously received MICR strings;
when the MICR string does not match any of the previously received MICR strings based on the comparing of the MICR string to the previously received MICR strings, determining duplicate document detection has not occurred; and
when the MICR string does match any of the previously received MICR strings based on the comparing of the MICR string to the previously received MICR strings, flagging, delaying, or terminating processing of the digital image captured of the document.

* * * * *